(12) United States Patent
Shimoda et al.

(10) Patent No.: US 12,464,597 B2
(45) Date of Patent: Nov. 4, 2025

(54) USER APPARATUS, BASE STATION AND COMMUNICATION SYSTEM

(71) Applicant: Mitsubishi Electric Corporation, Chiyoda-ku (JP)

(72) Inventors: Tadahiro Shimoda, Tokyo (JP); Mitsuru Mochizuki, Tokyo (JP); Fumihiro Hasegawa, Tokyo (JP); Noriyuki Fukui, Tokyo (JP); Daichi Uchino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/361,048

(22) Filed: Jul. 28, 2023

(65) Prior Publication Data

US 2024/0032137 A1    Jan. 25, 2024

Related U.S. Application Data

(63) Continuation of application No. 17/052,255, filed as application No. PCT/JP2019/023251 on Jun. 12, 2019, now abandoned.

(30) Foreign Application Priority Data

Jun. 19, 2018   (JP) .................................. 2018-116008

(51) Int. Cl.
   *H04W 76/27*   (2018.01)
   *H04B 7/06*    (2006.01)
   *H04W 72/27*   (2023.01)

(52) U.S. Cl.
   CPC ........ *H04W 76/27* (2018.02); *H04B 7/06964* (2023.05); *H04W 72/27* (2023.01)

(58) Field of Classification Search
   CPC ..... H04W 72/27; H04W 76/27; H04W 76/34; H04W 76/15; H04B 7/022; H04B 7/0695
   See application file for complete search history.

(56) References Cited

U.S. PATENT DOCUMENTS

2018/0191483 A1    7/2018  Yamazaki et al.
2018/0192426 A1*   7/2018  Ryoo ................ H04W 36/0055
                           (Continued)

FOREIGN PATENT DOCUMENTS

| EP | 2800428 A1 | 11/2014 |
|----|---|---|
| JP | 2017-208583 A | 11/2017 |
| WO | 2017/038337 A1 | 7/2018 |

OTHER PUBLICATIONS

3GPP TSG-RAN WG2 Meeting #100; R2-1714208; Source: Ericsson; Title: Offline#22 LTE re-establishment and resume while using NR PDCP (Ericsson)Reno, US, Nov. 27-Dec. 1, 2017 (Year: 2017).*

(Continued)

*Primary Examiner* — Mohammed S Chowdhury
(74) *Attorney, Agent, or Firm* — PROCOPIO, CORY, HARGREAVES & SAVITCH LLP

(57) ABSTRACT

Provided is a communication system with low latency and high reliability, etc. Even after transitioning from RRC_CONNECTED to RRC_INACTIVE, a communication terminal device maintains secondary base station configuration information on configuring a secondary base station. Even when at least one of a master base station and a secondary base station is changed during the RRC_INACTIVE, the communication terminal device maintains the secondary base station configuration information. The communication terminal device again transitions to the RRC_CONNECTED using the maintained secondary base station configuration information.

13 Claims, 64 Drawing Sheets

(56) References Cited

U.S. PATENT DOCUMENTS

| | | | |
|---|---|---|---|
| 2020/0084825 A1* | 3/2020 | Yang | H04W 76/28 |
| 2020/0169912 A1 | 5/2020 | Chang et al. | |
| 2020/0205042 A1* | 6/2020 | Ryu | H04W 36/0027 |
| 2020/0205123 A1* | 6/2020 | Byun | H04W 76/27 |
| 2020/0221526 A1* | 7/2020 | Jin | H04W 80/08 |
| 2020/0245388 A1* | 7/2020 | Byun | H04W 76/27 |
| 2020/0351782 A1* | 11/2020 | Kubota | H04W 48/08 |
| 2020/0389810 A1* | 12/2020 | Wang | H04W 76/11 |
| 2021/0120475 A1 | 4/2021 | Yang et al. | |
| 2021/0337436 A1 | 10/2021 | Teyeb et al. | |
| 2022/0141748 A1* | 5/2022 | Lee | H04W 36/0069 370/331 |
| 2023/0199558 A1* | 6/2023 | Wang | H04W 28/08 370/329 |
| 2024/0236788 A1* | 7/2024 | Yilmaz | H04W 36/0033 |

OTHER PUBLICATIONS

3GPP TSG-RAN WG2 NR#2; Tdoc R2-1707201; Source: Ericsson; Title: NR RRCConnectionReconfiguration procedure and signalling baseline; Qingdao, China, Jun. 27-29, 2017 (Year: 2017).*
3GPP TSG-RAN WG3 NR AdHoc; R3-172377; Source: CATT ; Title: Periodic RNA update ; Qingdao, China, Jun. 27-29, 2017. See §2.1, §2.2. (Year: 2017).*
3GPP TSG RAN WG2 Meeting#101; R2-1802929; Source: Intel Corporation; Title: TP on agreed NR Inactive aspects; Athens, Greece, Feb. 26-Mar. 2, 2018 (Year: 2018).*
International Search Report issued on Sep. 3, 2019 in PCT/JP2019/023251 filed on Jun. 12, 2019, 1 page.
3GPP TS 36.300 V14.3.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14), 2017, pp. 1-331.
"LS on HNB/HeNB Open Access Mode", 3GPP TSG-SA1 #42, S1-083461, 2008, 2 total pages.
3GPP TR 36.814 V9.2.0, $3^{rd}$ Generation Partnership Project; Technical Specification Group Radio Access Network; Evolved Universal Terrestrial Radio Access (E-UTRA); Further advancements for E-UTRA physical layer aspects (Release 9), 2017, pp. 1-105.
3GPP TR 36.912 V14.0.0, $3^{rd}$ Generation Partnership Project; Technical Specification Group Radio Access Network; Feasibility study for Further Advancements for E-UTRA (LTE-Advanced) (Release 14), 2017, 252 total pages.
Popovski et al., "Scenarios, requirements and KPIs for 5G mobile and wireless system", ICT-317669-METIS/D1.1, Mobile and wireless communications Enablers for the Twenty-twenty Information Society (METIS), Deliverable D1.1, 2013, pp. 1-75 (83 total pages).
3GPP TR 23.799 V14.0.0, $3^{rd}$ Generation Partnership Project; Technical Specification Group Services and System Aspects; Study on Architecture for Next Generation System (Release 14), 2016, pp. 1-522.
3GPP TR 38.801 V14.0.0, $3^{rd}$ Generation Partnership Project; Technical Specification Group Radio Access Network; Study on new radio access technology: Radio access architecture and interfaces (Release 14), 2017, pp. 1-91.
3GPP TR 38.802 V14.1.0, $3^{rd}$ Generation Partnership Project; Technical Specification Group Access Network; Study on New Radio Access Technology Physical Later Aspects (Release 14), 2017, pp. 1-144.
3GPP TR 38.804 V14.0.0, $3^{rd}$ Generation Partnership Project; Technical Specification Group Radio Access Network; Study on New Radio Access Technology; Radio Interface Protocol Aspects (Release 14), 2017, pp. 1-57.
3GPP TR 38.912 V14.0.0, $3^{rd}$ Generation Partnership Project; Technical Specification Group Radio Access Network; Study on New Radio (NR) access technology (Release 14), 2017, pp. 1-74.
"Work Item on New Radio (NR) Access Technology", 3GPP TSG RAN Meeting #77, RP-172115, 2017, 47 total pages.
3GPP TS 37.340 V15.0.0, $3^{rd}$ Generation Partnership Project; Technical Specification Group Radio Access Network; Evolved Universal Terrestrial Radio Access (E-UTRA) and NR; Multi-connectivity; Stage 2 (Release 15), 2017, pp. 1-51.
3GPP TS 38.211 V15.0.0, $3^{rd}$ Generation Partnership Project; Technical Specification Group Radio Access Network; NR; Physical channels and modulation (Release 15), 2017, pp. 1-73.
3GPP TS 38.213 V15.0.0, $3^{rd}$ Generation Partnership Project; Technical Specification Group Radio Access Network; NR; Physical layer procedures for control (Release 15), 2017, pp. 1-56.
3GPP TS 38.214 V15.0.0, $3^{rd}$ Generation Partnership Project; Technical Specification Group Radio Access Network; NR; Physical layer procedures for data (Release 15), 2017, pp. 1-71.
3GPP TS 38.300 V15.0.0, $3^{rd}$ Generation Partnership Project; Technical Specification Group Radio Access Network; NR; NR and NG-RAN Overall Description; Stage 2 (Release 15), 2017, pp. 1-68.
3GPP TS 38.321 V15.1.0, $3^{rd}$ Generation Partnership Project; Technical Specification Group Radio Access Network; NR; Medium Access Control (MAC) protocol specification (Release 15), 2018, pp. 1-67.
3GPP TS 38.212 V15.0.0, $3^{rd}$ Generation Partnership Project; Technical Specification Group Radio Access Network; NR; Multiplexing and channel coding (Release 15), 2017, pp. 1-82.
3GPP TS 36.331 V15.1.0, $3^{rd}$ Generation Partnership Project; Technical Specification Group Radio Access Network; Evolved Universal Terrestrial Radio Access (E-UTRA); Radio Resource Control (RRC); Protocol specification (Release 15), 2018, pp. 1-785.
"Remaining issues on NR-PBCH", 3GPP TSG RAN WG1 Meeting #92, R1-1802461, 2018, 6 total pages.
3GPP TS 37.324 V1.5.0, $3^{rd}$ Generation Partnership Project; Technical Specification Group Radio Access Network; E-UTRA and NR; Service Data Adaptation Protocol (SDAP) specification (Release 15), 2018, pp. 1-12 (13 total pages).
"Per-CC gap for MR-DC", 3GPP TSG-RAN2 NR AH#3, R2-1801427, 2018 pp. 1-3.
3GPP TS 38.331 V15.1.0, $3^{rd}$ Generation Partnership Project; Technical Specification Group Radio Access Network; NR; Radio Resource Control (RRC) protocol specification (Release 15), 2018, pp. 1-268.
"5G Architecture Options—Full Set" RP-161266, Joint RAN/SA Meeting Jun. 14, 2016, 11 total pages.
Samsung, "MR-DC bearer management in inactive state" [online], 3GPP TSG-RAN WG2 Meeting #102, R2-1808302, 2018, pp. 1-5.
Extended European Search Report issued Feb. 8, 2022 in corresponding European Patent Application No. 19822483.4, 12 pages.
Qualcomm Incorporated: "MR-DC Mode in Inactive", 3GPP TSG-RAN WG2 Meeting NR ad-hoc 2; R2-1706892, (3GPP), vol. RAN WG2, no. Qingdao, China; XP051301389, Jun. 27-29, 2017, 6 pages.
Qualcomm Incorporated: "RRC_Inactive with MR_DC", 3GPP TSG-RAN WG2 Meeting NR ad-hoc 2; R3-172430, (3GPP), vol. RAN WG3, no. Qingdao, China; XP051308067, Jun. 20, 2017.
Qualcomm Incorporated: "RRC_Inactive with MR_DC", 3GPP TSG-RAN WG3 Meeting #97; R3-172739, (3GPP), vol. RAN WG3, no. Berlin, Germany; XP051319585, Aug. 21-25, 2017, 6 pages.
Ericsson: "RRC suspend/resume in LTE-NR tight interworking", 3GPP TSG-RAN WG2 NR AH#2; Tdoc R2-1706634 (Revision of R2-1704452), (3GPP), vol. RAN WG2, no. Qingdao; XP051301136, Jun. 27-29, 2017, 4 pages.
Qualcomm Incorporated: "RRC_Inactive with MR_DC", 3GPP TSG-RAN WG3 Meeting NR Ad-Hoc 2; R3-172430, (3GPP), vol. RAN WG3, no. Qingdao, XP051302372, Jun. 27-29, 2017, 6 pages.
Indian Office Action issued Sep. 19, 2022 in Indian Application No. 202047047902, with English translation, 8 pgs.
3GPP TSG-RAN WG2 2018 RAN2 Ad-hoc Meeting, R2-1801417; Source: Samsung; Title: Suspension of UE to RRC_Inactive in MR dual connectivity, Vancouver, Canada, Jan. 21-25, 2018 (Year: 2018).
3GPP TSG-RAN WG2 #101; R2-1802643; Source: Ericsson; Title: RRC procedures for inter-RAT mobility from N R to E-UTRA, Athens, Greece, Feb. 26-Mar. 2, 2018 (Year: 2018).

(56) References Cited

OTHER PUBLICATIONS

3GPP TSG-RAN WG2 #101bis; R2-1804796; Source: Ericsson; Title: TP to 36.331 for inter-RAT mobility between NR and E-UTRA, Sanya, P.R. of China, May 16 -20, 2018. (Year: 2018).
3GPP TSG-RAN WG2 #102; R2-1807386; Source: MediaTek Inc.; Title: SOAP state storage for inactive state, Busan, South Korea, May 21-25, 2018 (Year: 2018).
3GPP TSG-RAN WG2 Meeting #103; R2-1811461, Gothenburg, Sweden, Aug. 20-24, 2018, Source:InterDigital Inc.; Title: Dual Connectivity Configuration in Inactive for MR-DC (Year: 2018).
3GPP TSG-RAN WG2 N R#2; Tdoc R2-1706571; Source: Ericsson ; Title: RRC procedure and signalling for harmonised bearers; Qingdao, China, Jun. 27-29, 2017. (Year: 2017).
Chinese Patent Office, Chinese Office Action, Application No. CN201980039996.8, dated Dec. 1, 2023, in 15 pages.
European Patent Office, Extended European Search Report, Application No. 23186934.8, dated Nov. 2, 2023, in 11 pages.
Huawei, HiSilicon, Discussion on UE capability for LTE-NR switch time [online], 3GPP TSG RAN WG2 #101 R2-1802283, Internet<URL: http: //www.3gpp.org/ftp/tsg_ran/WG2_RL2/TSGR2_101/Docs/R2-1802283.zip>, Mar. 2, 2018, pp. 1, 2.
Japanese Patent Office, Office Action, Application No. 2023-137761, dated Oct. 8, 2024, in 6 pages.

* cited by examiner

F I G. 7
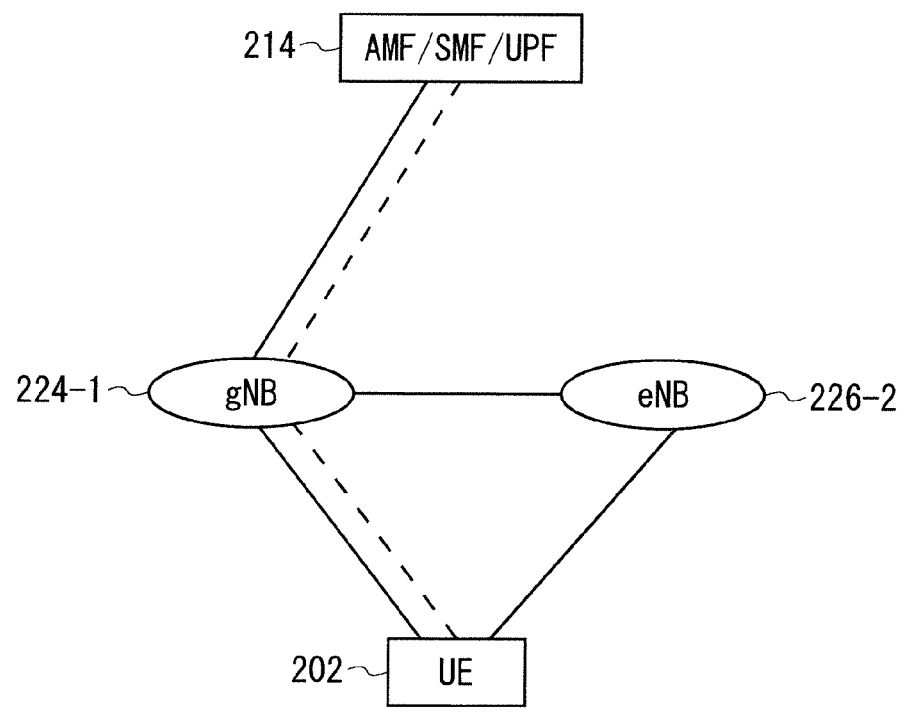

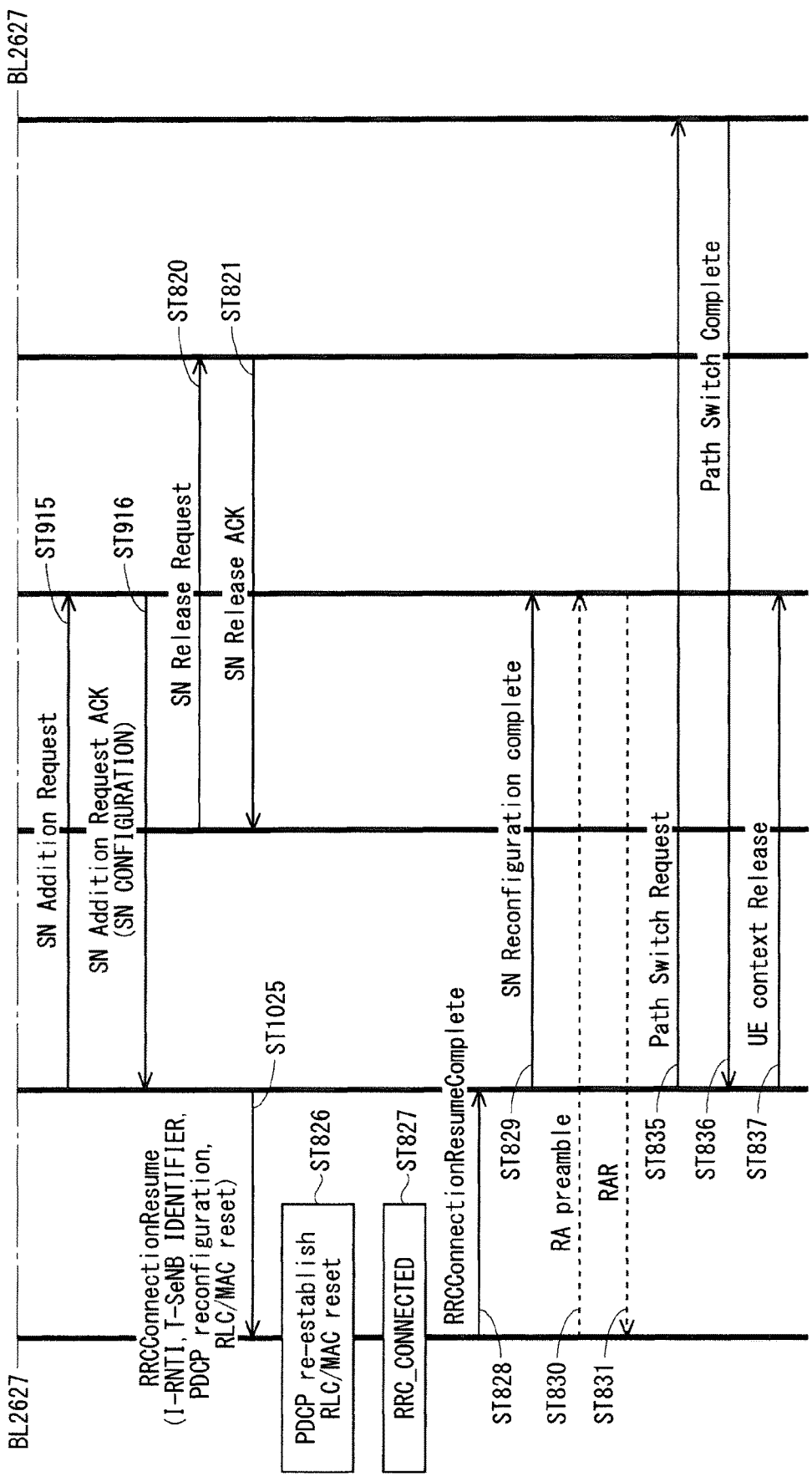
F I G. 27

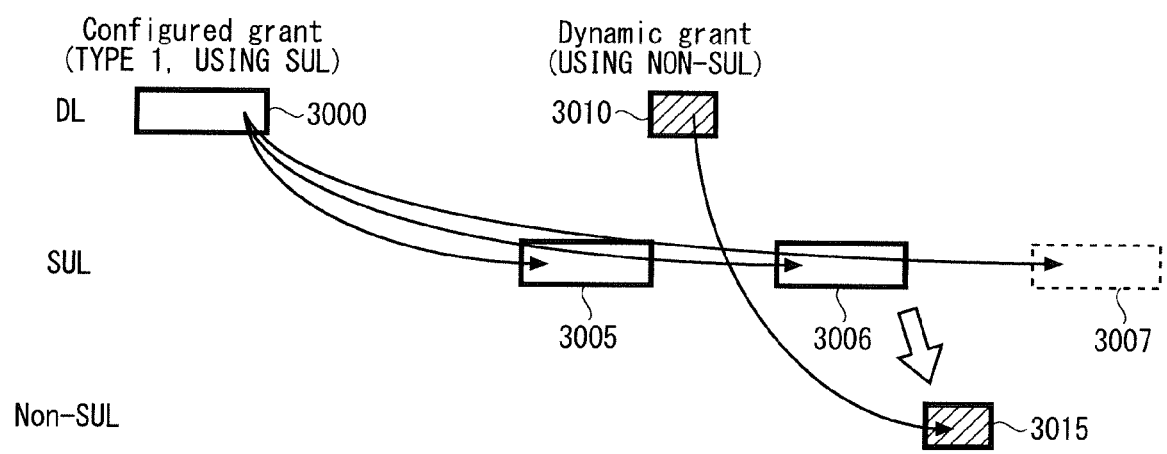
F I G. 2 8

F I G. 2 9
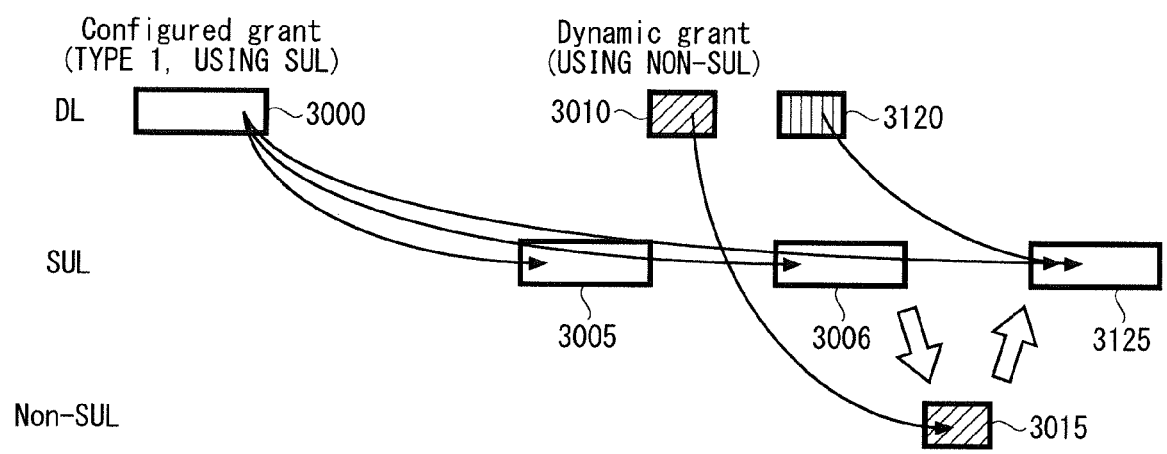

F I G. 3 0
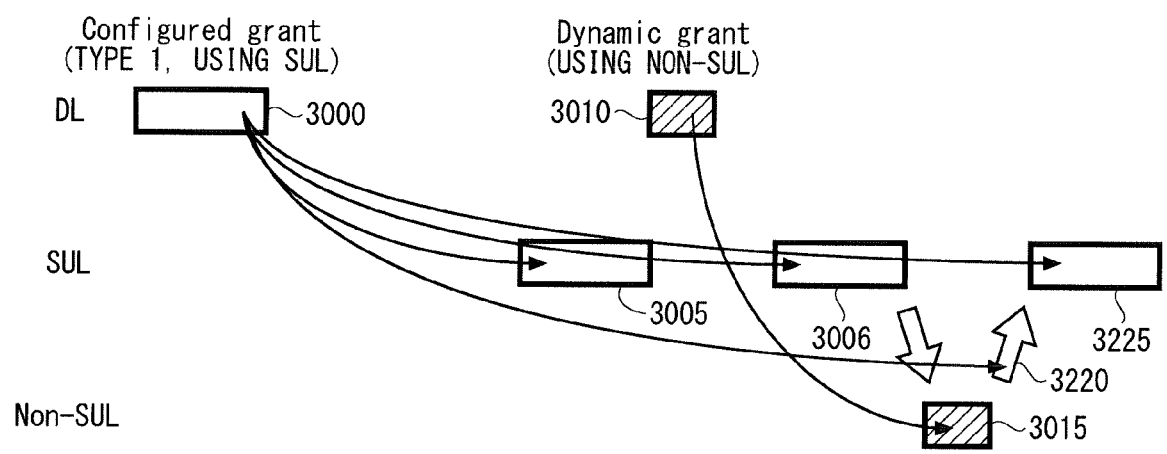

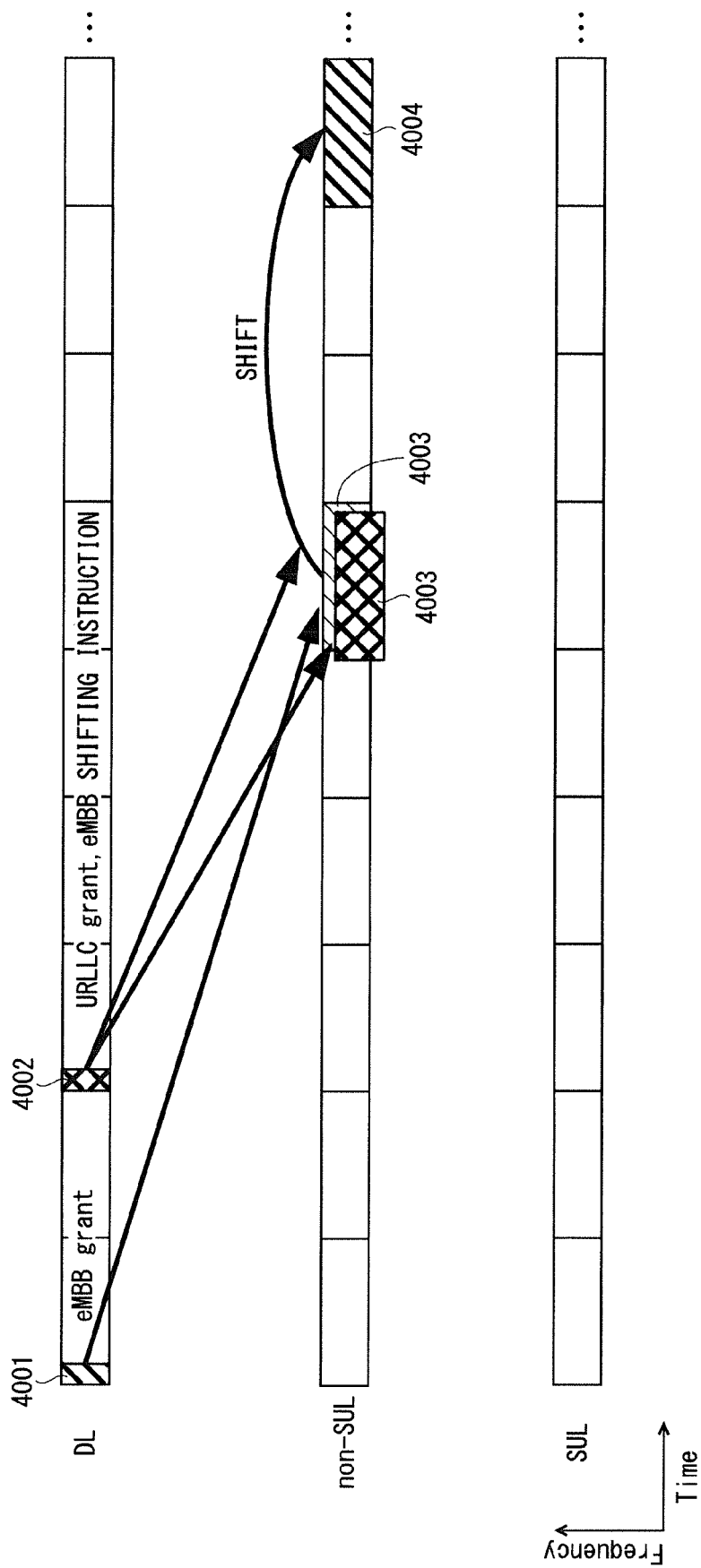

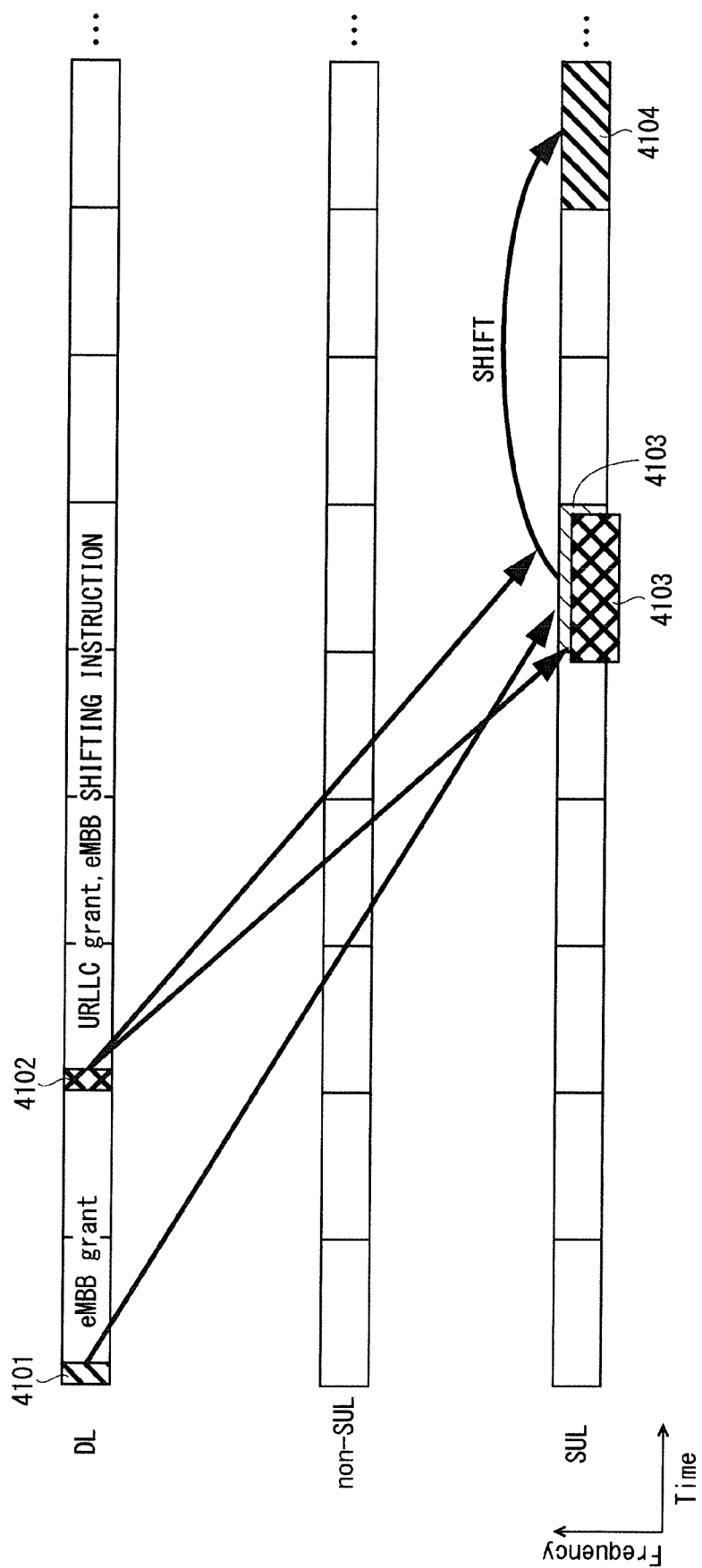

AFTER GRANTING eMBB DATA ON non-SUL, URLLC DATA IS GENERATED. TRANSMISSION WITH RESOURCE FOR eMBB DATA ON non-SUL IS SHIFTED, AND PREEMPTED FOR URLLC DATA ON SUL.

AFTER GRANTING eMBB DATA ON SUL, URLLC DATA IS GENERATED. TRANSMISSION WITH RESOURCE FOR eMBB DATA ON SUL IS SHIFTED, AND PREEMPTED FOR URLLC DATA ON NON-SUL.

FIG. 38 AFTER GRANTING eMBB DATA ON SUL, URLLC DATA IS GENERATED. TRANSMISSION WITH RESOURCE FOR eMBB DATA ON SUL IS SHIFTED, AND PREEMPTED FOR URLLC DATA ON NON-SUL.

AFTER GRANTING eMBB DATA ON NON-SUL, URLLC DATA IS GENERATED. RESOURCE FOR eMBB DATA ON NON-SUL IS PREEMPTED FOR URLLC DATA.

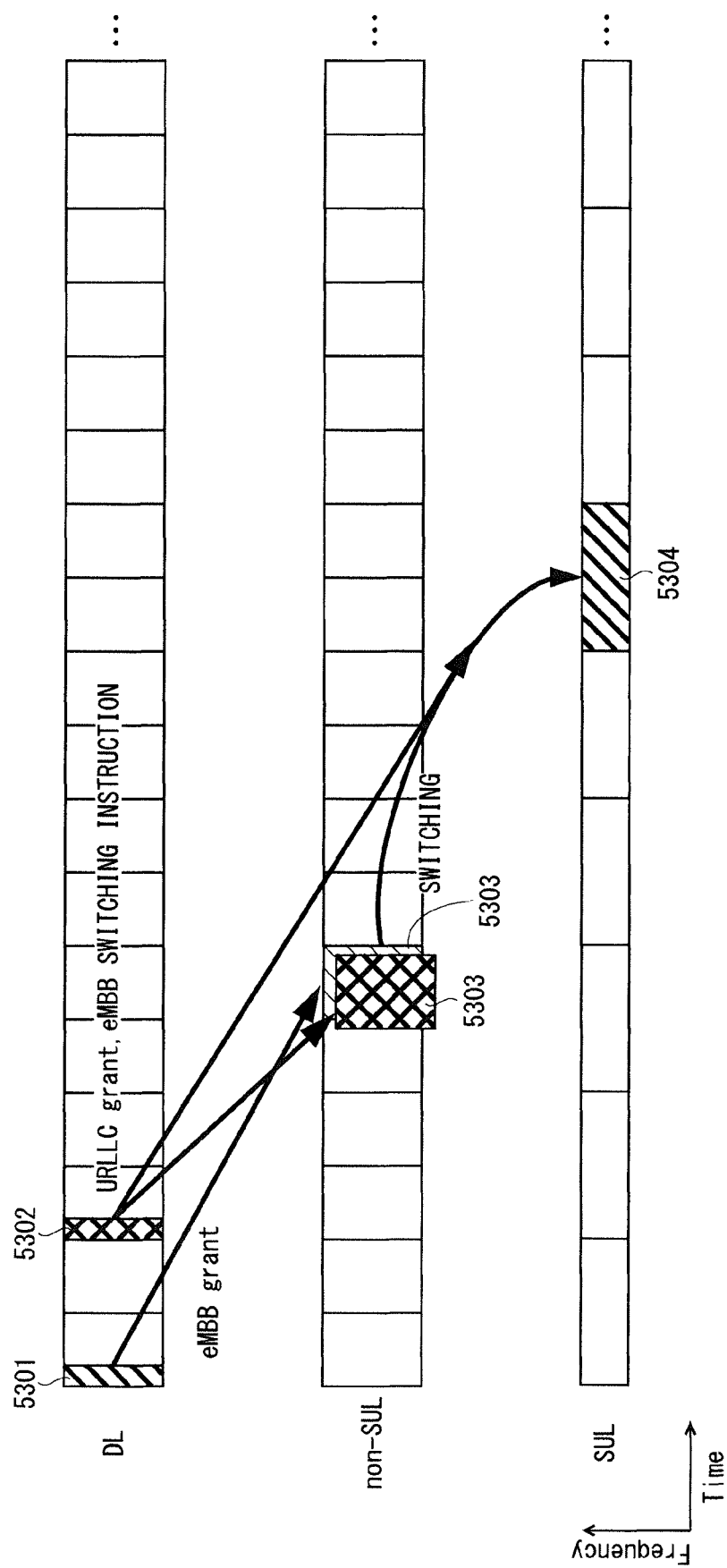

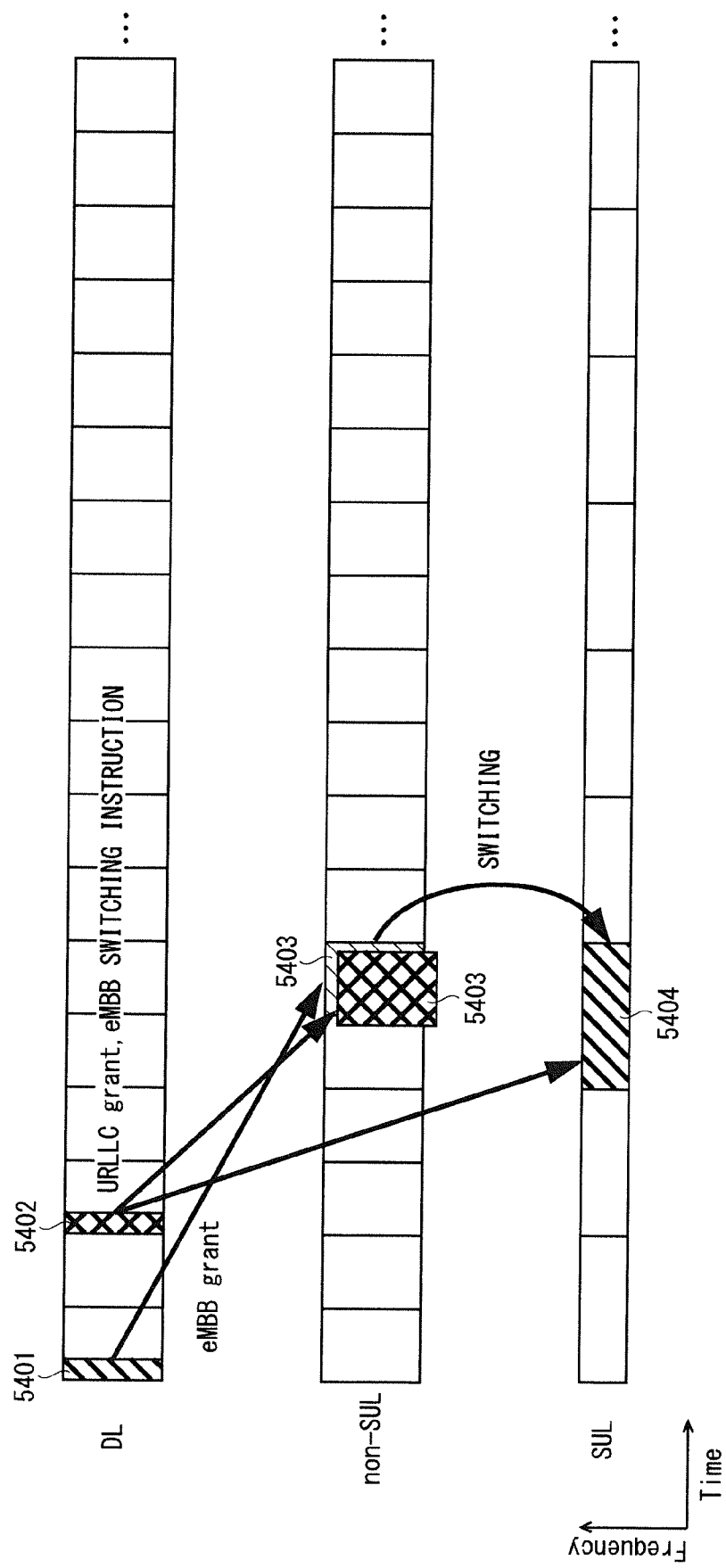

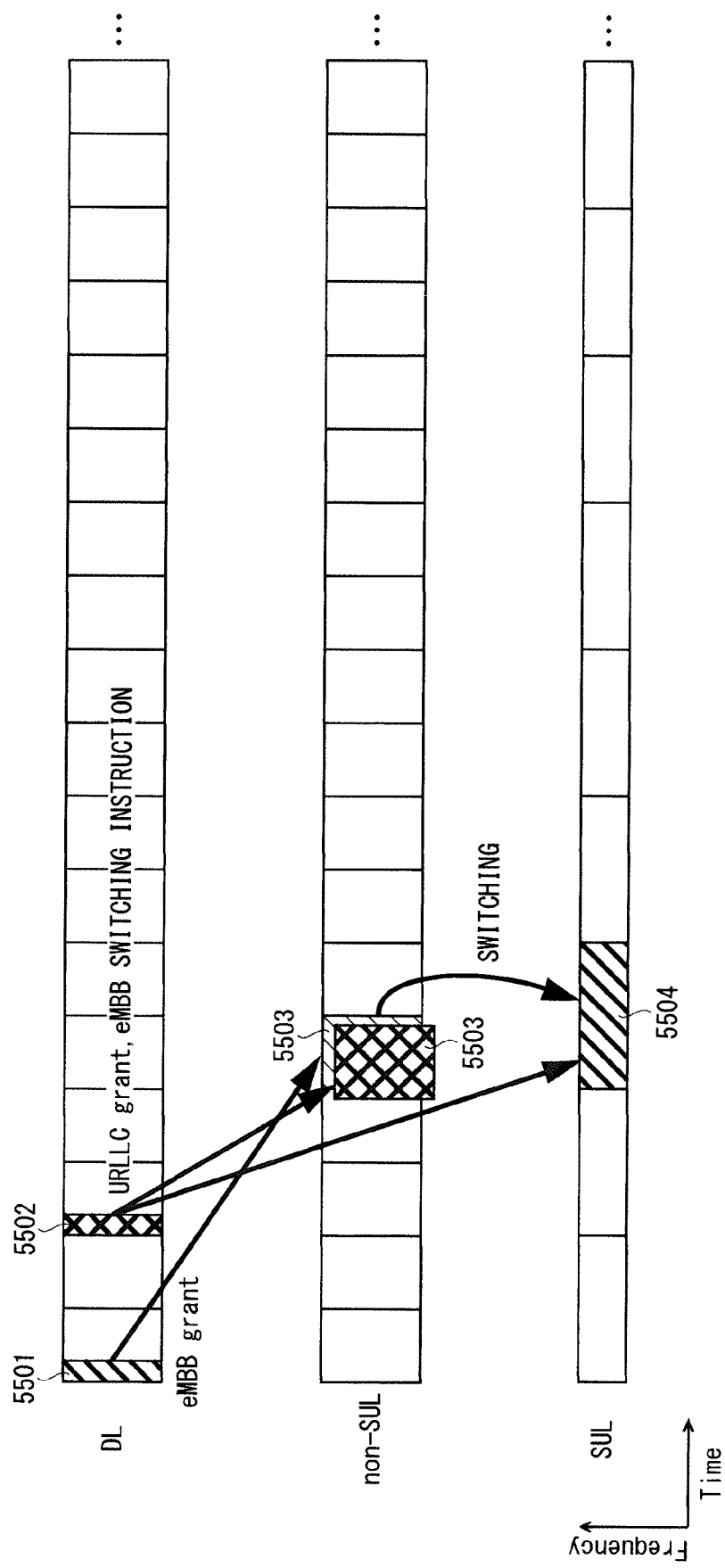

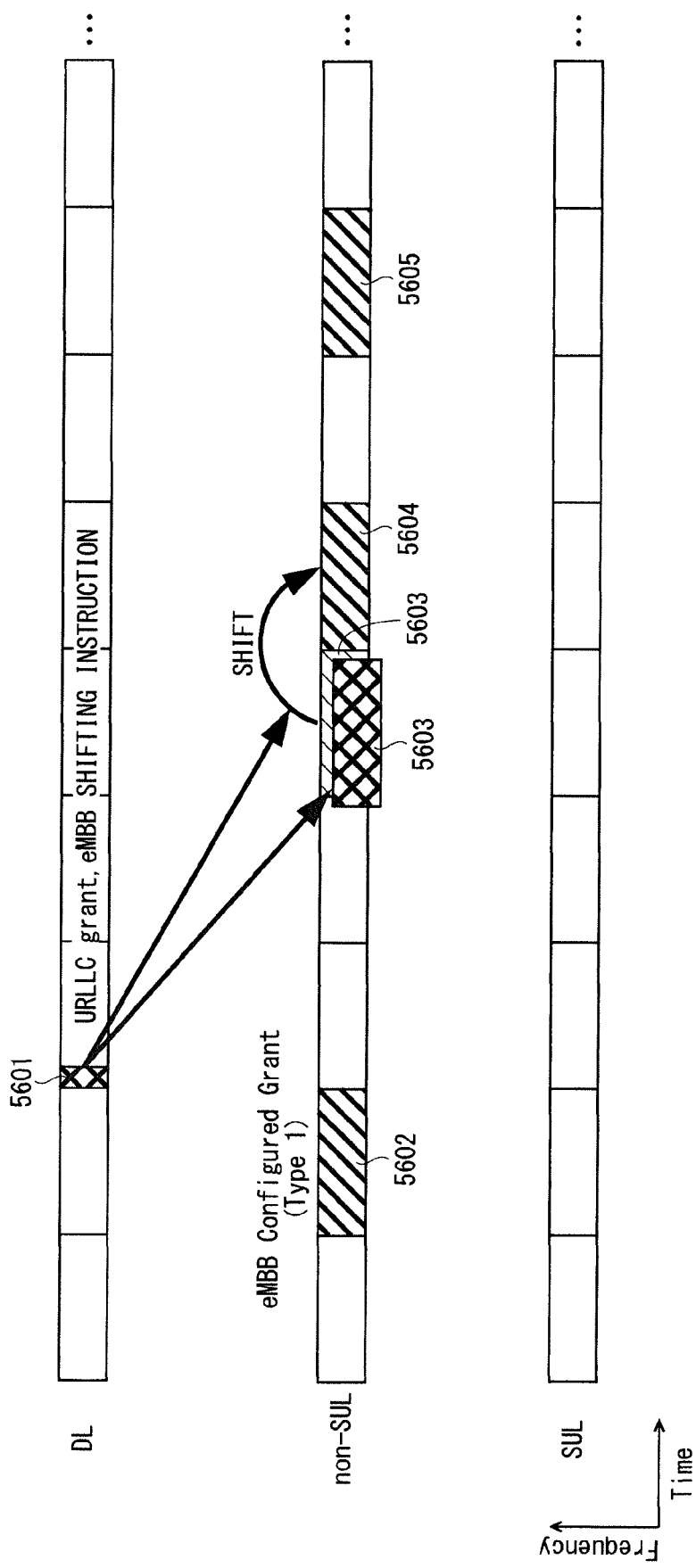

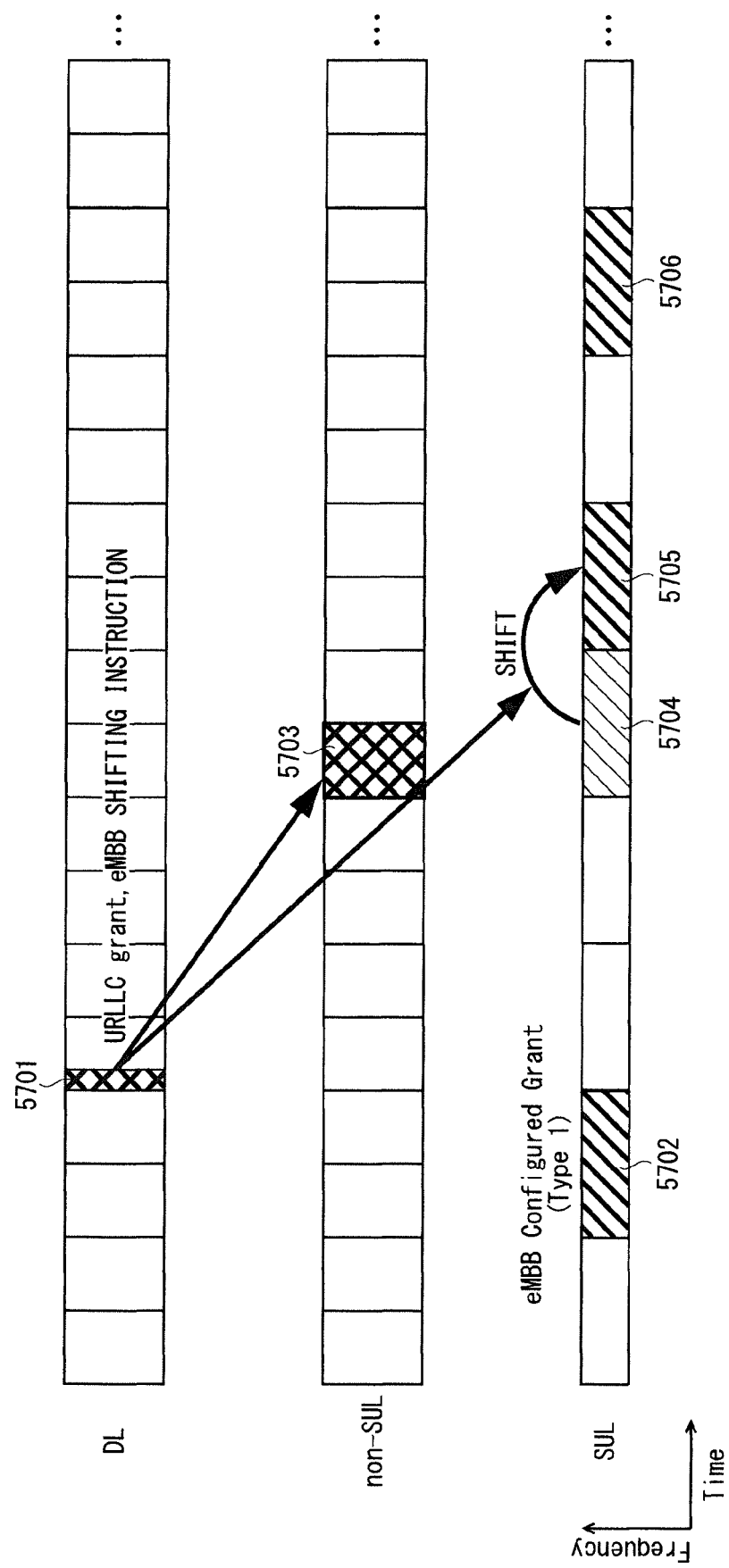

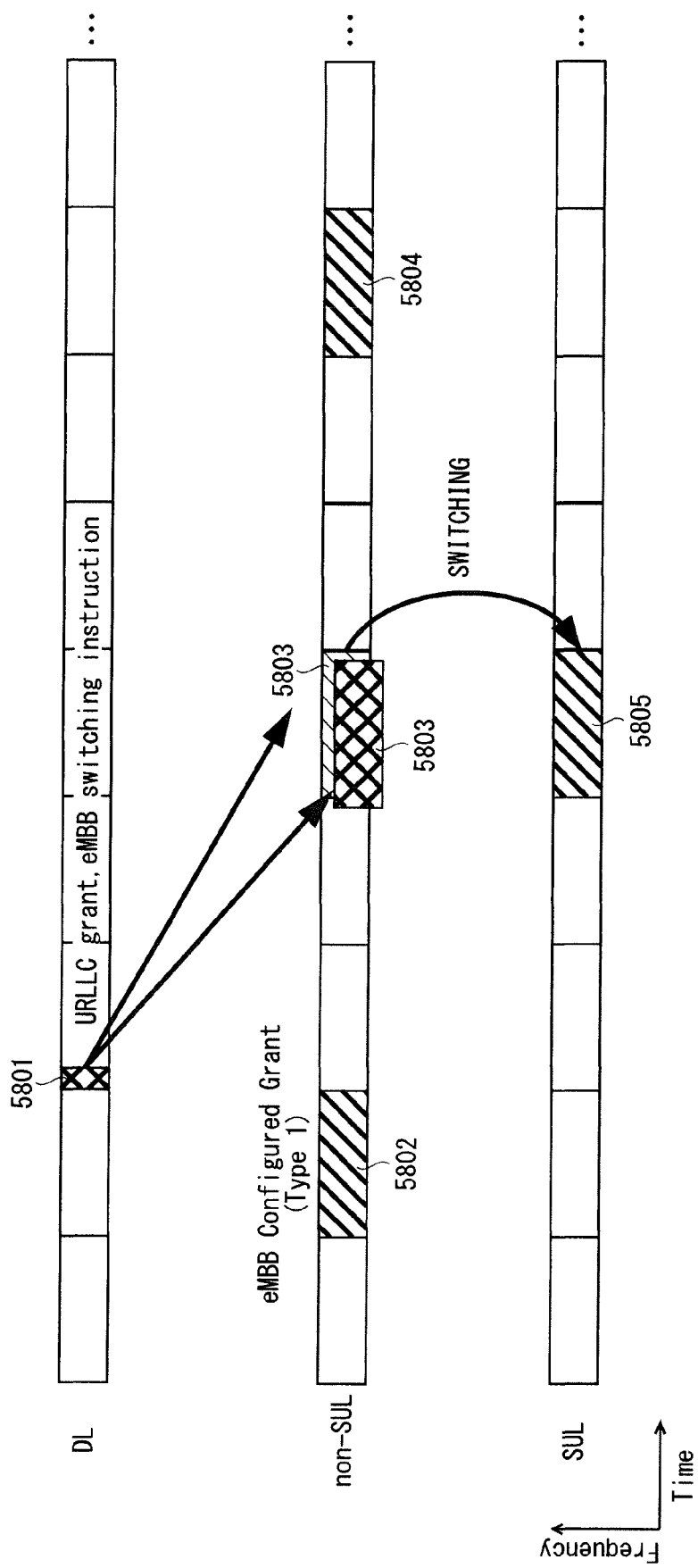

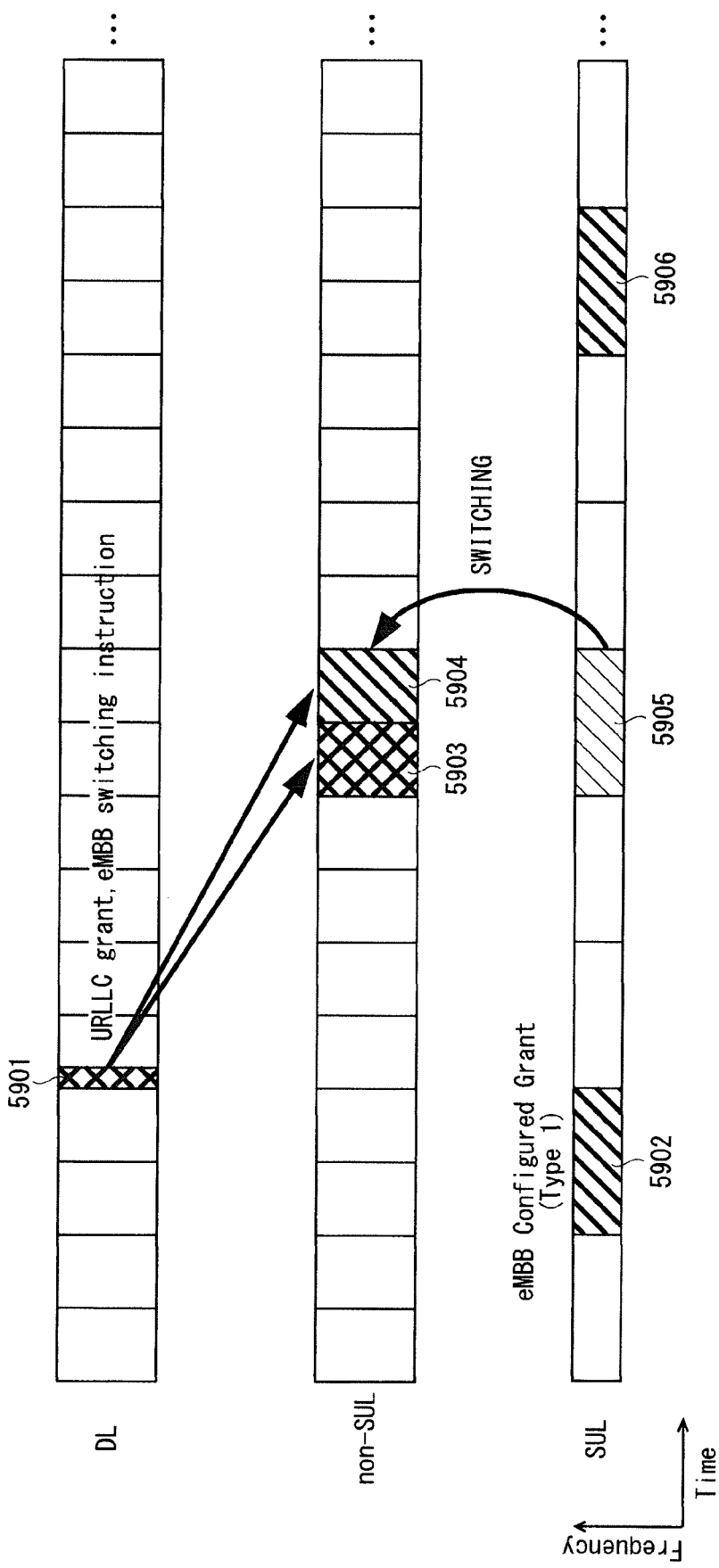

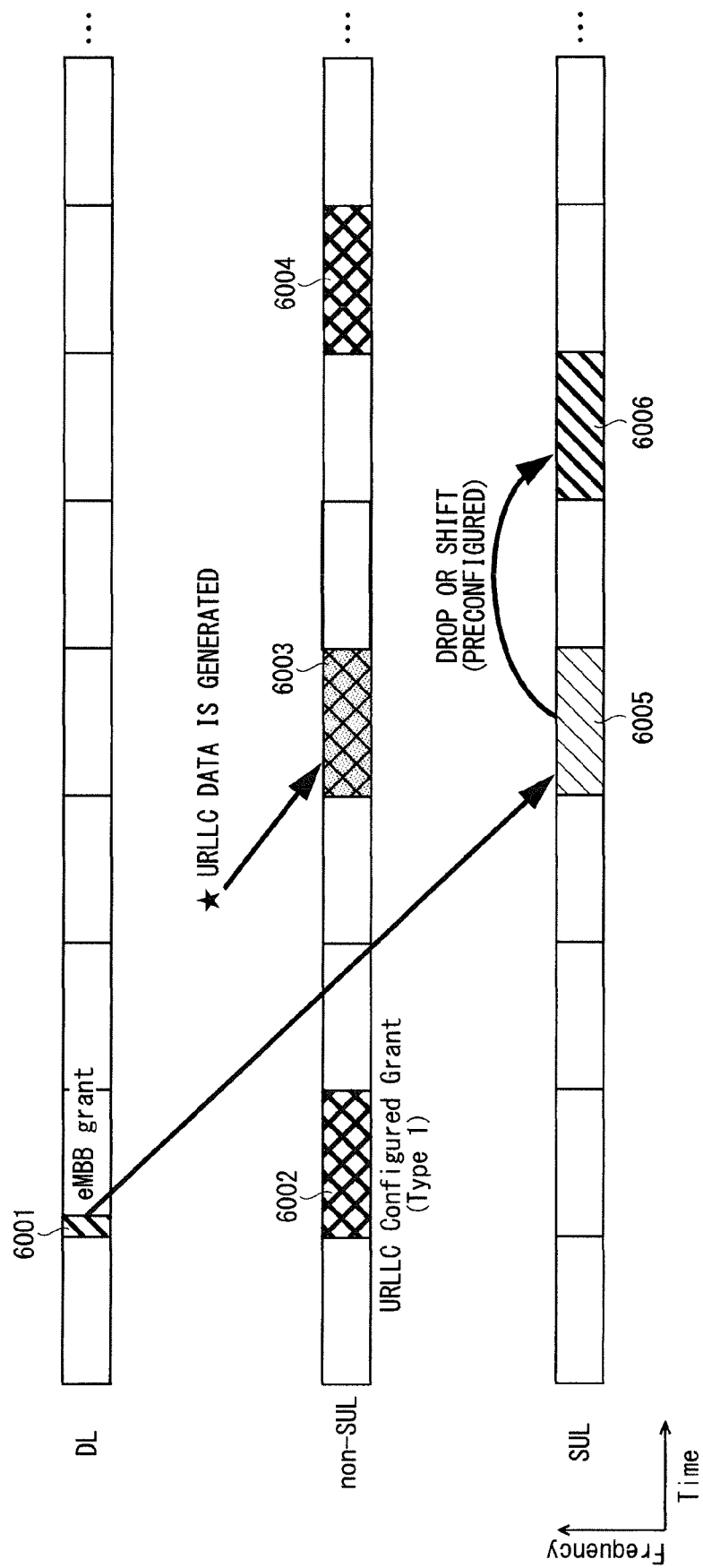

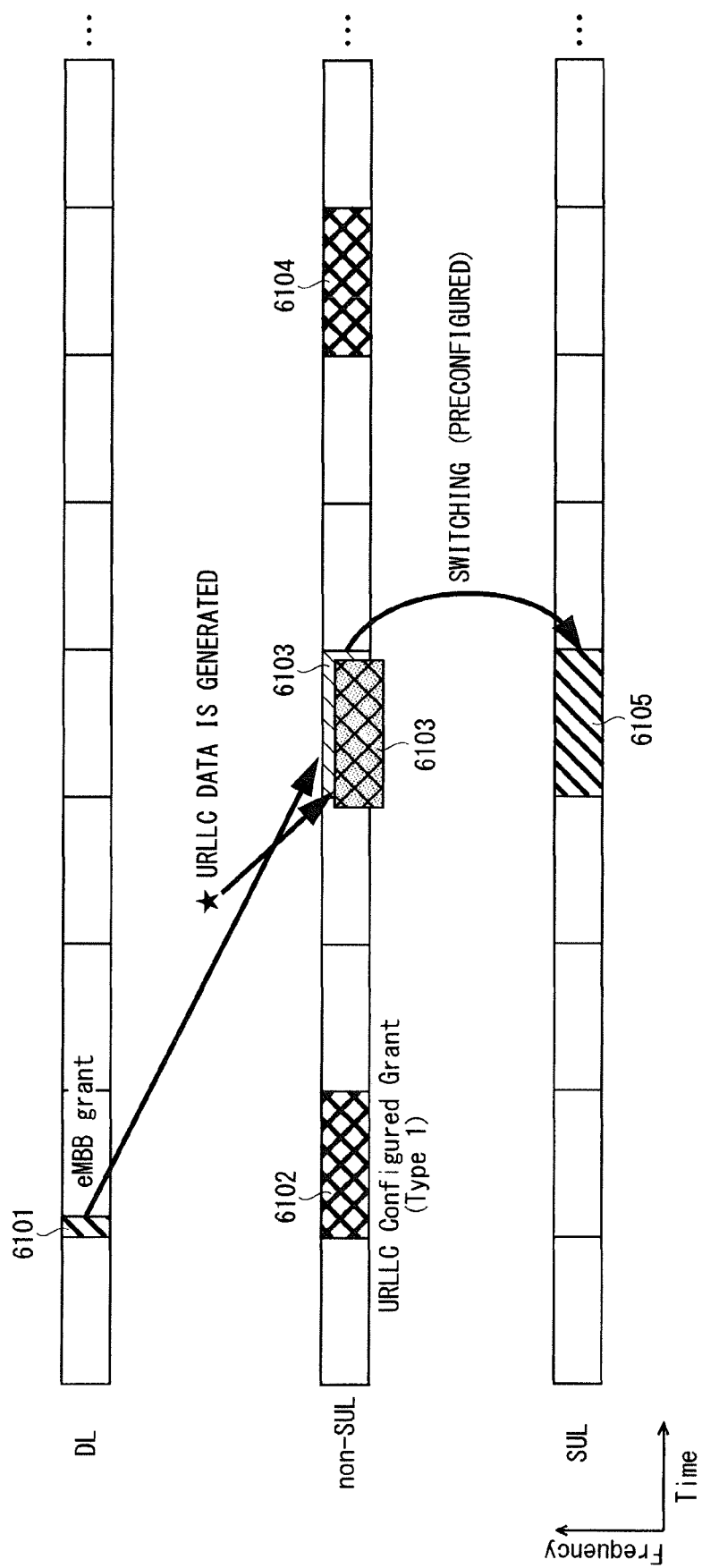

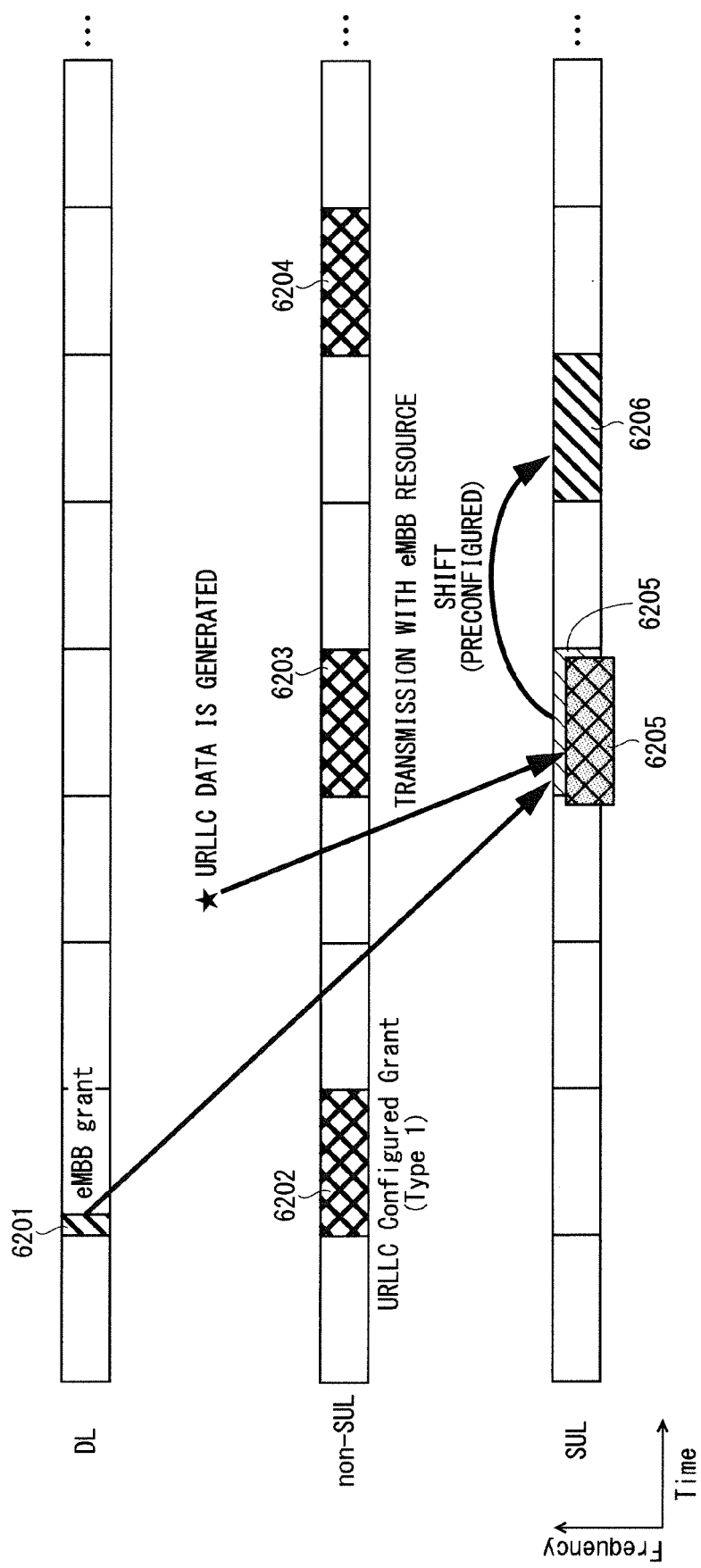

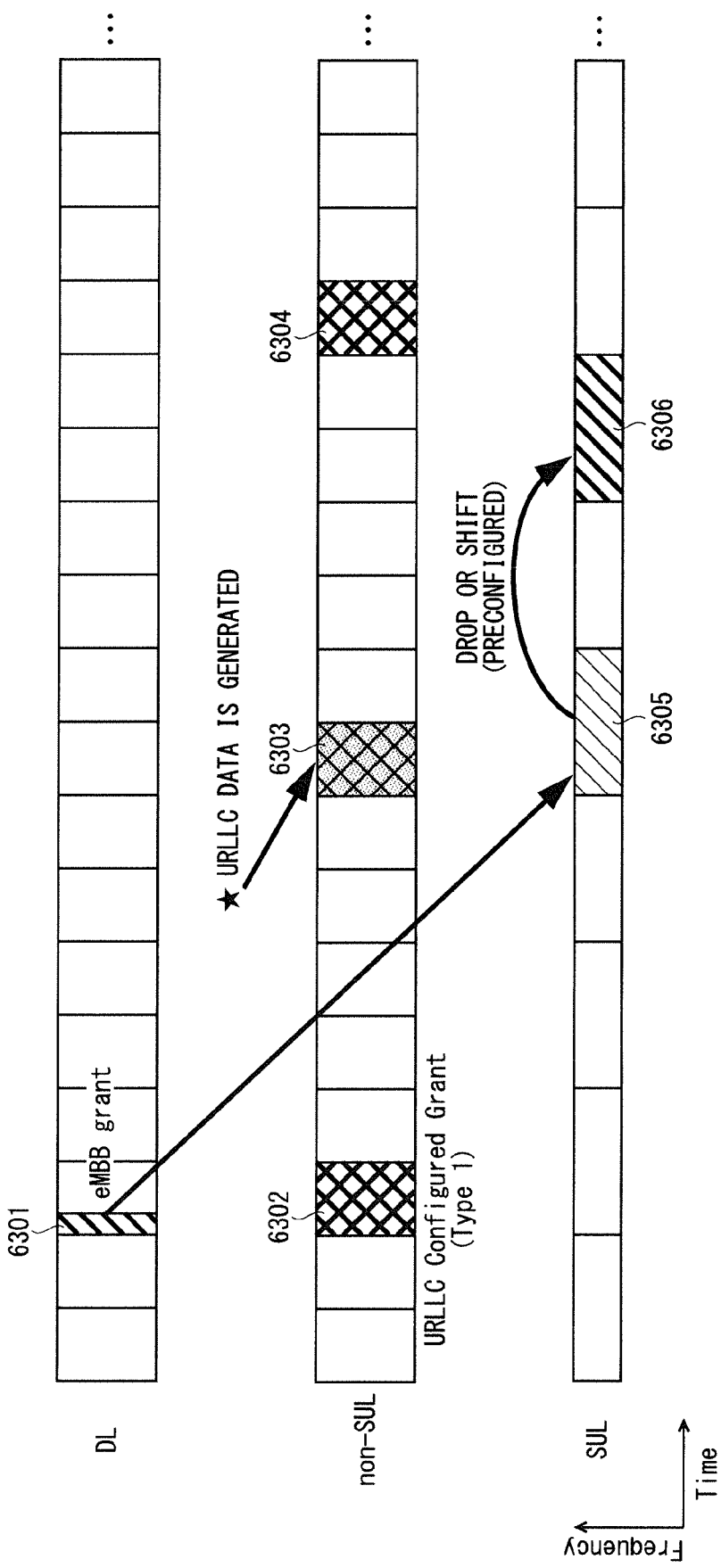

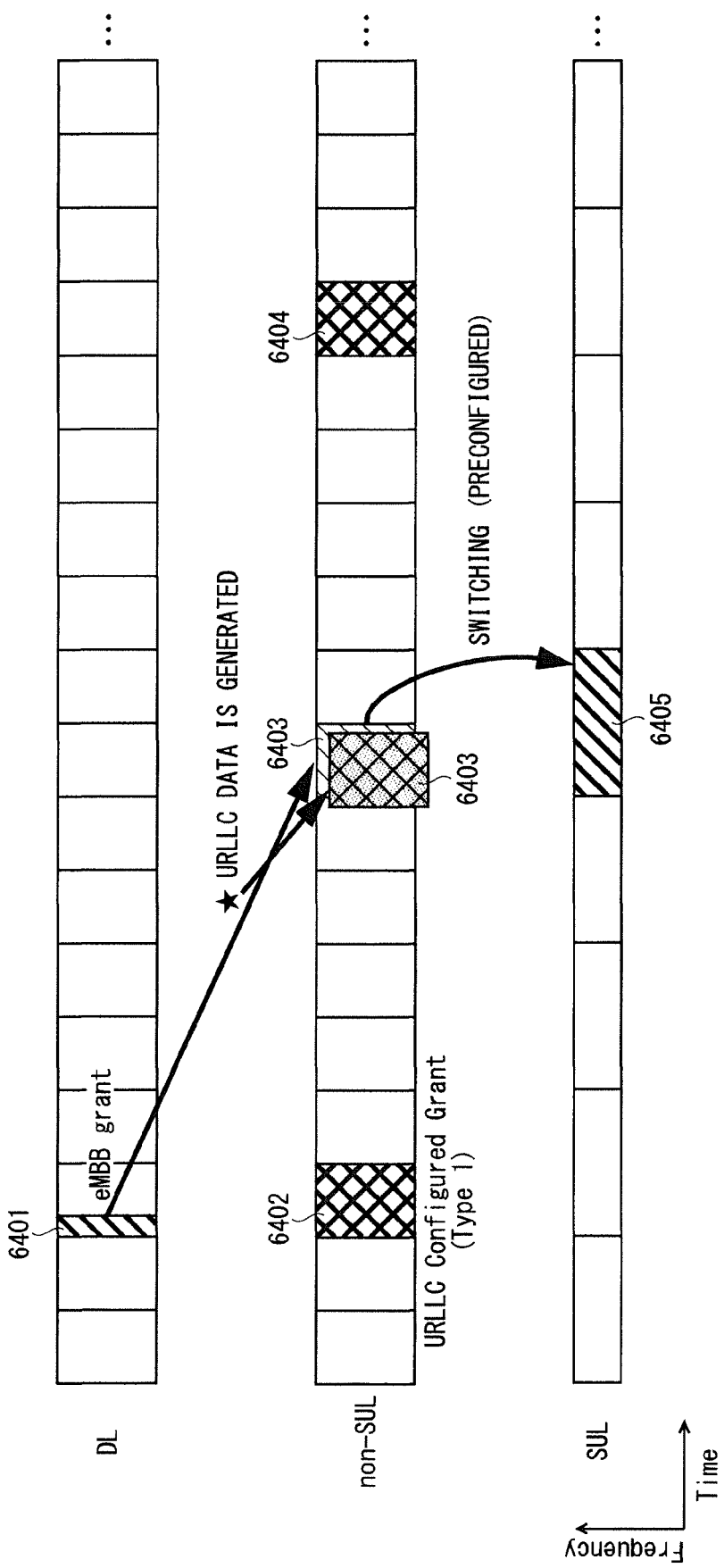

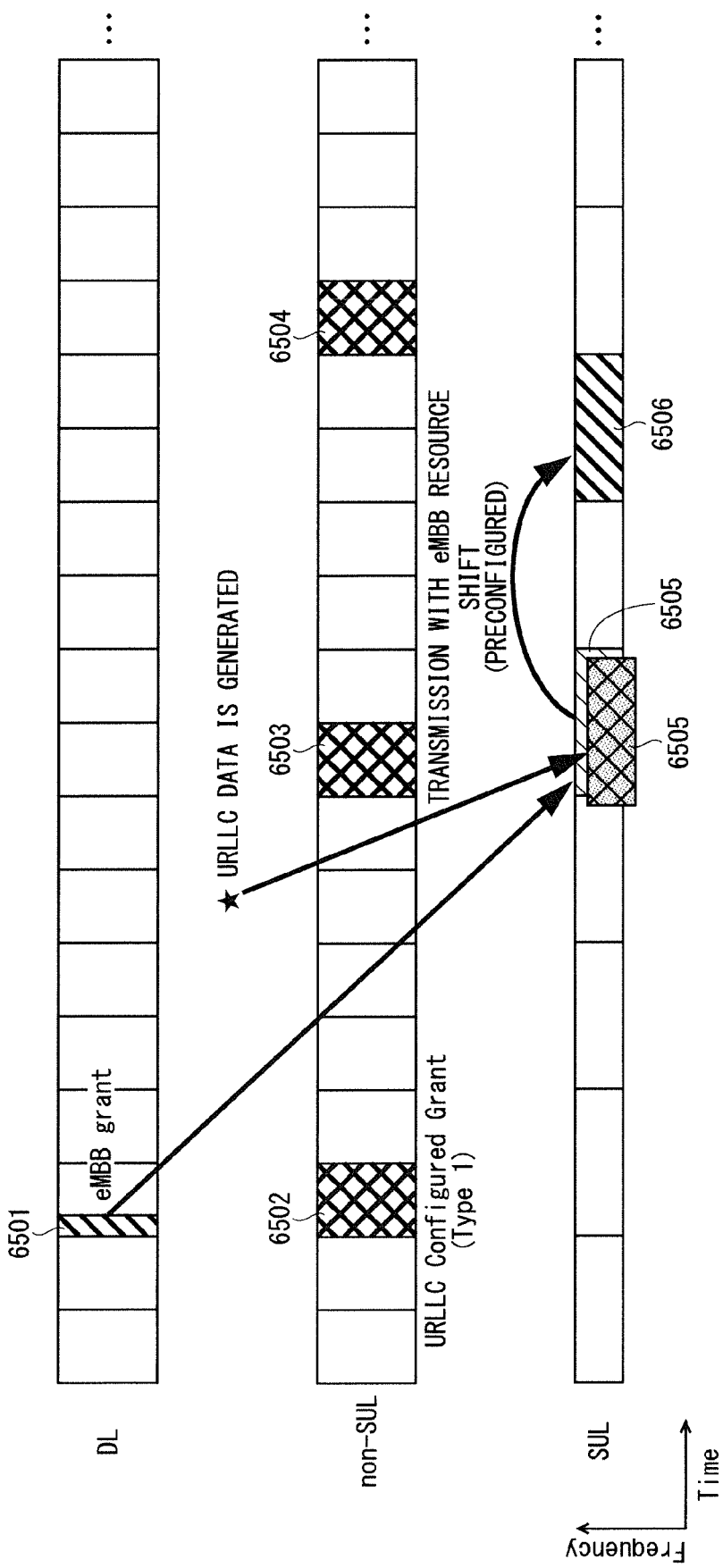

F I G. 5 7
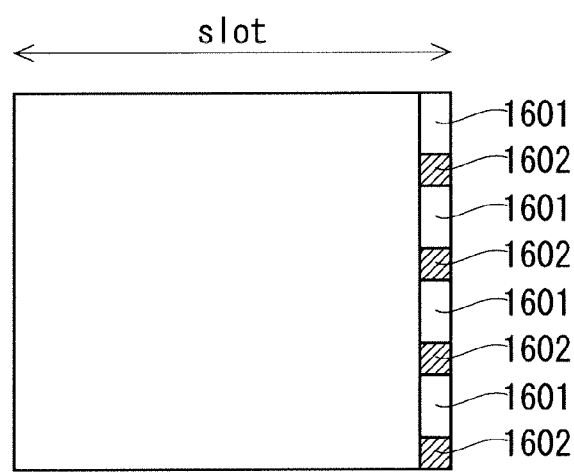

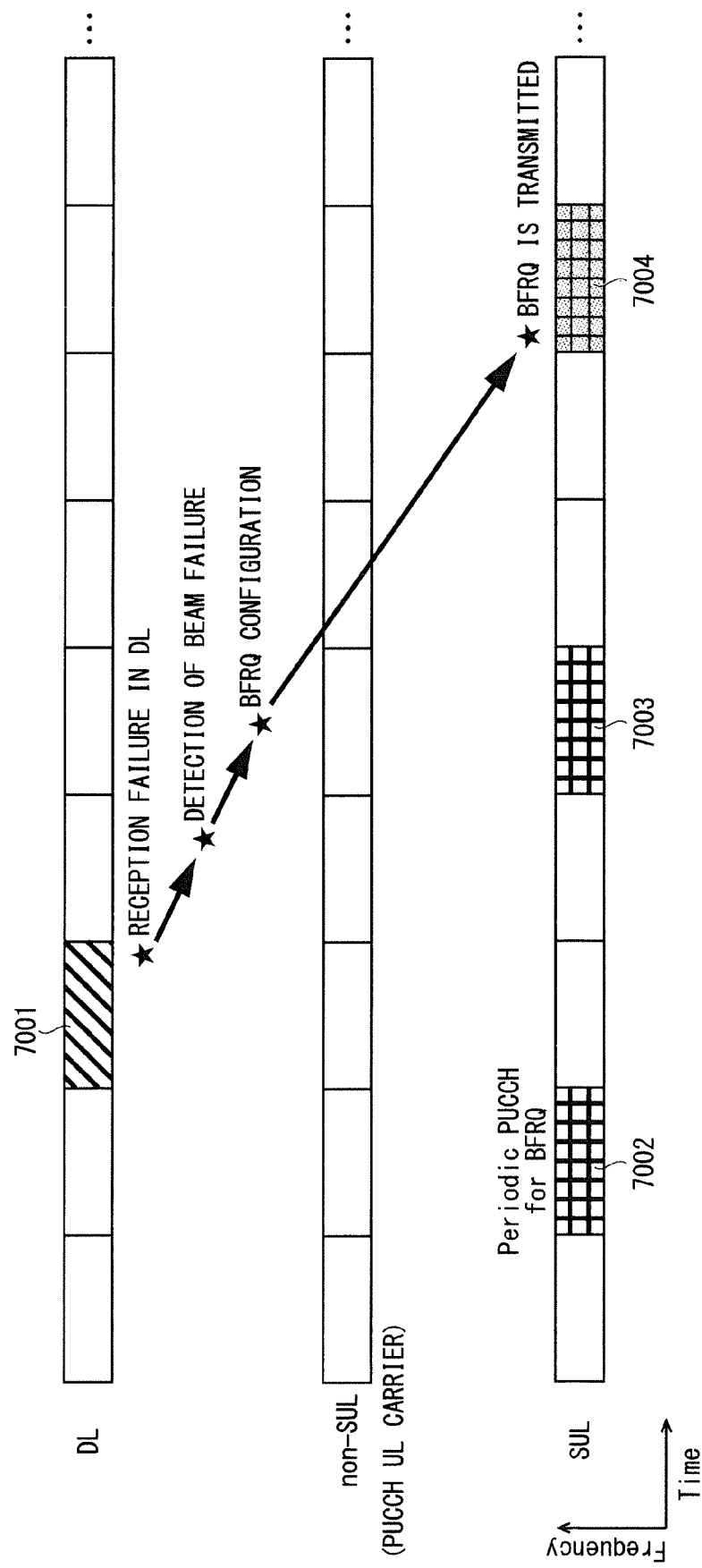

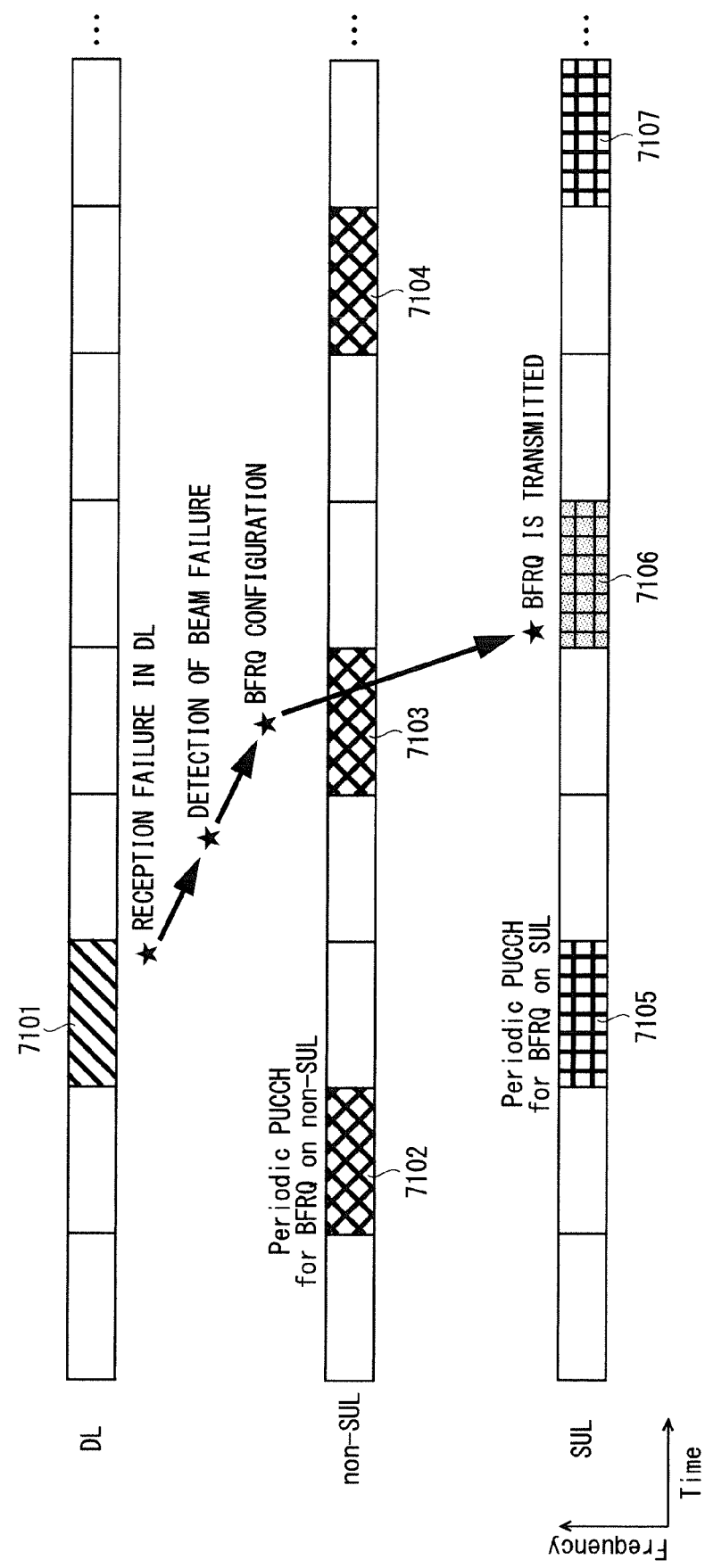

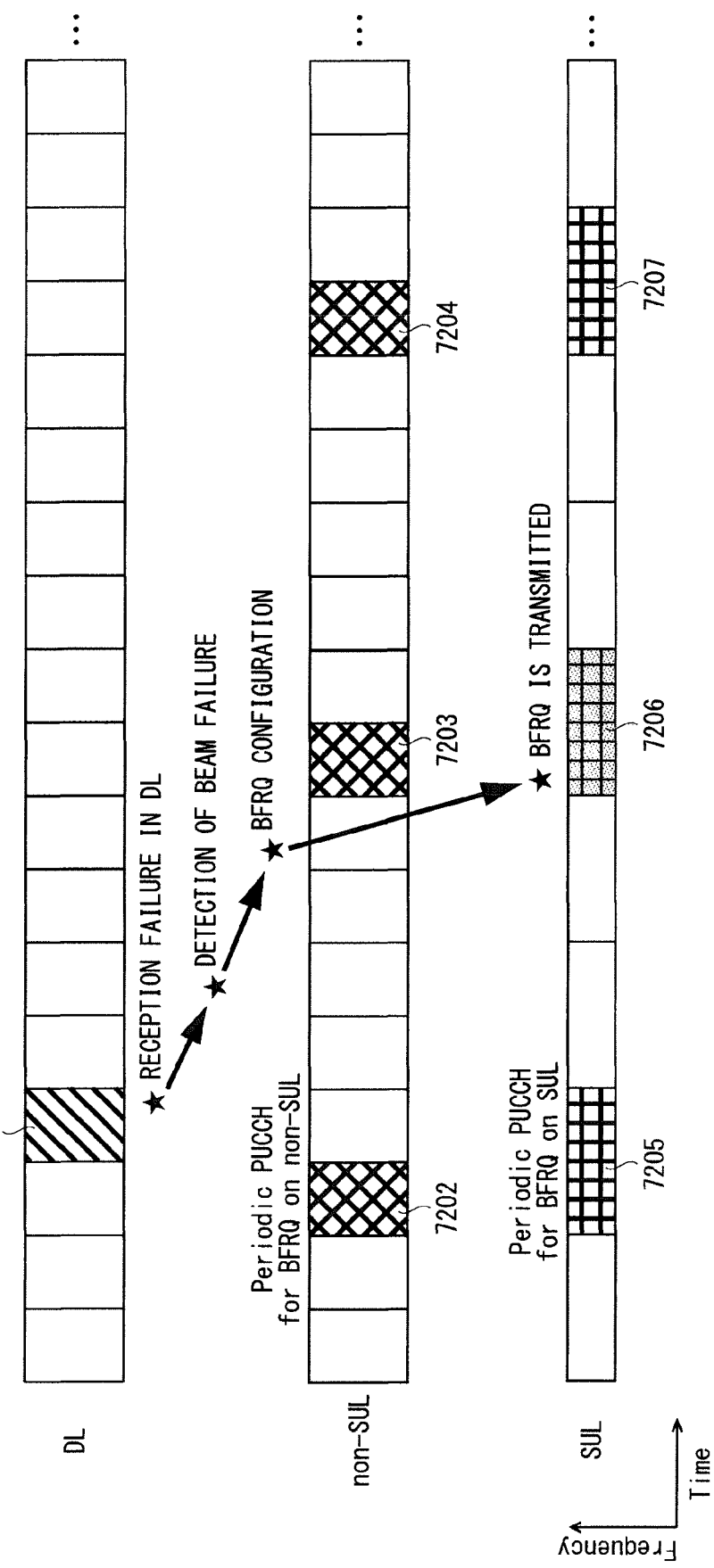

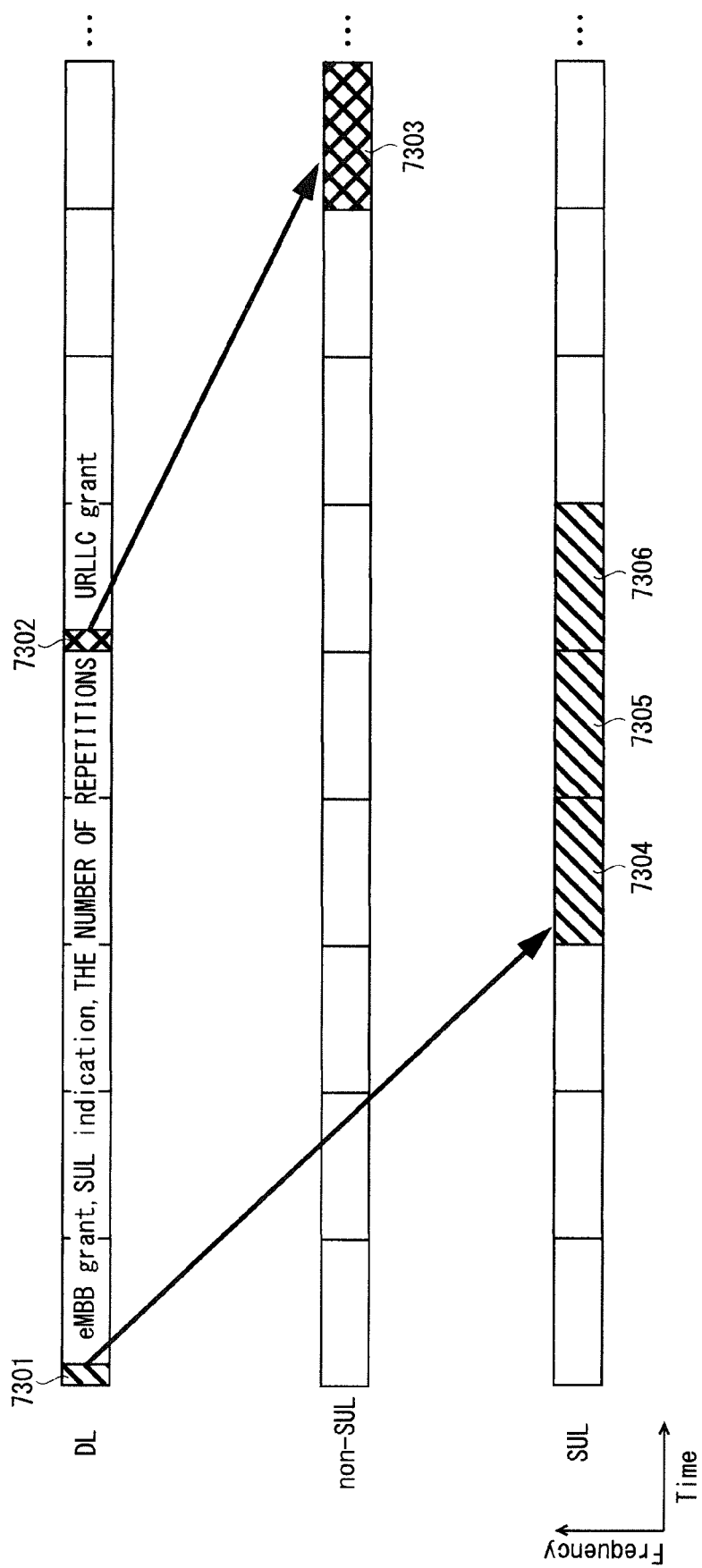

REPETITION PATTERN.

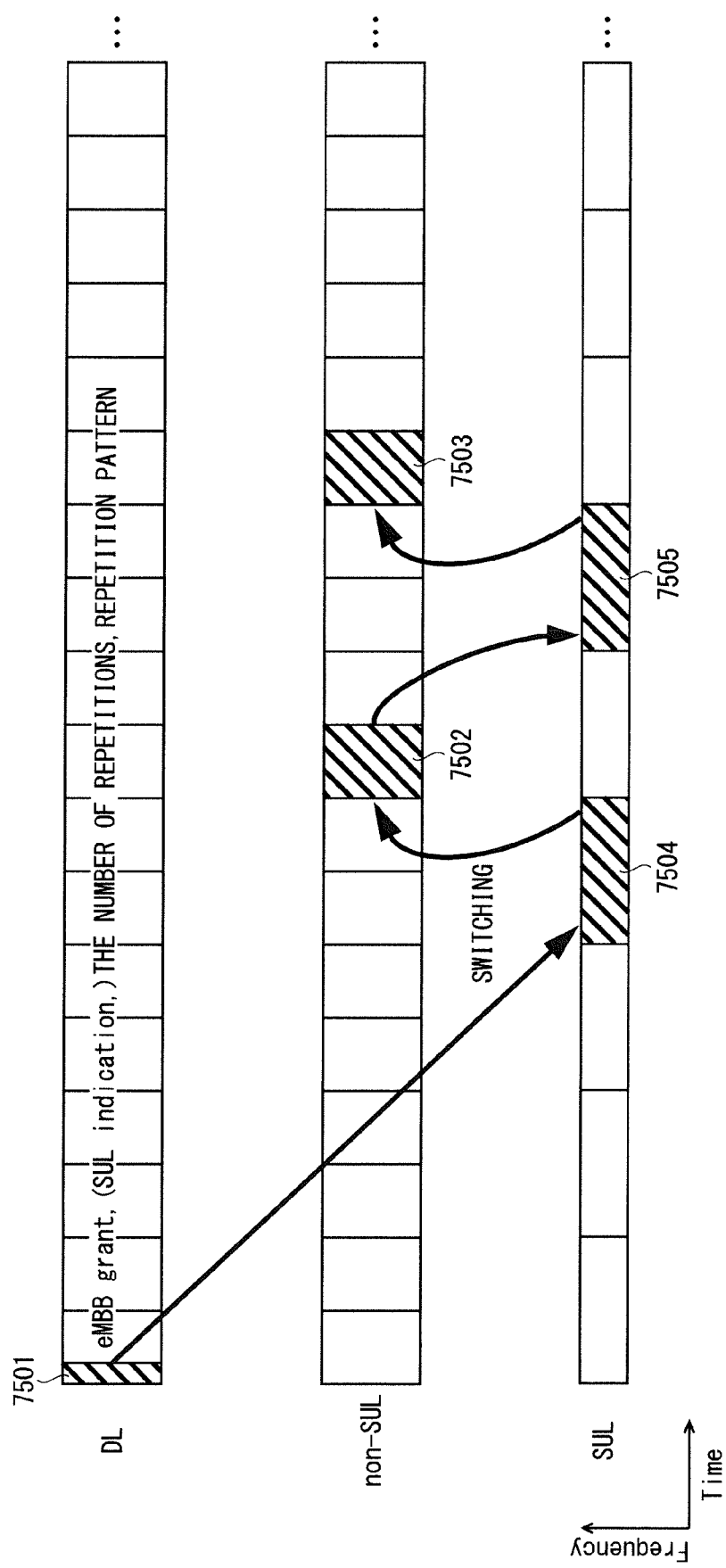
FIG. 63 REPETITION PATTERN. DIFFERENT NUMEROLOGIES.

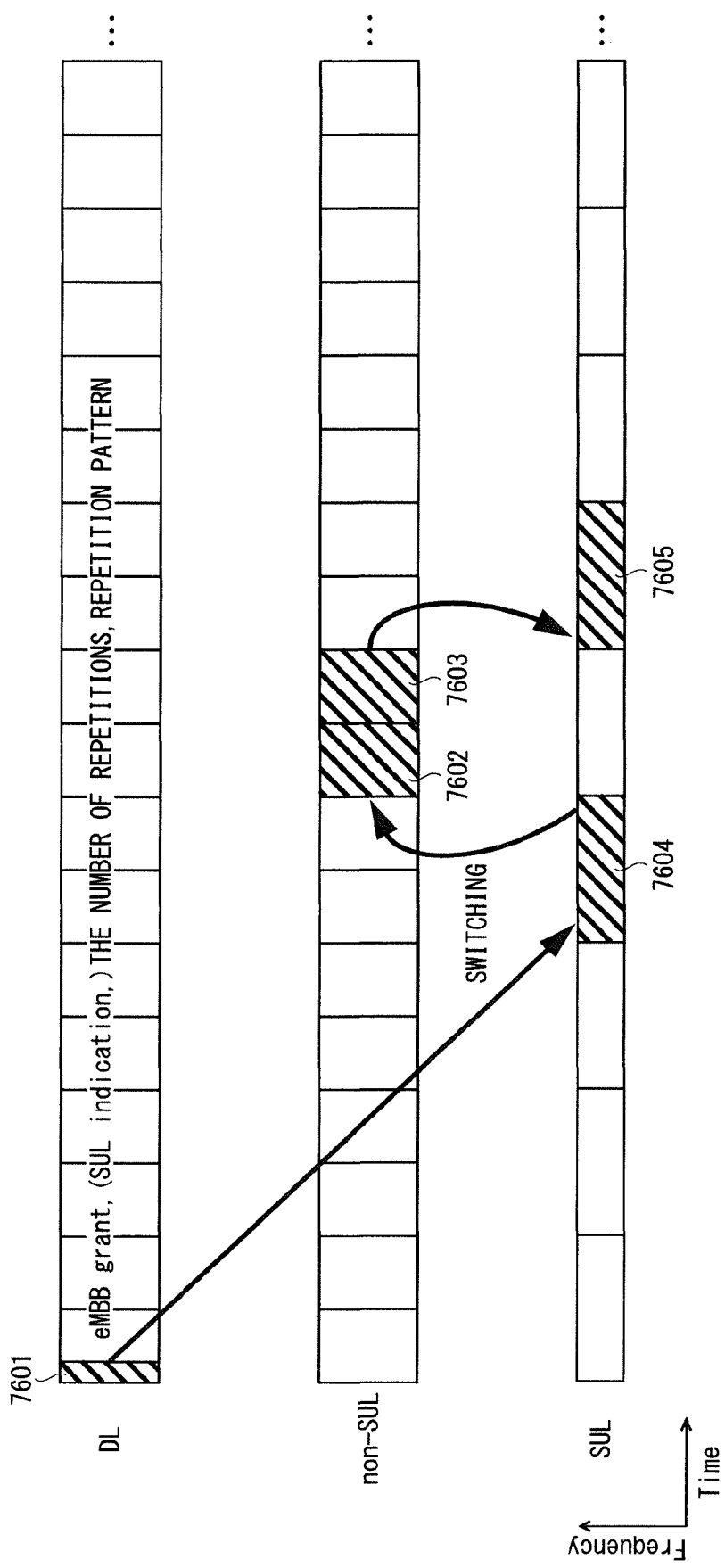

USER APPARATUS, BASE STATION AND COMMUNICATION SYSTEM

CROSS-REFERENCE TO RELATED APPLICATIONS

This application is a continuation of and claims priority to U.S. patent application Ser. No. 17/052,255, filed Nov. 2, 2020, the entire contents of which are incorporated herein by reference. Application Ser. No. 17/052,255 is a National Stage Application of International Application No. PCT/JP2019/023251, filed Jun. 12, 2019, which claims priority to Japanese Patent Application No. 2018-116008, filed Jun. 19, 2018. The benefit of priority is claimed to each of the foregoing.

TECHNICAL FIELD

The present invention relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 v15.0.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 24).

Furthermore, several new technologies have been studied in 3GPP. The example studies include prompt return to RRC_CONNECTED by maintaining the SDAP/PDCP configuration during RRC_INACTIVE and maintaining the UL coverage using Supplementary Uplink (SUL) (see Non-Patent Documents 16, 17, and 20).

In NR, the SRS to be used for sounding the uplink channel is allocated within the last 6 symbols in 1 slot consisting of 14 symbols. Furthermore, the number of symbols of the SRS is 1, 2, or 4 (see Non-Patent Documents 13 and 15).

PRIOR-ART DOCUMENTS

Non-Patent Documents

Non-Patent Document 1: 3GPP TS 36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3GPP RP-172115
Non-Patent Document 12: 3GPP TS 37.340 V15.0.0
Non-Patent Document 13: 3GPP TS 38.211 V15.0.0
Non-Patent Document 14: 3GPP TS 38.213 V15.0.0
Non-Patent Document 15: 3GPP TS 38.214 V15.0.0
Non-Patent Document 16: 3GPP TS 38.300 V15.0.0
Non-Patent Document 17: 3GPP TS 38.321 V15.1.0
Non-Patent Document 18: 3GPP TS 38.212 V15.0.0
Non-Patent Document 19: 3GPP TS 36.331 V15.1.0

Non-Patent Document 20: 3GPP R1-1802461
Non-Patent Document 21: 3GPP TS 37.324 V1.5.0
Non-Patent Document 22: 3GPP R2-1801427
Non-Patent Document 23: 3GPP TS 38.331 V15.1.0
Non-Patent Document 24: 3GPP RP-161266

SUMMARY

Problems to be Solved by the Invention

When the UE using a DC structure in which a high-level NW device is a 5G core (may be hereinafter referred to as a 5GC) transitions to RRC_INACTIVE, the secondary base station configuration is released. Thus, when the UE returns from RRC_INACTIVE to RRC_CONNECTED, the base station needs to reestablish the secondary base station for the UE. As a result, it takes some time for the UE to return to the DC structure, and the latency occurs in returning to the DC structure.

Furthermore, an uplink at low frequencies, that is, Supplementary UpLink (SUL, see 5.16 of Non-Patent Document 17) is used for complementing a difference in UL coverage in NR. However, none discloses a method for switching between the SUL and a non-SUL in a configured grant (see 10.3 of Non-Patent Document 16) or in preemption. Thereby, appropriate selection between the SUL and the non-SUL in the configured grant or in preemption is impossible. As a result, for example, the reliability in the uplink at a cell edge decreases.

In view of the problems, one of the objects of the present invention is to provide a radio communication technology with low latency and high reliability in NR.

Means to Solve the Problems

The present invention provides, for example, a communication system including: a communication terminal device; and a plurality of base stations configured to perform radio communication with the communication terminal device, wherein the plurality of base stations include a master base station and a secondary base station that provide the communication terminal device with dual connectivity, the communication terminal device maintains secondary base station configuration information on configuring the secondary base station even after transitioning from RRC_CONNECTED to RRC_INACTIVE, the communication terminal device maintains the secondary base station configuration information even when at least one of the master base station and the secondary base station is changed during the RRC_INACTIVE, and the communication terminal device again transitions to the RRC_CONNECTED using the maintained secondary base station configuration information.

The present invention further provides, for example, a communication terminal device configured to perform radio communication with a plurality of base stations, wherein the plurality of base stations include a master base station and a secondary base station that provide the communication terminal device with dual connectivity, the communication terminal device maintains secondary base station configuration information on configuring the secondary base station even after transitioning from RRC_CONNECTED to RRC_INACTIVE, the communication terminal device maintains the secondary base station configuration information even when at least one of the master base station and the secondary base station is changed during the RRC_INACTIVE, and the communication terminal device again transitions to the RRC_CONNECTED using the maintained secondary base station configuration information.

Effects of the Invention

According to the present invention, the latency when the communication terminal device returns to RRC_CONNECTED can be reduced even when the communication terminal device is in RRC_INACTIVE and at least one of the master base station and the secondary base station is changed. This can produce high reliability.

The objects, features, aspects, and advantages of the present invention become more apparent from the following detailed description of the present invention when taken in conjunction with the accompanying drawings.

BRIEF DESCRIPTION OF DRAWINGS

FIG. 7 illustrates a structure of the DC to be performed by the eNB and the gNB that are connected to the NG core.

FIG. 27 illustrates that the master base station determines the secondary base station and the UE using the DC structure performs operations of releasing the secondary base station configuration and transitioning from RRC_INACTIVE to RRC_CONNECTED according to the second modification of the first embodiment.

FIG. 28 illustrates a problem in switching to a Type-1 configured grant across the SUL and the non-SUL according to the third embodiment.

FIG. 29 illustrates operations of switching between the SUL and the non-SUL using an instruction for switching between the SUL and the non-SUL, before the uplink transmission using the configured grant according to the third embodiment.

FIG. 30 illustrates operations of switching between the SUL and the non-SUL without using the instruction for switching between the SUL and the non-SUL, before the uplink transmission using the configured grant according to the third embodiment.

FIG. 31 illustrates one example of performing preemption on a SUL-configured UE via the non-SUL according to the fourth embodiment.

FIG. 32 illustrates one example of performing preemption on the SUL-configured UE via the SUL according to the fourth embodiment.

FIG. 44 illustrates a case where the SUL and the non-SUL have different SCSs according to the third modification of the fourth embodiment.

FIG. 45 illustrates a case where the SUL and the non-SUL have different SCSs according to the third modification of the fourth embodiment.

FIG. 46 illustrates a case where the SUL and the non-SUL have different SCSs according to the third modification of the fourth embodiment. FIG. 46 illustrates one example when the amount of shift from the reset and the PI is configured and the UL carrier is switched.

FIG. 47 illustrates one example method for performing preemption when the configured grant is established according to the fourth modification of the fourth embodiment.

FIG. 48 illustrates one example method for performing preemption when the configured grant is established according to the fourth modification of the fourth embodiment.

FIG. 49 illustrates one example method for performing preemption when the configured grant is established according to the fourth modification of the fourth embodiment.

FIG. 50 illustrates one example method for performing preemption when the configured grant is established according to the fourth modification of the fourth embodiment.

FIG. 51 illustrates one example method for performing preemption when the configured grant is established according to the fourth modification of the fourth embodiment.

FIG. 52 illustrates one example method for performing preemption when the configured grant is established according to the fourth modification of the fourth embodiment.

FIG. 53 illustrates one example method for performing preemption when the configured grant is established according to the fourth modification of the fourth embodiment.

FIG. 54 illustrates that the eMBB data UL-granted on the SUL is preempted, shifted by two slots behind, and transmitted according to the fourth modification of the fourth embodiment.

FIG. 55 illustrates that the eMBB data UL-granted on the non-SUL is preempted, switched to the SUL that is a different UL carrier, and transmitted according to the fourth modification of the fourth embodiment.

FIG. 56 illustrates that the eMBB data UL-granted on the SUL is preempted, shifted by two slots behind, and transmitted according to the fourth modification of the fourth embodiment.

FIG. 57 illustrates an example format of the PUCCH for BFRQ according to the fifth embodiment.

FIG. 58 illustrates one example of transmitting the BFRQ with the PUCCH resource for BFRQ configured on the SUL according to the sixth embodiment.

FIG. 59 illustrates one example of configuring the PUCCH resources for BFRQ on both of the non-SUL and the SUL and transmitting the BFRQ according to the sixth embodiment.

FIG. 60 illustrates one example of configuring the PUCCH resources for BFRQ on both of the non-SUL and the SUL and transmitting the BFRQ according to the sixth embodiment.

FIG. 61 illustrates one example repeated transmission when a plurality of UL carriers are configured according to the seventh embodiment.

FIG. 63 illustrates one example repeated transmission when the UL carriers have different numerologies according to the seventh embodiment.

FIG. 64 illustrates one example repeated transmission when the UL carriers have different numerologies according to the seventh embodiment.

DESCRIPTION OF EMBODIMENTS

The First Embodiment

Figure 1:
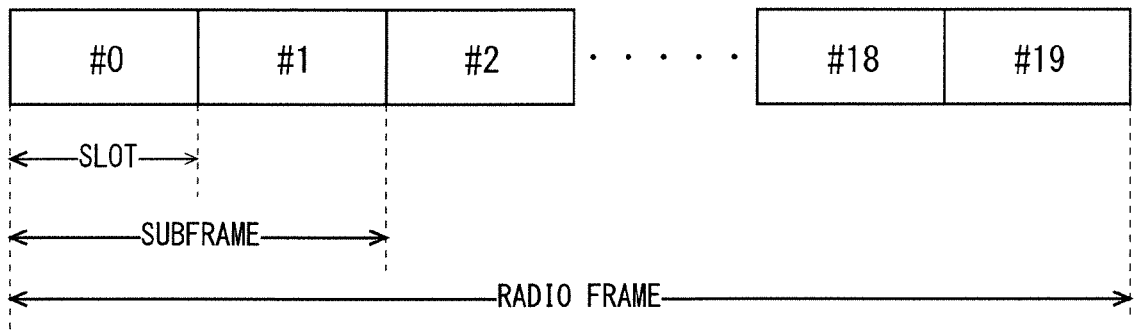
FIG. 1 is a diagram illustrating the configuration of a radio frame for use in an LTE communication system.
Figure 2:
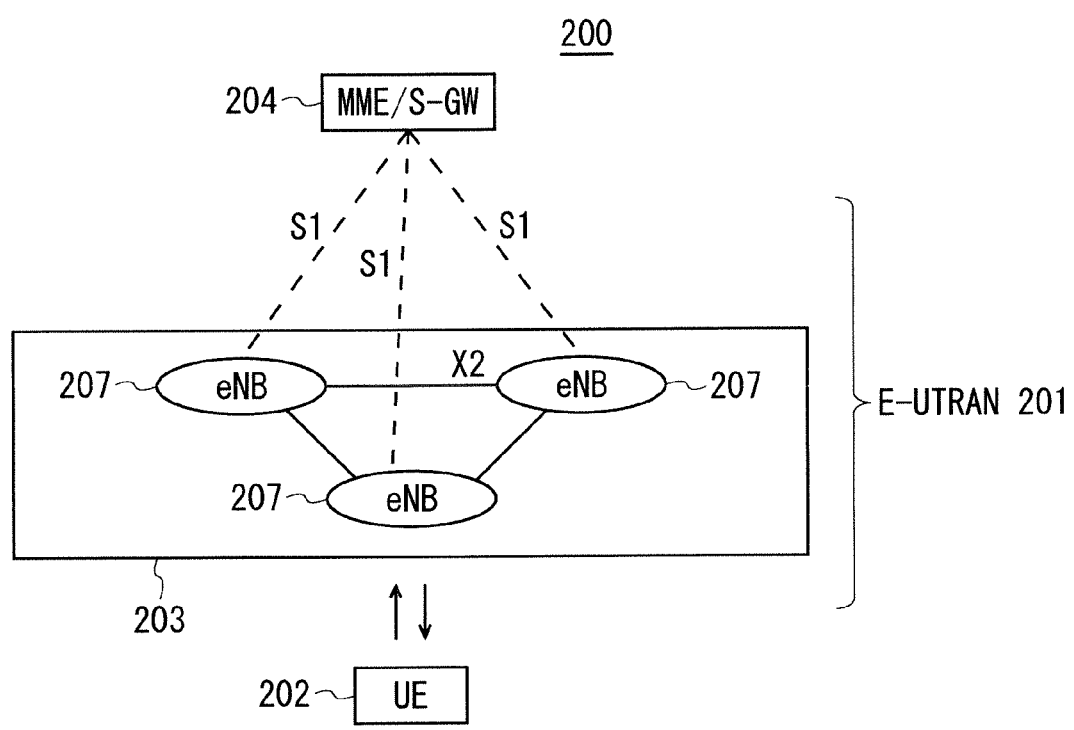
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

Figure 3:
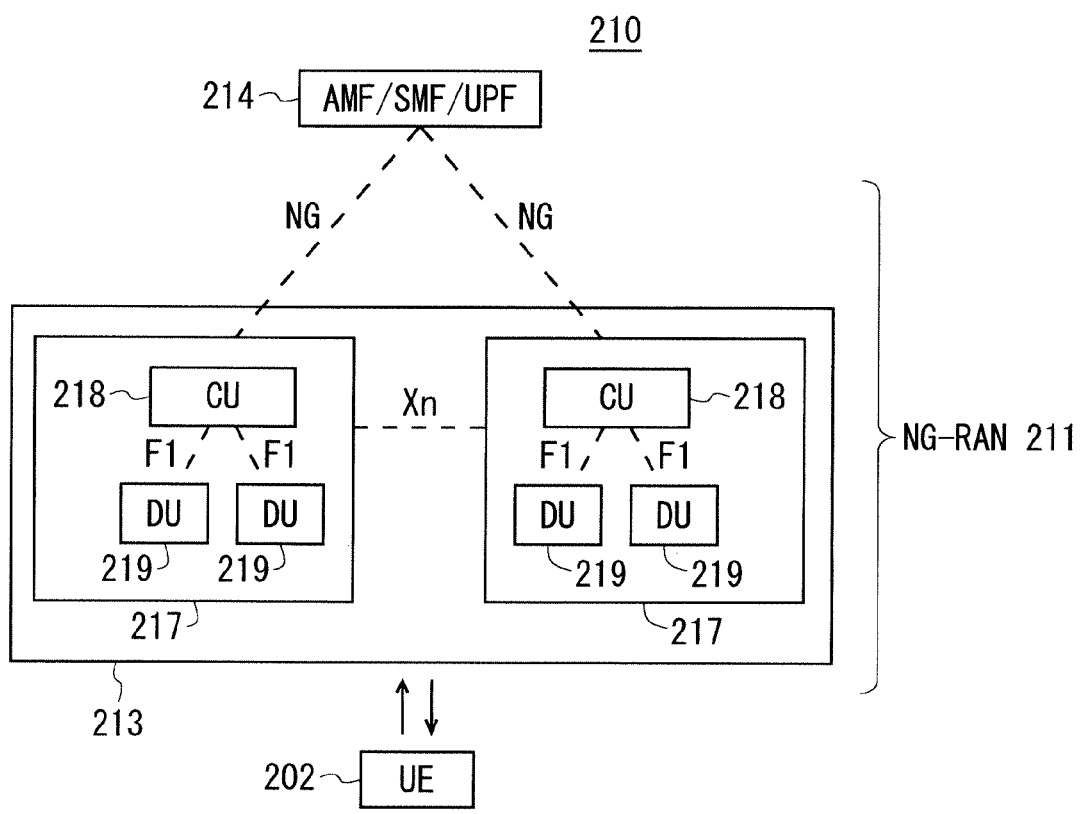
FIG. 3 is a block diagram illustrating an overall configuration of a NR communication system 210 that has been discussed in 3GPP.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 202, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

Figure 4:
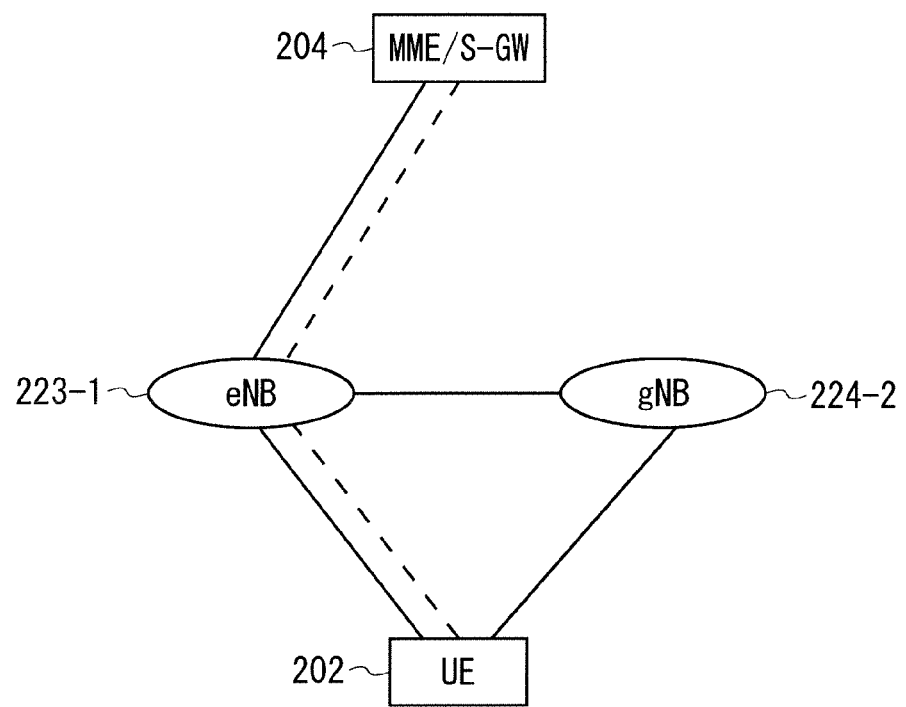
FIG. 4 illustrates a structure of the DC to be performed by an eNB and a gNB that are connected to the EPC.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

Figure 5:
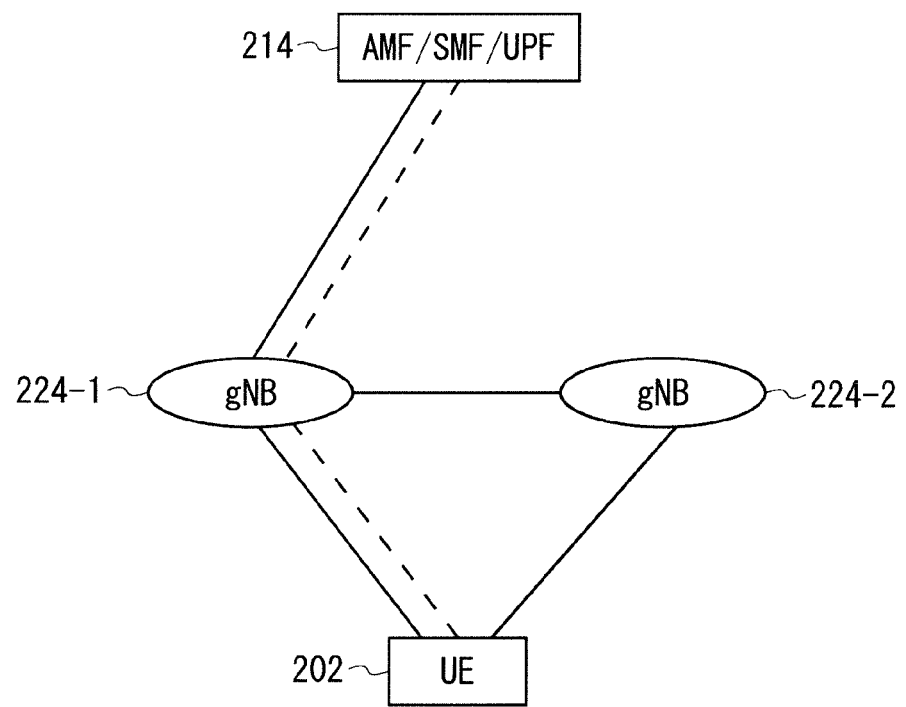
FIG. 5 illustrates a structure of the DC to be performed by gNBs that are connected to the NG core.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

Figure 6:
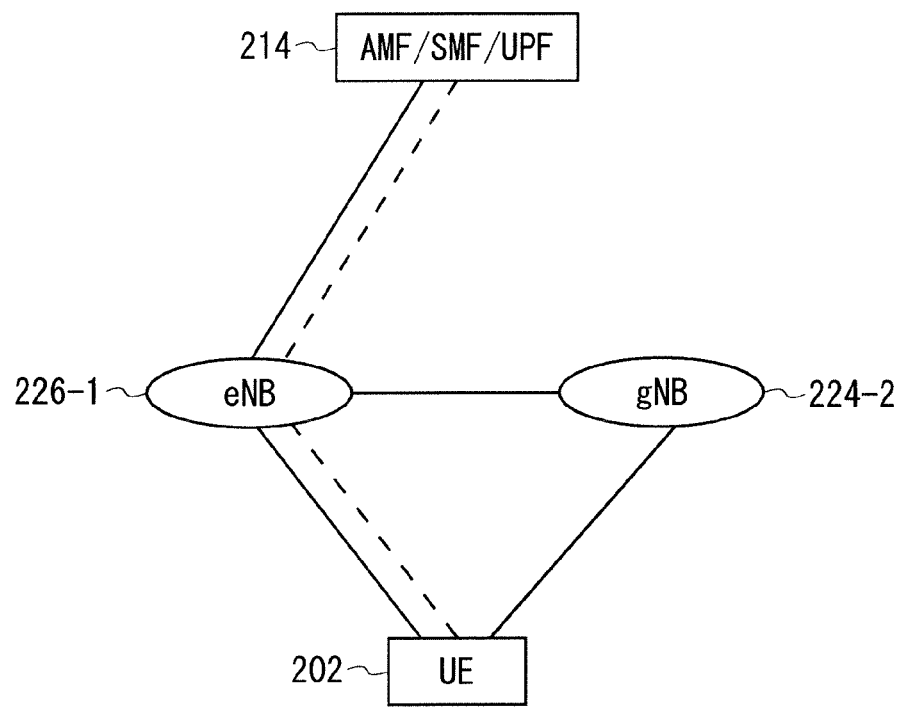
FIG. 6 illustrates a structure of the DC to be performed by the eNB and the gNB that are connected to the NG core.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
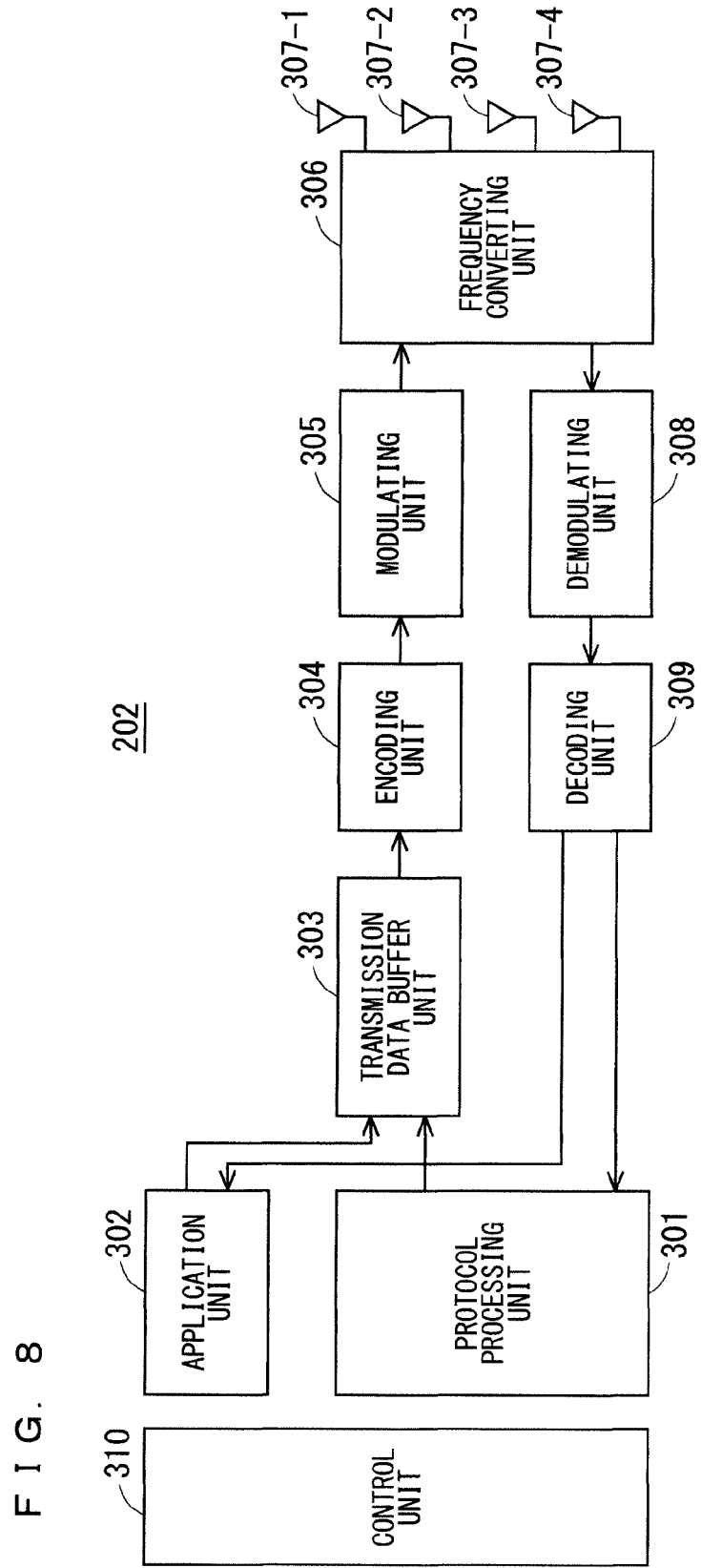
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
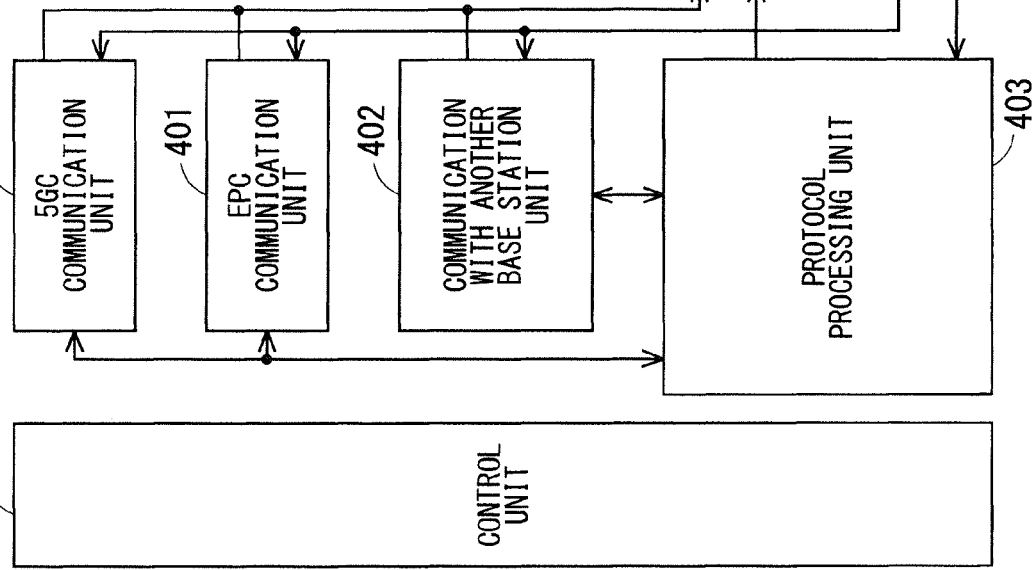
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204), HeNBGW 205, and the like. A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
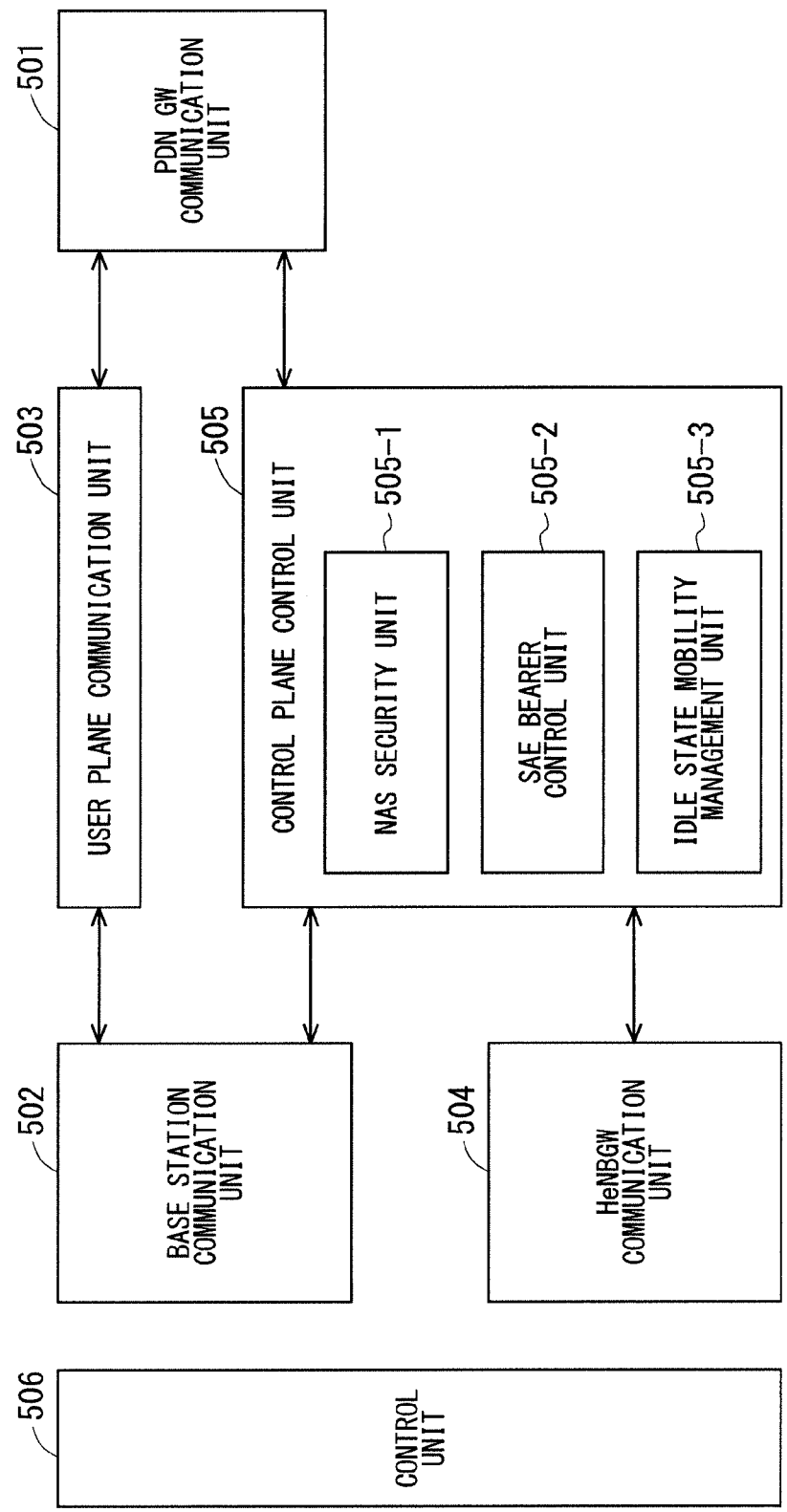
FIG. 10 is a block diagram showing the configuration of an MME.

FIG. 10 is a block diagram showing the configuration of the MME. FIG. 10 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility management unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility management unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility management unit 505-3 may manage the CSG of the Home-eNBs 206 to be connected to the MME 204*a*, CSG IDs, and a whitelist.

Figure 11:
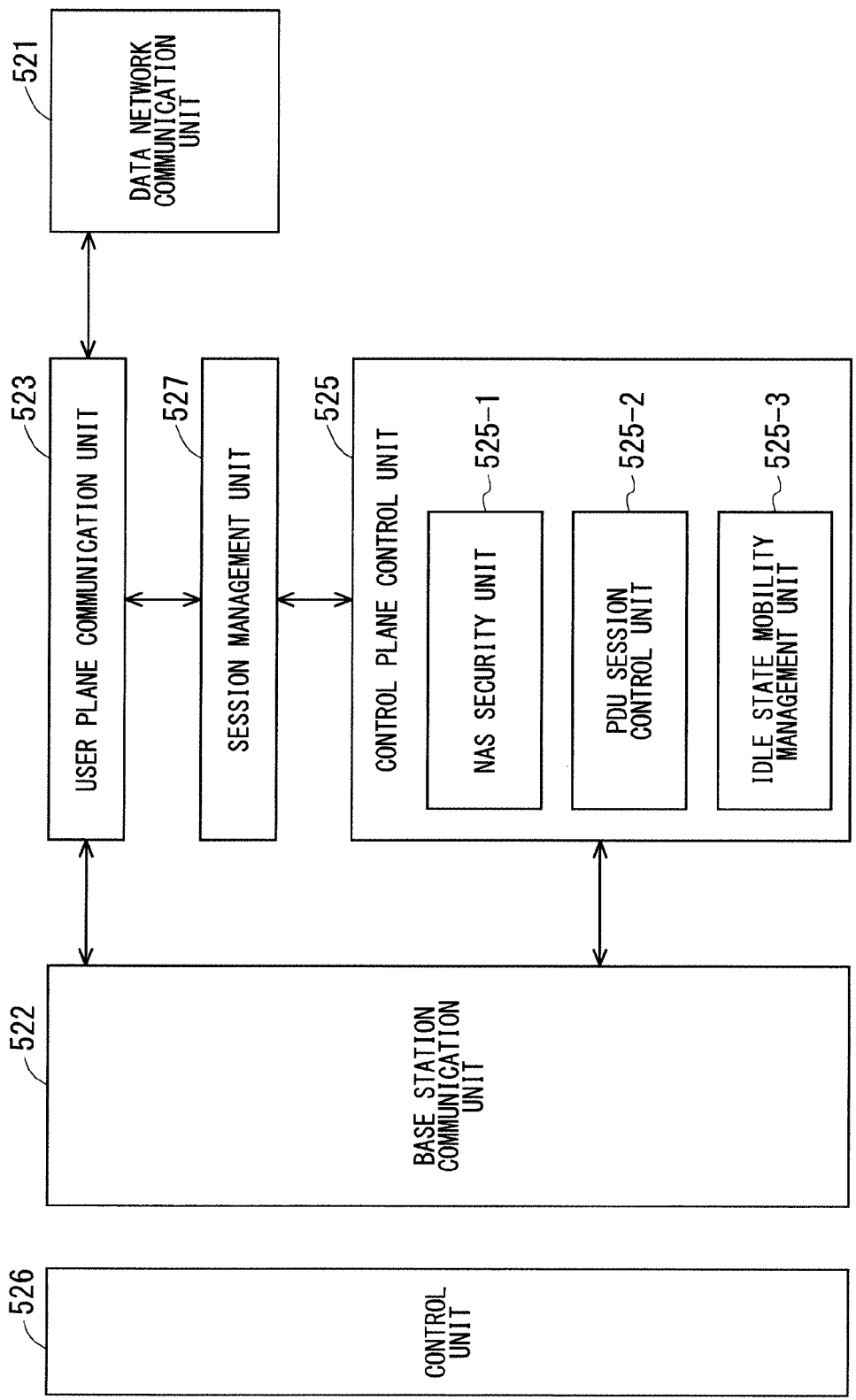
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility management unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility management unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
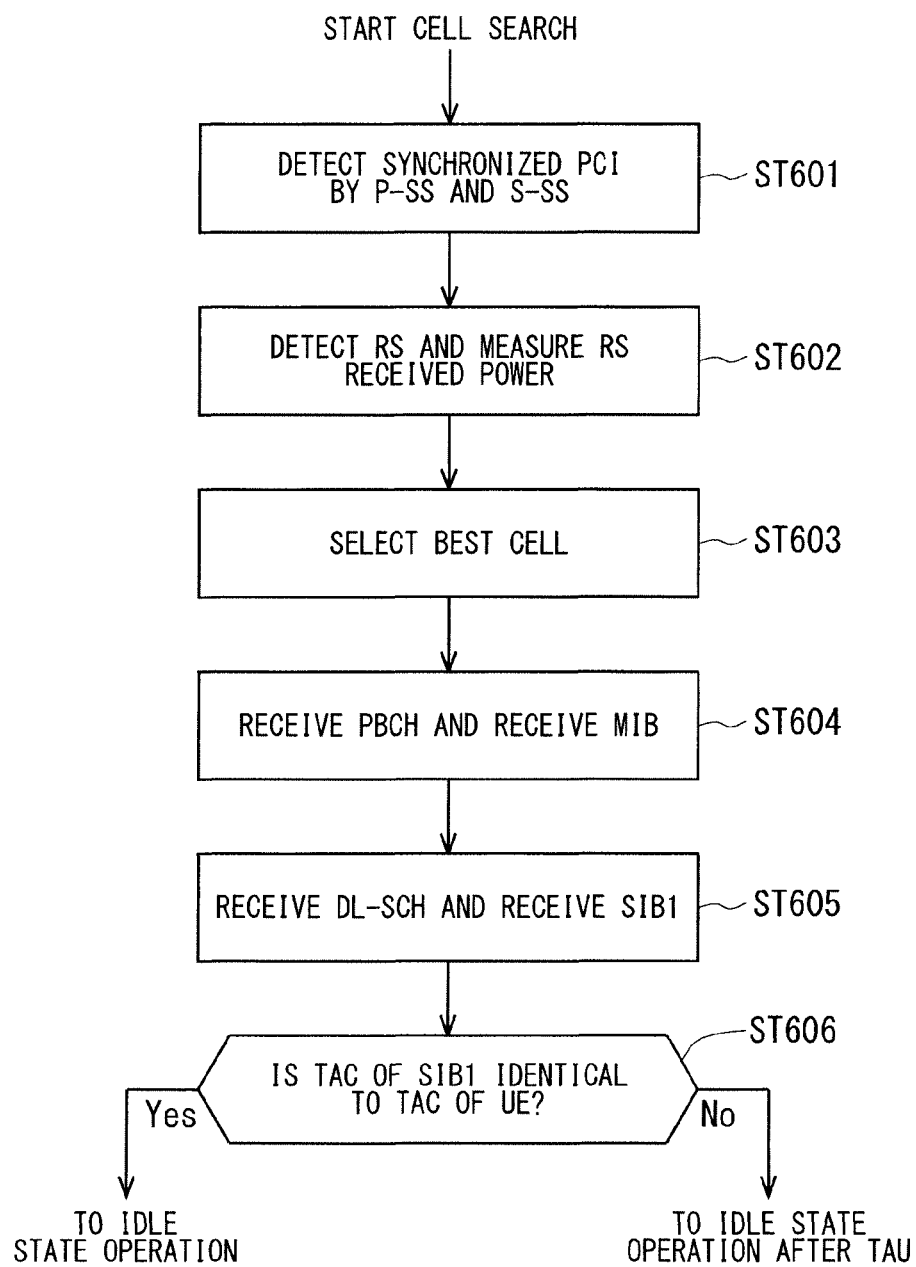
FIG. 12 is a flowchart showing an outline from a cell search to an idle state operation performed by a communication terminal (UE) in LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 13:
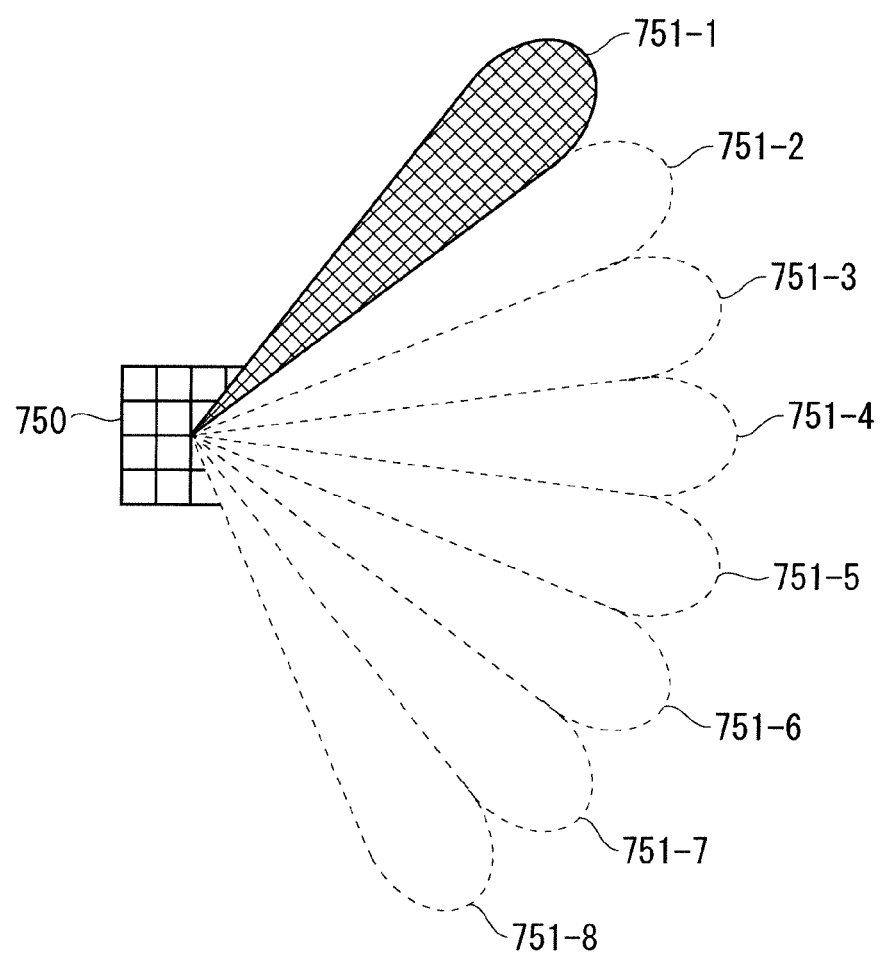
FIG. 13 illustrates an example structure of a cell in an NR system.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

In NR, RRC_INACTIVE has been added as a state between the base station and the user equipment in the RRC. The connection between the high-level NW device and the base station is maintained, in the connection between the high-level NW device and the user equipment in RRC_I-NACTIVE. In RRC_INACTIVE, for example, broadcast of system information (SI), paging, cell reselection, and mobility are performed.

When the UE using the DC structure in which the high-level NW device is a 5G core (may be hereinafter referred to as a 5GC) transitions to RRC_INACTIVE, the UE may maintain a structure of the secondary base station. The structure of the secondary base station may be, for example, the Service Data Adaptation Protocol (SDAP) (see Non-Patent Document 21) configuration in the secondary base station (Secondary Node (SN)), the PDCP configuration in the secondary base station, or a combination of them.

However, none discloses operations of the UE using the DC structure when the UE is in the RRC_INACTIVE state and a base station to be connected to the UE is changed due to the cell reselection. This creates, for example, a variance in the DC structure between the UE and the base station, which causes a problem of unnecessary data transmission and reception between the UE and the secondary base station.

A solution to the problem is hereinafter disclosed.

The UE in RRC_INACTIVE maintains the secondary base station configuration after the cell reselection. When the base station to be connected to the UE is changed due to the cell reselection, the operation may be applied.

The UE may determine the secondary base station. For example, the UE may determine the secondary base station using the cell reselection. This saves, for example, a report on a measurement result from the UE to the master base station. As a result, the amount of signaling between the UE and the base station can be reduced.

When determining the secondary base station, the UE may periodically measure the surrounding cells. The period may be determined in a standard. Alternatively, the period may be identical to the DRX period.

Alternatively, the UE may measure the surrounding cells upon receipt of the paging. This can reduce the amount of processing in the UE in the RRC_INACTIVE state.

The UE notifies the master base station of information on the determined secondary base station. The information may be, for example, an identifier of the secondary base station, or an identifier of a cell belonging to the secondary base station, e.g., a physical cell identity (ID) of the PSCell. The information may be included in the RRC dedicated signaling from the UE to the master base station, for example, RRC connection resumption request (RRCConnectionResumeRequest) or small data that can be transmitted in the RRC_I-NACTIVE state.

The secondary base station configuration may be, for example, the SDAP configuration of the secondary base station, the PDCP configuration of the secondary base station, or a combination of them. Consequently, prompt return to the connection between the high-level NW device and the secondary base station in the connection between the UE and the high-level NW device is possible.

The UE may maintain the RLC configuration of the secondary base station. This can reduce, for example, the amount of processing when the UE returns to RRC_CONNECTED. As another example, the UE may release the RLC configuration of the secondary base station. This enables, for example, configuration of an appropriate radio parameter using a radio channel state in returning to RRC_CONNECTED. The same may apply to the MAC configuration and/or the PHY configuration of the secondary base station.

The UE may maintain the configuration of the master base station. The configuration may be identical to the secondary base station configuration. The configuration may be, for example, the SDAP configuration, the PDCP configuration, or a combination of them. This can reduce, for example, the amount of processing when the UE returns to RRC_CONNECTED.

As another example, the UE may release the configuration of the master base station. For example, when the UE is connected to a cell different from the original cell in the cell reselection, the UE may release the configuration of the master base station. Consequently, for example, the UE can communicate with the base station, using a radio channel state of the reselected cell and an appropriate radio parameter. As another example of releasing the configuration of the master base station, the UE may release the configuration of the master base station when the UE returns to RRC_CONNECTED. This can, for example, reduce the amount of processing in the UE.

The UE itself may start releasing the configuration of the master base station in the UE. The timing with which the UE releases the configuration of the master base station may be predefined, for example, in a standard. Consequently, for example, the amount of signaling between the base station and the UE when the UE releases the configuration of the master base station can be reduced.

As another example, a source master base station may start releasing the configuration of the master base station in the UE. The source master base station may instruct the UE to release the configuration of the master base station in the UE. The source master base station may notify the instruction to the UE through a target master base station. This can, for example, increase the flexibility in the timing of releasing the configuration of the master base station in the UE.

As another example, the target master base station may start releasing the configuration of the master base station in the UE. The target master base station may instruct the UE to release the configuration of the master base station in the UE. The instruction may be included in another signaling from the target base station to the UE, for example, the signaling for instructing a return to RRC_CONNECTED or the signaling for instructing maintaining of RRC_INACTIVE. This can, for example, reduce the signaling between the target base station and the source base station.

As another example, the high-level NW device (e.g., the 5GC) may start releasing the configuration of the master base station in the UE. For example, the high-level NW device may release the configuration of the master base station in the UE when the RAN area of the UE is updated. Consequently, when the RAN area of the UE is updated, for example, the high-level NW device enables the configuration of the master base station appropriate for the updated RAN area.

The source master base station may hold the secondary base station configuration in the UE. The configuration to be held by the master base station may be identical to the secondary base station configuration which is maintained by the UE. The master base station may hold, together with the configuration, information on the secondary base station, for example, the identifier of the secondary base station. Consequently, for example, the master base station can identify the secondary base station in the DC structure with the UE.

The target master base station may inquire of the source master base station about information on the secondary base station configuration in the UE. The source master base station may notify the target master base station of the information. The inquiry and/or the notification may be made after the UE transmits, to the target master base station, a request of its own UE for transitioning to RRC_CONNECTED. Consequently, for example, the source master base station need not notify the information to the surrounding base stations including the target master base station in advance. As a result, the amount of signaling between the base stations can be reduced.

As another example, the inquiry and/or the notification may be made before the UE transmits, to the target master base station, the request of its own UE for transitioning to RRC_CONNECTED. Consequently, for example, the UE can promptly transition to RRC_CONNECTED while maintaining the DC structure.

The source master base station may release the secondary base station configuration via the signaling from the target master base station. The signaling may be, for example, signaling for the UE context release. Consequently, for example, the source master base station can prevent the shortage of buffer caused by holding the secondary base station configuration in the UEs being served thereby.

The secondary base station may hold its own secondary base station configuration in the UE. The configuration held by the secondary base station may be identical to that maintained by the UE. Consequently, for example, the buffer usage when the master base station holds the configuration can be reduced.

The UE reestablishes the PDCP for the master base station and/or the secondary base station. In the reestablishment, the UE may use the configuration of the master base station and/or the secondary base station which the UE maintains. The UE may perform the reestablishment using the signaling notified from the target master base station for instructing the return to RRC_CONNECTED. The signaling need not include information on configuring the master base station and/or the secondary base station, for example, a parameter of the configuration (e.g., PDCP-Config in Non-Patent Document 19 (3GPP TS36.331 V15.1.0)). This can, for example, reduce the size of the signaling.

The master base station may instruct the UE to reestablish the PDCP. The master base station may include the instruction in, for example, the signaling for instructing the return to RRC_CONNECTED to notify the UE of the instruction. The UE may reestablish the PDCP using the instruction. Alternatively, the UE need not reestablish the PDCP in the absence of the instruction.

As another example, the master base station need not notify the UE of the instruction for reestablishing the PDCP. The UE may reestablish the PDCP, for example, using the signaling for instructing the return to RRC_CONNECTED. This can, for example, reduce the size of the signaling between the master base station and the UE.

The signaling for instructing the return to RRC_CONNECTED may include the identifier of the UE. For example, the I-RNTI (see Non-Patent Document 16) may be used as the identifier. The identifier may be unique, for example, within the base station, the RAN area, or the 5GC. For example, even when the base station is changed by the cell reselection of the UE, making the identifier unique within the RAN area enables the base station to identify the UE.

As another example of the identifier, the C-RNTI may be used. The C-RNTI may be the one allocated when the UE is in RRC_CONNECTED. The C-RNTI may be used in combination with the PCI. Since, for example, the identifier in RRC_CONNECTED can be used as it is, the base station need not reallocate the identifier. As a result, the amount of processing in the communication system can be reduced.

When the identifier is unique within the RAN area and the RAN area is updated, the identifier may be updated. For example, when the UE selects a base station in a different RAN area in the cell reselection, the base station may notify the UE of a new identifier. The base station may give the notification, for example, through the procedure for updating the RAN area (see 9.2.2.5 of Non-Patent Document 16). This enables the base station to identify the UE, for example, even when the UE moves to a different RAN area in the cell reselection.

When the UE maintains the secondary base station configuration after the cell reselection, the secondary base station may change its own secondary base station configuration in the connection with the UE. The configuration may be, for example, the configuration of the SDAP and/or the PDCP. The secondary base station may notify the source master base station of the changed configuration. For example, the secondary base station addition request acknowledgement (SN Addition Request ACK) may be used as the notification. The source master base station may notify the UE of the changed configuration. The UE may change the secondary base station configuration using the notified configuration. This enables, for example, the use of an efficient configuration in a combination of the master base stations and the secondary base station in the communication system. As a result, the communication efficiency in the communication system can be increased.

Figure 14:
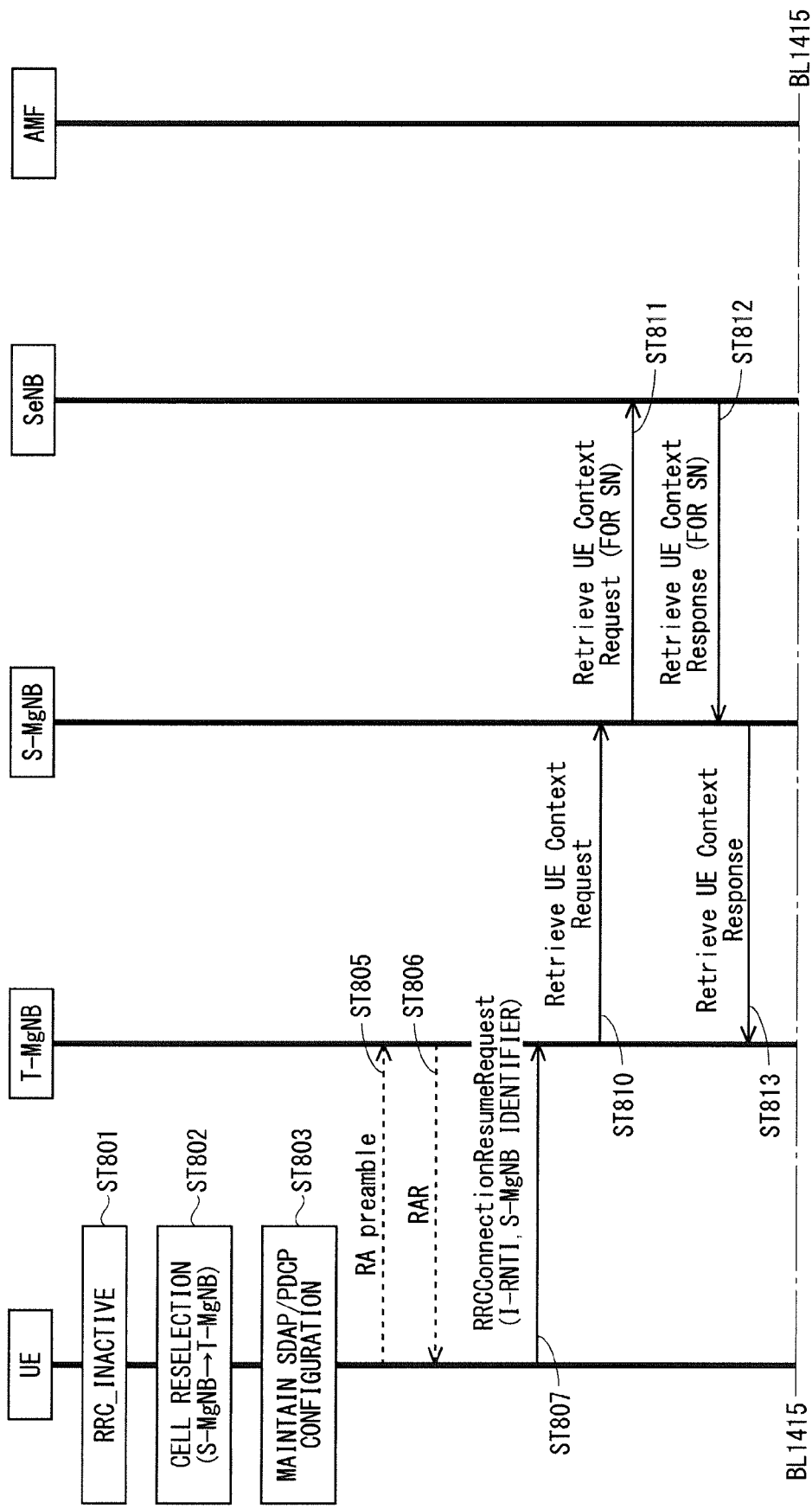
FIG. 14 illustrates that the UE using the DC structure performs operations of maintaining the secondary base station configuration and transitioning from RRC_INACTIVE to RRC_CONNECTED according to the first embodiment.
Figure 15:
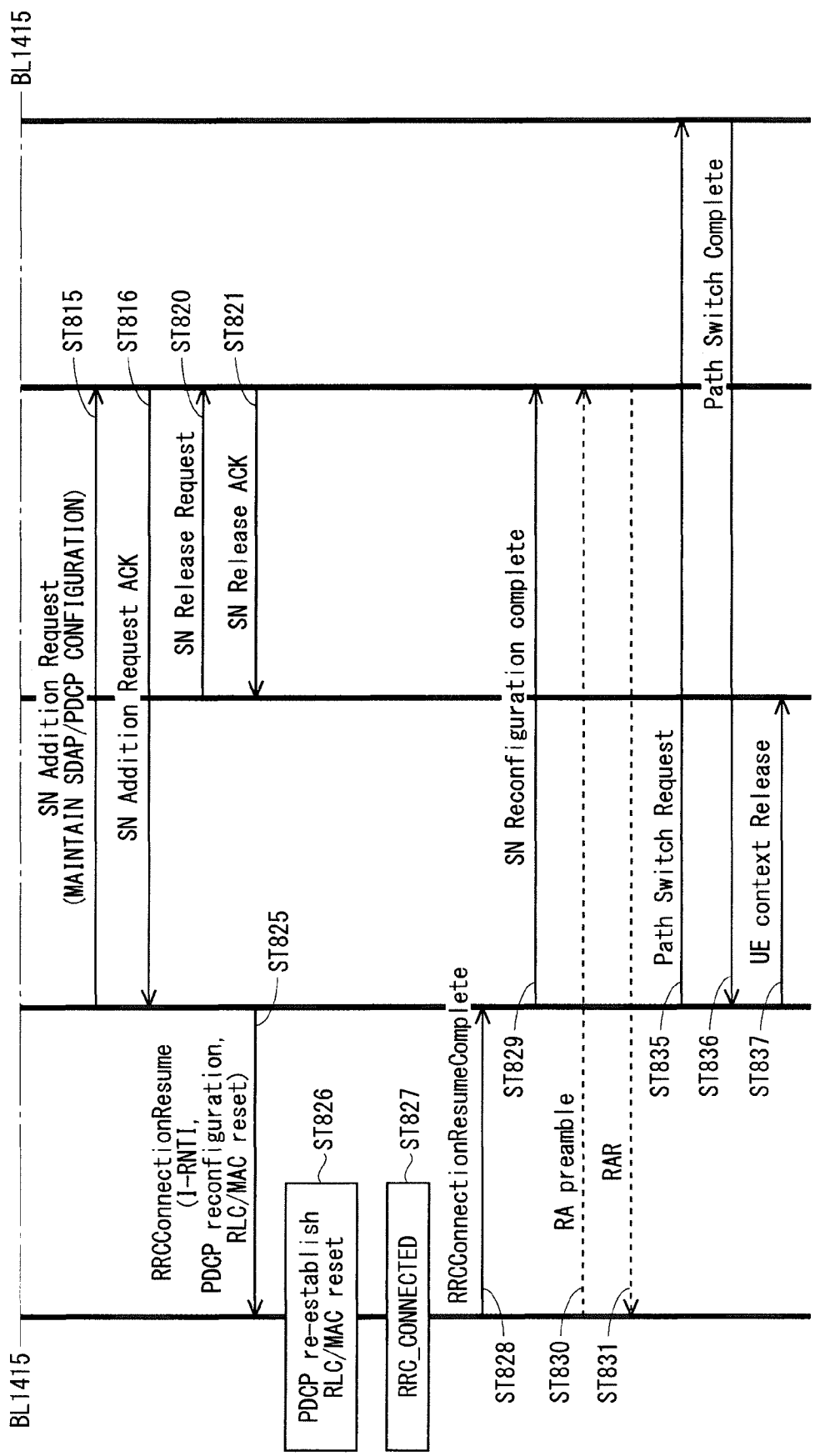
FIG. 15 illustrates that the UE using the DC structure performs operations of maintaining the secondary base station configuration and transitioning from RRC_INACTIVE to RRC_CONNECTED according to the first embodiment.

FIGS. 14 and 15 are a set of sequence diagrams illustrating that the UE using the DC structure performs operations of maintaining the secondary base station configuration and transitioning to RRC_CONNECTED when being connected to a different master base station in the cell reselection. FIGS. 14 and 15 are connected across a location of a border BL 1415. In FIGS. 14 and 15, S-MgNB denotes a source master base station, T-MgNB denotes a target master base station, and SeNB denotes a secondary base station. FIGS. 14 and 15 illustrate an example where the UE starts transitioning to RRC_CONNECTED.

In Step ST801 of FIG. 14, the UE is in the RRC_INACTIVE state. In Step ST802, the UE performs the cell reselection to switch the connection-target base station from the S-MgNB to the T-MgNB. In Step ST803, the UE maintains the SDAP/PDCP configuration of the SeNB.

In Steps ST805 and ST806 of FIG. 14, the UE and the T-MgNB perform a random access procedure. In Step ST805, the UE transmits a random access preamble to the T-MgNB. In Step ST806, the T-MgNB transmits a random access response to the UE. Suppose in the example of FIG. 14 that the random access procedure has been successful in Step ST806.

In Step ST807 of FIG. 14, the UE requests the T-MgNB to resume the RRC connection. The UE may make the request, for example, via the signaling for the RRC connection resumption request (RRCConnectionResumeRequest). The signaling may include the identifier of the UE, for example, the identifier allocated in transitioning to RRC_INACTIVE (e.g., the I-RNTI). The T-MgNB identifies the UE requesting the resumption of the RRC connection, using the identifier.

In Step ST810 of FIG. 14, the T-MgNB requests the S-MgNB to retrieve the UE context. The T-MgNB may make the request, for example, via the signaling for the UE Context Retrieval Request. The T-MgNB may make the request, for example, via an I/F between base stations (e.g., X2/Xn). The request may include information on a request for retrieving the secondary base station configuration.

In Step ST811 of FIG. 14, the S-MgNB requests the SeNB to retrieve the secondary base station configuration. The S-MgNB may make the request, for example, via the signaling identical to that in Step ST810. In Step ST812, the SeNB notifies the S-MgNB of the secondary base station configuration. The signaling for responding to the UE Context Retrieval (UE Context Retrieve Response) may be used for the signaling. In Step ST812, the S-MgNB retrieves the secondary base station configuration.

In Step ST813 of FIG. 14, the S-MgNB notifies the T-MgNB of the UE context. The S-MgNB may give the notification, for example, via the signaling for responding to the UE Context Retrieval (UE Context Retrieve Response). The S-MgNB may give the notification, for example, via the I/F between base stations (e.g., X2/Xn). The notification includes the secondary base station configuration included in Step ST812. Through Step ST813, the T-MgNB retrieves the UE context including the secondary base station configuration.

In Step ST815 of FIG. 15, the T-MgNB notifies the SeNB of the secondary base station addition request (SN Addition Request). The request may include the secondary base station configuration retrieved from the S-MgNB in Step ST813. In the example of FIG. 15, the SeNB determines to accept the request. In Step ST816, the SeNB notifies the T-MgNB of the acknowledgement to the request (secondary base station addition request acknowledgement (SN Addition Request ACK)).

In Step ST820 of FIG. 15, the S-MgNB notifies the SeNB of the secondary base station release request (SN Release Request). In Step ST821, the SeNB notifies the S-MgNB of the secondary base station release request acknowledgement (SN Release Request Acknowledge).

In Step ST825 of FIG. 15, the T-MgNB instructs the UE to resume the RRC connection. The T-MgNB may issue the instruction, for example, via the signaling for the RRC connection resumption (RRCConnectionResume). The signaling may include the identifier of the UE. The identifier may be, for example, the I-RNTI. The signaling may include the C-RNTI. The signaling may include both of the I-RNTI and the C-RNTI. As another example, the signaling may include information on the source base station. The information may be, for example, an identifier of the source base station (e.g., a gNB-ID) or an identifier of the PCell (e.g., the PCI). This enables, for example, the T-MgNB to promptly retrieve information on the S-MgNB.

In Step ST826 of FIG. 15, the UE reestablishes the PDCPs for the T-MgNB and the SeNB, and resets the RLC and the MAC. In Step ST826, the UE uses the SDAP configuration as it is. In Step ST827, the UE transitions to RRC_CONNECTED. In Step ST827, the UE may discard the I-RNTI.

In Step ST828 of FIG. 15, the UE notifies the T-MgNB of the resumption of the RRC connection. The UE may give the notification, for example, via the signaling for the RRC connection resumption completion (RRCConnectionResumeComplete).

In Step ST829 of FIG. 15, the T-MgNB requests the SeNB to resume the connection with the UE. The resumption may be, for example, resumption of the SCG bearer, the SCG path for the SCG split bearer, and the SCG path for the MCG split bearer. In Step ST829, the connection between the T-MgNB, the SeNB, and the UE is resumed.

In Steps ST830 and ST831 of FIG. 15, the UE and the SeNB perform the random access procedure. In Step ST830, the UE transmits the random access preamble to the SeNB. The random access preamble may be the random access preamble notified from the T-MgNB to the UE in Step ST825. In Step ST831, the SeNB notifies the UE of the random access response.

In Step ST835 of FIG. 15, the T-MgNB requests the AMF to switch between communication paths (Path Switch Request). The request may include a request for switching between the PDU sessions in the T-MgNB and the SeNB. In Step ST835, the communication paths between the AMF and the UPF are switched. The PDU sessions in the MgNB and the SgNB may be switched.

In Step ST836 of FIG. 15, the AMF notifies the T-MgNB of the communication path switch completion (Path Switch Complete). In Step ST837, the T-MgNB instructs the S-MgNB to release the UE context (UE context release) for the MgNB.

Although the example of FIGS. 14 and 15 illustrates a case where the UE itself starts the operations of transitioning to RRC_CONNECTED, the example may be applied to a case where the network starts the operations of transitioning to RRC_CONNECTED in the UE. In such a case, the S-MgNB may transmit the RAN paging to the T-MgNB. The T-MgNB may transmit the paging to the UE. The paging may be performed after the RAN paging from the S-MgNB to the T-MgNB. After the T-MgNB transmits the paging to the UE, the UE and the T-MgNB may perform the random access procedure in Steps ST805 and ST806. Similarly, the following diagrams may be applied to the case where the network starts the operations of transitioning to RRC_CO-NNECTED in the UE. This enables, for example, the UE to promptly return to the DC structure even when the downlink data is generated.

Although the example of FIGS. 14 and 15 illustrates that the SeNB transmits the secondary base station release request acknowledgement to the S-MgNB in Step ST821, the SeNB need not transmit the acknowledgement. The S-MgNB may automatically recognize the completion of the secondary base station release after transmitting the secondary base station release request to the SeNB in Step ST820. This can, for example, reduce the signaling between the base stations.

Although the example of FIGS. 14 and 15 illustrates that Step ST812 is performed after Step ST811, the SeNB may transmit the secondary base station configuration to the S-MgNB in advance. For example, the SeNB may perform Step ST812 using the transition of the UE to RRC_INAC-TIVE. In such a case, for example, the S-MgNB need not perform Step ST811. This enables, for example, the T-MgNB to promptly retrieve the secondary base station configuration.

Although the example of FIGS. 14 and 15 illustrates that the S-MgNB requests the secondary base station configuration in Step ST811, the S-MgNB need not perform ST811. For example, when the S-MgNB holds the configuration of the SeNB (e.g., the SDAP/PDCP configuration), the S-MgNB need not perform ST811. This can, for example, reduce the amount of signaling between the base stations.

The example of FIGS. 14 and 15 illustrates that the secondary base station release request in Step ST820 and the secondary base station release request acknowledgement in Step ST821 are performed after the secondary base station addition request in Step ST815 and the secondary base station addition request acknowledgement in Step ST816. However, the secondary base station release request and the secondary base station release request acknowledgement may be performed before the secondary base station addition request and the secondary base station addition request acknowledgement. This can, for example, increase the flexibility in the control over the SeNB in the T-MgNB and the S-MgNB.

Although Step ST816 of FIG. 15 exemplifies that the SN configuration has not been changed since before RRC_I-NACTIVE, the SeNB may change the configuration. The SeNB may include the changed configuration in the notification of Step ST816. The T-MgNB may include the changed configuration in the notification of Step ST825 for the UE. In Step ST827, the UE may perform the operations of transitioning to RRC_CONNECTED with the changed configuration. This enables, for example, the use of an efficient configuration in a combination of the master base stations and the secondary base station in the communication system. As a result, the communication efficiency in the communication system can be increased.

Although the example of FIGS. 14 and 15 illustrates that Steps ST810 to ST813 are performed before Steps ST815 and ST816, Steps ST810 to ST813 may be performed after Steps ST815 and ST816. When Steps ST810 to ST813 are performed after Steps ST815 and ST816, the S-MgNB and the SeNB need not perform the operations in Steps ST811 and ST812. The T-MgNB may retrieve the secondary base station configuration through Step ST816. This can, for example, reduce the signaling between the base stations.

In the example of FIGS. 14 and 15, the T-MgNB may be a T-MeNB. The S-MgNB may be an S-MeNB. The SeNB may be the SgNB.

Another solution is disclosed. The UE in RRC_INAC-TIVE releases the secondary base station configuration after the cell reselection. When the base station to be connected to the UE is changed due to the cell reselection, the aforementioned operations may be applied. This can, for example, reduce the amount of processing in the UE. The secondary base station configuration may be, for example, the SDAP configuration of the secondary base station, the PDCP configuration of the secondary base station, or a combination of them.

For example, when the UE is connected to a cell different from the original cell in the cell reselection, the UE may release the configuration. This can prevent, for example, the UE from releasing an unnecessary secondary base station configuration when a cell to be connected to the UE is not changed in the cell reselection. The cell may be a cell belonging to a master cell group (MCG) or a cell belonging to a secondary cell group (SCG).

The UE itself may start releasing the secondary base station configuration in the UE. The timing with which the UE releases the configuration may be predefined, for example, in a standard. Consequently, the amount of signaling between the base station and the UE when the UE releases the configuration can be reduced.

As another example, the source master base station may start releasing the configuration in the UE. The source master base station may instruct the UE to release the configuration in the UE. The source master base station may notify the instruction to the UE through the target master base station. This can, for example, increase the flexibility in the timing of releasing the configuration in the UE.

As another example, the target master base station may start releasing the configuration in the UE. The target master base station may instruct the UE to release the configuration in the UE. The instruction may be included in another signaling from the target base station to the UE, for example, the signaling for instructing the return to RRC_CON-NECTED or the signaling for instructing maintaining of RRC_INACTIVE. This can, for example, reduce the signaling between the target base station and the source base station.

As another example, the high-level NW device (e.g., the 5GC) may start releasing the configuration in the UE. For example, the high-level NW device may release the configuration in the UE when the RAN area of the UE is updated. Consequently, when the RAN area of the UE is updated, for example, the high-level NW device enables the configuration of the master base station appropriate for the updated RAN area.

When the UE releases the configuration, the source master base station need not request the secondary base station to retrieve the secondary base station configuration. This can, for example, reduce the signaling between the base stations.

Figure 16:
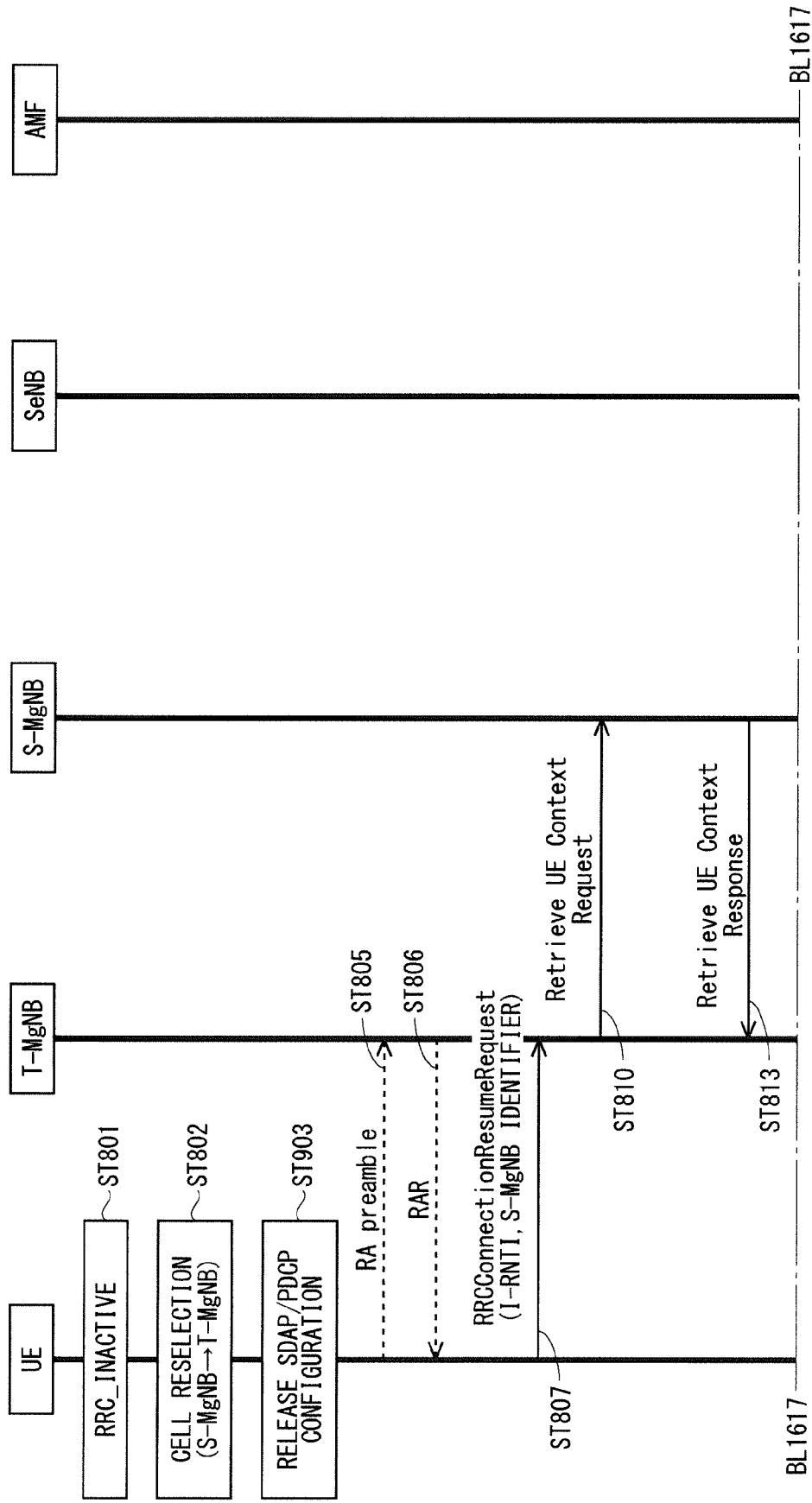
FIG. 16 illustrates that the UE using the DC structure performs operations of releasing the secondary base station configuration and transitioning from RRC_INACTIVE to RRC_CONNECTED according to the first embodiment.
Figure 17:
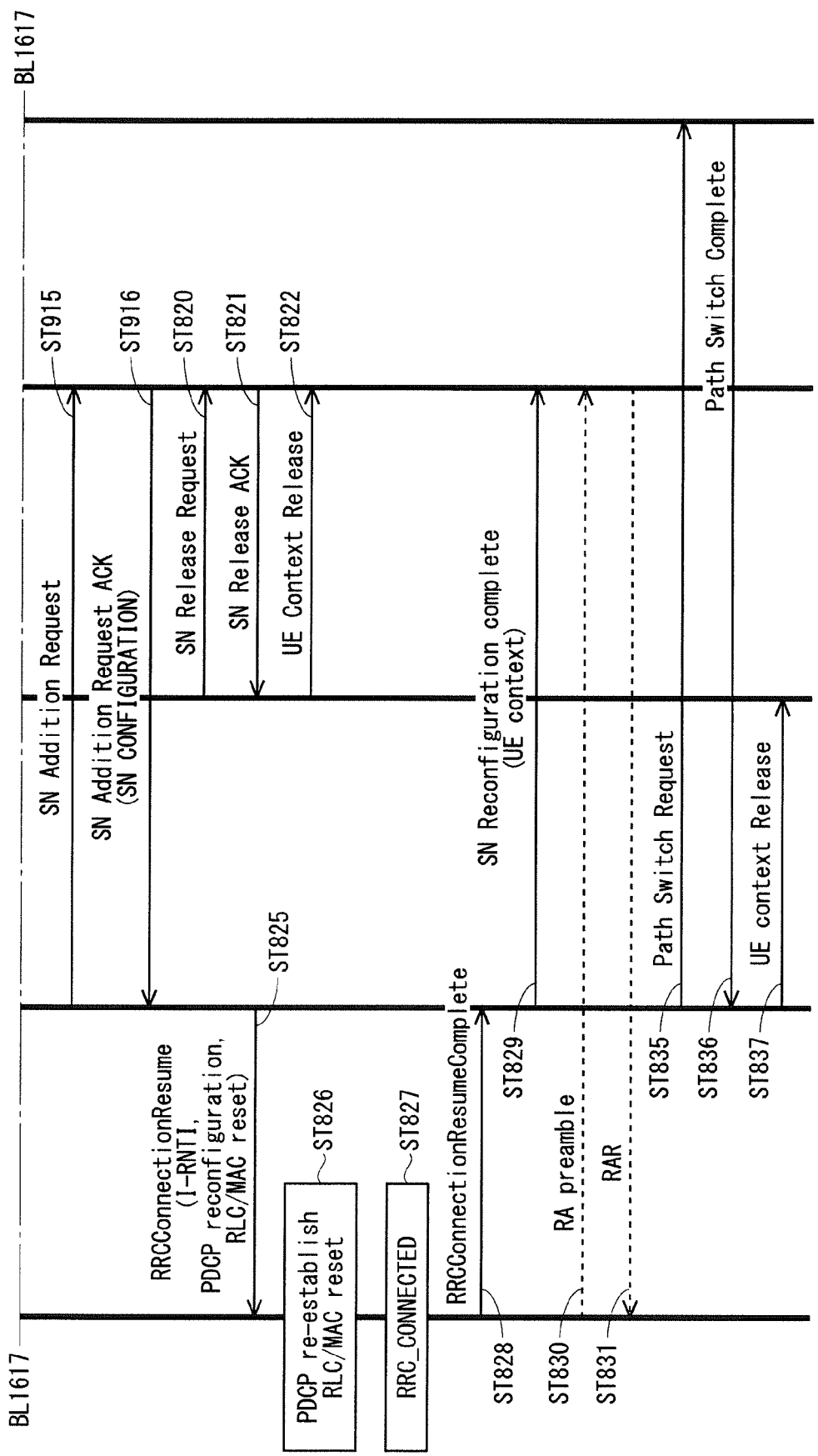
FIG. 17 illustrates that the UE using the DC structure performs operations of releasing the secondary base station configuration and transitioning from RRC_INACTIVE to RRC_CONNECTED according to the first embodiment.

FIGS. 16 and 17 are a set of sequence diagrams illustrating that the UE using the DC structure performs operations of releasing the secondary base station configuration and transitioning to RRC_CONNECTED when being connected to a different master base station in the cell reselection. FIGS. 16 and 17 are connected across a location of a border BL 1617. In FIG. 16, S-MgNB denotes a source master base station, T-MgNB denotes a target master base station, and SeNB denotes a secondary base station. FIGS. 16 and 17 illustrate an example where the UE starts transitioning to RRC_CONNECTED. In FIGS. 16 and 17, the same numbers are applied to the processes common to those in FIGS. 14 and 15, and the common description thereof is omitted.

Steps ST801 and ST802 in FIG. 16 are identical to those in FIG. 14.

In Step ST903 of FIG. 16, the UE releases the SDAP/PDCP configuration of the SeNB.

Steps ST805 to ST810 in FIG. 16 are identical to those in FIG. 14. In FIG. 16, the S-MgNB does not request the SeNB to retrieve the secondary base station configuration. The SeNB does not notify the S-MgNB of the secondary base station configuration. In Step ST813 of FIG. 16, the S-MgNB notifies the T-MgNB of the UE context. Unlike FIG. 14, the notification does not include the secondary base station configuration.

In Step ST915 in FIG. 17, the T-MgNB notifies the SeNB of the secondary base station addition request (SN Addition Request). In the example of FIG. 17, the SeNB determines to accept the request. In Step ST916, the SeNB notifies the T-MgNB of the acknowledgement to the request (secondary base station addition request acknowledgement (SN Addition Request ACK)). The notification may include the secondary base station configuration, for example, one or more combinations of the configurations of the SDAP, the PDCP, the RLC, the MAC, and the PHY.

Steps ST820 and ST821 in FIG. 17 are identical to those in FIG. 15. In Step ST822, the S-MgNB instructs the SeNB to release the UE context (UE context release). The SeNB releases the UE context because of Step ST822. Steps ST825 to ST837 are identical to those in FIG. 15.

In the example of FIGS. 16 and 17, the secondary base station release request acknowledgement in Step ST821 need not be transmitted similarly to FIGS. 14 and 15. The S-MgNB may automatically recognize the completion of the secondary base station release after transmitting the secondary base station release request to the SeNB in Step ST820. This can, for example, reduce the signaling between the base stations.

In the example of FIGS. 16 and 17, the secondary base station release request in Step ST820 and the secondary base station release request acknowledgement in Step ST821 may also be performed before the secondary base station addition request in Step ST915 and the secondary base station addition request acknowledgement in ST916 similarly to FIGS. 14 and 15. This can, for example, increase the flexibility in the control over the SeNB in the T-MgNB and the S-MgNB.

In the example of FIGS. 16 and 17, Step ST810 and Step ST813 may also be performed after ST915 and ST916 similarly to the example in FIGS. 14 and 15. The T-MgNB may retrieve the secondary base station configuration through Step ST916. This enables, for example, the T-MgNB to promptly retrieve the secondary base station configuration.

In the example of FIGS. 16 and 17, the T-MgNB may be the T-MeNB. The S-MgNB may be the S-MeNB. The SeNB may be the SgNB.

Another solution is disclosed. The master base station may determine whether the UE maintains or releases the secondary base station configuration, and notify it to the UE. The master base station may be a source base station or a target base station. The UE may maintain or release the configuration, using the instruction.

The master base station may issue the instruction before the UE transitions to RRC_INACTIVE, that is, when the UE is in RRC_CONNECTED. For example, the master base station may notify the UE of the instruction via the signaling for the RRC connection reconfiguration. This can, for example, reduce the amount of signaling between the base station and the UE when the UE transitions to RRC_INACTIVE.

As another example, the master base station may issue the instruction when the UE transitions to RRC_INACTIVE. For example, the master base station may notify the UE of the instruction via the signaling for the RRC connection termination. Since, for example, the UE need not hold the instruction while maintaining RRC_CONNECTED, the buffer volume in the UE can be consequently reduced.

The criteria for the master base station to determine whether the UE maintains or releases the secondary base station configuration may be, for example, switching of the master base station, switching of the secondary base station, or both of them. As another example, information on the type of the secondary base station (e.g., IoT base station, broadband communication base station, macro base station, and small cell base station) may be used. This can reduce the signaling between the base stations while, for example, the master base station appropriately enables the secondary base station configuration for the UE depending on the type of the secondary base station.

Although the first embodiment describes a case where the UE determines the secondary base station, the master base station may determine the secondary base station. The master base station may be, for example, the target master base station. The master base station may determine the secondary base station using a measurement result notified from the UE, or determine a base station with a small backhaul latency with the master base station as the secondary base station. Consequently, for example, the latency between the master base station and the secondary base station can be reduced. In other words, determining the base station with the small backhaul latency as the secondary base station can reduce the latency in the communication system.

The UE may periodically make the measurement. The period may be determined in a standard. Alternatively, the period may be identical to the DRX period. Alternatively, the master base station may notify the period dedicatedly to each UE. Alternatively, the master base station may broadcast the period to the UEs being served thereby.

Alternatively, the UE may make the measurement upon receipt of the paging. This can reduce the amount of processing in the UE in the RRC_INACTIVE state.

The UE may notify the master base station of the measurement result. The UE may give the notification using small data that can be transmitted in the RRC_INACTIVE state. This can prompt the notification of the measurement result. As another example, the UE may give the notification as a measurement report. Alternatively, the signaling for the RRC connection resumption request (RRCConnectionResumeRequest) may include the measurement result. The master base station may determine the secondary base station using this information. This enables, for example, the master base station to configure a base station with superior communication quality with the UE as the secondary base station. As a result, the transmission and reception rate of the UE in the communication system can be increased.

The master base station may use the criterion for the cell reselection in determining the secondary base station. The UE may notify the master base station of a measurement result to be used for the cell reselection.

Figure 18:
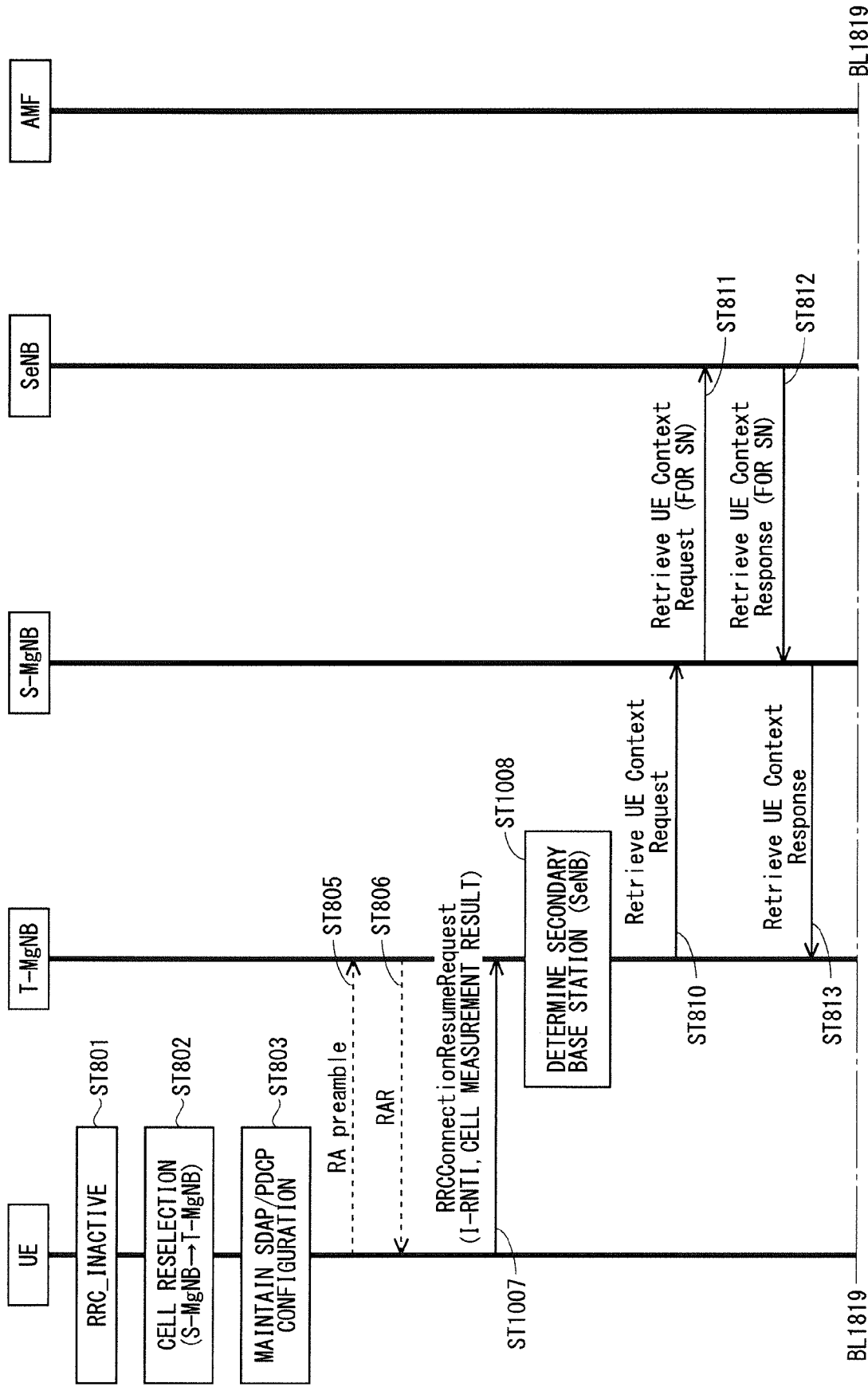
FIG. 18 illustrates that a master base station determines a secondary base station and the UE using the DC structure performs operations of maintaining the secondary base station configuration and transitioning from RRC_INACTIVE to RRC_CONNECTED according to the first embodiment.
Figure 19:
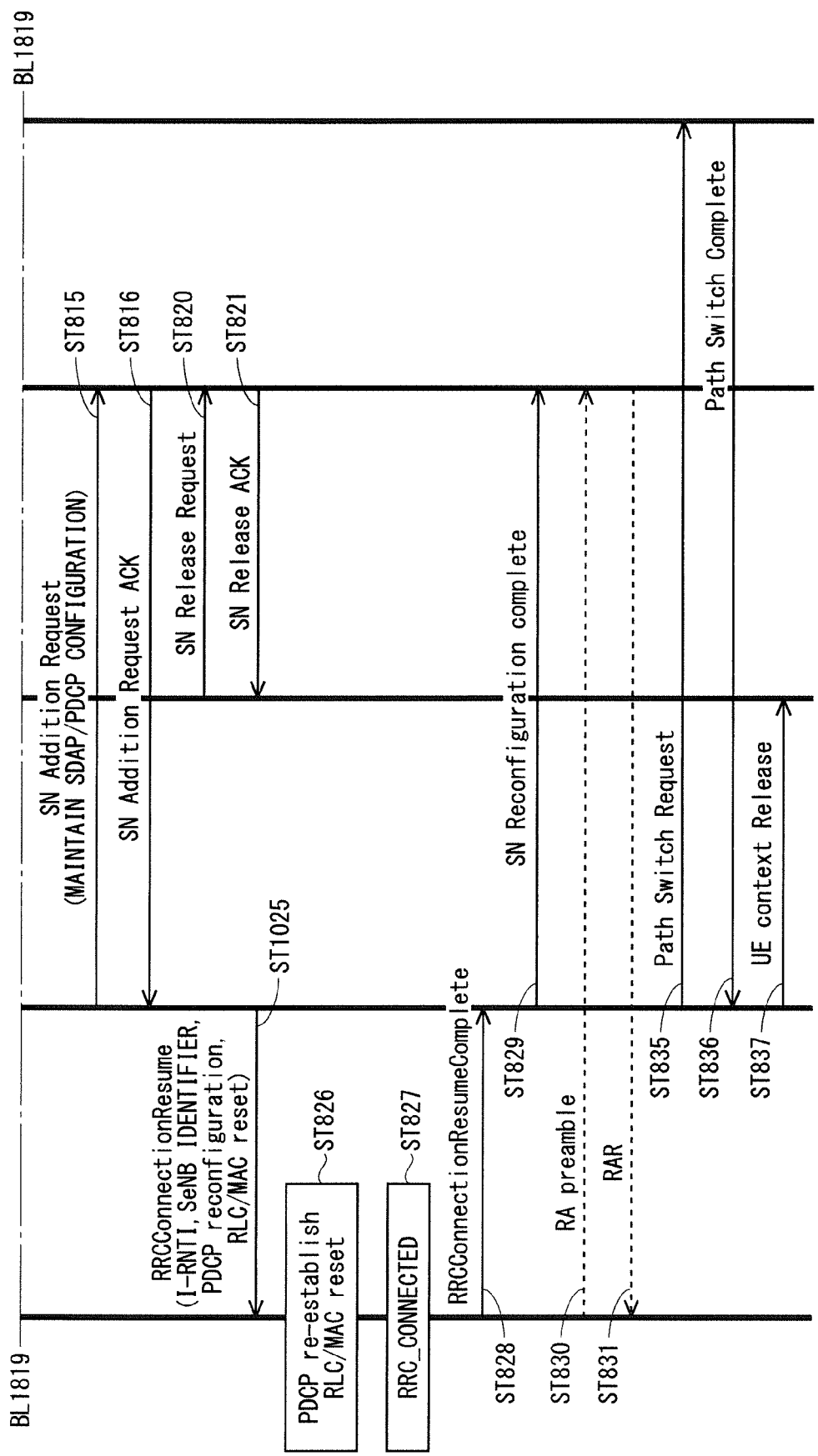
FIG. 19 illustrates that the master base station determines the secondary base station and the UE using the DC structure performs operations of maintaining the secondary base station configuration and transitioning from RRC_INACTIVE to RRC_CONNECTED according to the first embodiment.

FIGS. 18 and 19 are a set of sequence diagrams illustrating that the UE using the DC structure performs operations of maintaining the secondary base station configuration and transitioning to RRC_CONNECTED when being connected to a different master base station in the cell reselection. FIGS. 18 and 19 are connected across a location of a border BL 1819. FIGS. 18 and 19 illustrate that the target master base station determines the secondary base station. S-MgNB denotes a source master base station, T-MgNB denotes a target master base station, and SeNB denotes a secondary base station. FIGS. 18 and 19 illustrate an example where the UE starts transitioning to RRC_CONNECTED. In FIGS. 18 and 19, the same step numbers are applied to the processes identical to those in FIGS. 14 and 15, and the common description thereof is omitted.

Steps ST801 to ST806 in FIG. 18 are identical to those in FIG. 14.

In Step ST1007 of FIG. 18, the UE requests the T-MgNB to resume the RRC connection. The request may include the I-RNTI or a measurement result of the surrounding cells. In Step ST1008, the T-MgNB determines the secondary base station using the measurement result. In the example of FIG. 18, the secondary base station is the same before or after RRC_INACTIVE.

Steps ST810 to ST821 in FIGS. 18 and 19 are identical to those in FIGS. 14 and 15.

In Step ST1025 of FIG. 19, the T-MgNB instructs the UE to resume the RRC connection. The T-MgNB may issue the instruction, for example, via the signaling for the RRC connection resumption (RRCConnectionResume). The signaling may include the identifier of the UE. The identifier may be, for example, the I-RNTI. The signaling may include information on the secondary base station determined by the T-MgNB. The information may be, for example, the identifier of the secondary base station. The UE recognizes, from the information, that the secondary base station after returning to RRC_CONNECTED is the SeNB in FIGS. 18 and 19.

Although the I-RNTI is used as the identifier of the UE in the example of FIGS. 18 and 19, the C-RNTI may be used similarly to the example in FIGS. 14 and 15. The C-RNTI may be used in combination with the PCI. Since, for example, the identifier in RRC_CONNECTED can be used as it is, the base station need not reallocate the identifier. As a result, the amount of processing in the communication system can be reduced.

In the example of FIGS. 18 and 19, Step ST810 to Step ST813 may be performed after ST815 and ST816 similarly to the example in FIGS. 14 and 15. When Steps ST810 to ST813 are performed after Steps ST815 and ST816, the S-MgNB and the SeNB need not perform the operations in Steps ST811 and ST812. The T-MgNB may retrieve the secondary base station configuration through Step ST816. This can, for example, reduce the signaling between the base stations.

In the example of FIGS. 18 and 19, the T-MgNB may be the T-MeNB. The S-MgNB may be the S-MeNB. The SeNB may be the SgNB.

The first embodiment can prevent the variance in the DC structure between the UE and the base station. As a result, unnecessary data transmission and reception between the UE and the secondary base station can be prevented. Moreover, for example, maintaining of the secondary base station configuration enables the UE in RRC_INACTIVE to promptly transition to RRC_CONNECTED.

The First Modification of the First Embodiment

Although the first embodiment describes a case where only the master base station is switched before or after RRC_INACTIVE, the first embodiment may be applied when only the secondary base station is switched before or after RRC_INACTIVE.

The UE may maintain the secondary base station configuration when only the secondary base station is switched before or after RRC_INACTIVE. The master base station may request the source base station to retrieve the configuration. The source secondary base station may notify the master base station of the configuration.

The master base station may notify the target secondary base station of the configuration. For example, the configuration may be included in the signaling for the secondary base station addition request (SN Addition Request) from the master base station to the target secondary base station and notified. The target secondary base station may determine whether to use the configuration. The target secondary base station may notify the master base station of the use of the configuration. For example, the notification may be included in the signaling for the secondary base station addition request acknowledgement (SN Addition Request Acknowledgement) from the target secondary base station to the source base station and given. Consequently, for example, the source secondary base station can notify the target secondary base station of the configuration with less amount of signaling.

As another example, the target secondary base station may determine and use a secondary base station configuration different from the aforementioned configuration. The target secondary base station may notify the master base station of the secondary base station configuration which is different from the aforementioned configuration. For example, the notification may be included in the signaling for the secondary base station addition request acknowledgement (SN Addition Request Acknowledgement) from the target secondary base station to the source base station and given. Consequently, for example, the target secondary base station and the UE can flexibly change the configuration according to a state in the target secondary base station (e.g., a line load state, etc.). As a result, efficient communication is possible in the whole communication system.

Figure 20:
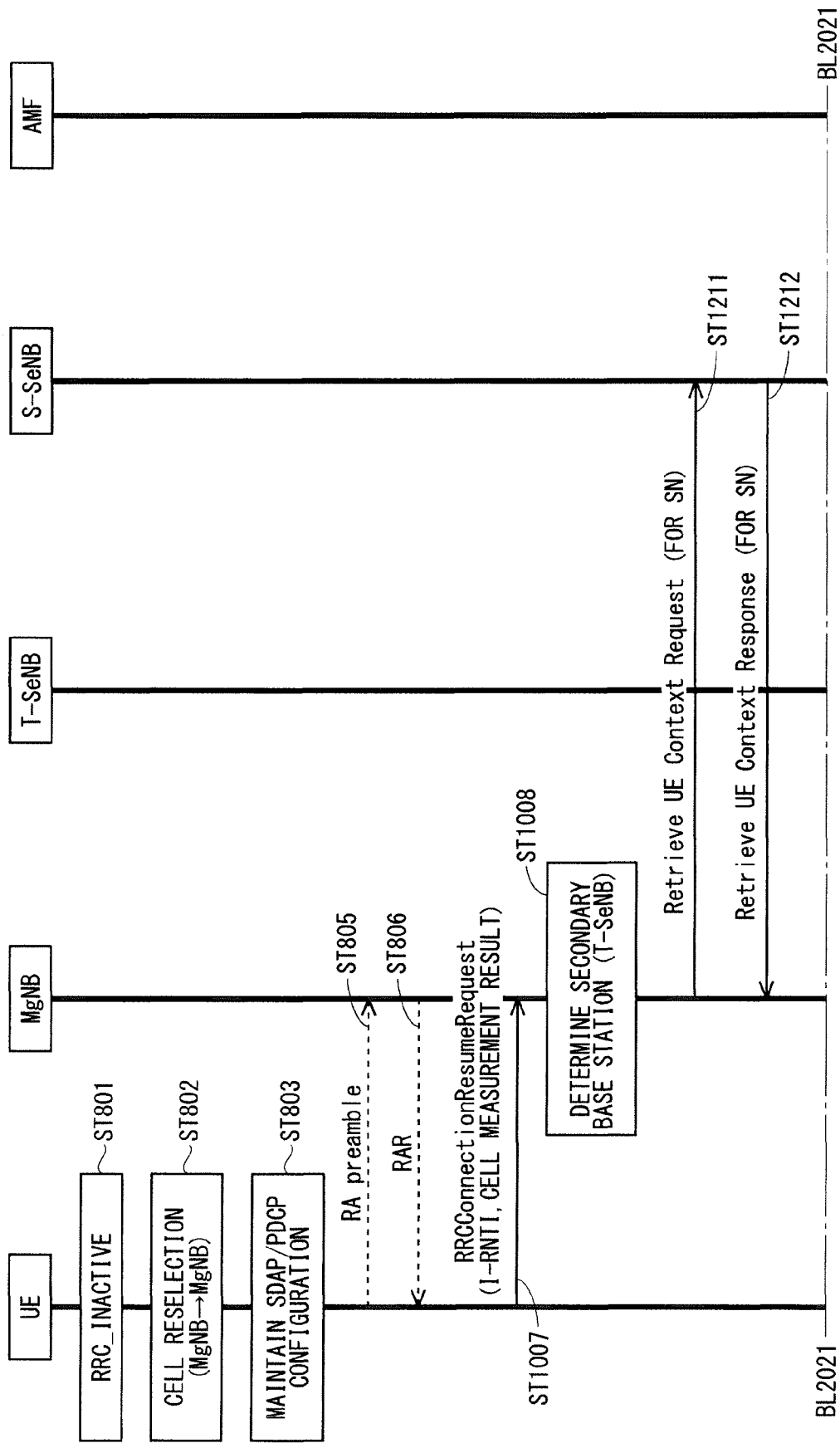
FIG. 20 illustrates that the master base station determines the secondary base station and the UE using the DC structure performs operations of maintaining the secondary base station configuration and transitioning from RRC_INACTIVE to RRC_CONNECTED according to the first modification of the first embodiment.
Figure 21:
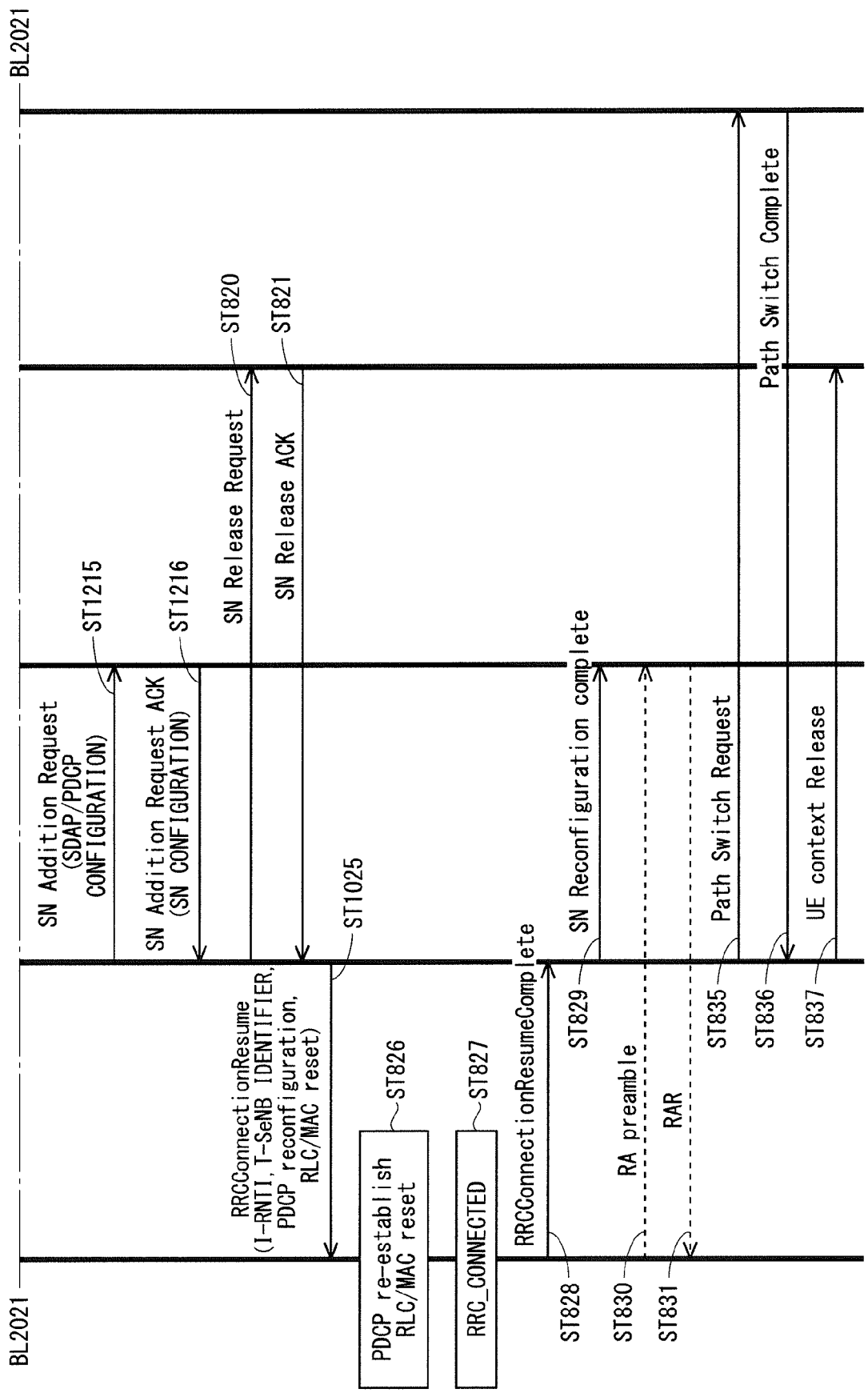
FIG. 21 illustrates that the master base station determines the secondary base station and the UE using the DC structure performs operations of maintaining the secondary base station configuration and transitioning from RRC_INACTIVE to RRC_CONNECTED according to the first modification of the first embodiment.

FIGS. 20 and 21 are a set of sequence diagrams illustrating that the UE using the DC structure performs operations of maintaining the secondary base station configuration and transitioning to RRC_CONNECTED when switching the secondary base station to a different secondary base station before or after RRC_INACTIVE. FIGS. 20 and 21 are connected across a location of a border BL 2021. In FIGS. 20 and 21, MgNB denotes a master base station, S-SeNB denotes a source secondary base station, and T-SeNB denotes a target secondary base station. FIGS. 20 and 21 illustrate an example where the UE starts transitioning to RRC_CONNECTED. FIGS. 20 and 21 also illustrate the example where the secondary base station determines the master base station. In FIGS. 20 and 21, the same numbers are applied to the processes common to those in FIGS. 14, 15, 18, and 19, and the common description thereof is omitted.

Steps ST801 to ST806 in FIG. 20 are identical to those in FIG. 14. Furthermore, Steps ST1007 and ST1008 in FIG. 20 are identical to those in FIG. 18. FIG. 20 illustrates that the MgNB determines the T-SeNB as the secondary base station in ST1008.

In Step ST1211 of FIG. 20, the MgNB requests the S-SeNB to retrieve the secondary base station configuration. The request may be identical to that in Step ST811 of FIG. 14. In Step ST1212, the S-SeNB notifies the MgNB of the secondary base station configuration. The configuration may be, for example, a configuration on the SDAP and/or the PDCP. The signaling may be identical to that in Step ST812 of FIG. 14.

In Step ST1215 of FIG. 21, the MgNB notifies the T-SeNB of the secondary base station addition request (SN Addition Request). The request may include the secondary base station configuration retrieved in Step ST1212. In Step ST1216, the T-SeNB notifies the MgNB of the acknowledgement to the request (secondary base station addition request acknowledgement (SN Addition Request ACK)). The notification may include, for example, the configurations on the RLC, the MAC, and the PHY in the secondary base station configuration.

Steps ST820 and ST821 in FIG. 21 are identical to those in FIG. 15. Furthermore, Step ST1025 in FIG. 21 is identical to that in FIG. 19. The identifier of the secondary base station which is included in Step ST1025 of FIG. 21 may be an identifier of the T-SeNB. Steps ST826 to ST837 are identical to those in FIG. 15.

Although the example of FIGS. 20 and 21 illustrates that the S-SeNB transmits the secondary base station release request acknowledgement to the MgNB in Step ST821, the S-SeNB need not transmit the acknowledgement. The MgNB may automatically recognize the completion of the secondary base station release after transmitting the secondary base station release request to the S-SeNB in Step ST820. This can, for example, reduce the signaling between the base stations.

Although the example of FIGS. 20 and 21 illustrates that Step ST1212 is performed after Step ST1211, the S-SeNB may transmit the secondary base station configuration to the MgNB in advance. For example, the S-SeNB may perform Step ST1212 using the transition of the UE to RRC_INACTIVE. In such a case, for example, the MgNB need not perform Step ST1211. This enables, for example, the MgNB to promptly retrieve the secondary base station configuration.

Although the example of FIGS. 20 and 21 illustrates that the MgNB requests the secondary base station configuration in Step ST1211, the MgNB need not perform ST1211. For example, when the MgNB holds the configuration of the S-SeNB (e.g., the SDAP/PDCP configuration), the MgNB need not perform ST1211. This can, for example, reduce the amount of signaling between the base stations.

The example of FIGS. 20 and 21 illustrates that the secondary base station release request in Step ST820 and the secondary base station release request acknowledgement in Step ST821 are performed after the secondary base station addition request in Step ST1215 and the secondary base station addition request acknowledgement in Step ST1216. However, the secondary base station release request and the secondary base station release request acknowledgement may be performed before the secondary base station addition request and the secondary base station addition request acknowledgement. This can, for example, increase the flexibility in the control over the secondary base station in the MgNB.

Although Step ST1216 of FIG. 21 exemplifies that the SN configuration (e.g., the SDAP/PDCP configuration) has not been changed since before RRC_INACTIVE, the T-SeNB may change the configuration. The T-SeNB may include the changed configuration in the notification of Step ST1216. The MgNB may include the changed configuration in the notification of Step ST1025 for the UE. In Step ST827, the UE may perform the operations of transitioning to RRC_CONNECTED with the changed configuration. This enables, for example, the use of an efficient configuration in a combination of the master base station and the secondary base stations in the communication system. As a result, the communication efficiency in the communication system can be increased.

In the example of FIGS. 20 and 21, the MgNB may be the MeNB. The T-SeNB may be a T-SgNB. The S-SeNB may be an S-SgNB.

Another solution is disclosed. The UE may release the secondary base station configuration when only the secondary base station is switched before or after RRC_INACTIVE. The UE may release the configuration, for example, with the timing disclosed in the first embodiment. Consequently, for example, the UE can use an appropriate configuration according to a state in the target secondary base station (e.g., a radio channel state with the UE and a load state in the base station, etc.). As a result, the transmission and reception rate of the UE in the communication system can be increased.

Figure 22:
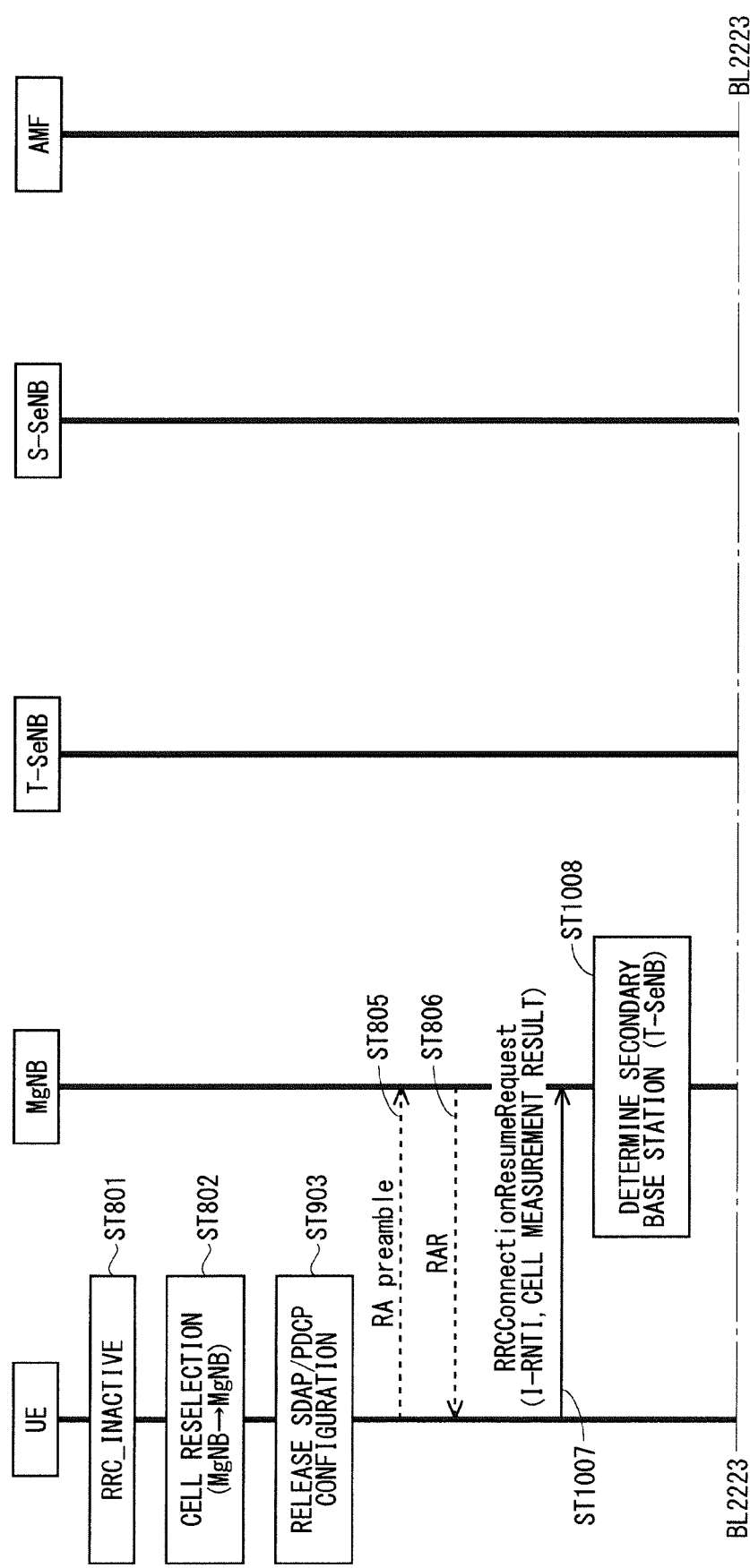
FIG. 22 illustrates that the master base station determines the secondary base station and the UE using the DC structure performs operations of releasing the secondary base station configuration and transitioning from RRC_INACTIVE to RRC_CONNECTED according to the first modification of the first embodiment.
Figure 23:
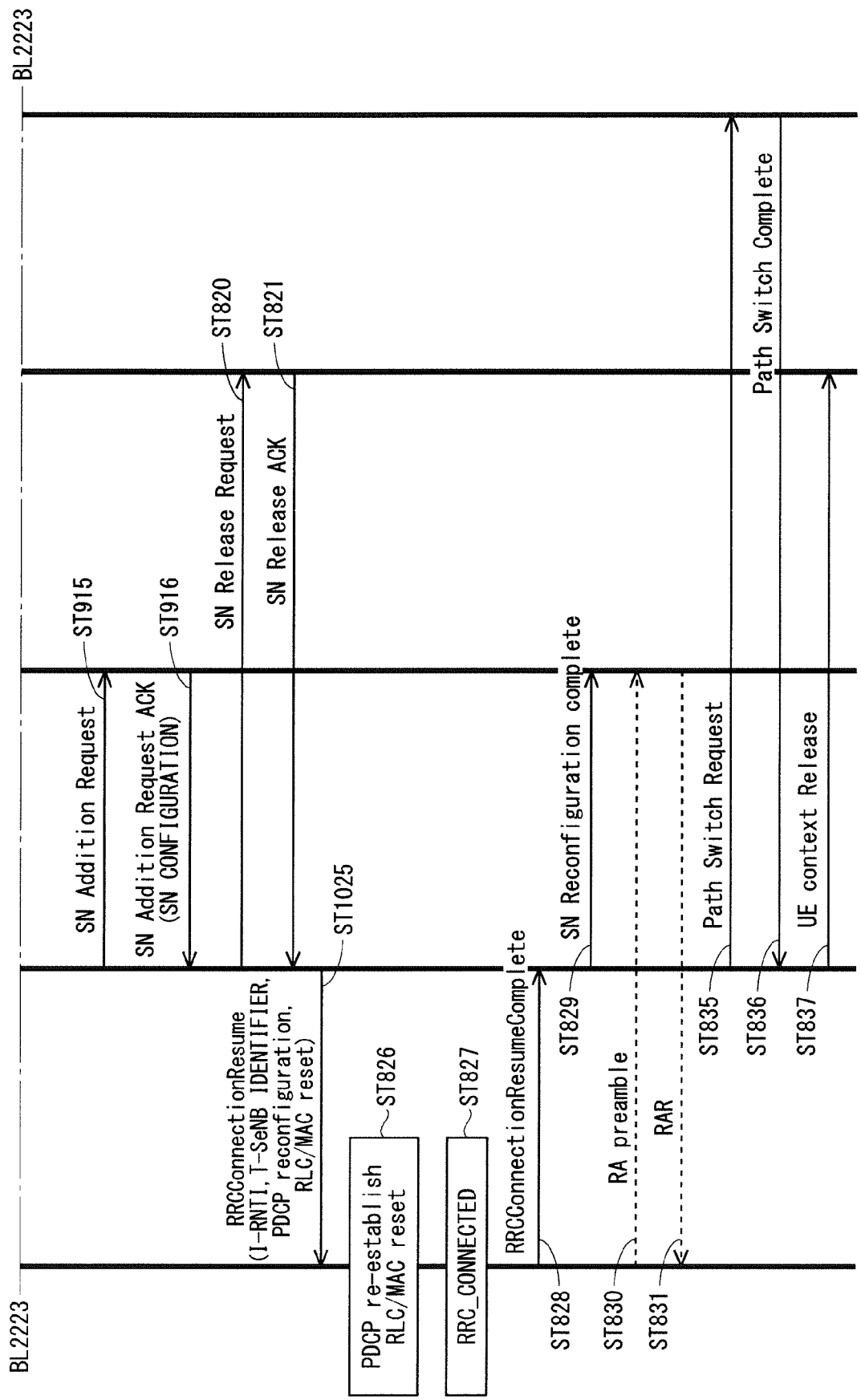
FIG. 23 illustrates that the master base station determines the secondary base station and the UE using the DC structure performs operations of releasing the secondary base station configuration and transitioning from RRC_INACTIVE to RRC_CONNECTED according to the first modification of the first embodiment.

FIGS. 22 and 23 are a set of sequence diagrams illustrating that the UE using the DC structure performs operations of releasing the secondary base station configuration and transitioning to RRC_CONNECTED when switching the secondary base station to a different secondary base station before or after RRC_INACTIVE. FIGS. 22 and 23 are connected across a location of a border BL 2223. In FIGS. 22 and 23, MgNB denotes a master base station, S-SeNB denotes a source secondary base station, and T-SeNB denotes a target secondary base station. FIGS. 22 and 23 illustrate an example where the UE starts transitioning to RRC_CONNECTED. FIGS. 22 and 23 also illustrate that the master base station determines the secondary base station. In FIGS. 22 and 23, the same numbers are applied to the processes common to those in FIGS. 14 to 19, and the common description thereof is omitted.

Steps ST801 and ST802 in FIG. 22 are identical to those in FIG. 14. Step ST903 is identical to that in FIG. 16. Steps ST805 and ST806 are identical to those in FIG. 14. Furthermore, Steps ST1007 and ST1008 in FIG. 22 are identical to those in FIG. 18. FIG. 22 illustrates that the MgNB determines the T-SeNB as the secondary base station in ST1008.

Steps ST915 and ST916 in FIG. 23 are identical to those in FIG. 17.

Steps ST820 and ST821 in FIG. 23 are identical to those in FIG. 15. Furthermore, Step ST1025 in FIG. 23 is identical to that in FIG. 19. The identifier of the secondary base station which is included in Step ST1025 of FIG. 23 may be the identifier of the T-SeNB. Steps ST826 to ST837 are identical to those in FIG. 15.

In the example of FIGS. 22 and 23, the secondary base station release request acknowledgement in Step ST821 need not be transmitted similarly to FIGS. 14, 15, 20, and 21. The MgNB may automatically recognize the completion of the secondary base station release after transmitting the secondary base station release request to the S-SeNB in Step ST820. This can, for example, reduce the signaling between the base stations.

In the example of FIGS. 22 and 23, the secondary base station release request in Step ST820 and the secondary base station release request acknowledgement in Step ST821 may also be performed before the secondary base station addition request in Step ST915 and the secondary base station addition request acknowledgement in ST916 similarly to FIGS. 14, 15, 20, and 21. This can, for example, increase the flexibility in the control over the secondary base station in the MgNB.

In the example of FIGS. 22 and 23, the MgNB may be the MeNB. The T-SeNB may be the T-SgNB. The S-SeNB may be the S-SgNB.

Another solution is disclosed. When only the secondary base station is switched before or after RRC_INACTIVE, the master base station may determine whether the UE maintains or releases the secondary base station configuration and notify it to the UE. The method identical to that in the first embodiment may be applied to the operations of the master base station for making the determination and notifying it to the UE. This produces, for example, the same advantages as those in the first embodiment.

As another example, the master base station may determine whether the UE maintains or releases the secondary base station configuration, using whether the RAN area of the secondary base station is updated or the information on the type of the secondary base station. The type of the secondary base station may be, for example, IoT base station, broadband base station, or another information. The master base station may determine that the UE releases the secondary base station configuration, for example, using the difference in the type of the secondary base station between before and after RRC_INACTIVE. This enables, for example, efficient operations in the communication system according to the type of the secondary base station.

Although the first modification of the first embodiment describes a case where the master base station determines the secondary base station, the UE may determine the secondary base station. For example, Step ST1007 in FIG. 20 and ST1025 in FIG. 21 may be replaced with Step ST807 in FIG. 14 and ST825 in FIG. 15, respectively, and Step ST1008 in FIG. 20 may be eliminated. This may be applied to FIGS. 22 and 23 similarly to FIGS. 20 and 21. Since, for example, the UE need not notify the master base station of the measurement information, the amount of signaling between the UE and the base station can be reduced.

The first modification of the first embodiment produces the same advantages as those in the first embodiment even when the secondary base station is switched before or after RRC_INACTIVE.

The Second Modification of the First Embodiment

Although the first modification of the first embodiment describes a case where only the secondary base station is switched before or after RRC_INACTIVE, the first embodiment may be applied when both of the master base station and the secondary base station are switched before or after RRC_INACTIVE.

The UE may maintain the secondary base station configuration when both of the master base station and the secondary base station are switched before or after RRC_INACTIVE. The target master base station may request the source secondary base station to retrieve the configuration through the source master base station. The source secondary base station may notify the target master base station of the configuration through the source master base station.

The target master base station may notify the target secondary base station of the configuration. For example, the configuration may be included in the signaling for the secondary base station addition request (SN Addition Request) from the target master base station to the target secondary base station and notified. The target secondary base station may determine whether to use the configuration. The target secondary base station may notify the target master base station of the use of the configuration. For example, the notification may be included in the signaling for the secondary base station addition request acknowledgement (SN Addition Request Acknowledgement) from the target secondary base station to the source base station and given. Consequently, for example, the source secondary base station can notify the target secondary base station of the configuration with less amount of signaling.

As another example, the target secondary base station may determine and use a secondary base station configuration different from the aforementioned configuration. The target secondary base station may notify the target master base station of the secondary base station configuration different from the aforementioned configuration. For example, the notification may be included in the signaling for the secondary base station addition request acknowledgement (SN Addition Request Acknowledgement) from the target secondary base station to the source base station and given. Consequently, for example, the target secondary base station and the UE can flexibly change the configuration according to a state in the target secondary base station (e.g., a line load state, etc.). As a result, efficient communication is possible in the whole communication system.

Figure 24:
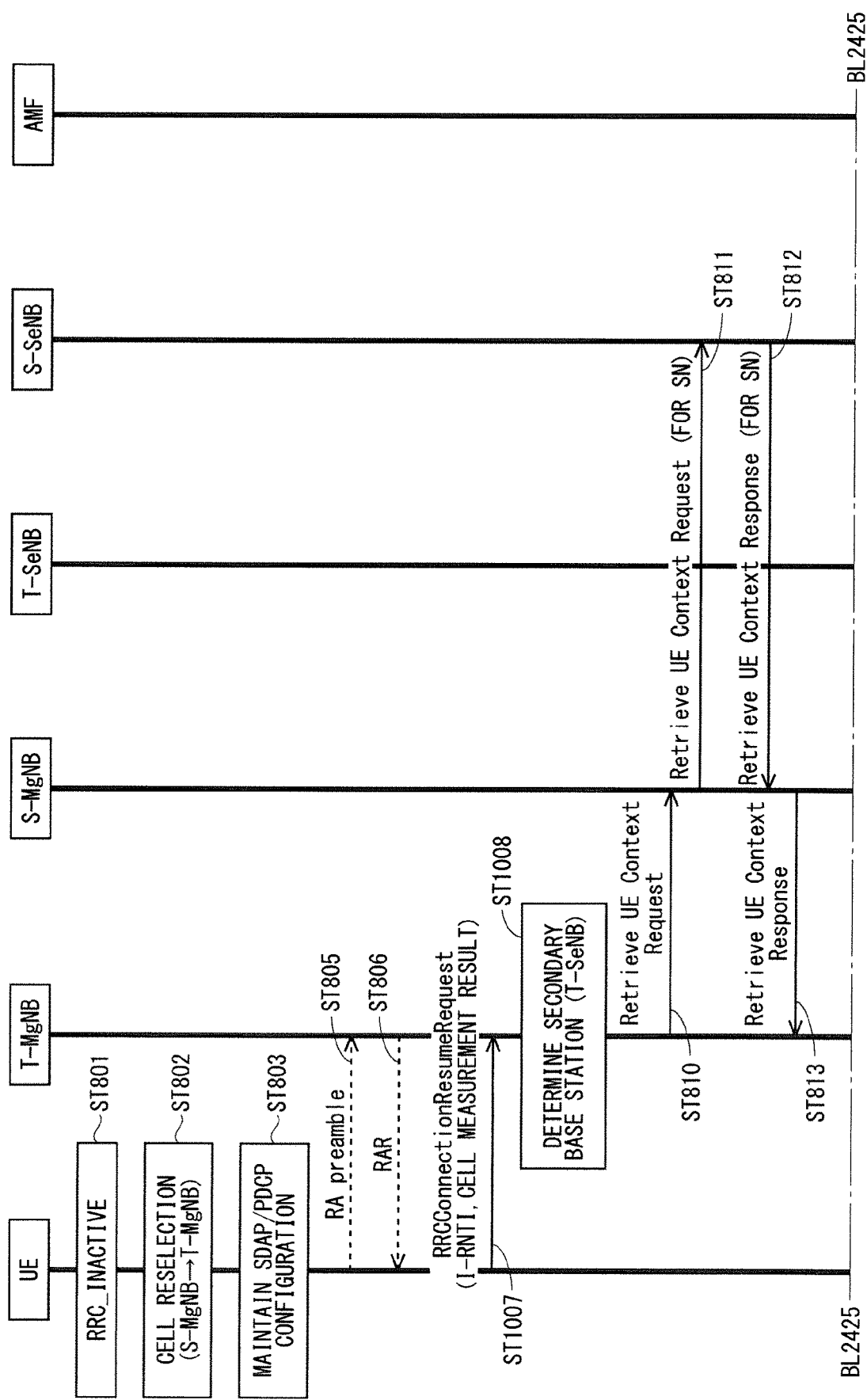
FIG. 24 illustrates that the master base station determines the secondary base station and the UE using the DC structure performs operations of maintaining the secondary base station configuration and transitioning from RRC_INACTIVE to RRC_CONNECTED according to the second modification of the first embodiment.
Figure 25:
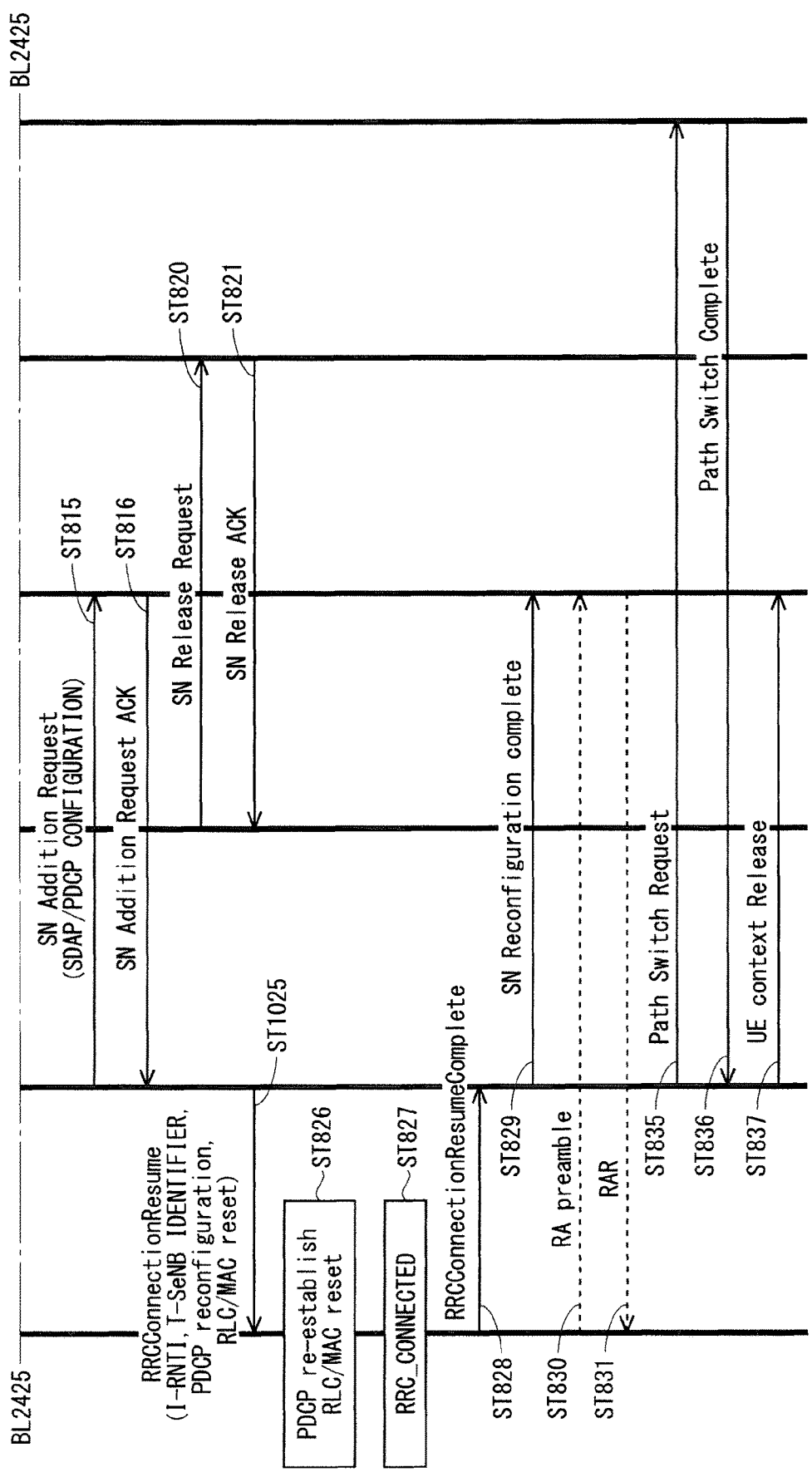
FIG. 25 illustrates that the master base station determines the secondary base station and the UE using the DC structure performs operations of maintaining the secondary base station configuration and transitioning from RRC_INACTIVE to RRC_CONNECTED according to the second modification of the first embodiment.

FIGS. 24 and 25 are a set of sequence diagrams illustrating that the UE using the DC structure performs operations of maintaining the secondary base station configuration and transitioning to RRC_CONNECTED when switching the master base station and the secondary base station to a different master base station and a different secondary base station before or after RRC_INACTIVE. FIGS. 24 and 25 are connected across a location of a border BL 2425. In FIGS. 24 and 25, S-MgNB denotes a source master base station, T-MgNB denotes a target master base station, S-SeNB denotes a source secondary base station, and T-SeNB denotes a target secondary base station. FIGS. 24 and 25 illustrate an example where the UE starts transitioning to RRC_CONNECTED. FIGS. 24 and 25 also illustrate the example where the master base station determines the secondary base station. In FIGS. 24 and 25, the same numbers are applied to the processes common to those in FIGS. 14, 15, 18, and 19, and the common description thereof is omitted.

Steps ST801 to ST806 in FIG. 24 are identical to those in FIG. 14. Steps ST1007 and ST1008 are identical to those in FIG. 18. Steps ST810 to ST821 are identical to those in FIG. 14. Step ST1025 is identical to that in FIG. 18. Steps ST826 to ST837 are identical to those in FIG. 15.

Although the example of FIGS. 24 and 25 illustrates that Step ST812 is performed after Step ST811, the S-SeNB may transmit the secondary base station configuration to the S-MgNB in advance. For example, the S-SeNB may perform Step ST812 using the transition of the UE to RRC_I-NACTIVE. In such a case, for example, the S-MgNB need not perform Step ST811. This enables, for example, the S-MgNB to promptly retrieve the secondary base station configuration.

Although the example of FIGS. 24 and 25 illustrates that the S-MgNB requests the secondary base station configuration in Step ST811, the S-MgNB need not perform ST811. For example, when the S-MgNB holds the configuration of the S-SeNB (e.g., the SDAP/PDCP configuration), the S-MgNB need not perform ST811. This can, for example, reduce the amount of signaling between the base stations.

The example of FIGS. 24 and 25 illustrates that the secondary base station release request in Step ST820 and the secondary base station release request acknowledgement in Step ST821 are performed after the secondary base station addition request in Step ST815 and the secondary base station addition request acknowledgement in Step ST816. However, the secondary base station release request and the secondary base station release request acknowledgement may be performed before the secondary base station addition request and the secondary base station addition request acknowledgement. This can, for example, increase the flexibility in the control over the secondary base stations in the T-MgNB and S-MgNB.

Although Step ST816 of FIG. 25 exemplifies that the SN configuration (e.g., the SDAP/PDCP configuration) has not been changed since before RRC_INACTIVE, the T-SeNB may change the configuration. The T-SeNB may include the changed configuration in the notification of Step ST816. The T-MgNB may include the changed configuration in the notification of Step ST1025 for the UE. In Step ST827, the UE may perform the operations of transitioning to RRC_CONNECTED with the changed configuration. This enables, for example, the use of an efficient configuration in a combination of the master base stations and the secondary base stations in the communication system. As a result, the communication efficiency in the communication system can be increased.

In the example of FIGS. 24 and 25, the S-MgNB may be the S-MeNB. The T-MgNB may be the T-MeNB. The T-SeNB may be the T-SgNB. The S-SeNB may be the S-SgNB.

Another solution is disclosed. The UE may release the secondary base station configuration when both of the master base station and the secondary base station are switched before or after RRC_INACTIVE. The UE may release the configuration, for example, with the timing disclosed in the first embodiment. Consequently, for example, the UE can use an appropriate configuration according to a state in the target secondary base station (e.g., a radio channel state with the UE and a load state in the base station, etc.). As a result, the transmission and reception rate of the UE in the communication system can be increased.

Figure 26:
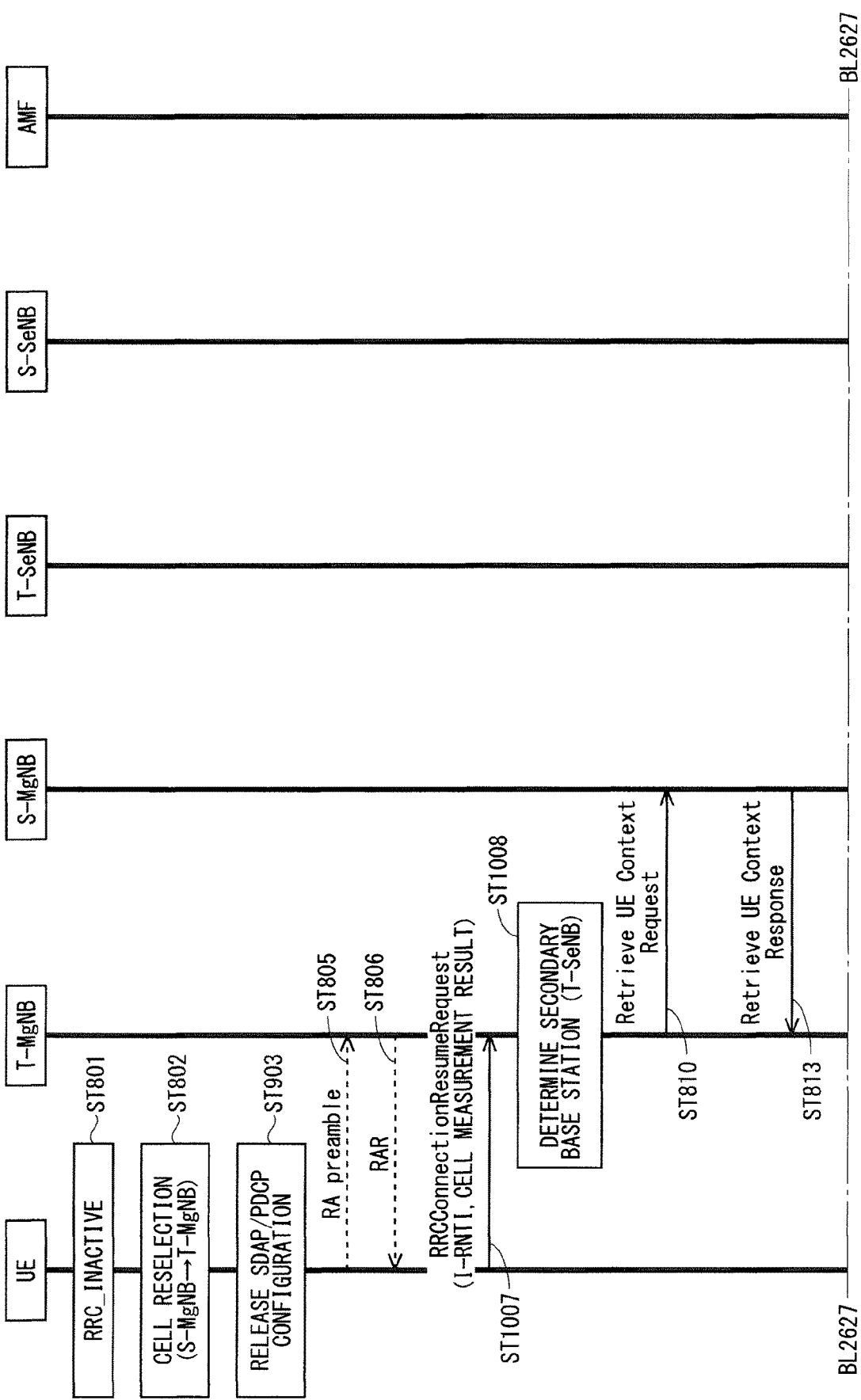
FIG. 26 illustrates that the master base station determines the secondary base station and the UE using the DC structure performs operations of releasing the secondary base station configuration and transitioning from RRC_INACTIVE to RRC_CONNECTED according to the second modification of the first embodiment.

FIGS. 26 and 27 are a set of sequence diagrams illustrating that the UE using the DC structure performs operations of releasing the secondary base station configuration and transitioning to RRC_CONNECTED when switching the master base station and the secondary base station to a different master base station and a different secondary base station before or after RRC_INACTIVE. FIGS. 26 and 27 are connected across a location of a border BL 2627. In FIGS. 26 and 27, S-MgNB denotes a source master base station, T-MgNB denotes a target master base station, S-SeNB denotes a source secondary base station, and T-SeNB denotes a target secondary base station. FIGS. 26 and 27 illustrate an example where the UE starts transitioning to RRC_CONNECTED. FIGS. 26 and 27 also illustrate that the target master base station determines the secondary base station. In FIGS. 26 and 27, the same numbers are applied to the processes common to those in FIGS. 14 to 19, and the common description thereof is omitted.

Steps ST801 and ST802 in FIG. 26 are identical to those in FIG. 14. Step ST903 is identical to that in FIG. 16. Steps ST805 and ST806 are identical to those in FIG. 14. Furthermore, Steps ST1007 and ST1008 in FIG. 26 are identical to those in FIG. 18. FIG. 26 illustrates that the T-MgNB determines the T-SeNB as the secondary base station in ST1008.

Steps ST915 and ST916 in FIG. 27 are identical to Steps ST815 and ST816 in FIG. 15.

Steps ST820 and ST821 in FIG. 27 are identical to those in FIG. 15. Furthermore, Step ST1025 in FIG. 27 is identical to that in FIG. 19. The identifier of the secondary base station which is included in Step ST1025 of FIG. 27 may be the identifier of the T-SeNB. Steps ST826 to ST837 are identical to those in FIG. 15.

In the example of FIGS. 26 and 27, the secondary base station release request acknowledgement in Step ST821 need not be transmitted similarly to FIGS. 14, 15, 20, and 21. The S-MgNB may automatically recognize the completion of the secondary base station release after transmitting the secondary base station release request to the S-SeNB in Step ST820. This can, for example, reduce the signaling between the base stations.

In the example of FIGS. 26 and 27, the secondary base station release request in Step ST820 and the secondary base station release request acknowledgement in Step ST821 may also be performed before the secondary base station addition request in Step ST915 and the secondary base station addition request acknowledgement in ST916 similarly to FIGS. 14, 15, 20, and 21. This can, for example, increase the flexibility in the control over the SeNBs in the T-MgNB and the S-MgNB.

In the example of FIGS. 26 and 27, the S-MgNB may be the S-MeNB. The T-MgNB may be the T-MeNB. The T-SeNB may be the T-SgNB. The S-SeNB may be the S-SgNB.

Another solution is disclosed. The master base station may determine whether the UE maintains or releases the secondary base station configuration, and notify it to the UE when both of the master base station and the secondary base station are switched before or after RRC_INACTIVE. The master base station may be a source master base station or a target master base station. The method identical to that in the first embodiment may be applied to the operations of the master base station for determining whether the UE maintains or releases the secondary base station configuration and notifying it to the UE. This produces, for example, the same advantages as those in the first embodiment.

Although the second modification of the first embodiment describes a case where the target master base station determines the secondary base station, the UE may determine the secondary base station. Since, for example, the UE need not notify the target master base station of the measurement information, the amount of signaling between the UE and the target master base station can be reduced.

The second modification of the first embodiment produces the same advantages as those in the first embodiment even when the master base station and the secondary base station are switched before or after RRC_INACTIVE.

The Second Embodiment

In the DC between an LTE base station and an NR base station, the LTE base station determines a measurement gap configuration in an FR1 frequency band for LTE and NR. The NR base station determines a measurement gap configuration in an FR2 frequency band for NR (see Non-Patent Document 22).

The NR base station may notify the LTE base station of candidates for a measurement gap that are configurable by its own base station. The LTE base station may determine the measurement gap configuration in the FR1 frequency band for LTE and NR, using the notification. The LTE base station may notify the NR base station of the measurement gap configuration in the FR1 frequency band for LTE and NR. The NR base station may perform scheduling in the FR1 frequency band for the UE, using the configuration.

The NR base station may notify the LTE base station of the measurement gap configuration in the FR2 frequency band for NR. The LTE base station may perform LTE scheduling for the UE using the configuration, for example, configuration of the transmission power.

In the previous description, the master base station may be the LTE base station or the NR base station.

When the aforementioned method is applied to the NR-DC, that is, a case where the master base station and the secondary base station are the NR base stations, the following problem occurs. Specifically, since no LTE base station exists in the NR-DC, an FR1 measurement gap cannot be configured. As a result, communication using FR1 is impossible in the NR-DC, which causes a problem in decrease in a coverage in the base stations.

Furthermore, none discloses which base station configures the FR1 measurement gap and the FR2 measurement gap in the NR-DC. Thus, for example, the MgNB and the SgNB configure the respective measurement gaps in the same frequency range (e.g., FR1 and FR2), which leads to excessive configuration of the measurement gaps in the UE. As a result, a problem of worsening the communication rate in the UE occurs.

A method for solving such problems is disclosed. A measurement gap is configured for a frequency range to be used by its own base station. For example, the base station using FR1 may configure the FR1 measurement gap. The base station using FR2 may configure the FR2 measurement gap. The configuring operations may be applied, for example, when the frequency ranges to be used by the MgNB and the SgNB differ. Consequently, for example, adjustment between the base stations in configuring the measurement gap is unnecessary. As a result, the measurement gap can be promptly configured.

Another solution is disclosed. The frequency range for the measurement gap to be configured by each base station may be statically determined. For example, the MgNB may configure FR1 and FR2. The SgNB may notify the MgNB of candidates for the configured measurement gap that can be supported by its own base station. The MgNB may notify the SgNB of the configured measurement gap. This can, for example, avoid the design complexity on configuring the measurement gap in the communication system.

As another example of statically determining the frequency range for the measurement gap to be configured by each base station, the MgNB may configure the FR1 measurement gap, and the SgNB may configure the FR2 measurement gap. The SgNB may notify the MgNB of candidates for the configured FR1 measurement gap that can be supported by its own base station. The MgNB may notify the SgNB of the configured FR1 measurement gap. Similarly, the MgNB may notify the SgNB of candidates for the configured FR2 measurement gap that can be supported by its own base station. The SgNB may notify the MgNB of the configured FR2 measurement gap. This can, for example, reduce the amount of processing when the MgNB configures the measurement gap.

As another example, the MgNB may configure the FR2 measurement gap, and the SgNB may configure the FR1 measurement gap. The SgNB may notify the MgNB of candidates for the configured FR2 measurement gap that can be supported by its own base station. The MgNB may notify the SgNB of the configured FR2 measurement gap. Similarly, the MgNB may notify the SgNB of candidates for the configured FR1 measurement gap that can be supported by its own base station. The SgNB may notify the MgNB of the configured FR1 measurement gap. This produces, for example, the same advantages as previously described.

As another example, the measurement gap may be determined using information on the type of a base station. The information may be, for example, information indicating that the base station is for IoT terminals or for broadband. Furthermore, the information may be, for example, information indicating that the base station is a macro base station or a small cell base station. For example, the base station for IoT terminals may configure the FR1 measurement gap, or the base station for broadband may configure the FR2 measurement gap. As another example, the macro base station may configure the FR1 measurement gap, or the small cell base station may configure the FR2 measurement gap. This enables the configuration of an appropriate measurement gap according to a use case of the communication to be performed between the base station and the UE.

The SgNB may notify the MgNB of information on the type of its own base station. The MgNB may notify the SgNB of information on the type of its own base station. Each of the MgNB and the SgNB may recognize the type of the other base station, using information received from the base station. This can, for example, prevent an overlap and/or omission in the configuration between the base stations.

As another example, the measurement gap may be determined using information on the type of the UE. The information may be, for example, information indicating that the UE is an IoT terminal or a broadband terminal, or another information. For example, the MgNB may configure the FR1 measurement gap for the IoT terminal. As another example, the SgNB may configure the FR2 measurement gap for the broadband terminal. This enables, for example, the configuration of an appropriate measurement gap according to a use case of the communication to be performed between the base station and the UE. The information may be included in, for example, the UE capability or another signaling. The UE may notify the MgNB of the information. The MgNB may notify the SgNB of the information. Each of the MgNB and the SgNB may determine which one of the FR1 measurement gap and the FR2 measurement gap its own gNB configures, using the information.

Another solution is disclosed. The frequency range for the measurement gap to be configured by each base station may be semi-statically determined. For example, among the base stations that communicate with the UE using the FR1 frequency band, a base station using a small subcarrier spacing, that is, a long symbol length may configure a measurement gap in the FR1 frequency band. Furthermore, among the base stations that communicate with the UE using the FR2 frequency band, a base station using a small subcarrier spacing, that is, a long symbol length may configure a measurement gap in the FR2 frequency band. The SgNB may notify the MgNB of information on the subcarrier spacing to be used in the communication between the SgNB and the UE. The notification may be included in, for example, the RRC configuration to be notified from the SgNB to the UE through the MgNB. The MgNB may notify the SgNB of information on the subcarrier spacing to be used in the communication between the MgNB and the UE. For example, a method for the MgNB to transfer, to the SgNB, the RRC configuration notified from the MgNB to the UE may be used as the notification method.

Another solution is disclosed. The entity of the measurement gap configuration before the occurrence of mobility may be inherited. For example, when the DC in which the master base station is the eNB and the secondary base station is the gNB is switched to the NR-DC due to the handover in the master base station, the MgNB may configure the FR1 measurement gap, and the SgNB may configure the FR2 measurement gap. As another example, when the DC in which the master base station is the gNB and the secondary base station is the eNB is switched to the NR-DC due to the switching of the secondary base station, the MgNB may configure the FR2 measurement gap, and the SgNB may configure the FR1 measurement gap. As another example, upon occurrence of the mobility from the NR-DC to the NR-DC using the other base stations, the target MgNB may configure a measurement gap in a frequency range configured by the source MgNB, and the target SgNB may configure a measurement gap in a frequency range configured by the source SgNB. This can, for example, reduce change in the configuration after the occurrence of the mobility. As a result, the amount of processing in the communication system can be reduced. The handover may be the cell reselection.

Another solution is disclosed. The MgNB may determine which one of the base stations, the MgNB or the SgNB configures which one of the FR1 and FR2 frequency ranges. The MgNB may notify the SgNB of information on the frequency range for the measurement gap to be configured by the SgNB. The notification may be included in, for example, the signaling to be notified from the MgNB to the SgNB (e.g., an SgNB addition request, an SgNB modification request, etc.). Through the notification, the MgNB may notify candidates for the configured measurement gap that can be supported by the MgNB, in the frequency range for the measurement gap to be configured by the SgNB. The SgNB may notify the MgNB of candidates for the configured measurement gap that can be supported by the SgNB, in the frequency range for the measurement gap to be configured by the MgNB. The notification may be included in, for example, the signaling to be notified from the SgNB to the MgNB (e.g., an SgNB addition request acknowledgement, an SgNB modification request acknowledgement, etc.). This enables, for example, flexible configuration of the measurement gap according to a communication state between the UE, the MgNB, and the SgNB.

As another example, the SgNB may determine which one of the base stations, the MgNB or the SgNB configures which one of the FR1 and FR2 frequency ranges. The SgNB may notify the MgNB of information on the frequency range for the measurement gap to be configured by the MgNB. This can, for example, reduce the amount of processing in the MgNB.

The solutions in the second embodiment may be combined for use. For example, the MgNB may determine a base station that determines a measurement gap in each of the FR1 and FR2 frequency ranges, using the information on the subcarrier spacing to be used by both of the base stations. The MgNB may retrieve information on the subcarrier spacing of the SgNB, via the RRC signaling to be notified from the SgNB to the UE through the MgNB. This enables, for example, flexible configuration of the measurement gap in the communication system.

Since the second embodiment enables independent configuration of both of the FR1 and FR2 frequency ranges also in the NR-DC, decrease in the communication rate between the UE, the MgNB, and the SgNB can be prevented.

The Third Embodiment

In the uplink transmission using a configured grant (see 10.3 of Non-Patent Document 16), the uplink at low frequencies which is provided for complementing a difference in UL coverage in NR, that is, a carrier of the Supplementary UpLink (SUL, see 5.16 of Non-Patent Document 17) or a carrier of a non-SUL may be used. The base station may include, in the signaling for notifying the configured grant to the UE, information indicating which one of the SUL and the non-SUL is used to notify the UE of the information. The base station may give the notification via the RRC signaling. The notification may be used in a Type-1 configured grant. The UE may perform the uplink transmission using the configured grant via the carrier instructed by the information included in the signaling.

The UE may perform the uplink transmission using a dynamic grant via a carrier different from that in the uplink transmission using the configured grant. The base station may include an instruction for switching between the SUL and the non-SUL in the dynamic grant to notify the UE of the instruction.

The aforementioned case creates the following problem. Specifically, none discloses a method for switching to the Type-1 configured grant across the SUL and the non-SUL. This consequently creates a variance in the carrier to be used for the UL transmission between the UE and the base station. As a result, the base station has a problem of failing to receive the UL signal transmitted by the UE.

FIG. 28 illustrates the problem. The base station configures, for the UE, transmission of uplink signals 3005, 3006, and 3007 as the Type-1 configured grant in a configured grant 3000 in FIG. 28. In the example of FIG. 28, suppose that the SUL is configured as a carrier for transmitting the uplink signals 3005, 3006, and 3007. The UE transmits the uplink signals 3005 and 3006 via the carrier of the SUL according to the configured grant 3000.

In FIG. 28, the base station transmits a dynamic grant 3010 to the UE. The dynamic grant 3010 includes information for instructing transmission of uplink signal 3015 via the non-SUL. The UE switches the uplink transmission carrier to the non-SUL using the dynamic grant 3010. Furthermore, the UE transmits the uplink signal 3015 via the non-SUL using the dynamic grant 3010.

With the timing of transmitting the uplink signal 3007 in FIG. 28, the carrier for uplink transmission of the UE is the non-SUL. This creates a variance with the SUL that is the transmission carrier configured using the configured grant 3000. As a result, the base station cannot receive the UL signal transmitted by the UE.

A method for solving the problem is disclosed.

The base station transmits, to the UE, an instruction for switching between the SUL and the non-SUL for uplink transmission. The base station may transmit the instruction, for example, after transmitting the dynamic grant. The UE receives the instruction before the uplink transmission using the configured grant. The UE switches between the SUL and the non-SUL with the instruction.

The DCI from the base station to the UE may include the instruction for switching between the SUL and the non-SUL. The DCI may include only the instruction for switching between the SUL and the non-SUL. This can, for example, reduce the amount of signaling from the base station to the UE. As another example, the DCI may include information on the scheduling for the uplink transmission, for example, information on the frequency and/or time resources. The information on the scheduling may be identical to or different from information included in the configured grant. The information included in the DCI may overwrite the information included in the configured grant. This enables, for example, flexible scheduling according to a radio channel state between the base station and the UE.

The UE need not switch between the SUL and the non-SUL in the absence of receipt of the instruction. The UE need not perform the uplink transmission using the configured grant. For example, when the carriers differ between the uplink transmission using the dynamic grant and the uplink transmission using the configured grant, the UE need not perform the uplink transmission using the configured grant. This can, for example, prevent the UE from performing unnecessary uplink transmission. As a result, the power consumption in the UE can be reduced, and flexible scheduling in the base station is possible. As another example, when the same carrier is used in the uplink transmission using the dynamic grant and the uplink transmission using the configured grant, the UE may perform the uplink transmission using the configured grant. This can, for example, reduce the signaling between the base station and the UE.

FIG. 29 illustrates operations of switching between the SUL and the non-SUL using the instruction for switching between the SUL and the non-SUL, before the uplink transmission using the configured grant. In FIG. 29, the same numbers are applied to the elements identical to those in FIG. 28, and the common description thereof is omitted.

The base station instructs the UE to switch to the SUL using a downlink signal 3120 in FIG. 29. The UE switches the uplink transmission carrier to the SUL using the downlink signal 3120. The UE transmits an uplink signal 3125 via the SUL using the configured grant 3000.

Another solution is disclosed. The base station does not transmit, to the UE, the instruction for switching between the SUL and the non-SUL for uplink transmission using the configured grant. The UE switches between the SUL and the non-SUL without receiving the instruction before the uplink transmission using the configured grant. This can, for example, reduce the amount of signaling between the base station and the UE.

FIG. 30 illustrates operations of switching between the SUL and the non-SUL without using the instruction for switching between the SUL and the non-SUL, before the uplink transmission using the configured grant. In FIG. 30, the same numbers are applied to the elements identical to those in FIG. 28, and the common description thereof is omitted.

The UE performs a transmission carrier switching operation 3220 using the configured grant 3000, after transmitting the uplink signal 3015. With this operation, the uplink transmission carrier of the UE is switched from the non-SUL to the SUL. The UE transmits an uplink signal 3225 via the SUL using the configured grant 3000.

Another solution is disclosed. The base station and the UE may discard the configured grant after the dynamic grant. The base station may reestablish the configured grant via the uplink carrier to be used in the dynamic grant. This enables, for example, the uplink transmission using the configured grant via the uplink carrier with a superior channel state. As a result, the reliability in the uplink transmission using the configured grant can be enhanced.

For example, the base station and the UE may discard the configured grant after transmitting and receiving the dynamic grant 3010 in FIG. 28. The UE need not perform the uplink signals 3006 and 3007.

The base station may switch between the methods disclosed in the third embodiment and use it. The base station may notify the UE of information indicating which one of the methods disclosed in the third embodiment is used. The base station may give the notification via the RRC signaling, the MAC signaling, the L1/L2 signaling, or a combination of these. Consequently, for example, the base station can simultaneously communicate with the UEs supporting different use cases. As a result, the number of UEs to be accommodated in the base station can be increased.

Although the third embodiment describes a case where the number of the SULs configured in the UE is one, a plurality of SULs may be configured. The plurality of SULs may be, for example, SULs configured at different frequencies. This may apply to the following embodiments and/or modifications.

The third embodiment can prevent a variance in the carrier to be used for the UL transmission between the UE and the base station. This can consequently prevent the UE from performing unnecessary uplink transmission.

The First Modification of the Third Embodiment

A Type-2 configured grant (see 10.3 of Non-Patent Document 16) may be used for enabling dynamic switching of a transmission carrier in the uplink transmission using the configured grant. The base station may include an instruction for switching between the SUL and the non-SUL in the DCI in the Type-2 configured grant to notify the UE of the instruction. The UE may switch the uplink carrier in the configured grant between the SUL and the non-SUL using the DCI.

The aforementioned case creates the following problem. Specifically, since the Type-2 configured grant includes information on the uplink transmission resources unlike the Type-1 configured grant, the signaling size of the PDCCH increases. This causes problems including increase in the overhead owing to the PDCCH and/or decrease in the reliability due to decrease in the coding rate of the PDCCH.

A method for solving the problems is disclosed.

A configured grant of a new type is provided (such a grant may be referred to as a Type-3 configured grant). The Type-3 configured grant enables configuration of the uplink transmission resources for both of the SUL and the non-SUL. The base station transmits, to the UE, information on the uplink transmission resources to be configured as the configured grant. The base station may transmit the information, for example, semi-statically. The base station may perform the semi-static transmission, for example, via the RRC signaling. In the transmission of the information, information on the uplink transmission resource via the SUL and information on the uplink transmission resource via the non-SUL may be included in the same signaling or in different signalings. The information on the uplink transmission resources may be identical to information to be notified from the base station to the UE via the RRC signaling in the Type-1 configured grant.

The base station may include information for instructing activation/deactivation of the configured grant, in the DCI in the Type-3 configured grant. The DCI may include only the information or another information. Information on the activation/deactivation of the configured grant via the SUL and information on the activation/deactivation of the configured grant via the non-SUL may be included in the same DCI or in different pieces of the DCI. The UE may switch, using the instruction, between the uplink transmission carriers using the configured grant. Consequently, for example, the UE can flexibly change the uplink transmission carrier in the Type-3 configured grant.

The information for instructing activation/deactivation of the configured grant may be information for simultaneously switching between the activation/deactivation of the configured grant via the SUL and the activation/deactivation of the configured grant via the non-SUL. For example, the UE may activate both of the configured grant via the SUL and the configured grant via the non-SUL, using the information indicating activation. The UE may use the UL carrier used before transmitting the configured grant as it is. For example, the UE may use the SUL instructed using the immediately previous dynamic grant, in transmission of the configured grant immediately after the SUL has been configured using the dynamic grant. This can, for example, reduce the amount of signaling between the base station and the UE.

As another example, the base station may include the instruction for switching between the SUL and the non-SUL, in the DCI in the Type-3 configured grant. The DCI may include only the switching instruction or another information. The UE may switch between the uplink transmission carriers using the instruction. This can, for example, reduce the amount of signaling between the base station and the UE.

Another solution is disclosed. The configurations of the Type-1 configured grant and the Type-2 configured grant may be allowed for the UE. For example, the SUL scheduling may be configured using the Type-1 configured grant, and the non-SUL scheduling may be configured using the Type-2 configured grant. Both of the SUL scheduling and the non-SUL scheduling may be configured using the Type-2 configured grant. As to which one of the Type-1 configured grant and the Type-2 configured grant is used, for example, the activation/deactivation of the Type-2 configured grant may be used or a new identifier may be provided. Since there is no need to provide, for example, a new-type configured grant, the design complexity in the communication system can be avoided.

The configurations of the Type-1 configured grant and the Type-2 configured grant need not be allowed for the UE in the first modification of the third embodiment. This can, for example, reduce the amount of processing in the base station and the UE.

The first modification of the third embodiment enables flexible switching between the SUL and the non-SUL using the configured grant. Furthermore, the amount of signaling between the base station and the UE, particularly, the amount of signaling using the PDCCH can be reduced. Furthermore, the first modification can prompt switching between the SUL and the non-SUL using the configured grant.

The Second Modification of the Third Embodiment

The uplink transmission using the dynamic grant via the SUL may be scheduled with the time resources with which the uplink transmission using the configured grant via the non-SUL is scheduled. The dynamic grant may be prioritized over the configured grant. In other words, the UE may perform the uplink transmission via the SUL. For example, when the UE moves from the center of a cell to the cell edge, data to be transmitted according to the scheduling using the configured grant may be switched to the scheduling using the dynamic grant, and the data may be transmitted according to the scheduling using the dynamic grant. This can, for example, maintain the reliability in the communication requiring the low latency. The SUL and the non-SUL may be reversed. The dynamic grant differs from the preemption to be described in the fourth embodiment in that the dynamic grant does not generate a plurality of uplink transmission data.

The application of such a method creates the following problem. Specifically, the UE needs to switch between the uplink carriers of the SUL and the non-SUL to prioritize the dynamic grant. Switching between the uplink carriers requires predetermined time. However, the base station does not know the time required for switching between the uplink carriers in the UE. Moreover, none discloses with which timing the uplink carrier is switched. This creates, for example, a time lag between the timing with which the UE actually transmits the uplink signal using the dynamic grant via the SUL and the timing with which the base station receives the uplink signal via the SUL. This results in a problem of decrease in the reliability and the communication rate of the uplink signal using the dynamic grant.

A method for solving the problem is disclosed. The UE notifies information on the switching time between the uplink carriers. As another method, the time may be predefined, for example, in a standard. The method disclosed in the fourth embodiment may be applied to the notification and/or the standard.

The UE stops the uplink transmission before switching between the uplink carriers, more than the switching time before the timing to start the scheduling using the dynamic grant. As another example, the UE may start the uplink transmission after switching between the uplink carriers, more than the switching time after the timing to start the scheduling using the dynamic grant. The switching time may extend before and after the timing to start the scheduling using the dynamic grant.

The UE may stop the uplink transmission via the signaling from the base station to the UE (e.g., the DCI). For example, the dynamic grant may include information on the stop of the uplink transmission.

As another example, the stop of the uplink transmission may be predefined as a standard on the operation of the UE. The UE may autonomously stop the uplink transmission during the switching time without the signaling from the base station. This can, for example, reduce the amount of signaling from the base station to the UE.

The operation of stopping the uplink transmission may be applied to the timing to end the scheduling using the dynamic grant. For example, the UE may stop the uplink transmission for more than the switching time from the timing to end the scheduling using the dynamic grant.

The transmission according to the scheduling using the configured grant over which the dynamic grant is prioritized may be stopped, in the second modification of the third embodiment. The stop period may correspond to, for example, the scheduling in a period after a period overlapping the dynamic grant, the whole scheduling for one period overlapping the dynamic grant, the time resource after the timing with which the overlap with the dynamic grant starts in the scheduling for one period overlapping the dynamic grant, or only the time resource overlapping the dynamic grant (e.g., overlapping symbols). The operation of stopping the transmission may be, for example, determined and notified to the UE by the base station, or may be statically predetermined in a standard. The base station may give the notification, for example, semi-statically via the RRC signaling, or dynamically via the MAC signaling and/or the L1/L2 signaling. This enables, for example, flexible scheduling in the base station.

The second modification of the third embodiment can maintain the reliability and the communication rate of the uplink signal using the dynamic grant whose timing overlaps with that of the configured grant.

The Fourth Embodiment

Studies on transmission of the uplink data via the Supplemental UL (SUL) that is the UL carrier different from the UL carrier to be used in starting connection have been made for reducing the power consumption of the UE and enhancing the reliability in transmission of the uplink data. When the SUL is configured in the UE (i.e., when the gNB configures the SUL), data requiring the low-latency characteristics may be generated. Even when the SUL is configured in the UE, a method for transmitting, with low latency, such data requiring the low-latency characteristics is necessary. The fourth embodiment discloses a method for solving such a problem.

In NR, the following method for preferentially transmitting the data requiring the low-latency characteristics has been studied. The method enables, with the resource to which the uplink grant has already been given for transmitting the uplink data to a UE, the UE (intra-UE) or another UE (inter-UE) to transmit the uplink data generated later. This method is called preemption.

In order to solve the problem, the preemption is performed on the UE in which the SUL is configured (may be referred to as a "SUL-configured UE"). The UE in which the SUL is configured is configured for preemption. When the SUL is configured in the UE to which the uplink grant has been given earlier, the UE is configured for preemption. Alternatively, when the SUL is configured in the UE to which the uplink grant has been given later, the UE is configured for preemption. Both of the UEs may be configured for preemption.

The conventional preemption is performed via a single UL carrier. However, even when the SUL is configured in the UE, performing preemption on the UE in which the SUL is configured and which can use a plurality of UL carriers enables transmission of the data requiring the low-latency characteristics with low latency.

A detailed method for performing preemption on the SUL-configured UE is disclosed. The preemption may be performed on the SUL-configured UE via the non-SUL. Furthermore, the preemption may be performed on the SUL-configured UE via the SUL. Furthermore, the preemption may be performed not when the early uplink grant and the subsequent uplink grant overlap in the resources per se but when the resource for the early uplink grant and the resource for the subsequent uplink grant overlap in timing. The resource for the uplink grant is a resource on the frequency/time axes that has been scheduled by the uplink grant.

The preemption may be performed when the resource for the early uplink grant and the resource for the subsequent uplink grant overlap in timing under a configuration in which the resource for the early uplink grant is allocated on the SUL and the resource for the subsequent uplink grant is allocated on the non-SUL. Furthermore, the preemption may be performed when the resource for the early uplink grant and the resource for the subsequent uplink grant overlap in timing under a configuration in which the resource for the early uplink grant is allocated on the non-SUL and the resource for the subsequent uplink grant is allocated on the SUL.

As such, the preemption may be performed when the resource allocated on the SUL and the resource allocated on the non-SUL overlap in timing. Performing such a process on the UE in which the simultaneous transmission via the SUL and the non-SUL is prohibited enables preemption on the resource allocated to the different UL carrier.

The uplink grant should be used for allocating the uplink resource to the UE to be preempted. When the UE to be preempted is the intra-UE or the inter-UE, the uplink grant should also be used for allocating, to the UE, the uplink resource for data generated later. The gNB notifies the UE to be preempted of the uplink grant. Upon receipt of the uplink grant, the UE performs the uplink transmission according to the uplink grant.

The gNB notifies the UE to which the uplink resource has already been allocated using the uplink grant to preferentially transmit the data generated later. For example, in the case of intra-UE, the gNB may give the notification using the uplink grant. For example, in the case of inter-UE, the gNB may give the notification using the uplink grant. Furthermore, the gNB may separately provide a channel or a signal to notify information on the preemption. The channel or the signal is referred to as a preemption indication (PI). Consequently, the UE to which the uplink resource has already been allocated using the uplink grant can recognize that the data generated later should be preferentially transmitted.

When the data generated later is preferentially transmitted, the uplink transmission in which the uplink resource has already been allocated using the uplink grant should be stopped. Alternatively, the uplink transmission may be shifted to a subsequent slot. The uplink transmission is performed in the shifted slot. Since the data generated later and the data already allocated are not simultaneously transmitted, interference caused by simultaneous transmission of the two pieces of data can be avoided. The communication quality in transmission of the data generated later can be improved.

Each of FIGS. 31 and 32 illustrates one example preemption method in the UE in which the SUL is configured. The vertical axis represents the frequency, and the horizontal axis represents the time. The processes in the time axis direction are performed per slot.

FIGS. 31 and 32 illustrate that transmission of the ultra-reliable and low-latency service data (URLLC data) is prioritized over that of the eMBB service data (eMBB data) requiring the large capacity communication. The URLLC data generated later can be transmitted with the resource for the eMBB data to which the uplink grant has been given earlier. In other words, the resource for the eMBB data to which the uplink grant has been given earlier is preempted as the resource for the URLLC data generated later.

FIG. 31 illustrates one example of performing preemption on the SUL-configured UE via the non-SUL. Each of 4001 and 4002 denotes the PDCCH to be transmitted to the UE.

The gNB transmits the uplink grant for the eMBB data to the UE using the PDCCH 4001. The gNB allocates a resource 4003 on the non-SUL using the grant for the eMBB data.

The gNB determines that the UE should preferentially transmit, with the timing of the resource allocated earlier, the URLLC data generated later. The gNB determines that the UE should transmit the URLLC data with the resource on the non-SUL which has been allocated earlier.

A configuration range of the number of slots from the UL grant to the transmission may differ between the eMBB data and the URLLC data. The minimum value and/or the maximum value of the number of slots may differ between the eMBB data and the URLLC data. The configuration range or the minimum value and/or the maximum value may be statically determined, for example, in a standard. For example, the minimum value of the number of slots for the URLLC data from the UL grant to the transmission may be smaller than that for the eMBB data.

The processing time for the URLLC data transmission UE from reception of the UL grant to transmission of the URLLC data is sometimes shorter than that for the eMBB data transmission UE. In such a case, making the minimum value of the number of slots for the URLLC data from the UL grant to the transmission smaller than that for the eMBB data can shorten the time from the UL grant to transmission of the URLLC data.

Although data with a higher priority is the URLLC data and data with a lower priority is the eMBB data in the example of this Description, the URLLC data and the eMBB data are not limited to these. For example, data with a higher priority may require the low-latency characteristics more than data with a lower priority. The gNB may assess data with a higher priority and data with a lower priority, using, for example, the QoS or the QoS parameter required for the service, or an identifier of the QoS class (QoS Class Identifier (QCI)).

The gNB transmits the grant for the URLLC data to the UE using the PDCCH 4002. The gNB allocates, using the grant for the URLLC data, the resource 4003 on the non-SUL which has been allocated earlier.

Furthermore, the gNB notifies, using the PDCCH 4002, the UE to preferentially transmit the URLLC data with the resource 4003 on the non-SUL which has been allocated earlier. Alternatively, the gNB may notify the UE to stop transmission of the eMBB data with the resource 4003 which has been allocated earlier. Alternatively, the gNB may notify the UE to shift, to a slot subsequent to the resource 4003 which has been allocated earlier, transmission of the eMBB data. The UE shifts the eMBB data to a subsequent slot 4004 on the non-SUL and transmits the eMBB data. These pieces of information are referred to as information on the preemption. FIG. 31 illustrates the shifting to the subsequent slot.

Nine examples of the information on the preemption are described below.

(1) Information indicating preferential transmission of the URLLC data
(2) Information indicating stopping transmission of the eMBB data
(3) Information indicating shifting the eMBB data to a subsequent slot and transmitting the eMBB data
(4) Information indicating shifting the eMBB data to a previous slot and transmitting the eMBB data
(5) The amount of shift
(6) The scheduling information at a shift destination
(7) Information indicating partly stopping transmission of the eMBB data
(8) Information indicating simultaneous transmission of the eMBB data and the URLLC data
(9) Combinations of (1) to (8) above When (2) is used, the gNB may notify, using a new UL grant, the UE of the scheduling of the eMBB data whose transmission has been stopped. For example, upon receipt of the information, the UE dynamically receives the subsequent PDCCHs. Upon receipt of the new UL grant, the UE transmits the eMBB data according to the new UL grant.

When (3) or (4) is used, that is, when information indicating shifting and transmitting the eMBB data is used, the information of (2) indicating stopping transmission may be omitted.

Although shifting the eMBB data to a subsequent slot has been disclosed, the eMBB data may be shifted to a previous slot. The information of (4) indicating shifting the eMBB data to a previous slot and transmitting the eMBB data may be used. When the UE can perform processing in time from reception of the uplink grant or the PI of the PDCCH 4002 to transmission of the eMBB data, shifting of the eMBB data to the previous slot can reduce the latency until the transmission.

The amount of shift in (5) may be information in the time axis direction. The information may be, for example, the time to be shifted, the number of slots to be shifted, or the number of TTIs to be shifted. For example, the amount of shift may be represented by a positive number when the eMBB data is shifted backward, whereas the amount of shift may be represented by a negative number when the eMBB data is shifted forward. This can omit the information of (3) or (4).

Examples of the scheduling information of (6) include the resource information in the time axis direction and the resource information in the frequency axis direction. The resource information in the time axis direction may be represented per symbol. The resource information in the frequency axis direction may be represented per subcarrier or per resource block. In the scheduling information of (6), the same information as the scheduling information notified earlier by the uplink grant may be omitted. This can reduce the amount of information.

In the case of intra-UE, the gNB may include the information on the preemption in the UL grant for the URLLC data to notify the intra-UE of the information. In the case of inter-UE, the gNB notifies the information on the preemption to the UE that has transmitted the uplink grant for the eMBB data earlier. The gNB may notify the UE using the UL grant or using the PI.

In the case of inter-UE, the PDCCH 4002 may include the PDCCH for the URLLC data and the PDCCH or the PI for the preemption. Furthermore, the PDCCH for the URLLC data and the PDCCH or the PI for the preemption may be transmitted using different time/frequency resources.

This enables transmission of both of the URLLC data and the eMBB data on the non-SUL. Furthermore, the URLLC data can be transmitted with low latency.

FIG. 32 illustrates one example of performing preemption on the SUL-configured UE via the SUL. Each of 4101 and 4102 denotes the PDCCH to be transmitted to the UE.

The gNB transmits the uplink grant for the eMBB data to the UE using the PDCCH 4101. The uplink grant may include information indicating transmission on the SUL. The gNB allocates a resource 4103 on the SUL using the grant for the eMBB data.

The gNB determines that the UE should preferentially transmit, with the timing of the resource allocated earlier, the URLLC data generated later. The gNB determines that the UE should transmit the URLLC data with the resource on the SUL which has been allocated earlier.

The gNB transmits the grant for the URLLC data to the UE using the PDCCH 4102. The gNB allocates, using the grant for the URLLC data, the resource 4103 on the SUL that has been allocated earlier.

Furthermore, the gNB notifies, using the PDCCH 4102, the UE of information on the preemption for the resource 4103 allocated earlier. FIG. 32 illustrates that the preemption information indicates shifting transmission of the eMBB data to a slot subsequent to the resource 4103 allocated earlier. The UE shifts the eMBB data to a subsequent slot 4104 on the SUL and transmits the eMBB data.

This enables transmission of both of the URLLC data and the eMBB data on the SUL. Furthermore, the URLLC data can be transmitted with low latency.

Figure 33:
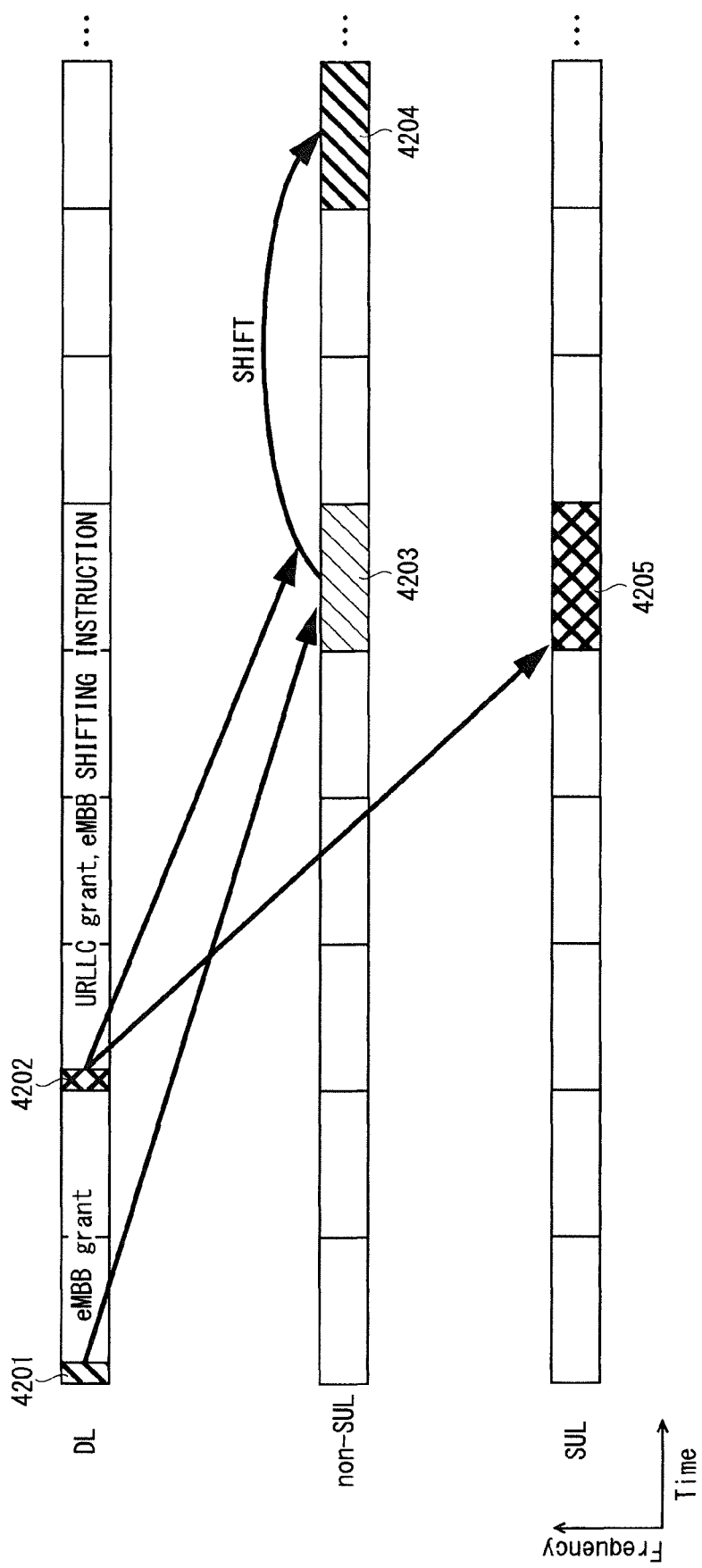
FIG. 33 illustrates a preemption method when a resource for eMBB data on the non-SUL which has been granted earlier and a resource for URLLC data on the SUL which is to be granted later overlap in timing according to the fourth embodiment.
Figure 34:
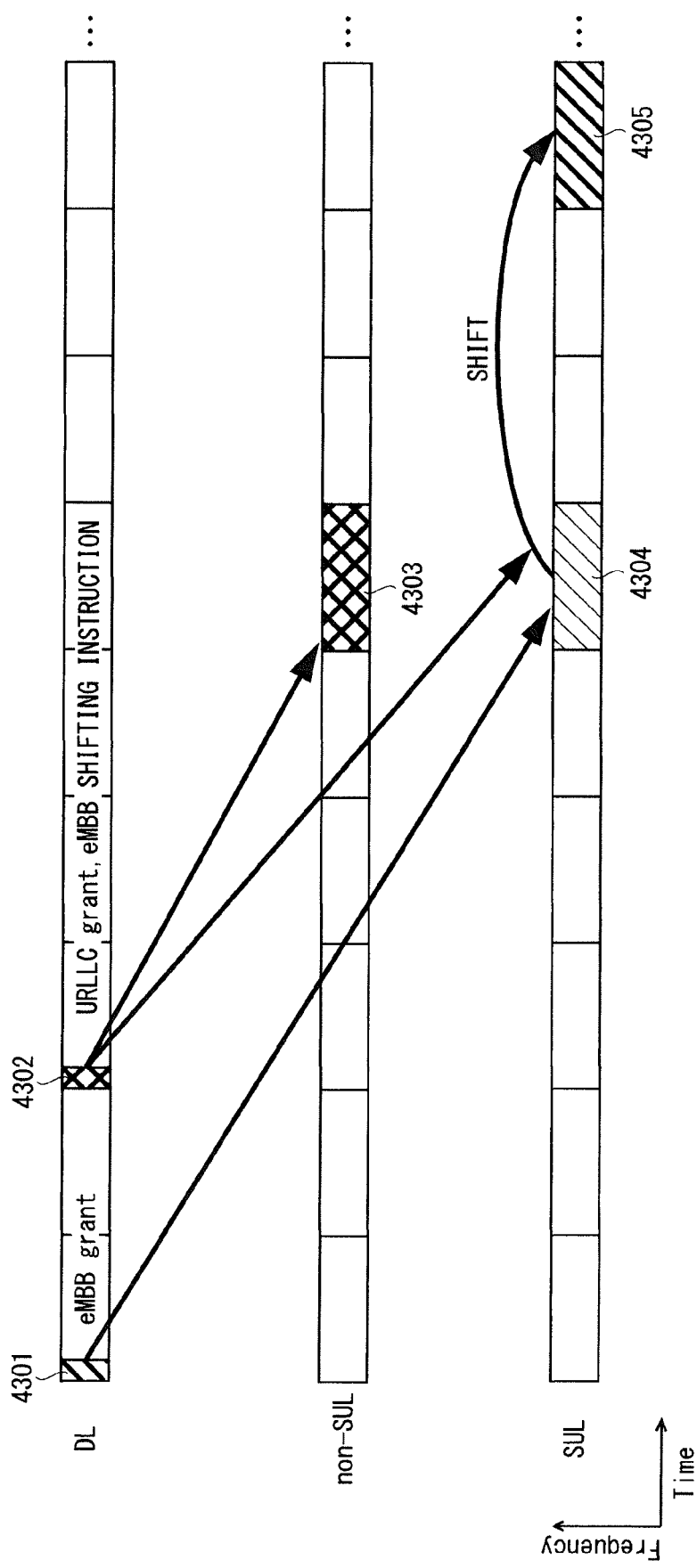
FIG. 34 illustrates the preemption method when the resource for the eMBB data on the SUL which has been granted earlier and the resource for the URLLC data on the non-SUL which is to be granted later overlap in timing according to the fourth embodiment.

Each of FIGS. 33 and 34 illustrates one example preemption method in the UE in which the SUL is configured. FIGS. 33 and 34 illustrate that the preemption is performed when the resource allocated on the SUL and the resource on the non-SUL overlap in timing, FIG. 33 illustrates the preemption method when the resource for the eMBB data on the non-SUL which has been granted earlier and the resource for the URLLC data on the SUL which is to be granted later overlap in timing. Each of 4201 and 4202 denotes the PDCCH to be transmitted to the UE.

The gNB transmits the uplink grant for the eMBB data to the UE using the PDCCH 4201. The gNB allocates a resource 4203 on the non-SUL using the grant for the eMBB data.

The gNB determines that the UE should preferentially transmit the URLLC data generated later, with the timing of the resource on the non-SUL which has been allocated earlier.

The gNB transmits the uplink grant for the URLLC data to the UE using the PDCCH 4202. The gNB allocates a resource 4205 on the SUL using the grant for the URLLC data with the timing of the resource on the non-SUL which has been allocated earlier.

Furthermore, the gNB notifies, using the PDCCH 4202, the UE of information on the preemption for the resource 4203 allocated earlier. FIG. 33 illustrates that the preemption information indicates shifting transmission of the eMBB data to a slot subsequent to the resource 4203 allocated earlier. The UE shifts the eMBB data to a subsequent slot 4204 on the non-SUL and transmits the eMBB data.

This enables transmission of the URLLC data on the SUL and the eMBB data on the non-SUL. Furthermore, the URLLC data can be transmitted with low latency.

FIG. 34 illustrates the preemption method when the resource for the eMBB data on the SUL which has been granted earlier and the resource for the URLLC data on the non-SUL which is to be granted later overlap in timing. Each of 4301 and 4302 denotes the PDCCH to be transmitted to the UE.

The gNB transmits the uplink grant for the eMBB data to the UE using the PDCCH 4301. The gNB allocates a resource 4304 on the SUL using the grant for the eMBB data.

The gNB determines that the UE should preferentially transmit the URLLC data generated later, with the timing of the resource on the SUL which has been allocated earlier.

The gNB transmits the uplink grant for the URLLC data to the UE using the PDCCH 4302. The gNB allocates a resource 4303 on the non-SUL using the grant for the URLLC data with the timing of the resource on the SUL which has been allocated earlier.

Furthermore, the gNB notifies, using the PDCCH 4302, the UE of information on the preemption for the resource 4304 allocated earlier. FIG. 34 illustrates that the preemption information indicates shifting transmission of the eMBB data to a slot subsequent to the resource 4304 allocated earlier. The UE shifts the eMBB data to a subsequent slot 4305 on the SUL and transmits the eMBB data.

This enables transmission of the URLLC data on the non-SUL and the eMBB data on the SUL. Furthermore, the URLLC data can be transmitted with low latency.

Although the previous disclosure is based on the same numerology in the SUL and the non-SUL, the numerology is not limited to this. In other words, the aforementioned method is applicable even when the SUL and the non-SUL differ in numerology. The method is also applicable even when a BWP in the SUL and a BWP in the non-SUL which are configured in the UE differ in numerology.

Each of FIGS. 35 to 38 illustrates one example preemption method in the UE in which the SUL is configured, when the SUL and the non-SUL differ in numerology. The vertical axis represents the frequency, and the horizontal axis represents the time. The processes are performed per slot in the time axis direction.

FIGS. 35 to 38 illustrate an example where the non-SUL is operated in a high frequency band and the SUL is operated in a low frequency band. Furthermore, FIGS. 35 to 38 illustrate that the SUL is shorter in sub-carrier spacing (SCS) and longer in slot length than the non-SUL as the numerology of each UL carrier. FIGS. 35 to 38 illustrate that the slot length of the SUL is double that of the non-SUL.

Figure 35:
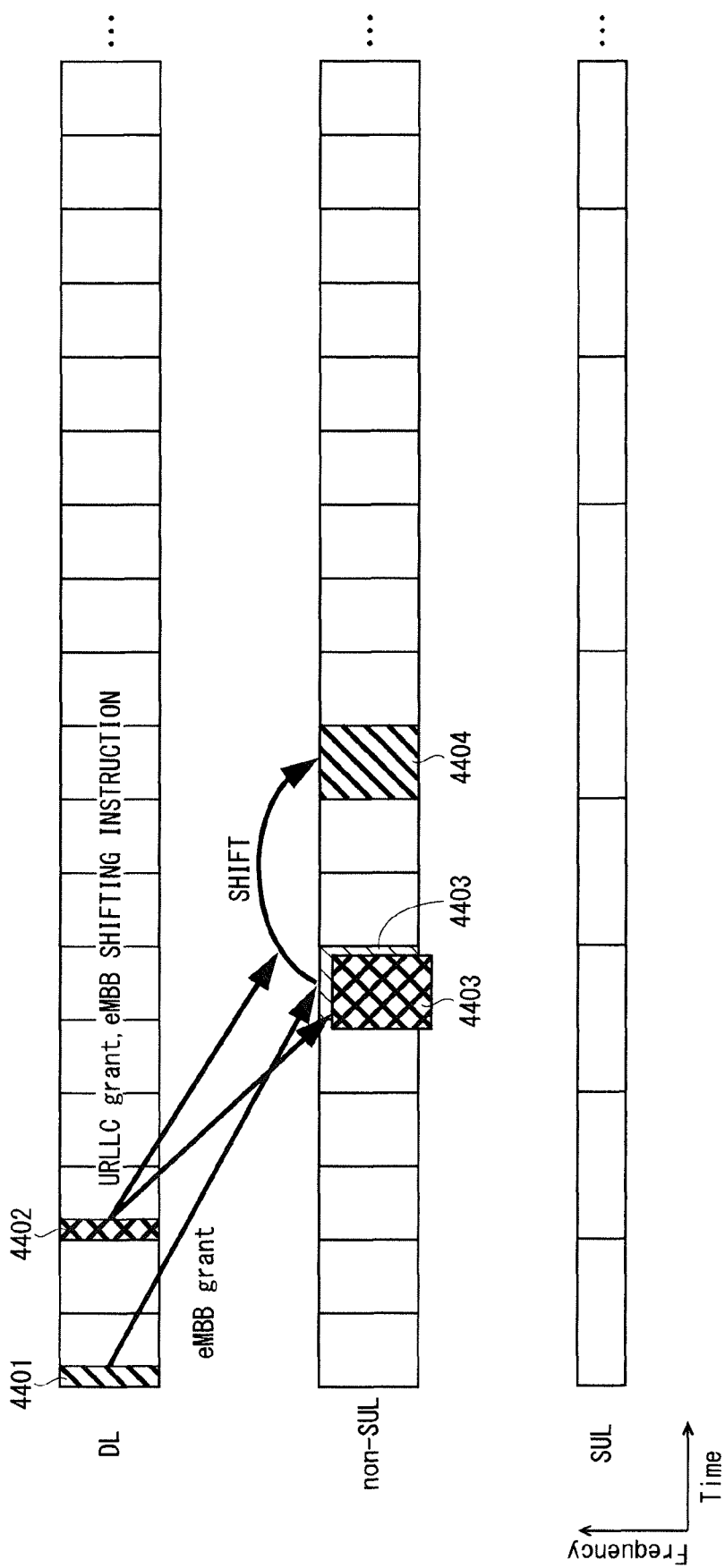
FIG. 35 illustrates an example of performing preemption on the SUL-configured UE via the non-SUL according to the fourth embodiment.

FIG. 35 illustrates an example of performing preemption on the SUL-configured UE via the non-SUL. Since the preemption method in FIG. 35 is identical to that in FIG. 31, the description is omitted. Elements 4401 to 4404 in FIG. 35 correspond to the elements 4001 to 4004 in FIG. 31, respectively.

Figure 36:
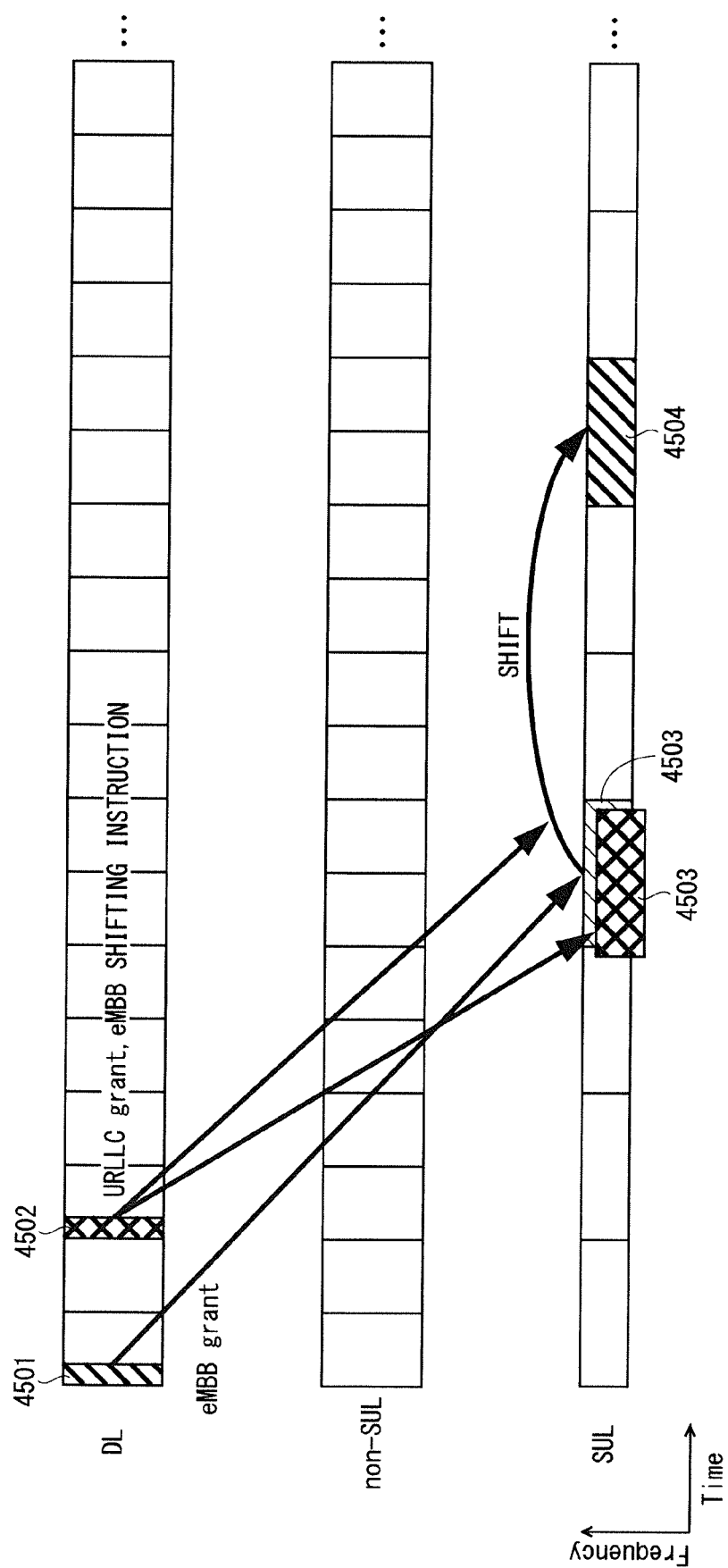
FIG. 36 illustrates an example of performing preemption on the SUL-configured UE via the SUL according to the fourth embodiment.

FIG. 36 illustrates an example of performing preemption on the SUL-configured UE via the SUL. Since the preemption method in FIG. 36 is identical to that in FIG. 32, the description is omitted. Elements 4501 to 4504 in FIG. 36 correspond to the elements 4101 to 4104 in FIG. 32, respectively.

Figure 37:
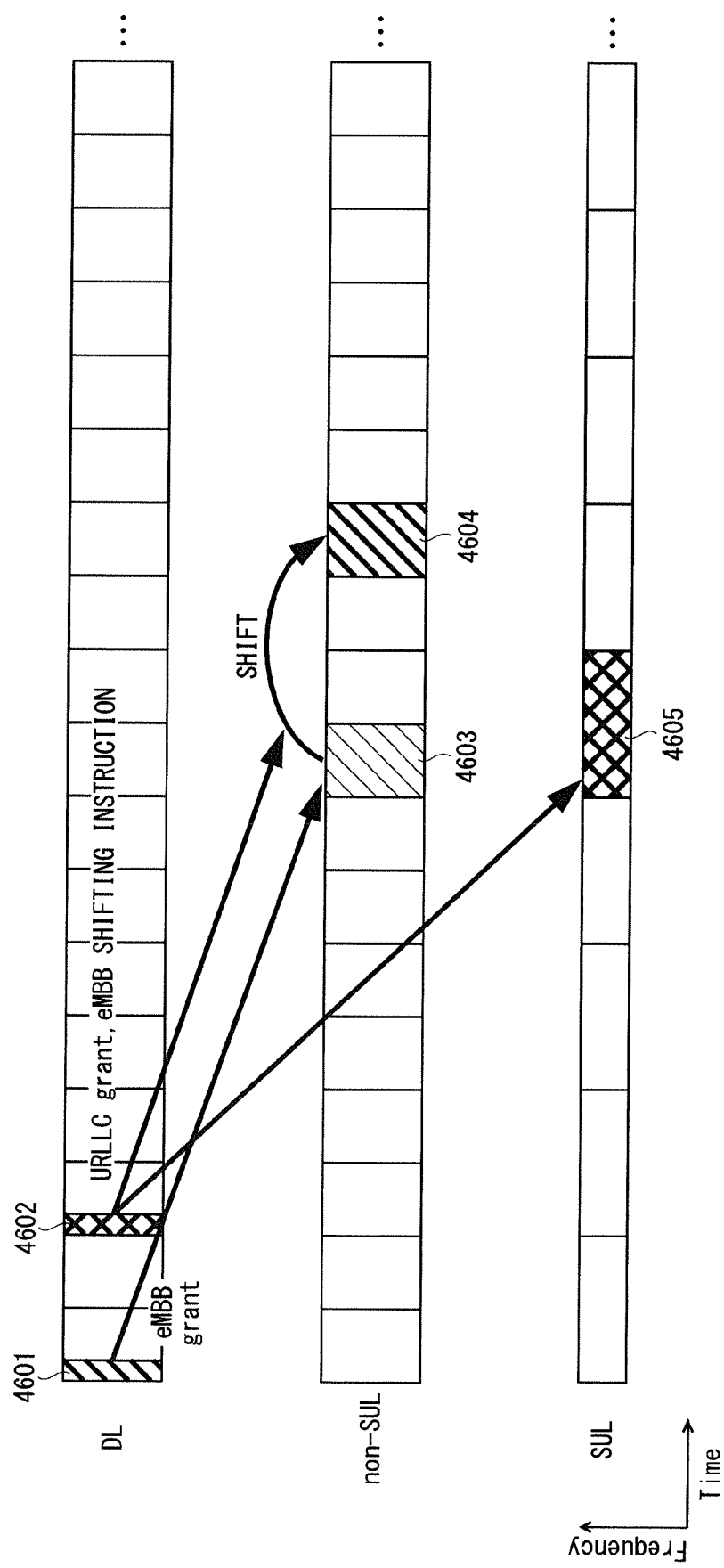
FIG. 37 illustrates the preemption method when the resource for the eMBB data on the non-SUL which has been granted earlier and the resource for the URLLC data on the SUL which is to be granted later overlap in timing according to the fourth embodiment.
Figure 38:
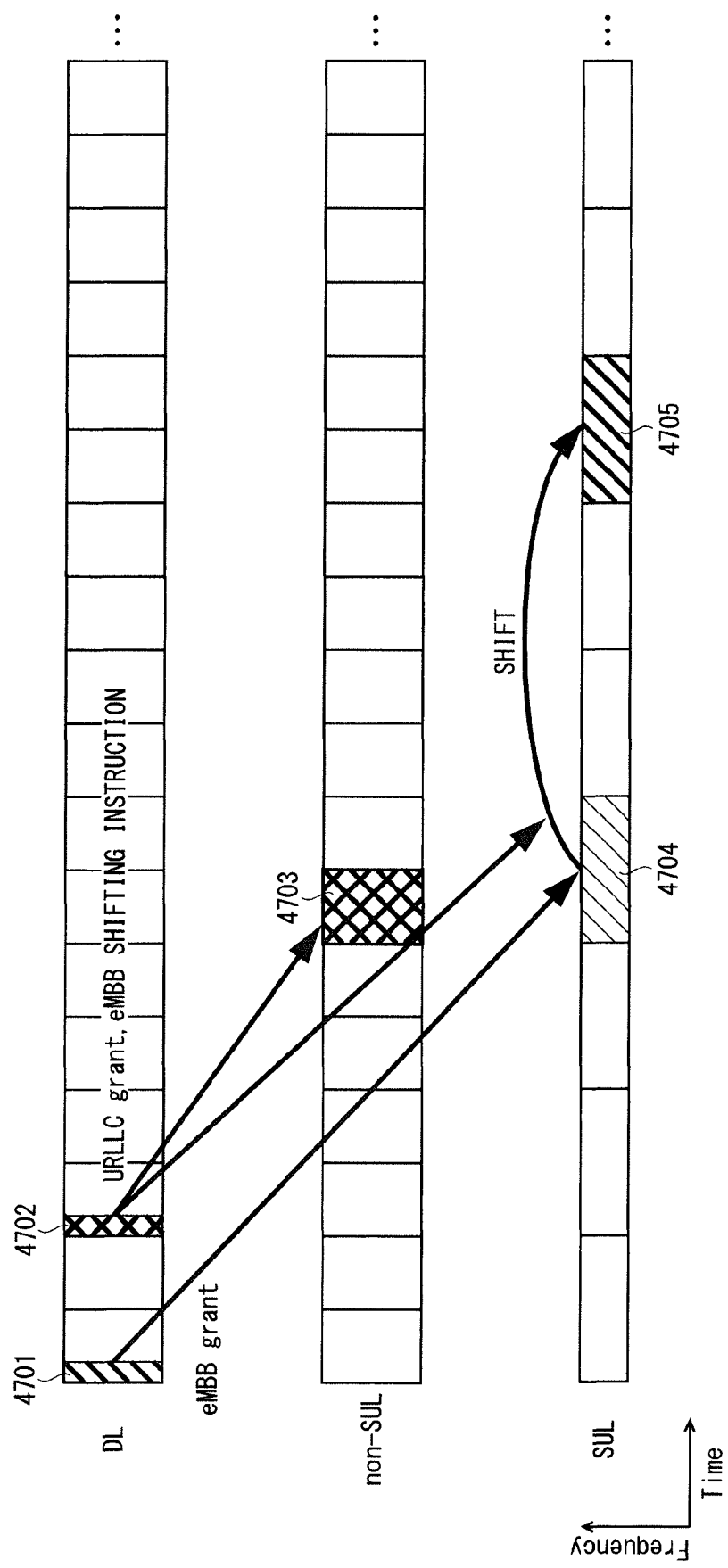
FIG. 38 illustrates the preemption method when the resource for the eMBB data on the SUL which has been granted earlier and the resource for the URLLC data on the non-SUL which is to be granted later overlap in timing according to the fourth embodiment.

Each of FIGS. 37 and 38 illustrates one example preemption method in the UE in which the SUL is configured. FIGS. 37 and 38 illustrate that the preemption is performed when the resource allocated on the SUL and the resource on the non-SUL overlap in timing, FIG. 37 illustrates the preemption method when the resource for the eMBB data on the non-SUL which has been granted earlier and the resource for the URLLC data on the SUL which is to be granted later overlap in timing. Since the preemption method in FIG. 37 is identical to that in FIG. 33, the description is omitted. Elements 4601 to 4605 in FIG. 37 correspond to the elements 4201 to 4205 in FIG. 33, respectively.

FIG. 38 illustrates the preemption method when the resource for the eMBB data on the SUL which has been granted earlier and the resource for the URLLC data on the non-SUL which is to be granted later overlap in timing. Since the preemption method in FIG. 38 is identical to that in FIG. 34, the description is omitted. Elements 4701 to 4705 in FIG. 38 correspond to the elements 4301 to 4305 in FIG. 34, respectively.

For example, as illustrated in the example of FIG. 37, when the SUL and the non-SUL differ in slot length and the eMBB data is shifted to the subsequent slot and transmitted, the timing of the resources sometimes still overlaps depending on the amount of shift. This occurs, for example, when the amount of shift of the resource 4603 of the eMBB data is one slot in FIG. 37. In such a case, the resource 4603 of the eMBB data overlaps the timing of the resource 4605 of the URLLC data even after being shifted by one slot.

As a method for solving such a problem, the amount of shift of the resource for the eMBB data should be restricted to a range that does not overlap the timing of the resource for the URLLC data. For example, the amount of shift of the resource 4603 of the eMBB data on the non-SUL is defined as 2 slots or longer in FIG. 37. The gNB should calculate the amount of shift using the early grant for the eMBB data and the subsequent grant for the URLLC data so that the timings do not overlap even after the shift. The gNB should calculate the amount of shift in consideration of each UL carrier or the SCS of the BWP in the UL carrier so that the timings do not overlap even after the shift.

This can prevent an overlap in timing between the resource for the eMBB data and the resource for the URLLC data even when the SUL and the non-SUL differ in slot length. Furthermore, the preemption can be performed on the resource allocated to the different UL carrier.

The method for shifting, to a subsequent slot, data to be preempted has been disclosed. In the example of FIG. 34, the resource 4304 for the eMBB data to be preempted is shifted as the resource 4305, and the eMBB data is transmitted with the resource 4305.

As another method, transmission of the data to be preempted has only to be stopped without being shifted. As another method, the transmission may be partly stopped. As another method, the data to be preempted may be simultaneously transmitted with the preempting data.

A method for only stopping the transmission of the data to be preempted without shifting the data is disclosed. The gNB configures transmission stop information as the preemption information, and transmits it to the UE. Upon receipt of the transmission stop information, the UE stops the transmission with the preempted resource.

Figure 39:
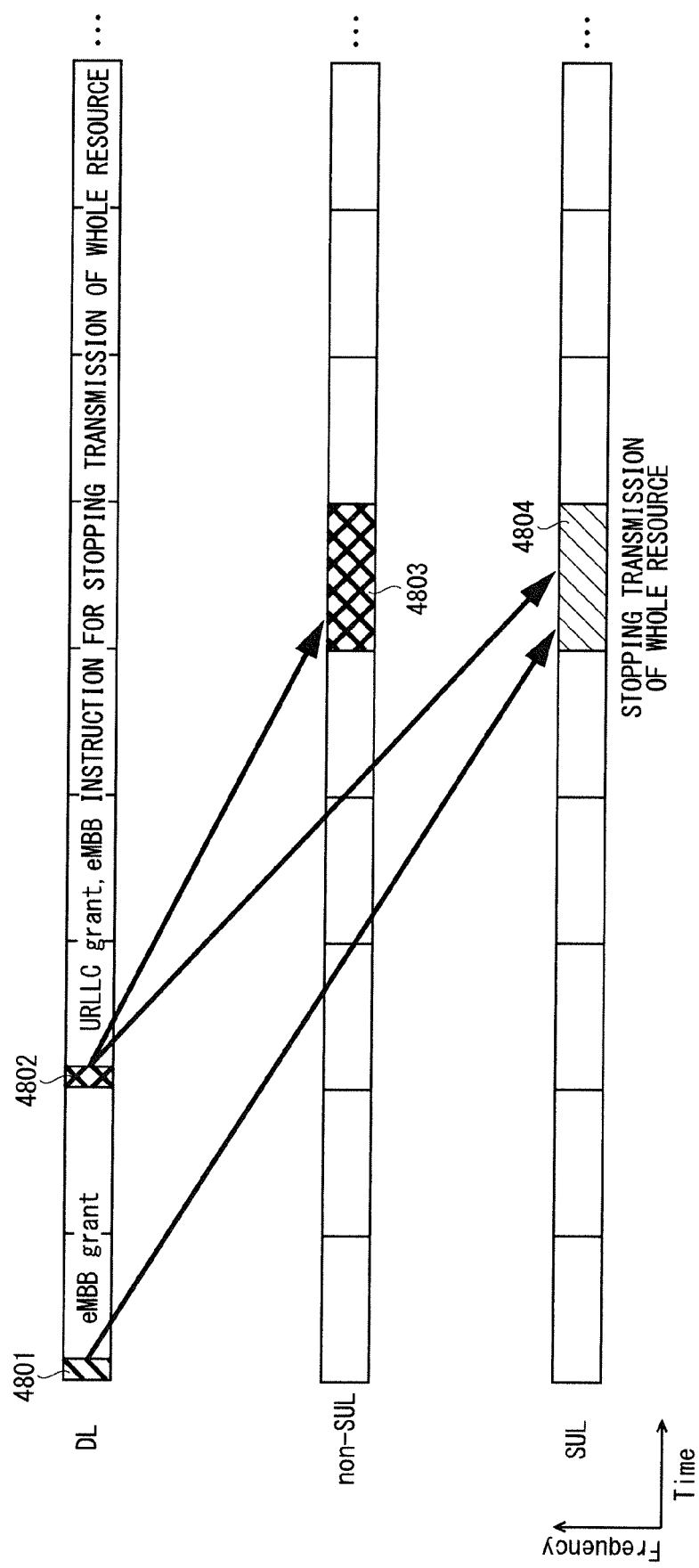
FIG. 39 illustrates an example of only stopping transmission without shifting data to be preempted according to the fourth embodiment.

FIG. 39 illustrates an example of only stopping transmission of the data to be preempted without shifting it. FIG. 39 illustrates the preemption method when the resource for the eMBB data on the SUL which has been granted earlier and the resource for the URLLC data on the non-SUL which is to be granted later overlap in timing. Since the method in FIG. 39 is similar to that in FIG. 34, the differences are mainly described.

The gNB notifies, using a PDCCH 4802, the UE of information on the preemption for a resource 4804 on the SUL which has been allocated earlier. The preemption information should be, for example, information indicating stopping transmission of the eMBB data with the resource 4804 on the SUL which has been allocated earlier. The UE stops transmitting the eMBB data with the resource 4804 on the SUL.

The gNB may retransmit the uplink grant for the eMBB data to the UE, for the data whose transmission has been stopped. The gNB transmits the uplink grant to the UE as initial transmission data. As another method, the gNB may transmit the uplink grant to the UE as retransmission data. The UE transmits the data whose transmission has been stopped, according to the uplink grant. This enables the UE to stop transmitting the data to be preempted, for example, in the absence of the resource to be shifted with the timing of notifying the preemption information or when the gNB cannot determine the resource to be shifted. Consequently, the interference with another uplink transmission can be avoided.

As another method, transmission of the data to be preempted may be partly stopped. When the resource for the eMBB data to be preempted and the resource for the preempting URLLC data overlap in timing, transmission of the overlapping portion may be stopped. The data with the overlapping timing may be punctured.

Figure 40:
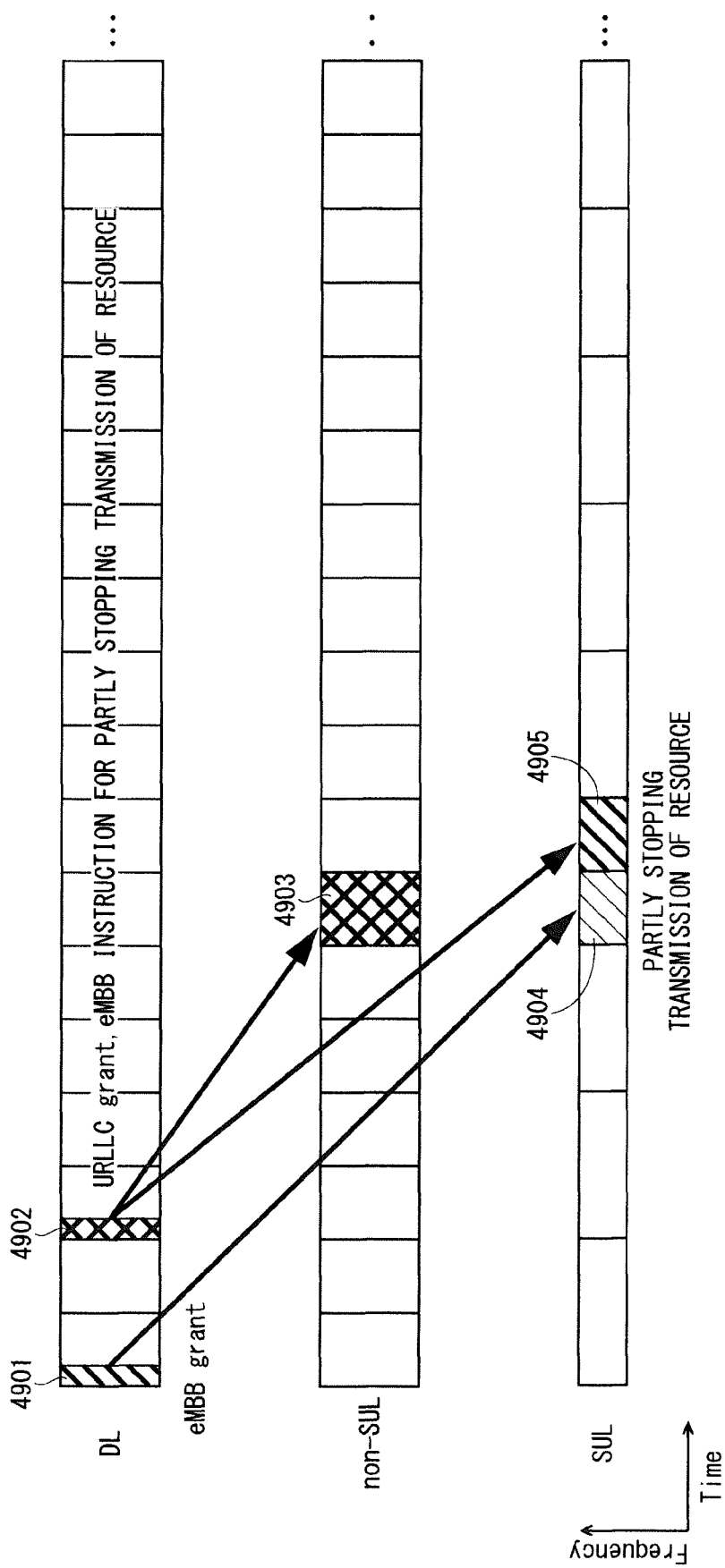
FIG. 40 illustrates an example of partly stopping transmission of the data to be preempted according to the fourth embodiment.

FIG. 40 illustrates an example of partly stopping transmission of the data to be preempted. FIG. 40 illustrates the preemption method when the resource for the eMBB data on the SUL which has been granted earlier and the resource for the URLLC data on the non-SUL which is to be granted later overlap in timing. Since the method in FIG. 40 is similar to that in FIG. 38, the differences are mainly described.

The gNB notifies, using a PDCCH 4901, the UE of information on the preemption for a resource 4904 on the SUL which has been allocated earlier. The preemption information should be, for example, information indicating partly stopping transmission of the eMBB data with the resource 4904 on the SUL which has been allocated earlier. The UE stops, with the resource 4904 on the SUL, transmitting the eMBB data with the timing overlapping the timing to transmit the URLLC data. The UE transmits the eMBB data with the timing that does not overlap the timing to transmit the URLLC data.

Since the eMBB data can be partly transmitted with the resource, transmission from the UE to the gNB becomes possible. This can reduce the latency in transmission of the eMBB data.

Transmission of data may be stopped per code block group (CBG). The UE stops transmitting the CBG with the timing overlapping the timing to transmit the URLLC data. The UE transmits the CBG with the non-overlapping timing. When whether transmission is possible is determined per CBG and the retransmission is performed, the CBG that has been received by the gNB need not be retransmitted. Thus, the retransmission data can be reduced. Furthermore, this can reduce the latency in transmission of the eMBB data.

The UE may transmit the data whose transmission has been stopped, using the resource with the timing that does not overlap the timing to transmit the URLLC data. The UE may transmit the whole allocated eMBB data including the data whose transmission has been stopped, using the resource with the timing that does not overlap the timing to transmit the URLLC data. Since the resource 4904 on the SUL which has been allocated earlier for transmitting the eMBB data becomes less, the coding rate or the MCS may be changed.

Since the whole allocated eMBB data can be transmitted with the resource, the latency in transmission of the eMBB data can be reduced.

The gNB may notify the UE of the partial transmission method. The gNB may notify the partial transmission method using the earlier eMBB grant or together with the preemption information. As another method, the gNB may notify the partial transmission method via the RRC signaling or the MAC signaling. Alternatively, the partial transmission method may be statically determined, for example, in a standard. Consequently, the gNB and the UE can mutually recognize the partial transmission method. This can prevent malfunctions caused by differences in recognition between the gNB and the UE.

A method for simultaneously transmitting the data to be preempted and the preempting data is disclosed. The gNB may configure simultaneous transmission information as the preemption information, and transmit it to the UE. Upon receipt of the simultaneous transmission information, the UE performs transmission with the preempted resource. For example, when the early uplink grant and the subsequent uplink grant overlap in resources per se in one UE (intra-UE) or a different UE (inter-UE), data to which the resource has been allocated using the early grant and data to which the resource has been allocated using the subsequent grant are simultaneously transmitted.

For example, when the resource for the early uplink grant and the resource for the subsequent uplink grant overlap in timing in one UE (intra-UE), the data to which the resource has been allocated using the early grant and the data to which the resource has been allocated using the subsequent grant are simultaneously transmitted.

When the simultaneous transmission is performed, the transmission power of the eMBB data which has been granted earlier may be reduced, and the transmission power of the URLLC data which has been granted later may be increased. The gNB may notify the UE of information on the transmission power in the simultaneous transmission.

The information on the transmission power in the simultaneous transmission may be an increased or decreased amount of the transmission power using the earlier UL grant. Furthermore, the information may be an increased or decreased amount of the transmission power from the subsequent UL grant.

For example, the gNB may notify the UE of information on the transmission power of the eMBB data which has been granted earlier, together with the preemption information. For example, the gNB may include, in the UL grant for the URLLC data, information on the transmission power of the URLLC data which has been granted later to notify the UE of the information.

As another method, the gNB may notify the information on the transmission power in the simultaneous transmission, via the RRC signaling or the MAC signaling. Alternatively, the information may be statically determined, for example, in a standard. Consequently, the gNB and the UE can mutually recognize the partial transmission method. This can prevent malfunctions caused by differences in recognition between the gNB and the UE.

The shifting method, the method for only stopping transmission, the method for partly stopping transmission, and the simultaneous transmission method may be selectable. These methods may be selectable according to a condition. For example, the transmission may be only stopped when switching between the SUL and the non-SUL is necessary, whereas the transmission may be partly stopped when the switching between the SUL and the non-SUL is unnecessary. Consequently, when the gNB or the UE cannot estimate the switching time, the complexity of control in the gNB and the UE can be avoided. Thus, malfunctions can be reduced.

As another example, the transmission may be only stopped when determination on stopping the transmission can be made by the first timing to transmit data to be preempted (the eMBB data), whereas the transmission may be partly stopped when the determination cannot be made by the first timing. As another example, the simultaneous transmission may be performed when the determination on partly stopping transmission of the data to be preempted (the eMBB data) cannot be made by the first timing to partly stop the transmission.

The UE or the gNB may select these methods. The UE notifies the gNB of capability information. The gNB may select these methods using the capability information from the UE. The gNB notifies the UE of the selected method. The methods previously disclosed may be applied to the notification method.

As such, the methods can be selected according to, for example, the capability of the UE or the radio propagation environment. Thus, the UE can transmit the eMBB data with high reliability and low latency.

When the UE performs transmission by switching between the SUL and the non-SUL, the switching sometimes requires a large amount of time. This occurs, for example, when the SUL and the non-SUL differ in numerology. In the numerology where the SCS is longer and the symbol length is shorter, the switching sometimes requires, for example, several symbols. When the switching requires a large amount of time, the URLLC data or the eMBB data cannot be transmitted during the switching time, which leads to the loss of data. This degrades the communication quality.

A method for solving such a problem is disclosed. The transmission time of data is determined in consideration of the switching time between the SUL and the non-SUL. The resource to which data is allocated is determined in consideration of the switching time between the SUL and the non-SUL.

For example, the switching between the SUL and the non-SUL may be performed before or after transmission of preempting data (URLLC data) to be preferentially transmitted. The switching time may be considered in the transmission of the data to be preempted (eMBB data). The data to be preempted (eMBB data) should be transmitted in consideration of the switching time in the resource for transmitting the data to be preempted (eMBB data). Since the switching is not performed during transmission of the preempting data, the data can be communicated with high reliability and low latency.

In FIG. 40, for example, the switching is not performed during transmission of the URLLC data with the resource 4903 on the non-SUL. The non-SUL is switched to the SUL, and the eMBB data is transmitted with the resource 4905 on the SUL. The gNB should notify the UE of the resource to which the eMBB data is allocated in the resource 4905 on the SUL, using the UL grant or the preemption information in consideration of the switching time. For example, when the switching time is two symbols long, two symbols in the resource 4905 on the SUL are allocated to the switching time, and the remaining symbols in the resource 4905 except the two symbols are allocated to the eMBB data.

Upon receipt of the UL grant or the preemption information, the UE transmits the eMBB data with the resource allocated using the UL grant in the resource 4905 on the SUL. The gNB schedules transmission of the eMBB data with the resource excluding the switching time, and notifies the scheduling information using the UL grant or the preemption information.

This can eliminate the loss of data caused by the switching between the SUL and the non-SUL when the eMBB data is transmitted. The data can be communicated with high reliability. Moreover, the URLLC data can be transmitted without any influence of the switching between the SUL and the non-SUL. Thus, the data can also be communicated with high reliability and low latency.

The switching time may be configured dedicatedly in each UE. Alternatively, the same time may be configured for all the UEs. When the same time is configured for all the UEs, the switching time may be statically determined, for example, in a standard. Both of the gNB and the UE can recognize the same switching time determined. The gNB can issue the UL grant to the UE in consideration of the switching time. The UE can be designed so that the UE can perform the switching within the switching time.

When the switching time is configured dedicatedly in each UE, the gNB needs to recognize the switching time for each UE. A method for the gNB to recognize the switching time dedicated to each UE is disclosed. The UE includes, in the UE capability, information on the time to switch between the uplink carriers to notify the information. The UE may include, in the UE capability, information on the time to switch between numerologies to be used for the uplink carriers to notify the information.

The UE may give the notification when establishing an RRC connection, or when the gNB requests the capability or information on the switching time from the UE. The UE may give the notification via the RRC signaling. As another method, the UE may give the notification via the MAC signaling. As another method, the UE may give the notification using the L1/L2 control signal. This enables early notification.

The switching time may be counted per symbol. The switching time may be counted per integral submultiple of one symbol or per plurality of symbols. Alternatively, a range of the switching time is divided into one or more switching times in advance, and each of the divided switching times is numbered. The UE may notify the numbers as information on the switching times. The amount of information can be reduced.

Consequently, the gNB can recognize the switching time dedicated to each UE. Thus, the gNB can determine the transmission time of data in consideration of the switching time dedicated to each UE. Furthermore, the gNB can determine the resource to which the data is allocated. The communication with high reliability and low latency is possible.

The methods disclosed in the fourth embodiment can produce the high-reliability and low-latency characteristics in the uplink communication. Moreover, the use of the SUL can increase the resource available in the frequency axis direction. Thus, the communication with higher reliability than that of the conventional communication via only the non-SUL is possible. Moreover, the use of the combined methods enables flexible scheduling. This enables the communication with higher-reliability and lower-latency characteristics.

The First Modification of the Fourth Embodiment

A plurality of SCSs are used in NR. This sometimes restricts the SCSs in which transmission with a logical channel configuration is possible (Non-Patent Document 17). The gNB configures a list of one or more SCSs in which the UE is allowed to perform transmission for each logical channel (Non-Patent Document 23). This list is hereinafter referred to as an allowed SCS list.

When the SUL is configured in the UE, switching between a plurality of UL carriers occurs. When the SCS of a logical channel for the eMBB data or the URLLC data is restricted, switching between the SUL and a non-SUL with different numerologies is impossible. For example, when the allowed SCS list does not include an SCS based on the numerology of the BWP in the UL carrier after switching, the switching is impossible.

A method for solving such a problem is disclosed. The SCS restriction may be configured in the UE in which the SUL is configured. The SCS restriction includes a configuration of not switching to the UL carrier whose SCS is different from those in the allowed SCS list. The SCS restriction may include a configuration of not switching to the BWP in the UL carrier whose SCS is different from those in the allowed SCS list.

When switching to a UL carrier for the UE, the gNB switches to the UL carrier in consideration of the SCS restriction configured in the UE. When switching to a UL carrier for the UE, the gNB switches to a UL carrier including an SCS in the allowed SCS list configured in the UE. One UL carrier may include a plurality of SCSs.

When switching to a UL carrier for the UE, the gNB switches to a BWP in the UL carrier in consideration of the SCS restriction configured in the UE. When switching to a UL carrier for the UE, the gNB switches to a BWP of a UL carrier including an SCS in the allowed SCS list configured in the UE.

As another method, when configuring an SUL in the UE, the gNB may configure an SUL including an SCS in the allowed SCS list configured in the UE. When configuring an SUL in the UE, the gNB may configure an SUL including a BWP including an SCS in the allowed SCS list configured in the UE.

As another method, the gNB may incorporate an SCS included in the SUL configured in the UE, into the allowed SCS list for the UE. The gNB may incorporate an SCS included in a BWP in the SUL configured in the UE, into the allowed SCS list for the UE.

The SCS included in the SUL which the gNB has configured in the UE may be automatically incorporated into the allowed SCS list for the UE. When the gNB has configured the BWP in the SUL in the UE, the SCS included in the BWP in the SUL may be automatically incorporated into the allowed SCS list for the UE. The gNB need not separately configure the SCS in the allowed SCS list for the UE.

Another method for solving the problem is disclosed. The allowed SCS list is not configured in the UE in which the SUL is configured. The gNB does not configure the allowed SCS list in the UE in which the SUL is configured. The gNB may cancel the configuration of the allowed SCS list in the UE in which the SUL is configured. The gNB may configure the elimination of the SCSs in the allowed SCS list, in the UE in which the SUL is configured.

Another method for solving the problem is disclosed. The SCS restriction is not applied to the UE in which the SUL has been configured. The gNB may configure, in the UE, an SUL including an SCS that is not included in the allowed SCS list. The gNB may configure, in the UE, a BWP in a SUL including an SCS that is not included in the allowed SCS list.

Mapping to the resource including the SCS that is not included in the allowed SCS list may be allowed on the SUL. Mapping to the BWP including the SCS that is not included in the allowed SCS list may be allowed on the SUL.

Another method for solving the problem is disclosed. The SCS restriction on the non-SUL and the SCS restriction on the SUL are imposed. The conventional SCS restriction may be imposed as the SCS restriction on the non-SUL. In addition to the conventional SCS restriction, the SCS restriction on the SUL is imposed. In the presence of a plurality of SULs, a plurality of SUL restrictions may be imposed in addition to the conventional SCS restriction. The SCS restriction may be imposed for each UL carrier or for each UL carrier group including one or more UL carriers. The aforementioned methods may be appropriately applied to the SCS restriction on each of the UL carriers.

This enables configuration of the SCS restriction on the SUL which differs from the conventional SCS restriction. For example, the SUL may have no SCS restriction. This enables transmission on the SUL via any logical channel.

Consequently, when the SUL is configured in the UE and the SCS of the logical channel for the eMBB data or the URLLC data is restricted even on the non-SUL, switching between the SUL and the non-SUL is possible. The data transmission on the SUL can be flexibly configured, and the communication quality can be improved.

Although the method on the UE in which the SUL has been configured or the UE in which the SUL is configured has been disclosed, the method may be limited to the preemption. The method may be limited to a case where the preemption is performed on the UE in which the SUL has been configured. For example, when the preemption is performed on the UE in which the SUL has been configured, the UL carrier is not switched to the UL carrier whose SCS is different from those in the allowed SCS list. When the preemption is performed on the UE in which the SUL has been configured, for example, the SCS restriction is not applied.

The preemption particularly requires the low-latency characteristics. As disclosed in the fourth embodiment, switching between the UL carriers in the preemption can improve the communication quality. Thus, application of the method for operating the allowed SCS list particularly in the preemption as disclosed in the first modification of the fourth embodiment can produce the high-reliability and low-latency characteristics.

The Second Modification of the Fourth Embodiment

The fourth embodiment discloses shifting data to be preempted to a subsequent slot or a previous slot. The fourth embodiment also discloses a method for performing such a shift on a carrier identical to the UL carrier to which the resource that has been UL granted earlier is mapped. Here, another method is disclosed.

When data generated later is preferentially transmitted, data to which the uplink resource has already been allocated using the uplink grant is shifted to a subsequent slot or a previous slot on the SUL or on the non-SUL, and transmitted. The data may be shifted to a slot on a UL carrier different from the UL carrier via which the uplink resource has been allocated using the early uplink grant.

The UL carrier information at the shift destination is provided. The gNB notifies the UE that transmits data to be preempted (e.g., the eMBB data) of the UL carrier information at the shift destination. The preemption information may include the UL carrier information at the shift destination. The gNB notifies the UE that transmits the data to be preempted of the preemption information using the UL grant or the PI. When the data is shifted to a slot on a UL carrier identical to the UL carrier via which the uplink resource has been allocated using the early uplink grant, the UL carrier information at the shift destination may be omitted.

The gNB may notify the UE that transmits the data to be preempted of BWP information in the UL carrier at the shift destination. The gNB may include the BWP information in the preemption information to notify the BWP information. The SUL/non-SUL indicator (Non-Patent Document 18) that is information indicating the SUL or the non-SUL may be used as the UL carrier information at the shift destination.

As such, the data to be preempted can be transmitted with the UL carrier being switched. For example, when the communication qualities on the non-SUL and the SUL vary in time, the gNB should configure a UL carrier with far superior communication quality as the UL carrier at the shift destination. Consequently, the data to be preempted can be transmitted on the UL carrier with far superior communication quality. This can produce higher reliability for the data which is to be preempted and has been UL granted earlier.

For example, data may be transmitted on the SUL when a wide coverage is necessary. The gNB should configure the SUL as the UL carrier at the shift destination, in the UE with inferior communication quality of the non-SUL. Consequently, the data to be preempted can be transmitted with far superior communication quality.

For example, the data may be transmitted on a UL carrier with a low resource-use load. The gNB should configure the SUL as the UL carrier at the shift destination when the resource-use load on the non-SUL is high. Consequently, more resources can be allocated to the data to be preempted with earlier timing. Thus, the transmission with low latency is possible.

Figure 41:
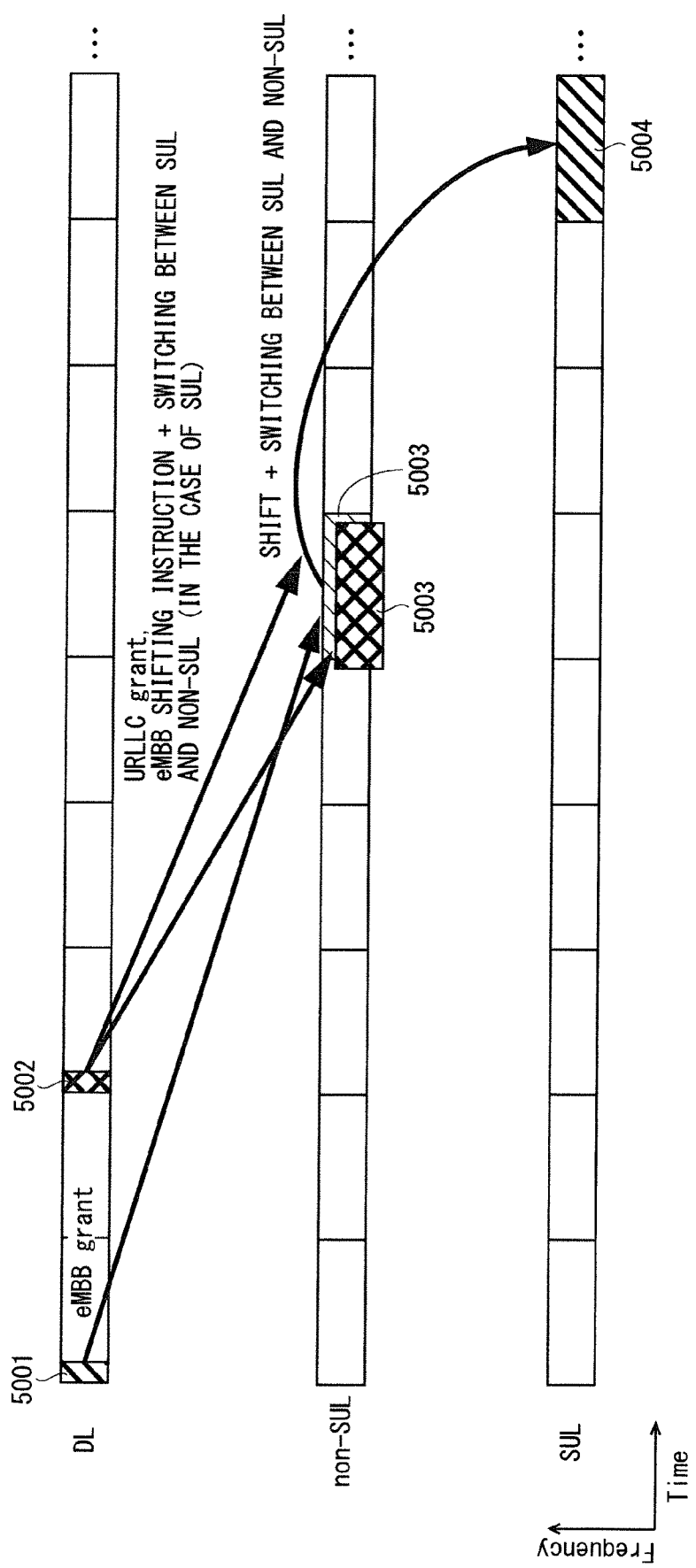
FIG. 41 illustrates one example method for shifting, using the preemption to a slot on a UL carrier different from the UL carrier, data to which the resource has been allocated using the early uplink grant, and transmitting the data according to the second modification of the fourth embodiment.

FIG. 41 illustrates one example method for shifting, using the preemption to a slot on a UL carrier different from the UL carrier, data to which the resource has been allocated using the early uplink grant, and transmitting the data. FIG. 41 illustrates the preemption method when the resource for the eMBB data on the non-SUL which has been granted earlier and the resource for the URLLC data on the non-SUL which is to be granted later overlap. Since the method in FIG. 41 is similar to that in FIG. 31, the differences are mainly described.

The gNB transmits the uplink grant for the eMBB data to the UE using a PDCCH 5001. Suppose that, for example, the location of the UE at that time is within a coverage of the non-SUL. Here, the gNB allocates a resource 5003 on the non-SUL to the UE.

The gNB determines that the UE should preferentially transmit, with the timing of the resource allocated earlier, the URLLC data generated later. Suppose that, for example, the location of the UE at that time is within the coverage of the non-SUL. Here, the gNB determines that the UE should transmit the URLLC data with the resource on the non-SUL which has been allocated earlier. The gNB transmits the grant for the URLLC data to the UE using a PDCCH 5002. The gNB allocates, using the grant for the URLLC data, the resource 5003 on the non-SUL which has been allocated earlier.

Suppose that, for example, the UE at that time to which the UL grant has been transmitted earlier moves within a coverage of the SUL which is located at an edge of or outside the coverage of the non-SUL. Here, the gNB notifies, using the PDCCH 5002, the UE to which the UL grant has been transmitted earlier to shift, to a subsequent slot 5004 on the SUL, the resource 5003 on the non-SUL which has been allocated earlier. The gNB should configure the SUL as the UL carrier information at the shift destination and notify it. The gNB may include the UL carrier information at the shift destination in the preemption information to notify the UL carrier information.

The UE shifts the eMBB data to the subsequent slot 5004 on the SUL and transmits the eMBB data.

This enables the UE that has moved within the coverage of the SUL which is located at the edge of or outside the coverage of the non-SUL to transmit the eMBB data with the resource on the SUL. Consequently, the communication quality of data to be preempted can be improved.

Figure 42:
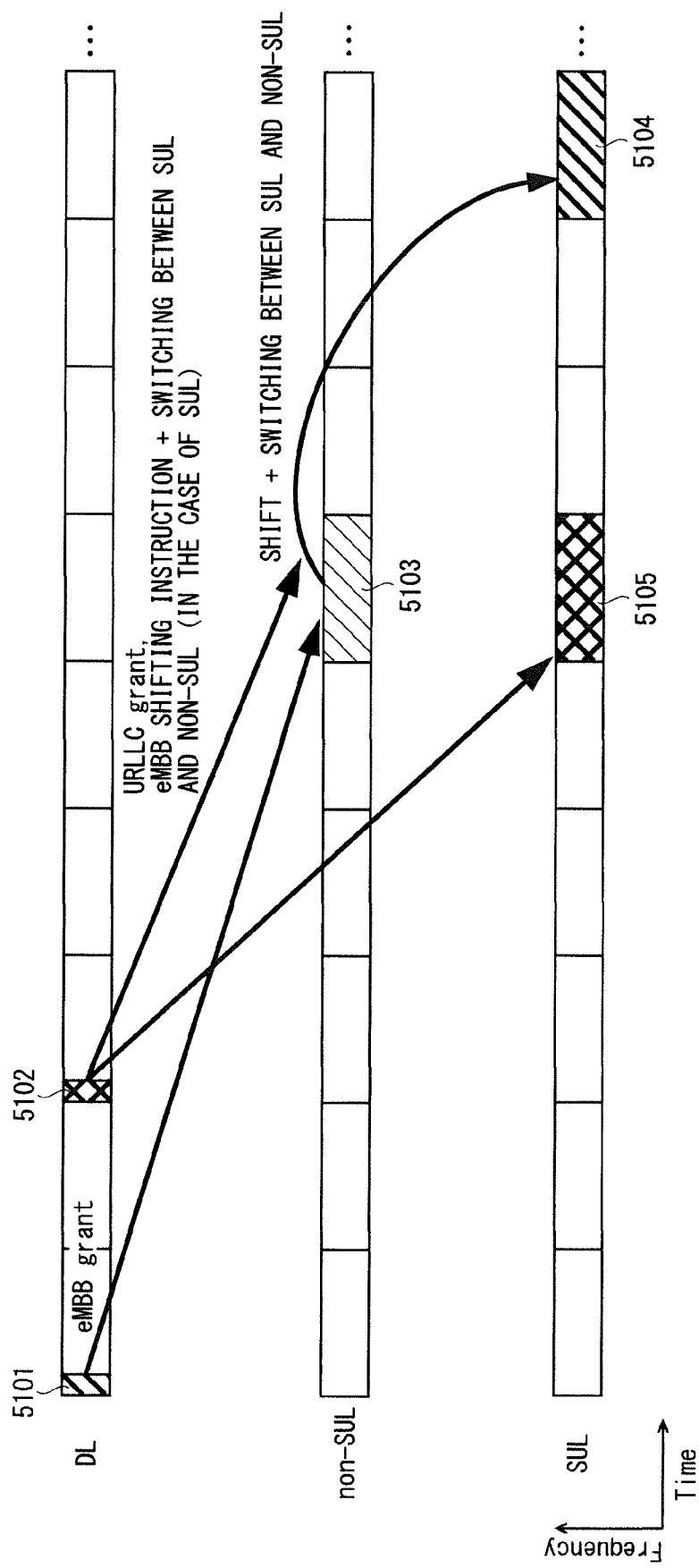
FIG. 42 illustrates one example method for shifting, using the preemption to a slot on a UL carrier different from the UL carrier, data to which the resource has been allocated using the early uplink grant, and transmitting the data according to the second modification of the fourth embodiment.

FIG. 42 illustrates one example method for shifting, using the preemption to a slot on a UL carrier different from the UL carrier, data to which the resource has been allocated using the early uplink grant, and transmitting the data. FIG. 42 illustrates the preemption method when the resource for the eMBB data on the non-SUL which has been granted earlier and the resource for the URLLC data on the SUL which is to be granted later overlap in timing. Since the method in FIG. 42 is similar to that in FIG. 33, the differences are mainly described.

The gNB transmits the uplink grant for the eMBB data to the UE using a PDCCH 5101. For example, when the UL communication quality of the non-SUL at that time is superior to that of the SUL, the gNB allocates a resource 5103 on the non-SUL to the UE.

The gNB determines that the UE should preferentially transmit, with the timing of the resource allocated earlier, the URLLC data generated later. For example, when the UL communication quality of the SUL at that time is superior to that of the non-SUL, the gNB determines that the UE should transmit the URLLC data with the resource on the SUL.

The gNB transmits the grant for the URLLC data to the UE using a PDCCH 5102. The gNB allocates a resource 5105 on the SUL using the grant for the URLLC data.

Furthermore, the gNB notifies, using the PDCCH 5102, the UE to which the UL grant has been transmitted earlier to shift, to a subsequent slot 5104 on the SUL, the resource 5103 on the non-SUL which has been allocated earlier. The gNB should configure the SUL as the UL carrier information at the shift destination and notify it. The gNB may include the UL carrier information at the shift destination in the preemption information to notify the UL carrier information.

The UE shifts the eMBB data to the subsequent slot 5104 on the SUL and transmits the eMBB data.

Although the example discloses shifting data to a subsequent slot, the data may be shifted to a previous slot.

This enables selection of a UL carrier at the shift destination for the data to be preempted, according to, for example, a radio propagation state, a location of the UE, and a load state on each UL carrier. The data to be preempted can be transmitted on the UL carrier with far superior communication quality. Since the UE can transmit the data to be preempted with lower transmission power, the power consumption of the UE can be reduced.

A request for switching between the UL carriers may be provided. The UE notifies the gNB of the request for switching between the UL carriers. The request for switching between the UL carriers should include information indicating a requested UL carrier. When the SUL is at low frequencies, transmission of the UL data on the SUL sometimes requires less power consumption in the UE. For example, when the amount of remaining battery power in the UE becomes less, transmission of the UL data on the SUL can reduce the power consumption in the UE and prolong the communication time.

When the UE estimates the communication quality in the UL from the communication quality in the DL and requests switching to the UL carrier with superior communication quality, the UE notifies the gNB of a request for switching between the UL carriers.

When the UE requests switching to the SUL, the UE includes information indicating the SUL in the request for switching between the UL carriers to notify the gNB of the information. Upon receipt of the request, the gNB may instruct the UE to transmit the UL data on the SUL using the UL grant. Alternatively, the gNB may instruct the UE to transmit the UL data on the SUL for transmitting the eMBB data to be preempted.

This can reduce the power consumption in the UE. Moreover, the communication quality of the UL data can be improved.

The Third Modification of the Fourth Embodiment

The second modification of the fourth embodiment discloses a method for enabling a configuration of the UL carrier at the shift destination when the data to be preempted is shifted to a subsequent slot. Here, a method for enabling the configuration of the UL carrier without the shift is disclosed.

When the data generated later is preferentially transmitted, data to which the uplink resource has already been allocated using the uplink grant is transmitted with the UL carrier being switched. The UL carrier via which the uplink resource has been allocated using the early uplink grant is switched to a different UL carrier.

UL carrier switching information is provided. The gNB notifies the UE that transmits the data to be preempted (e.g., the eMBB data) of the UL carrier switching information. The gNB may include the UL carrier switching information in the preemption information. The gNB notifies the UE that transmits the data to be preempted of the preemption information using the UL grant or the PI.

The gNB may notify the UE that transmits the data to be preempted of the BWP information in the shifted UL carrier. The gNB may include the BWP information in the preemption information to notify the BWP information. The SUL/non-SUL indicator (Non-Patent Document 18) that is information indicating the SUL or the non-SUL may be used as the UL carrier switching information.

As such, the data to be preempted can be transmitted with the UL carrier being switched, without shifting the data. For example, when the communication qualities on the non-SUL and the SUL vary in time, the gNB should switch to the UL carrier with far superior communication quality. Consequently, the data to be preempted can be transmitted on the UL carrier with far superior communication quality. This can produce higher reliability for the data which is to be preempted and has been UL granted earlier.

When the wide coverage is necessary, the gNB should switch to the SUL, for example, the UL carrier with a low resource-use load, similarly to the second modification of the fourth embodiment. The data to be preempted can be transmitted with far superior communication quality or with lower latency.

Figure 43:
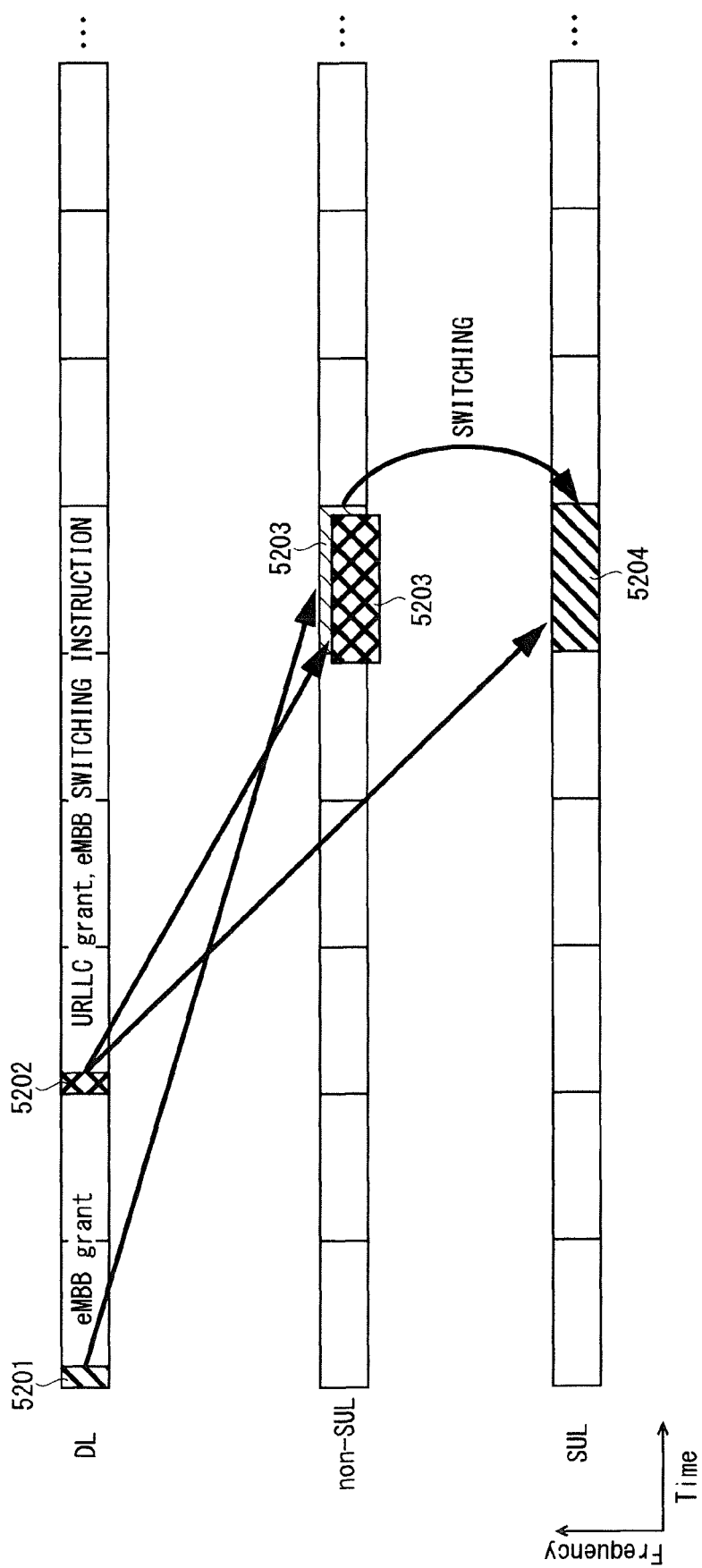
FIG. 43 illustrates one example method for transmitting, using the preemption in a slot on a UL carrier different from the UL carrier, data to which the resource has been allocated using the early uplink grant according to the third modification of the fourth embodiment.

FIG. 43 illustrates one example method for transmitting, using the preemption in a slot on a UL carrier different from the UL carrier, data to which the resource has been allocated using the early uplink grant. FIG. 43 illustrates the preemption method when the resource for the eMBB data on the non-SUL which has been granted earlier and the resource for the URLLC data on the non-SUL which is to be granted later overlap.

The gNB transmits the uplink grant for the eMBB data to the UE using a PDCCH 5201. Suppose that, for example, the location of the UE at that time is within the coverage of the non-SUL. Here, the gNB allocates a resource 5203 on the non-SUL to the UE.

The gNB determines that the UE should preferentially transmit, with the timing of the resource allocated earlier, the URLLC data generated later. Suppose that, for example, the location of the UE at that time is within the coverage of the non-SUL. Here, the gNB determines that the UE should transmit the URLLC data with the resource on the non-SUL which has been allocated earlier. The gNB transmits the grant for the URLLC data to the UE using a PDCCH 5202. The gNB allocates, using the grant for the URLLC data, the resource 5203 on the non-SUL which has been allocated earlier.

Suppose that, for example, the UE at that time to which the UL grant has been transmitted earlier moves within a coverage of the SUL which is located at the edge of or outside the coverage of the non-SUL. Here, the gNB notifies, using the PDCCH 5202, the UE to which the UL grant has been transmitted earlier that the resource 5203 on the non-SUL that has been allocated earlier is switched to a slot 5204 on the SUL. The gNB should configure the SUL as the UL carrier switching information and notify it. The gNB may include the UL carrier information in the preemption information to notify the UL carrier information.

The UE switches the eMBB data to the subsequent slot 5204 on the SUL and transmits the eMBB data.

This enables the UE that has moved within the coverage of the SUL which is located at the edge of or outside the coverage of the non-SUL to transmit the eMBB data with the resource on the SUL. Consequently, the communication quality of the data to be preempted can be improved. Moreover, the switching without the shift can reduce the latency until transmission of the data to be preempted.

FIG. 44 illustrates a case where the SUL and the non-SUL have different SCSs. FIG. 44 illustrates one example method for transmitting, using the preemption to a slot on a UL carrier different from the UL carrier, data to which the resource has been allocated using the early uplink grant. FIG. 44 illustrates the preemption method when the resource for the eMBB data on the non-SUL which has been granted earlier and the resource for the URLLC data on the non-SUL which is to be granted later overlap.

The gNB transmits the uplink grant for the eMBB data to the UE using a PDCCH 5301. Suppose that, for example, the location of the UE at that time is within the coverage of the non-SUL. Here, the gNB allocates a resource 5303 on the non-SUL to the UE.

The gNB determines that the UE should preferentially transmit, with the timing of the resource allocated earlier, the URLLC data generated later. Suppose that, for example, the location of the UE at that time is within the coverage of the non-SUL. Here, the gNB determines that the UE should transmit the URLLC data with the resource on the non-SUL which has been allocated earlier. The gNB transmits the grant for the URLLC data to the UE using a PDCCH 5302. The gNB allocates, using the grant for the URLLC data, the resource 5303 on the non-SUL which has been allocated earlier.

Suppose that, for example, the UE at that time to which the UL grant has been transmitted earlier moves within a coverage of the SUL which is located at the edge of or outside the coverage of the non-SUL. Here, the gNB notifies, using the PDCCH 5302, the UE to which the UL grant has been transmitted earlier that the resource 5303 on the non-SUL which has been allocated earlier is switched to the SUL. The gNB should configure the SUL as the UL carrier switching information and notify it. The gNB may include the UL carrier information in the preemption information to notify the UL carrier information.

When the resource is switched to a UL carrier having different SCSs, the resource may be switched to a slot 5304 merely using the UL carrier switching information. In the conventional scheduling where the SCSs in the DL differs from those in the UL in NR, the slot allocated using the earlier UL grant for the eMBB data is determined by the number of slots in the SCS included in the BWP in the allocated UL carrier or in the UL carrier.

Suppose in FIG. 44 that a resource 5303 on the non-SUL after five slots is allocated using the earlier UL grant for the eMBB data in a PDCCH 5301. Also suppose that only the UL carrier switching information is notified using the PDCCH 5302 for switching, to the SUL, the resource 5303 on the non-SUL which has been allocated earlier. In such a case, the UE allocates the slot 5304 on the SUL after five slots from the uplink slot with the timing of the earlier UL grant for the eMBB data in the PDCCH 5301.

Thus, the UE switches the eMBB data to the subsequent slot 5304 on the SUL and transmits the eMBB data.

As such, switching between the UL carriers can improve the communication quality of the data to be preempted. However, the latency until transmission of the data to be preempted cannot be reduced even by switching between the UL carriers without the shift.

A method for reducing the latency until transmission of the data to be preempted when the UL carrier is switched without the shift is disclosed.

Offset amount information in the time axis direction for the number of slots which has been granted before the notification of the UL carrier switching information is provided. The amount of offset may be counted per slot. For example, when K1 denotes the number of slots given with the earlier grant and K2 denotes the amount of offset, the slot newly configured may be the (K2+K1)-th slot from the previous grant timing.

The notification of the amount of offset can change the number of slots which has been granted earlier. Suppose that, for example, the number of slots given with the earlier grant is five and the amount of offset configured with the UL carrier switching information is −3. Here, the newly configured slot is calculated as (5+(−3)=2). A new slot is configured in the second slot from the previous grant timing.

FIG. 45 illustrates a case where the SUL and the non-SUL have different SCSs. FIG. 45 illustrates one example when the UL carrier is switched by configuring the amount of offset. Since FIG. 45 is similar to FIG. 44, the differences are mainly described.

The gNB notifies, using a PDCCH 5402, the UE to which the UL grant has been transmitted earlier that a resource 5403 on the non-SUL that has been allocated earlier is switched to the SUL. The gNB should configure the SUL as the UL carrier switching information and notify it. The gNB notifies the offset information together with the UL carrier information. Here, the gNB configures returning by three slots (−3) as the offset information and notifies it. The gNB may include the UL carrier information and the offset information in the preemption information to notify these pieces of information.

As such, the slot in which the UL carrier has been switched to the SUL is the second slot of the SCSs on the SUL from the timing of the previous UL grant 5401. Thus, a slot 5404 is configured in FIG. 45.

Thus, the UE switches the eMBB data to the slot 5404 on the SUL and transmits the eMBB data.

As such, when the UL carriers with different SCSs are switched, the communication quality of the data to be preempted can be improved, and the latency until transmission of the data to be preempted can be reduced.

The number of slots which has been granted before the notification may be reset by the notification of the UL carrier switching information. The resetting is statically predetermined, for example, in a standard, so that both of the gNB and the UE can recognize the resetting. The gNB may newly notify slot information to the UE to which the UL grant has been transmitted earlier. The gNB may include the slot information newly configured, in the preemption information. The slot information may be an amount of shifting the slot from the notification timing of the preemption information. The slot information may be the amount of shifting the slot from the PI.

As such, the slot after shifting to the UL carrier with the different numerology can be newly configured without using the slot configured with the earlier UL grant. Thus, for example, a slot can be easily configured with the same timing as that of the slot to be preempted.

When the UL carrier is switched, the configuration of a slot may be reset, and the UL carrier may be switchable only with the same timing as that of the preempted slot. This causes a problem in switching to the UL carrier with different SCSs. For example, when a UL carrier with long SCSs is switched to a UL carrier with short SCSs, a slot of one long SCS includes slots of a plurality of short SCSs. Consequently, the slot with the same timing as that of the preempted slot cannot be identified.

A method for solving such a problem is disclosed. In a slot of a long SCS, a slot is switched to a predetermined slot of a short SCS. The predetermined slot is, for example, the first slot. Alternatively, the predetermined slot may be the last slot. The predetermined slot may be statically predetermined, for example, in a standard. The gNB and the UE can mutually recognize the predetermined slot. Thus, malfunctions can be reduced.

Alternatively, the gNB may notify the UE of the predetermined slot. The gNB may notify the number of slots of short SCSs to be offset within one slot of a long SCS. The gNB may configure the offset value from the beginning and notify it. The gNB may notify, in advance, the predetermined slot via the RRC signaling as a notification method. Furthermore, the gNB may give the notification via the MAC signaling. This can reduce malfunctions. Furthermore, the gNB may give the notification via the L1/L2 control signaling. This enables a dynamic and appropriate configuration.

FIG. 46 illustrates a case where the SUL and the non-SUL have different SCSs. FIG. 46 illustrates one example when the amount of shift from the reset and the PI is configured and the UL carrier is switched. Since FIG. 46 is similar to FIG. 45, the differences are mainly described.

The gNB notifies, using a PDCCH 5502, the UE to which the UL grant has been transmitted earlier that a resource 5503 on the non-SUL that has been allocated earlier is switched to the SUL. The gNB should configure the SUL as the UL carrier switching information and notify it. The gNB notifies the amount of shift from the PI via the UL carrier, together with the UL carrier information. The amount of shift may be counted per slot. The amount of shift is one slot in the example of FIG. 46.

The UE switches the UL carrier to the SUL, and resets the configuration of the slots received by the earlier UL grant, that is, four slots in the example of FIG. 46. Furthermore, the UE shifts one slot on the SUL from the PI, and transmits the eMBB data with a resource 5504 on the SUL.

Consequently, when the UE switches the UL carrier between the UL carriers with different SCSs, the UE can perform transmissions with the same timing. This can reduce the latency until transmission of the data to be preempted.

With the appropriate combinations of the methods disclosed from the fourth embodiment to the third modification of the fourth embodiment, the data to be preempted can be flexibly configured. Thus, the communication quality can be improved, and the latency can be reduced.

The Fourth Modification of the Fourth Embodiment

A preemption method when a configured grant is established for the UE on the SUL or the non-SUL is disclosed.

The preemption is performed with the resource or the resource timing allocated using the configured grant. The configured grant may save the uplink transmission. Regardless of whether to perform the uplink transmission using the configured grant, the preemption is performed with the resource or the resource timing allocated using the configured grant.

Methods on the configured grant include a method for notifying the UE of the scheduling information given as a grant only via the RRC signaling (referred to as Type-1 herein). The other methods include a method for including, in the DCI, a part of the scheduling information given as a grant to notify the UE of the part of the scheduling information using the PDCCH, and notifying the UE of the other parts via the RRC signaling (referred to as Type-2 herein). The information to be included in the DCI and notified includes at least activation/deactivation information and resource allocation information in the frequency axis direction.

Furthermore, the first modification of the third embodiment discloses a method for including, in the DCI, activation/deactivation information in the scheduling information given as a grant to notify the UE of the activation/deactivation information using the PDCCH, and notifying the UE of the other information via the RRC signaling. This is referred to as Type-3 herein.

The preemption may be performed in the Type-1. Furthermore, the preemption may be performed between the activation and deactivation in the Type-2 and the Type-3. The methods disclosed from the fourth embodiment to the third modification of the fourth embodiment should be appropriately applied as the preemption method. These methods may be applied by replacing the earlier UL grant with the configured grant.

When the UE performs UL transmission with the resource or the resource timing allocated using the configured grant, the UE stops the transmission, shifts the transmission slot, or switches between the transmission UL carriers, etc. When the transmission has been stopped, the UE may transmit the data whose transmission has been stopped, with the resource allocated using the next configured grant.

In the absence of an instruction for shifting the transmission slot, the UE may perform the transmission with the resource allocated using the next configured grant. Since the resource for the UL transmission is regularly allocated using the configured grant, the resource is available. Thus, the control over the preemption can be facilitated.

For switching the transmission UL carrier, transmission of the preempted UL data should be enabled via a UL carrier different from the UL carrier via which the configured grant has been established. Since this enables the UE in which the SUL is configured to use of a plurality of UL carriers for UL transmission, the flexible scheduling is possible. This can produce advantages including improvement on the low latency characteristics, enhancement of the reliability, reduction of the power consumption in the UE, and increase in the coverage.

The configured grant may be established for the UE in which the SUL is configured so that the plurality of UL carriers overlap in the resource timing. This facilitates the switching between the UL carriers, and can improve the low latency characteristics.

Since the resource scheduled by the configured grant is invalid between the activation and deactivation in the Type-2 and the Type-3, that is, except for during the activation time, or during the deactivation time, the resource need not be reserved. Thus, the same processes as those when the configured grant is not established should be applied.

FIG. 47 illustrates one example method for performing preemption when the configured grant is established. The configured grant is established for the eMBB data on the non-SUL.

Resources 5602, 5603, and 5605 for the eMBB data are periodically allocated using the configured grant. The gNB transmits the grant for the URLLC data to the UE using a PDCCH 5601. The gNB allocates, using the grant for the URLLC data, the resource 5603 on the non-SUL which has been allocated earlier using the configured grant.

Furthermore, the gNB notifies, using the PDCCH 5601, the UE to preferentially transmit the URLLC data with the resource 5603 on the non-SUL which has been allocated earlier using the configured grant. Furthermore, the gNB may notify the UE to shift, to a subsequent slot 5604, the resource 5603 allocated earlier using the configured grant. The preemption information may be applied as these pieces of the information. When the eMBB data is generated in the UE, the UE transmits the eMBB data in the subsequent slot 5604 on the non-SUL.

FIG. 48 illustrates one example method for performing preemption when the configured grant is established. The configured grant is established for the eMBB data on the SUL. FIG. 48 illustrates a case where the SUL and the non-SUL differ in numerology.

Resources 5702, 5704, and 5706 for the eMBB data are periodically allocated using the configured grant. The gNB transmits the grant for the URLLC data to the UE using a PDCCH 5701. The gNB allocates, using the grant for the URLLC data, a resource 5703 in a slot on a different UL carrier which overlaps, in timing, with the resource 5704 on the SUL which has been allocated earlier using the configured grant.

The gNB notifies, using the PDCCH 5701, the UE to preferentially transmit the URLLC data with the timing of the resource 5704 on the SUL which has been allocated earlier using the configured grant. Furthermore, the gNB may notify the UE to shift, to a subsequent slot 5705, the resource 5704 allocated earlier using the configured grant. The preemption information may be applied as these pieces of the information. When the eMBB data is generated in the UE, the UE transmits the eMBB data in the subsequent slot 5705 on the SUL.

FIG. 49 illustrates one example method for performing preemption when the configured grant is established. The configured grant is established for the eMBB data on the non-SUL. Since FIG. 49 is similar to FIG. 47, the differences are mainly described.

In the example of FIG. 47, the resource 5604 in the subsequent slot is allocated instead of the preempted resources 5603. In FIG. 49, a resource 5805 in a slot on a different UL carrier is allocated instead of a preempted resource 5803. When the eMBB data is generated in the UE, the UE switches between the UL carriers, and transmits the eMBB data in the resource 5805 on the SUL. Elements 5801, 5802, and 5804 in FIG. 49 correspond to the elements 5601, 5602, and 5605 in FIG. 47, respectively.

FIG. 50 illustrates one example method for performing preemption when the configured grant is established. The configured grant is established for the eMBB data on the SUL. Since FIG. 50 is similar to FIG. 48, the differences are mainly described.

In the example of FIG. 48, the resource 5705 in the subsequent slot is allocated instead of the preempted resource 5704. In FIG. 50, a resource 5904 in a slot on a different UL carrier is allocated instead of a preempted resource 5905. When the eMBB data is generated in the UE, the UE switches between the UL carriers, and transmits the eMBB data in the resource 5904 on the non-SUL. Elements 5901, 5902, 5903, and 5906 in FIG. 50 correspond to the elements 5701, 5702, 5703, and 5706 in FIG. 48, respectively.

This enables preferential transmission of the URLLC data even when the configured grant is established for the eMBB data. Thus, the URLLC data can be transmitted with low latency.

The preemption may also be performed when the configured grant is established for the URLLC data. The methods disclosed from the fourth embodiment to the third modification of the fourth embodiment should be appropriately applied as the preemption method.

FIG. 51 illustrates one example method for performing preemption when the configured grant is established. The configured grant is established for the URLLC data on the non-SUL.

Resources 6002, 6003, and 6004 for the URLLC data are periodically allocated using the configured grant. The gNB transmits the grant for the eMBB data to the UE using a PDCCH 6001. The URLLC data is generated before a resource 6005 on the SUL which is allocated using the grant for the eMBB data.

In the case of intra-UE, the UE determines to preferentially transmit the URLLC data generated later. Preferentially transmitting data on a service requiring the low latency characteristics may be statically determined, for example, in a standard. Alternatively, the gNB should notify the UE of the priority of data. The gNB may configure, in the UE, a logical channel priority as the priority of data. The logical channel priority may be determined, using for example, the QoS or the QoS parameter required for the service, or the QCI.

Here, the preferential transmission of the URLLC data generated later is described. The preferential transmission is performed by shifting, to a subsequent slot, the uplink transmission in which the uplink resource has already been allocated using the uplink grant. The method for transmitting the preempted data, for example, whether transmission of the data is shifted, stopped, or switched should be predetermined.

The priority of a service, the priority of data, the method for transmitting the preempted data, or resource information for the transmission may be statically determined, for example, in a standard. Alternatively, the gNB may notify the UE of the various information in advance. The gNB may notify the various information via the RRC signaling or the MAC signaling. The gNB may dynamically notify the various information via the L1/L2 signaling.

The gNB may notify the various information using the UL grant for the eMBB data. Since the gNB can dynamically notify the method for transmitting the preempted data and the resource information, the configuration according to the radio propagation environment or the load state is possible. Thus, the uplink communication quality can be improved, and the use efficiency of the resource can be increased.

The gNB notifies in advance, using the PDCCH 6001, the UE of the method for transmitting data when the data is preempted, and the resource information.

When determining to preferentially transmit the URLLC data, the UE transmits the URLLC data with a resource 6003 allocated using the configured grant on the non-SUL. When the transmission timing of the URLLC data overlaps with that of the resource 6005 on the SUL which has been UL granted earlier for the eMBB data, the UE transmits the eMBB data according to the preconfigured transmission method and the resource information.

Suppose herein that the method for transmitting the preempted data is shifting the preempted data on the same UL carrier and the resource information for the transmission indicates a slot shifted by two slots behind. The UE transmits the eMBB data with a resource 6006 obtained by shifting the resource 6005 by two slots behind.

This enables preferential transmission of the URLLC data with the timing of the resource 6005 which has been allocated earlier using the configured grant. Furthermore, the preempted eMBB data can also be transmitted in the resource 6006 in the subsequent slot.

FIG. 52 illustrates one example method for performing preemption when the configured grant is established. The configured grant is established for the URLLC data on the non-SUL.

Resources 6102, 6103, and 6104 for the URLLC data are periodically allocated using the configured grant. The gNB transmits the grant for the eMBB data to the UE using a PDCCH 6101. The gNB notifies in advance, using the PDCCH 6101, the UE of the method for transmitting data when the data is preempted, and the resource information.

The URLLC data is generated before a resource 6103 on the non-SUL which is allocated using the grant for the eMBB data.

When determining to preferentially transmit the URLLC data, the UE transmits the URLLC data with the resource 6103 allocated using the configured grant on the non-SUL. The UE transmits the eMBB data according to the preconfigured transmission method and the resource information. Suppose herein that the method for transmitting the preempted data is shifting the preempted data to a different UL carrier and the resource information for the transmission indicates a slot whose offset is 0. The UE switches the UL carrier from the resource 6103 on the non-SUL to a resource 6105 on the SUL, and transmits the eMBB data with the resource 6105 on the SUL.

As such, enabling preemption with a resource allocated using the configured grant enables earlier allocation of data in the dynamic scheduling to the resource.

Furthermore, enabling preemption with the resource allocated using the configured grant enables earlier allocation of data with a lower priority to the resource.

Thus, the resource allocated using the configured grant need not be reserved for data with a higher priority. Consequently, the use efficiency of the resource can be increased while the low latency characteristics are produced.

FIG. 53 illustrates one example method for performing preemption when the configured grant is established. The configured grant is established for the URLLC data on the non-SUL.

Resources 6202, 6203, and 6204 for the URLLC data are periodically allocated using the configured grant. The gNB transmits the grant for the eMBB data to the UE using a PDCCH 6201. The gNB notifies in advance, using the PDCCH 6201, the UE of the method for transmitting data when the data is preempted, and the resource information.

The URLLC data is generated before a resource 6205 on the SUL which is allocated using the grant for the eMBB data.

When determining to preferentially transmit the URLLC data, the UE can select whether to transmit the URLLC data with the resource 6203 on the non-SUL that has been allocated using the configured grant or with the resource 6205 on the SUL that has been allocated using the UL grant for the eMBB data. When a plurality of resources are allocated with the same timing, the UE may make selection among the resources. Enabling the UE to make the selection enables selection of the resource to be transmitted in consideration of a state in the UE, for example, the amount of remaining battery power or the location of the UE.

For example, when the amount of remaining battery power is less, the UE determines to perform transmission via the SUL. This can reduce the power consumption. For example, when the location from the base station is far, the UE determines to perform transmission via the SUL. This can improve the communication quality.

Selection of the resource may be statically determined, for example, in a standard. This can reduce the amount of signaling information. Furthermore, the gNB has only to receive one of the resources, which can facilitate the receiving process in the gNB.

Furthermore, the gNB may preconfigure the selection of the resource and notify it to the UE. Resource selection information indicating a result of the selection of the resource may be provided. The gNB notifies the UE of the resource selection information. The method for notifying the priority of a service, the priority of data, the method for transmitting the preempted data, or resource information for the transmission may be applied to the notification of the resource selection information.

The gNB selects a resource and configures it for the UE, which enables, for example, a configuration in consideration of the uplink communication quality from the UE. This can improve the communication quality.

FIG. 53 illustrates that the URLLC data is transmitted with the resource 6205 allocated for the eMBB data. The UE determines to transmit the URLLC data with the resource 6205 on the SUL. The UE transmits the eMBB data according to the preconfigured transmission method and the resource information. FIG. 53 illustrates that the data is shifted by two slots behind and transmitted according to the method for transmitting the preempted data and the resource information for the transmission.

The UE shifts the resource to be used for transmitting the eMBB data from the resource 6205 to a resource 6206 on the SUL and transmit the eMBB data.

When a plurality of resources are allocated with the same timing, enabling the selection among the resources can improve the communication quality of data with a higher priority. Thus, lower latency characteristics can be produced. Moreover, the power consumption can be reduced.

Each of FIGS. 54 to 56 illustrates one example method for performing preemption when the SUL and the non-SUL differ in numerology and the configured grant is established for the URLLC data on the non-SUL. FIGS. 54 to 56 illustrate a case where the SCSs of the non-SUL are longer than those of the SUL, that is, the symbol duration of the non-SUL is shorter than that of the SUL.

FIG. 54 illustrates that the eMBB data UL-granted on the SUL is preempted, shifted by two slots behind, and transmitted. Since the preemption method in FIG. 54 is identical to that in FIG. 51, the description is omitted. Elements 6301 to 6306 in FIG. 54 correspond to the elements 6001 to 6006 in FIG. 51, respectively.

FIG. 55 illustrates that the eMBB data UL-granted on the non-SUL is preempted, switched to the SUL that is a different UL carrier, and transmitted. The offset value is −3 slots. The offset value may be included in the resource information.

Data with a lower priority in the dynamic scheduling is allocated earlier to the resource allocated using the configured grant. When data with a higher priority is generated, preempting the data with a lower priority which has been allocated earlier enables transmission of the data with a higher priority with low latency. Since the preemption method in FIG. 55 is identical to that in FIG. 52, the description is omitted. Elements 6401 to 6405 in FIG. 55 correspond to the elements 6101 to 6105 in FIG. 52, respectively.

FIG. 56 illustrates that the eMBB data UL-granted on the SUL is preempted, shifted by two slots behind, and transmitted. FIG. 56 illustrates a case where a plurality of resources 6503 and 6505 are allocated with the same timing. The UE determines to transmit the URLLC data with the resource 6505 on the SUL, for example, in a standard, according to determination by the UE, or according to a notification from the gNB.

Since the preemption method in FIG. 56 is identical to that in FIG. 53, the description is omitted. Elements 6501 to 6506 in FIG. 56 correspond to the elements 6201 to 6206 in FIG. 53, respectively.

This enables preferential transmission of the URLLC data even when the configured grant is established for the URLLC data. Thus, the URLLC data can be transmitted with low latency.

The Fifth Embodiment

In a beam failure recovery request (Beam Failure Recovery Request; hereinafter also referred to as a BFRQ in some cases) using the PUCCH, transmission may be performed using an SR PUCCH. As another example, a beam measurement result report PUCCH may be used. The base station may perform configuration of a BFRQ PUCCH to the UE. For the configuration, for example, RRC signaling may be used.

However, in the BFRQ using the PUCCH, details of RRC signaling used for configuration of the PUCCH are not disclosed, and a PUCCH format for transmitting the BFRQ is not disclosed. As a result, the UE cannot notify the base station of the BFRQ by using the PUCCH. Further, in the BFRQ PUCCH, how to secure reliability is not disclosed. As a result, reliability in the BFRQ notification from the UE to the base station cannot be secured.

Solutions to the above problems are disclosed below.

The UE transmits the BFRQ PUCCH by using a predetermined sequence. Application of the predetermined sequence may be, for example, performed when only information related to presence/absence of beam failure occurrence is included as BFRQ information, for example. The predetermined sequence may be, for example, a ZC sequence. In this manner, for example, the base station can promptly detect the PUCCH. In the BFRQ PUCCH, a parameter related to a sequence, for example, a root index and/or a cyclic shift amount, may be different from that of an SR PUCCH and/or ACK/NACK PUCCH sequence. Alternatively, in the BFRQ PUCCH, the parameter may be the same as that of the SR PUCCH and/or ACK/NACK PUCCH. When the parameter is the same as that of the SR PUCCH and/or ACK/NACK PUCCH, BFRQ PUCCH frequency and/or time resources may be different from those of the ACK/NACK PUCCH. In the base station, the BFRQ PUCCH and the SR PUCCH and/or ACK/NACK PUCCH can be distinguished.

As another example, the UE may perform transmission by using PSK and/or QAM modulation (hereinafter also referred to as PSK/QAM modulation in some cases) for the BFRQ PUCCH. PSK may be BPSK, QPSK, or another PSK scheme. QAM may be 16 QAM, 64 QAM, 256 QAM, or another QAM scheme. The same may hereinafter hold true regarding PSK and QAM. Application of PSK/QAM modulation may be, for example, performed when the BFRQ includes a plurality of bits, for example, when the BFRQ includes information related to a beam to be described later.

The UE may transmit the BFRQ PUCCH subjected to PSK/QAM modulation together with the DMRS. The UE may subject the BFRQ PUCCH and the DMRS to frequency multiplexing or time multiplexing.

The UE may transmit the BFRQ PUCCH as a short PUCCH. For example, an effect of frequency diversity can be achieved. Transmission as a long PUCCH is also possible. For example, an effect of time diversity can be achieved.

FIG. 57 is a diagram illustrating a BFRQ PUCCH format. FIG. 57 illustrates an example of using PSK/QAM modulation as a BFRQ PUCCH modulation scheme. Further, FIG. 57 illustrates an example of using a short PUCCH of one symbol as the PUCCH.

In FIG. 57, BFRQ information is subjected to PSK/QAM modulation and is mapped to a PUCCH 1601. For demodulation of the PUCCH 1601, a DMRS 1602 is subjected to frequency multiplexing with the same symbol as the PUCCH 1601 and is mapped.

FIG. 57 illustrates an example of using a short PUCCH of one symbol. However, a short PUCCH of two or more symbols or a long PUCCH may be used. Further, an example in which the DMRS 1602 and the PUCCH 1601 are subjected to FDM is illustrated. However, TDM may be used.

The BFRQ PUCCH may include information related to presence/absence of the BFRQ. For example, the UE may use the BFRQ by transmitting the PUCCH, or the UE may not use the BFRQ by not transmitting the PUCCH. As another example, the UE may use different sequences used for the BFRQ PUCCH, depending on presence/absence of the BFRQ. As another example, an identifier indicating presence/absence of the BFRQ may be included in the PUCCH. As another example, the PUCCH modulation scheme may be different depending on presence/absence of the BFRQ. For example, when the BFRQ is used, the PUCCH may use PSK and/or QAM modulation, whereas when the BFRQ is not used, the PUCCH may include a predetermined sequence (for example, a ZC sequence).

The BFRQ PUCCH may include information related to a beam of beam failure. For example, a downlink beam identifier may be included, or information related to a measurement result of the downlink beam by the UE may be included. The base station may, for example, increase transmit power of the downlink beam by using the information related to the measurement result. In this manner, for example, prompt recovery of the beam in the UE is enabled.

The BFRQ PUCCH may include information related to a beam measured by the UE. For example, a downlink beam identifier may be included, or information related to a measurement result of the downlink beam by the UE may be included. Beam information included in the information may be, for example, beam information whose measurement result of the UE is equal to or greater than a predetermined threshold. The threshold may be defined in a standard in advance, or may be broadcast or individually notified to the UEs from the base station in advance. Beam information included in the information may be information related to a plurality of beams. The base station may use the information for downlink beam recovery. In this manner, for example, prompt recovery from beam failure in the UE is enabled.

Configuration necessary for BFRQ PUCCH transmission from the UE may be defined in a standard. In this manner, for example, the signaling amount required for configuration can be reduced. As another example, the information may be broadcast or individually notified to the UEs from the base station in advance. For the individual notification, for example, RRC signaling may be used. The RRC signaling may be, for example, RRC connection reconfiguration (RRCConnectionReconfiguration). In this manner, for example, flexible control using a use state in the UE, another UE, and another base station in the communication system is enabled. As another example, the information may be notified from the base station to the UE by using MAC signaling, or may be notified from the base station to the UE by using L1/L2 signaling. In this manner, for example, the information can be promptly notified to the UE. For the configuration, the above-mentioned combination may be used. For example, the use of sequence modulation for the PUCCH may be defined in a standard, and information related to the sequence may be individually notified from the base station to the UE.

As configuration necessary for BFRQ PUCCH transmission from the UE, the following items (1) to (4) are disclosed.

(1) Information related to PUCCH transmission resources
(2) Information related to a modulation scheme
(3) Information related to a notification from the UE
(4) Combination of the above-mentioned items (1) to (3)

The above-mentioned item (1) may, for example, include information related to BFRQ PUCCH transmission timing. The information may include information related to a BFRQ PUCCH transmission cycle and offset, or may include information related to the number of transmission symbols. The above-mentioned item (1) may include information related to PUCCH frequency resources, or may include information indicating whether the PUCCH is a long PUCCH or a short PUCCH.

The above-mentioned item (2) may be, for example, modulation using PSK and/or QAM, or may be modulation using a sequence (for example, a ZC sequence).

In the above-mentioned item (2), regarding modulation using PSK and/or QAM, information related to the DMRS may be included. The information related to the DMRS may, for example, include information related to a root index of the DMRS, or may include information related to a cyclic shift amount of the DMRS. Information related to a multiplexing scheme for the DMRS and the PUCCH may be included. The multiplexing scheme may be, for example, FDM or TDM.

In the above-mentioned item (2), regarding modulation using a sequence, the information related to a root index of a sequence, or the information related to a cyclic shift amount of a sequence may be included.

The above-mentioned item (3) may, for example, include information related to presence/absence of a notification of information related to a beam. The beam may be a beam of beam failure, may be a beam measured by the UE, or may be both of the above.

The above-mentioned item (3) may include information related to a signal used by the UE in beam measurement. Possible examples include a CSI-RS, a synchronization signal (SS), and both of the above.

The above-mentioned item (3) may include information related to presence/absence of a measurement result notification.

A part or all of the information related to the above-mentioned items (1) to (4) may be defined in a standard in advance. In this manner, for example, the signaling amount in the notification from the base station to the UE can be reduced.

The UE may notify of the BFRQ at the first BFRQ PUCCH transmission timing after beam failure detection. In this manner, for example, the UE can promptly notify the base station of the BFRQ. As another example, the UE may notify of the BFRQ at the first BFRQ PUCCH transmission timing after new beam detection. In this manner, for example, prompt recovery from the beam failure is enabled.

Other solutions are disclosed. The UE may transmit the BFRQ by using an SR PUCCH. Information of the SR and the BFRQ may be multiplexed on the same PUCCH. In multiplexing of the SR and the BFRQ, the BFRQ may not include information of a beam. For example, as the information of the BFRQ, only an identifier indicating that beam failure has occurred may be used.

A predetermined sequence may be used in the PUCCH to be multiplexed. Application of the predetermined sequence may be, for example, performed when only information related to presence/absence of beam failure occurrence is included as BFRQ information, for example. Regarding the predetermined sequence, different sequences may be used in each of the cases where only the SR is present, only the BFRQ is present, and both of the SR and the BFRQ are present. When neither the SR nor the BFRQ is present, the PUCCH may not be transmitted. As the above-mentioned different sequences, for example, a root index of the sequence may be different, a cyclic shift amount (Cyclic shift) may be different, a sequence itself may be different, for example, an m sequence may be used when the BFRQ is present. A plurality of the above may be used in combination. In this manner, for example, the base station can easily acquire the information related to the SR and/or the BFRQ. The base station may acquire the information related to the SR and the information related to the BFRQ, by using a PUCCH sequence.

As another example, PSK/QAM modulation may be used in the PUCCH to be multiplexed. Application of PSK/QAM modulation may be, for example, performed when the BFRQ includes a plurality of bits, for example, when the BFRQ includes information related to a beam. The PUCCH may, for example, include information related to presence/absence of the SR, or may include information related to the BFRQ (for example, presence/absence of the BFRQ, or information related to a beam).

In application of PSK/QAM modulation to the PUCCH to be multiplexed, the UE may multiplex the PUCCH subjected to PSK/QAM modulation and the DMRS and may transmit the multiplexed resultant. The multiplexing may be, for example, FDM or TDM. The base station may determine presence/absence of the BFRQ by using a signal received from the UE. For example, the base station may determine presence/absence of the BFRQ, based on a condition that a QPSK signal and a DMRS signal are subjected to FDM. In this manner, for example, the base station can easily determine presence/absence of the BFRQ.

In application of PSK/QAM modulation to the PUCCH to be multiplexed, the DMRS may include information related to presence/absence of the SR. For example, according to presence/absence of the SR, different DMRS sequences (for example, a root index and cyclic shift) may be used. In this manner, for example, the information amount that can be included in the PUCCH can be increased.

In application of PSK/QAM modulation to the PUCCH to be multiplexed, a PUCCH of another UE may not be transmitted in time/frequency resources in which the PUCCH is transmitted. In this manner, interference with the PUCCH from another UE can be prevented.

As another example, in application of PSK/QAM modulation to the PUCCH to be multiplexed, a PUCCH of another UE may be transmitted in time/frequency resources in which the PUCCH is transmitted. The UE may transmit the PUCCH in a contention-based manner. The UE may retransmit the PUCCH to the base station, based on a condition that beam recovery is not performed within a predetermined time period and/or that an uplink grant is not received from the base station. The above-mentioned predetermined time period may be defined in a standard, or may be broadcast or notified to the UE from the base station in advance. In this manner, multiplexing with a PUCCH of another UE is enabled. As a result, the capacity of the communication system can be increased.

Whether a PUCCH of another UE can be transmitted in the time/frequency resources in which the PUCCH is transmitted described above may be applied to another UCI PUCCH.

In the PUCCH to be multiplexed, both of a predetermined sequence and PSK/QAM modulation may be used. For example, regarding the PUCCH without the BFRQ, i.e., the PUCCH with only the SR, a predetermined sequence may be used, whereas regarding the PUCCH with the BFRQ, PSK/QAM modulation may be used. In a case where neither the SR nor the BFRQ is present, the PUCCH may not be transmitted. In this manner, for example, a conventional SR PUCCH can be continuously used in the communication system, and thus complexity in design in the communication system can be avoided.

As another example of a BFRQ transmission method using the SR PUCCH, a plurality of mapping of the PUCCH may be used. For example, according to presence/absence of the SR, different mapping may be used as mapping of the PUCCH. The PUCCH mapping different according to the SR may be, for example, performed when the BFRQ includes a plurality of bits, for example, when the BFRQ includes information related to a beam. As another example, according to presence/absence of the BFRQ, different mapping may be used as mapping of the PUCCH. The PUCCH mapping different according to presence/absence of the BFRQ may be, for example, performed when the information related to the BFRQ includes only information related to presence/absence of beam failure occurrence. The different mapping may be, for example, mapping that a signal is replaced between symbols or between sub-carriers, or may be a combination of the both. The above-mentioned replacement between symbols may be a replacement between units, with each of the units including a plurality of symbols. The above-mentioned replacement between sub-carriers may be a replacement between units, with each of the units including a plurality of sub-carriers. In this manner, for example, the BFRQ information can be multiplexed without changing a sequence or changing a modulation scheme, and thus complexity in design in the communication system can be avoided.

Information related to the above-mentioned plurality of mapping may be defined in a standard, or may be broadcast or individually notified to the UEs from the base station in advance.

Information included in the PUCCH on which the SR and the BFRQ are multiplexed may include a part or all of the above-mentioned BFRQ information included in the BFRQ PUCCH. The information related to the SR, for example, information related to presence/absence of the SR may be included. For example, when a sequence is used in the PUCCH on which the SR and the BFRQ are multiplexed, the PUCCH may include only information related to presence/absence of the SR and information related to presence/absence of the BFRQ.

In BFRQ transmission using the SR PUCCH, only one of the SR and the BFRQ may be transmitted on one PUCCH. Specifically, either the SR or the BFRQ may be prioritized. In the above description, the PUCCH format may be a conventional SR PUCCH format, or may be the same as the above-mentioned BFRQ PUCCH format. In this manner, for example, complexity in design in the communication system can be avoided.

Regarding assignment of priority between the SR and the BFRQ, for example, UCI to be prioritized may be statically determined in a standard, or may be broadcast or semi-statically notified from the base station to the UE. The semi-static notification may be, for example, RRC dedicated signaling. Alternatively, the notification may be dynamical notification from the base station to the UE by using MAC signaling or L1/L2 signaling.

As another example of the assignment of priority, UCI that is generated first in the UE may be prioritized, or as another example, UCI that is not transmitted on the PUCCH in the immediately preceding transmission may be prioritized.

Configuration necessary for BFRQ transmission using the SR PUCCH may be defined in a standard, or may be broadcast or individually notified to the UEs from the base station in advance, in a similar manner to the configuration necessary for BFRQ PUCCH transmission.

In notification of the configuration from the base station to the UE using RRC dedicated signaling, the configuration details may be, for example, included in configuration details of the SR. In this manner, for example, the base station can notify the UE of SR configuration and BFRQ configuration at the same time, and thus configuration processing in the UE can be promptly performed.

As the configuration necessary for BFRQ transmission using the SR PUCCH, the following items (1) to (6) are disclosed.

(1) Information related to PUCCH transmission resources
(2) Information related to a modulation scheme
(3) Information related to a notification from the UE
(4) Information related to multiplexing of the SR and the BFRQ
(5) Information related to PUCCH mapping
(6) Combination of the above-mentioned items (1) to (5)

The above-mentioned item (1) may be similar to the item (1) of the configuration necessary for BFRQ PUCCH transmission.

In the above-mentioned item (1), information related to the PUCCH transmission timing may be the same as information related to SR transmission timing. PUCCH scheduling in the base station is facilitated.

The above-mentioned item (2) may be similar to the item (2) of the configuration necessary for BFRQ PUCCH transmission.

In the above-mentioned item (2), information related to the DMRS in modulation using PSK and/or QAM may include information of a DMRS sequence in each of a case where the SR is present and a case where the SR is absent. Information related to a difference between DMRS sequences (for example, a root index and a cyclic shift amount) of the case where the SR is present and the case where the SR is absent may be included.

Regarding modulation using a sequence, the above-mentioned item (2) may include information of a sequence in each of the cases where only the SR is present, only the BFRQ is present, and both of the SR and the BFRQ are present. Information related to a difference of sequences among the above-mentioned three items may be included.

The above-mentioned item (3) may include information similar to the item (3) of the configuration necessary for BFRQ PUCCH transmission, or may include information related to SR notification.

The above-mentioned item (4) may, for example, include information related to whether the SR and the BFRQ can be multiplexed on one PUCCH. If the multiplexing is not possible, the information may be information indicating which of the PUCCH and the SR is prioritized.

The above-mentioned item (5) may, for example, include information related to whether the above-mentioned different mapping of the PUCCH can be supported, may include information indicating whether a signal is replaced between symbols or between sub-carriers, or may include information related to the number of symbols and/or sub-carriers to be included as a unit.

The UE may detect a downlink communication beam. The detection may be performed after beam failure detection in the UE. A signal used for beam detection in the UE may be defined in a standard in advance, or may be broadcast or individually notified to the UEs from the base station. The signal may be, for example, a CSI-RS or a synchronization signal (SS). As another example, the UE may not perform the downlink communication beam detection operation.

The transmission timing of the PUCCH to be transmitted from the UE to the base station, for example, the cycle and the offset, may be the same regardless of the presence/absence of the BFRQ. In this manner, the base station can detect the BFRQ, based on reception of the PUCCH.

The UE may notify of the BFRQ at the first SR PUCCH transmission timing after beam failure detection. In this manner, for example, the UE can promptly notify the base station of the BFRQ. As another example, the UE may notify of the BFRQ at the first SR PUCCH transmission timing after new beam detection. In this manner, for example, prompt recovery from the beam failure is enabled.

The base station may change a downlink beam for the UE by using the BFRQ. The base station may also transmit the CSI-RS to another beam by using the BFRQ. The mapping of the CSI-RS in another beam may be the same as that of the original beam. In this manner, for example, the UE can detect another beam with the same mapping as the original beam. As a result, the UE can promptly perform beam detection for recovery from the beam failure.

Other solutions are disclosed. The UE may transmit the BFRQ by using a beam measurement result report PUCCH. Specifically, the UE may include BFRQ information in a beam measurement result report. The PUCCH may be a PUCCH used to report a synchronization signal (SS) measurement result to the base station. The PUCCH may be newly provided.

The BFRQ information to be included in the beam measurement result report may include information related to presence/absence of the BFRQ (for example, a flag indicating presence/absence of the BFRQ), may include information using a beam identifier, or may include information related to the beam measurement result. As the information using a beam identifier, for example, the BFRQ may be associated with a state that the beam identifier is a predetermined special value (for example, all the bits are '0' or all the bits are '1'). As the information related to the beam measurement result, for example, the BFRQ may be associated with a state that the measurement result is equal to or less than a predetermined threshold. As another example, the BFRQ may be associated with a state that the measurement result is a predetermined special value (for example, all the bits are '0' or all the bits are '1'). In this manner, for example, the information of presence/absence of the BFRQ and the information of the beam measurement result report can be used in common. As a result, complexity in design of the UE and the base station concerning the BFRQ can be avoided.

The beam identifier and/or beam measurement result included in the BFRQ information to be included in the beam measurement result report PUCCH may be a CSI-RS beam identifier and/or beam measurement result. In this manner, for example, the base station can promptly perform recovery from the beam failure by using the information related to the CSI-RS beam.

Alternatively, the BFRQ information to be included in the beam measurement result report PUCCH may be only the information related to presence/absence of the BFRQ. The base station may perform recovery operation from the beam failure by using the information related to the beam included in the beam measurement result report. In this manner, for example, the signaling amount of the beam measurement result report PUCCH included in the BFRQ can be prevented from increasing.

As another example, the DMRS in the beam measurement result report PUCCH may be changed by using the BFRQ information. The change may be, for example, a change of the DMRS sequence. The sequence change may be, for example, a root index change, a cyclic shift amount change, or a combination of the both. In this manner, for example, the UE can promptly notify the base station of the PUCCH including the BFRQ.

As another example, the beam measurement result information may not be included in the beam measurement result report PUCCH. The PUCCH may include only information related to the BFRQ. The information related to the BFRQ may be similar to that of the above-mentioned case where the BFRQ information is multiplexed on the beam measurement result report PUCCH.

When the PUCCH includes only information related to the BFRQ, modulation using a sequence may be performed. The modulation using a sequence may be, for example, performed in a similar manner to that of the SR PUCCH. In this manner, for example, the base station can promptly detect the BFRQ.

As another example of a BFRQ transmission method using the SR PUCCH, a plurality of mapping of the PUCCH may be used. The above-mentioned plurality of mapping may be similar to that in the BFRQ transmission method using the SR PUCCH. For example, according to presence/absence of the BFRQ, different mapping may be used as PUCCH mapping. The PUCCH mapping different according to presence/absence of the BFRQ may be, for example, performed when the information related to the BFRQ includes only information related to presence/absence of beam failure occurrence.

Configuration necessary for BFRQ transmission using the beam measurement result report PUCCH may be defined in a standard in advance, or may be broadcast or individually notified from the base station to the UEs, in a similar manner to the above-mentioned configuration necessary for BFRQ transmission using the SR PUCCH. For the individual notification, for example, RRC signaling may be used, MAC signaling may be used, or L1/L2 signaling may be used. In this manner, for example, an effect similar to that of multiplexing of the SR and the BFRQ can be achieved.

As the above-mentioned configuration necessary for BFRQ transmission using the beam measurement result report PUCCH, the following items (1) to (6) are disclosed.
  (1) Information related to PUCCH transmission resources
  (2) Information related to a modulation scheme
  (3) Information related to a notification from the UE
  (4) Information related to multiplexing of the beam measurement result and the BFRQ
  (5) Information related to PUCCH mapping
  (6) Combination of the above-mentioned items (1) to (5)

The above-mentioned item (1) may be similar to the item (1) of the configuration necessary for BFRQ transmission using the SR PUCCH. Information related to the beam measurement result report PUCCH transmission timing including the BFRQ may be the same as information related to beam measurement result report transmission timing. PUCCH scheduling in the base station is facilitated.

The above-mentioned item (2) may be similar to the item (2) of the configuration necessary for BFRQ transmission using the SR PUCCH.

In the above-mentioned item (2), information related to the DMRS in modulation using PSK and/or QAM may include information of a DMRS sequence in each of a case where the BFRQ is present and a case where the BFRQ is absent. Information related to a difference between DMRS sequences (for example, a root index and a cyclic shift amount) of the case where the BFRQ is present and the case where the BFRQ is absent may be included.

Regarding modulation using a sequence, the above-mentioned item (2) may include information of a sequence of a case where only the BFRQ is present.

The above-mentioned item (3) may be similar to the item (3) of the configuration necessary for BFRQ transmission using the SR PUCCH. Information related to the beam measurement result report may be included.

The above-mentioned item (4) may be similar to the item (4) of the configuration necessary for BFRQ transmission using the SR PUCCH.

The above-mentioned item (5) may be similar to the item (5) of the configuration necessary for BFRQ transmission using the SR PUCCH.

Operation of the UE in BFRQ transmission using the beam measurement result report PUCCH may be similar to the operation of the UE in BFRQ transmission using the SR PUCCH. The same may hold true for the operation of the base station.

The beam measurement result report PUCCH according to the fifth embodiment may be periodic, semi-persistent, or aperiodic. For example, the UE may notify of the BFRQ at the first beam measurement result report PUCCH transmission timing after beam failure detection. In this manner, for example, the UE can promptly notify the base station of the BFRQ. As another example, the UE may notify of the BFRQ at the first beam measurement result report PUCCH transmission timing after new beam detection. In this manner, for example, prompt recovery from the beam failure is enabled.

The beam measurement result report PUCCH according to the fifth embodiment may be a CSI PUCCH. The UE may transmit the BFRQ by using the CSI PUCCH. In BFRQ transmission using the CSI PUCCH, a method similar to the BFRQ transmission method using the beam measurement result report PUCCH may be used. In this manner, an effect similar to that of multiplexing of the beam measurement result and the BFRQ can be achieved.

In the fifth embodiment, another piece of UCI and the BFRQ may be multiplexed. Another piece of UCI may be, for example, an Ack/Nack. For BFRQ transmission using an Ack/Nack PUCCH, a method similar to that for the BFRQ using the SR PUCCH may be used, or a method similar to that of BFRQ transmission using the beam measurement result report PUCCH may be used. In this manner, for example, flexible configuration concerning the PUCCH is enabled.

The BFRQ transmission using respective UCI PUCCHs disclosed in the fifth embodiment may be combined. The above-mentioned PUCCH may be periodic, semi-persistent, or aperiodic. A plurality of PUCCHs among the periodic PUCCH, the semi-persistent PUCCH, and the aperiodic PUCCH may be combined together. For example, the UE may notify of the BFRQ at the first PUCCH transmission timing regardless of UCI. In this manner, for example, prompt notification from the UE to the base station is enabled.

In beam failure determination in the base station, the PUCCH including the BFRQ disclosed in the fifth embodiment may not be used. The base station may determine beam failure in the UE by using a reception condition depending on a type of PUCCH transmission timing from the UE. The type of PUCCH transmission timing may be a periodic PUCCH, a semi-persistent PUCCH, or an aperiodic PUCCH. For example, the base station may determine beam failure in the UE when the base station cannot receive the aperiodic PUCCH from the UE while receiving the periodic PUCCH from the UE. As another example, the base station may determine beam failure in the UE when the base station cannot receive the aperiodic PUCCH from the UE. In the above description, information related to presence/absence of reception of a plurality of PUCCHs may be used. For example, the base station may determine beam failure in the UE when the base station cannot receive the aperiodic PUCCH a predetermined number of times or more consecutively. In the above description, the base station may determine that the base station cannot receive the PUCCH, based on a fact that received quality of the PUCCH in the base station falls below predetermined quality. In this manner, for example, the signaling amount in the radio interface can be reduced.

The base station may transmit the PDCCH to the UE by using information related to a beam included in the BFRQ. In the PDCCH transmission, the base station may use a beam acquired from the information. After BFRQ transmission, the UE may detect the PDCCH within a range of a predetermined time window. In this manner, for example, recovery from the beam failure can be promptly performed.

The UE may transmit the PUCCH including the BFRQ by using a plurality of beams. The PUCCH may be a BFRQ PUCCH, an SR PUCCH, a beam measurement result report PUCCH, or another UCI PUCCH. In this manner, for example, reliability of BFRQ notification from the UE can be secured. As another example, the UE may transmit the PUCCH including the BFRQ a plurality of times. The plurality of times of transmission may be, for example, transmission of the same PUCCH by using different symbols, transmission of the same PUCCH by using different slots, or may be transmission of the same PUCCH in PUCCH transmission cycle of respective pieces of UCI. In this manner, for example, reliability of BFRQ notification from the UE can be enhanced.

As another example, the UE may transmit the PUCCH including the BFRQ as a long PUCCH. The PUCCH may be a BFRQ PUCCH, an SR PUCCH, a beam measurement result report PUCCH, or another UCI PUCCH. In this manner, for example, time diversity can be secured. As another example, the UE may transmit the PUCCH as a short PUCCH. Frequency diversity can be secured. As another example, the UE may use the PUCCH by combining a short PUCCH and a long PUCCH. Time and frequency diversity can be secured. The combination of a short PUCCH and a long PUCCH may be, for example, equivalent to a state that the UE uses both a short PUCCH and a long PUCCH in the same slot.

The base station may give an instruction to the UE beforehand as to in which method the PUCCH is to be transmitted, among a short PUCCH, a long PUCCH, and both of a short PUCCH and a long PUCCH. For the instruction, for example, RRC dedicated signaling may be used, MAC signaling may be used, or L1/L2 signaling may be used.

According to the fifth embodiment, the UE can transmit the BFRQ by using the PUCCH. Further, the UE can promptly recover from the beam failure.

The Sixth Embodiment

One of the SUL and the SUL is configured as a UL carrier for transmitting the PUCCH, in the UE in which the SUL is configured in NR. Here, the UL carrier is referred to as a PUCCH UL carrier. When the PUSCH and the PUCCH overlap in transmission timing, piggybacking the PUSCH has been discussed. Furthermore, mapping the BFRQ to the PUCCH to transmit the BFRQ in NR has been discussed.

Enabling the earlier beam recovery requires enabling earlier transmission of the BFRQ. Transmission of the BFRQ using the PUCCH that is a L1 control channel has been discussed to enable the earlier transmission of the BFRQ. However, the use of the UL frequency existing in the same frequency band as that of the DL frequency sometimes degrades the communication quality in the UL along with the degradation of the communication quality in the DL. The degradation of the communication quality in the UL causes a problem in the gNB failing to receive the BFRQ even when the UE transmits the BFRQ. Thus, the challenge is to improve the communication quality in transmitting the BFRQ.

The sixth embodiment discloses a method for solving such a problem.

The BFRQ is transmitted via the SUL. The transmission of the BFRQ via the SUL should be enabled. The transmission of the PUCCH for the BFRQ via the SUL is enabled. The PUCCH for the BFRQ is configured via the SUL. When the coverage of the SUL for enabling the UL transmission is wider than that of the non-SUL, the transmission of the BFRQ via the SUL can improve the communication quality of the BFRQ. Thus, the BFRQ can be notified to the gNB earlier.

Even when the non-SUL is configured as the PUCCH UL carrier, the BFRQ may be transmitted via the SUL. Transmission of the PUCCH for BFRQ should be enabled via a UL carrier with a different configuration from that of the PUCCH UL carrier. The PUCCH for BFRQ is configured via the UL carrier with the different configuration from that of the PUCCH UL carrier.

The BFRQ may be transmitted via both of the UL carriers of the SUL and the non-SUL. Transmission of the PUCCH for BFRQ should be enabled via both of the UL carriers of the SUL and the non-SUL. The PUCCH for BFRQ is configured via both of the UL carriers of the SUL and the non-SUL.

The BFRQ is transmitted when the communication quality of a beam in the DL is degraded. Thus, the PUCCH resource that does not need a dynamic trigger in the DL should be periodically configured for the PUCCH for BFRQ. The PUCCH resource for BFRQ should be periodically configured via the RRC signaling. The gNB should notify the UE of the PUCCH resource for periodic BFRQ via the RRC signaling.

The configuration and release of the PUCCH resource for BFRQ may be provided as the RRC signaling. Alternatively, configuration and release information may be provided as the configuration information of the PUCCH resource for BFRQ. Alternatively, activation/deactivation information may be provided as the configuration information of the PUCCH resource for BFRQ. The UE configures the PUCCH resource for BFRQ with the configuration or the activation, and releases the PUCCH resource for BFRQ with the release or the deactivation.

As such, the PUCCH resource for BFRQ can be configured without using the dynamic trigger in the DL.

The PUCCH resource may be semi-persistently configured as a method for configuring the PUCCH resource for BFRQ. The activation/deactivation may be included in the DCI for notifying it with the PDCCH as a method for semi-persistently configuring the PUCCH resource. The gNB may determine the activation/deactivation for the UE according to the communication quality in the DL.

For example, a threshold for the communication quality for BFRQ is provided. In this case, a value representing the communication quality higher than that disabling the communication in the DL should be provided as the threshold. While the communication in the DL is possible, the gNB can notify the UE of the activation/deactivation.

Furthermore, a period for measuring the communication quality for BFRQ may be provided. For example, the gNB notifies the UE of the activation of the PUCCH for BFRQ when the communication quality is lower than or equal to the threshold for the communication quality for BFRQ during the period for measuring the communication quality for BFRQ. The gNB notifies the UE of the deactivation of the PUCCH for BFRQ when the communication quality exceeds the threshold for the communication quality for BFRQ during the period for measuring the communication quality for BFRQ.

In the semi-persistent PUCCH for BFRQ, the allocated resource may be held during the activation, and released during the deactivation. Since the resource for BFRQ need not be held when the communication quality in the DL is superior, the resource can be used for another UL communication. The use efficiency of the resource can be increased.

Although inclusion of the activation/deactivation in the DCI is disclosed as a method for semi-persistently configuring the PUCCH for BFRQ, allocation of the PUCCH resource may be notified together with the activation. Furthermore, the scheduling information may be notified together with the activation. This enables, for each activation, allocation of the PUCCH resource for BFRQ or change in the scheduling information.

Since the configuration can be changed in the time axis direction in comparison with periodic configuration of the PUCCH for BFRQ, the configuration corresponding to the time fluctuations in the radio propagation environment is possible. This can improve the communication quality of the PUCCH for BFRQ.

The PUCCH resource for BFRQ may be configured for each UE or for each plurality of UEs (each UE group). The CDM may be used as a multiplexing method between the UEs. The gNB should include a code dedicated to each UE in the configuration information of the PUCCH for BFRQ to notify the UE of the code. Since the resource need not be reserved dedicatedly in each UE, the use efficiency of the resource can be increased.

The PUCCH for BFRQ may be a short PUCCH consisting of a smaller number of symbols. Furthermore, the PUCCH for BFRQ may be a long PUCCH consisting of a larger number of symbols. The gNB may include beam measurement information in the UCI to notify the information using the PUCCH for BFRQ.

The UE may determine whether to transmit the BFRQ using the PUCCH for BFRQ on the SUL or on the non-SUL. The UE may transmit the BFRQ with an arbitrary timing of the PUCCH for BFRQ.

For example, the UE may assign priorities and determine whether to transmit the BFRQ using the PUCCH for BFRQ on the SUL or on the non-SUL, according to the priorities. For example, the UE prioritizes the use of the PUCCH for BFRQ on the SUL whose operation is assumed to widen the coverage more than that on the non-SUL. When detecting a beam failure, the UE first transmits the BFRQ to the gNB, using the PUCCH resource for BFRQ configured on the SUL. When failing to receive, from the gNB, a signal after transmitting the BFRQ, the UE transmits the BFRQ to the gNB, using the PUCCH resource for BFRQ configured on the non-SUL.

A timer for measuring the time from transmission of the BFRQ to reception of a signal after transmitting the BFRQ may be provided. The timer is started upon transmission of the BFRQ, and is stopped upon receipt of the BFRQ transmission signal. Upon expiration of the timer without receiving the BFRQ transmission signal, the BFRQ may be retransmitted. The maximum number of retransmissions of the BFRQ may be provided.

The gNB may configure the timer for BFRQ or the maximum number of retransmissions of the BFRQ and notify it to the UE. The gNB may give the notification via the RRC signaling. Alternatively, the timer for BFRQ or the maximum number of retransmissions of the BFRQ may be statically determined, for example, in a standard. This can reduce the amount of information to be signaled.

Examples of the other determination methods by the UE may include transmitting the BFRQ using the PUCCH resource for BFRQ which arrives earlier after detection of a beam failure and after configuration of the BFRQ. When the timing of the PUCCH resource for BFRQ configured on the non-SUL is earlier after the UE configures the BFRQ, the UE transmits the BFRQ using the PUCCH resource for BFRQ configured on the non-SUL.

For example, upon expiration of the timer without receiving the BFRQ transmission signal after transmitting the BFRQ, the UE may retransmit the BFRQ with the timing of the PUCCH resource for BFRQ which arrives the next earliest. For example, when the PUCCH resource for BFRQ which arrives the next earliest is the PUCCH resource for BFRQ configured on the SUL, the UE transmits the BFRQ using the PUCCH resource for BFRQ configured on the SUL.

This can reduce the latency until transmission of the BFRQ. Since the BFRQ can be transmitted with low latency, earlier recovery from the beam failure is possible.

The UE may transmit the BFRQ consecutively a plurality of times. The number of consecutive transmissions may be determined by the UE, or determined and notified to the UE by the gNB. Alternatively, the number of consecutive transmissions may be statically determined, for example, in a standard. For example, the UE may transmit the BFRQ a plurality of times using the PUCCH resource for BFRQ which arrives earlier after detection of a beam failure and after configuration of the BFRQ. The UE can transmit the BFRQ with lower latency by transmitting the BFRQ consecutively a plurality of times, before receiving the BFRQ transmission signal or regardless of the presence or absence of receiving the signal. Furthermore, earlier recovery from the beam failure is possible.

A method for configuring the UL carrier when the BFRQ is transmitted consecutively a plurality of times is disclosed. The PUCCH resource for BFRQ on the UL carrier whose timing of the PUCCH resource for BFRQ arrives earlier is used.

Suppose that, for example, the number of times the BFRQ is consecutively transmitted is configured as three, the PUCCH for BFRQ that arrives the earliest is configured on the SUL, the PUCCH for BFRQ that arrives the second earliest is configured on the SUL, and the PUCCH for BFRQ that arrives the third earliest is configured on the non-SUL. In this case, the UE transmits the BFRQ for the first time using the PUCCH for BFRQ on the SUL which arrives the earliest, transmits the BFRQ for the second time using the PUCCH for BFRQ on the SUL which arrives the second earliest, and transmits the BFRQ for the third time using the PUCCH for BFRQ on the non-SUL which arrives the third earliest.

When the UE transmits the BFRQ consecutively a plurality of times, patterns of the UL carriers via which the BFRQ is transmitted may be predetermined. The UE may alternately transmit the BFRQs on different UL carriers, for example, transmit the first BFRQ via the SUL and transmit the second BFRQ via the non-SUL. This can produce advantages identical to those by the frequency hopping. The use of different frequencies can increase a probability of transmission of the BFRQ.

The UE may retransmit the BFRQ consecutively a plurality of times. The same methods as previously described are applicable. This enables the earlier beam recovery.

The gNB may determine whether the BFRQ is transmitted using the PUCCH for BFRQ on the SUL or on the non-SUL. The gNB notifies the UE of which one of the PUCCH resources for BFRQ is used to transmit the BFRQ. When the UE transmits the BFRQ consecutively a plurality of times, the gNB may determine the pattern of the UL carrier via which the BFRQ is transmitted and notify it to the UE. This applies to the retransmission of the BFRQ.

The UL carrier information for transmitting the PUCCH for BFRQ may be provided. The gNB notifies the UE of the information. The gNB may notify the UE via the RRC signaling. The gNB may include the UL carrier information in the DCI upon activation to notify the information. Furthermore, the UL carrier for transmitting the BFRQ may be changed. When the UL carrier is changed, the gNB may include the UL carrier information in the RRC signaling to notify the UE of the information. When the UL carrier is changed, the gNB may include the UL carrier information also in the DCI to notify the UE of the information.

Consequently, the gNB can configure, in the UE, the UL carrier via which the BFRQ is transmitted. For example, the gNB measures the UL communication quality from the UE, and determines that the SUL is for transmitting the BFRQ when the communication quality of the SUL is superior to that on the non-SUL. Then, the gNB notifies the UE to use the PUCCH resource for BFRQ on the SUL. When the communication quality of the non-SUL is superior to that on the SUL, the gNB determines that the non-SUL is for transmitting the BFRQ, and notifies the UE to use the PUCCH resource for BFRQ on the non-SUL.

Consequently, the gNB can configure the UL carrier via which the BFRQ is transmitted, in the UE according to the radio propagation environment. The gNB enables the UE to transmit the BFRQ via the UL carrier with the superior communication quality. Thus, the gNB can receive the BFRQ from the UE earlier. The gNB can perform the recovery from the beam failure earlier for the UE.

The preemption may be prohibited for the PUCCH for BFRQ. Preempting the PUCCH resource for BFRQ may be prohibited. The UE need not assume that the PUCCH resource for BFRQ is preempted. Upon receipt of a preemptive instruction for the PUCCH resource for BFRQ from the gNB, the UE may disregard the preemptive instruction. When the PUCCH resources for BFRQ on the different UL carriers overlap not only in the resource but also in the resource timing, the preemption may be prohibited.

This enables earlier transmission of the BFRQ using the PUCCH for BFRQ upon occurrence of a beam failure. The gNB can receive the BFRQ from the UE earlier. The gNB can perform the recovery from the beam failure earlier for the UE.

FIG. 58 illustrates one example of transmitting the BFRQ with the PUCCH resource for BFRQ configured on the SUL. FIG. 58 illustrates that the PUCCH UL carrier is configured as the non-SUL. The configurable restriction on the UL carrier is removed from the PUCCH for BFRQ. The UL carrier different from the PUCCH UL carrier is configured for the PUCCH for BFRQ. The gNB configures, for the UE, the PUCCHs for BFRQ on the SUL that is the UL carrier different from the PUCCH UL carrier.

Periodic PUCCH resources 7002, 7003, and 7004 are allocated as the PUCCHs for BFRQ. The UE that has failed reception in a slot 7001 in the DL detects a beam failure, and configures transmission of the BFRQ. Here, the use of the PUCCH resources for BFRQ that have been configured on the SUL is determined. The UE transmits the BFRQ using the PUCCH resource 7004 for BFRQ on the SUL.

This enables configuration of the PUCCH resources for BFRQ on the SUL, for example, enables transmission of the BFRQ on the SUL in a frequency band different from that in the DL. This can improve the communication quality of the BFRQ. Thus, the UE can notify the gNB of the BFRQ earlier.

FIG. 59 illustrates one example of configuring the PUCCH resources for BFRQ on both of the non-SUL and the SUL and transmitting the BFRQ. Any one of the non-SUL and the SUL may be configured as the PUCCH UL carrier. The configurable restriction on the UL carrier is removed from the PUCCH for BFRQ. The PUCCHs for BFRQ are configured on both of the UL carriers. The gNB configures, for the UE, the PUCCHs for BFRQ on both of the non-SUL and the SUL.

Periodic PUCCH resources 7102, 7103, and 7104 are allocated as the PUCCHs for BFRQ on the non-SUL. Periodic PUCCH resources 7105, 7106, and 7107 are allocated as the PUCCHs for BFRQ on the SUL. The UE that has failed reception in a slot 7101 in the DL detects a beam failure, and configures transmission of the BFRQ. Here, the UE derives the PUCCH resource for BFRQ that can be transmitted the earliest.

FIG. 59 illustrates that the PUCCH resource 7103 for BFRQ on the non-SUL is too late for configuring the BFRQ and the PUCCH resource 7106 for BFRQ configured on the SUL is the PUCCH resource that can be transmitted the earliest. The UE determines to transmit the BFRQ using the PUCCH resource 7106 for BFRQ on the SUL, and transmits the BFRQ using the PUCCH resource 7106.

Consequently, the PUCCH resources for BFRQ can be configured on both of the UL carriers of the non-SUL and the SUL. Configuring the PUCCH resources for BFRQ on both of the UL carriers enables the UE to transmit the BFRQ using the PUCCH resource for BFRQ with the earliest timing. Thus, the UE can notify the gNB of the BFRQ earlier.

FIG. 60 illustrates one example of configuring the PUCCH resources for BFRQ on both of the non-SUL and the SUL and transmitting the BFRQ. FIG. 60 illustrates a case where the SUL and the non-SUL have different SCSs. FIG. 60 also illustrates that periods are configured so that the PUCCH resources for BFRQ on both of the UL carriers coincide in timing. Any one of the non-SUL and the SUL may be configured as the PUCCH UL carrier. The configurable restriction on the UL carrier is removed from the PUCCHs for BFRQ. The PUCCHs for BFRQ are configured on both of the UL carriers. The gNB configures, for the UE, the PUCCHs for BFRQ on both of the non-SUL and the SUL.

Periodic PUCCH resources 7202, 7203, and 7204 are allocated as the PUCCHs for BFRQ on the non-SUL. Periodic PUCCH resources 7205, 7206, and 7207 are allocated as the PUCCHs for BFRQ on the SUL. The UE that has failed reception in a slot 7201 in the DL detects a beam failure, and configures transmission of the BFRQ. Here, the SUL is predetermined as the UL carrier to be preferentially used for transmitting the BFRQ. Alternatively, the UL carrier with longer SCSs may be determined as the UL carrier to be preferentially used for transmitting the BFRQ.

The UE determines to transmit the BFRQ using the PUCCH resource for BFRQ on the SUL. The UE transmits the BFRQ using the PUCCH resource 7206 for BFRQ on the SUL.

For example, when the SUL is configured at frequencies in a frequency band different from that in the DL, preferential use of the PUCCH resource for BFRQ on the SUL can increase the probability of transmission of the BFRQ. For another example, when the coverage of the SUL is wider than that of the non-SUL, the use of the PUCCH resource for BFRQ on the SUL can increase the probability of transmission of the BFRQ.

For another example, the use of the PUCCH resource for BFRQ configured on one of the non-SUL and the SUL as a UL carrier with superior communication quality can increase the probability of transmission of the BFRQ. For example, the gNB may measure the communication quality of the non-SUL or the SUL. The gNB should notify, in advance, the UE of using which PUCCH for BFRQ on the non-SUL or the SUL the BFRQ is transmitted.

This enables transmission of the BFRQ using the PUCCH resource for BFRQ on the UL carrier with superior communication quality. Thus, the UE can notify the gNB of the BFRQ earlier.

After transmission of the BFRQ to the gNB, a beam recovery process is performed. The UL carrier to be used for this process after transmission of the BFRQ may be the UL carrier via which the BFRQ has been transmitted. The gNB performs the process after transmission of the BFRQ, via the UL carrier via which the BFRQ has been received. This enables the use of the UL carrier via which communication is possible.

As another method, the gNB may notify the SUL/non-SUL indicator using the UL grant to be transmitted from the gNB to the UE in the process after transmission of the BFRQ. The gNB may include the SUL/non-SUL indicator in the DCI for UL grant to notify the indicator using the PDCCH. The UE can recognize, from the indicator, which UL carrier is used.

The details disclosed in the fifth embodiment should be appropriately applied to the format of the BFRQ, information included in the PUCCH, and the method for configuring the PUCCH for BFRQ.

Configuring the PUCCH resource for BFRQ on the SUL as disclosed in the sixth embodiment enables transmission of the BFRQ with the communication quality superior to that in the conventional transmission of the BFRQ on the non-SUL. Enabling transmission of the PUCCH for BFRQ on both of the UL carriers of the SUL and the non-SUL enables transmission of the PUCCH for BFRQ on the SUL even when the PUCCH for BFRQ cannot be transmitted via the non-SUL. Furthermore, such use of the PUCCH enables earlier transmission of the BFRQ.

Thus, the BFRQ can be notified to the gNB earlier, and the recovery period from the beam failure can be shortened.

The PUCCH for BFRQ can be configured on the non-SUL. The non-SUL is sometimes configured so that its SCS is longer and its symbol duration is shorter than those of the SUL. Upon occurrence of a beam failure under this state, configuring the PUCCH resource for BFRQ on the non-SUL enables earlier notification of the BFRQ to the gNB and shortening the recovery period from the beam failure.

When the PUCCH is configured for another signal on the UL carrier configured as the PUCCH UL carrier, the BFRQ may be transmitted with the resource for transmitting the PUCCH. The PUCCH for another signal may be configured periodically or semi-persistently. Examples of such PUCCH include the PUCCH for SR and the PUCCH for CSI.

For example, when the PUCCH for SR is configured on the PUCCH UL carrier, the resource for transmitting the PUCCH for SR is used for transmitting the BFRQ on the PUCCH UL carrier.

The configuration of the PUCCHs for BFRQ on both of the UL carriers of the SUL and the non-SUL is disclosed above. Such a method saves the configuration of the PUCCH for BFRQ on the PUCCH UL carrier.

Furthermore, the PUCCH for BFRQ may be configured on the PUCCH UL carrier. Any one of the PUCCH for BFRQ and the PUCCHs for the other signals may be used for transmitting the BFRQ on the PUCCH UL carrier. The BFRQ can be transmitted with the resource for the PUCCH that is generated with the earliest timing from the configuration of the BFRQ. This can produce lower latency characteristics.

The Seventh Embodiment

In NR, repeated transmission (repetition) of the UL transmission data has been discussed. However, nothing has been discussed about the repeated transmission when a plurality of UL carriers can be used for the UE in which the SUL is configured. The method on the repeated transmission using a plurality of UL carriers is unknown.

The seventh embodiment discloses a method for solving such a problem.

The repeated transmission is performed on the same carrier. The repeated transmission is performed on the UL carrier configured using the DCI in the UL grant for the initial transmission. The repeated transmission may be configured using the SUL/the non-SUL indicator in the DCI in the UL grant for the initial transmission. This can avoid complexity in the control over the repeated transmission. This can reduce malfunctions in the gNB and the UE.

Another method is disclosed. The UL carrier is switched in the repeated transmission. The repeated transmission is performed by switching between the SUL and the non-SUL. The gNB may configure, in the UE, whether the UL carrier is switched in the repeated transmission. Information indicating whether the UL carrier is switched in the repeated transmission may be provided. The gNB may notify the UE of the information via the RRC signaling. The gNB may notify the UE of the information together with the SUL configuration information. The gNB may notify the UE of the information via the MAC signaling or the L1/L2 control signaling. This enables a dynamic change in the configuration.

The UL carrier may be switched in one HARQ process for each repeated transmission or for each plurality of repeated transmissions.

A method for switching between the UL carriers is disclosed. Switching patterns are provided. For example, the UL carrier should be switched for each transmission. When the initial transmission is performed on the SUL, the second repeated transmission is performed on the non-SUL. The third repeated transmission is performed on the SUL. As such, the UL carriers are alternately and repeatedly used for the number of times the transmission is configured.

The UL carriers may be alternately switched for each plurality of repeated transmissions. For example, the UL carrier is switched for each two transmissions. When the initial transmission is performed on the SUL, the first and second repeated transmissions are performed on the SUL, and the third and fourth repeated transmissions are performed on the non-SUL. As such, the UL carriers are alternately and repeatedly used for the number of times the transmission is configured.

Information on the UL carrier for the initial transmission or the switching pattern may be statically determined, for example, in a standard. Alternatively, the gNB may determine the information and notify it to the UE. The notification method may be the RRC signaling. The information may be broadcast as the broadcast information. This is effective when the same switching pattern is configured in all the UEs in a cell in which the SUL is configured. The information may be notified via the signaling dedicated to each UE or each UE group. The switching pattern is configurable dedicatedly in each UE. For example, the switching pattern is configurable in consideration of the communication quality of each UL carrier for each UE, etc.

Another notification method may be the MAC signaling. This can reduce reception errors. Another notification method may be the L1/L2 control signaling. Since this enables dynamic notification, for example, the time variation in the radio propagation environment can be supported early.

The UL carrier for the initial transmission may be configured using the DCI for the initial transmission. The UL carrier for the initial transmission may be configured using the SUL/the non-SUL indicator. Since this enables configuration of the UL carrier for the initial transmission, the gNB can configure, in the UE, the UL carrier with far superior communication quality in the initial transmission.

The gNB notifies the UE of the UL grant in both of the UL carriers of the SUL and the non-SUL. The gNB notifies the UE of the UL scheduling information in both of the UL carriers of the SUL and the non-SUL. The gNB may configure the UL scheduling information using the DCI for the initial transmission and notify the UE of the configuration information. This enables allocation of the resource for repeated transmission on the SUL and the non-SUL.

Another method is disclosed. The gNB configures the UL grant for the initial transmission using the DCI for the initial transmission, and notifies it to the UE. The scheduling information for repeated transmission from the second time may be derived from the scheduling information for the initial transmission. Only allocation of the resource may be derived from the scheduling information for the initial transmission as the scheduling information. This enables allocation of the resource for repeated transmission on the SUL and the non-SUL.

Another method is disclosed. A hopping pattern across the UL carriers may be predetermined. The hopping pattern should be represented by, for example, a function of a slot number of the initial transmission or the resource information of the initial transmission in the frequency axis direction, etc. Consequently, the gNB can notify the UE of the repeated transmission resource on a different UL carrier with less amount of information.

Another method is disclosed. During the repeated transmission, the gNB may include the UL carrier for performing subsequent transmission in the DCI to notify the UL carrier using the UL grant. A number may be assigned to the repeated transmission, and the number may be included in the DCI. The subsequent transmission after the number is performed via the UL carrier. This is effective, for example, when the number of repeated transmissions is many.

FIG. 61 illustrates one example repeated transmission when a plurality of UL carriers are configured. FIG. 61 illustrates a case where the repeated transmission is performed on the same carrier. When the SUL is configured using the DCI of a UL grant 7301 for the initial transmission, the repeated transmission is performed on the SUL. The resource indicated by the UL grant for the initial transmission is a resource 7304 on the SUL. The second repeated transmission (see a resource 7305) and the third repeated transmission (see a resource 7306) are performed on the SUL. Here, the number of repeated transmissions is configured as three.

This can avoid the complexity in the control over the repeated transmissions configured on the SUL for the UE. This can reduce malfunctions.

Figure 62:
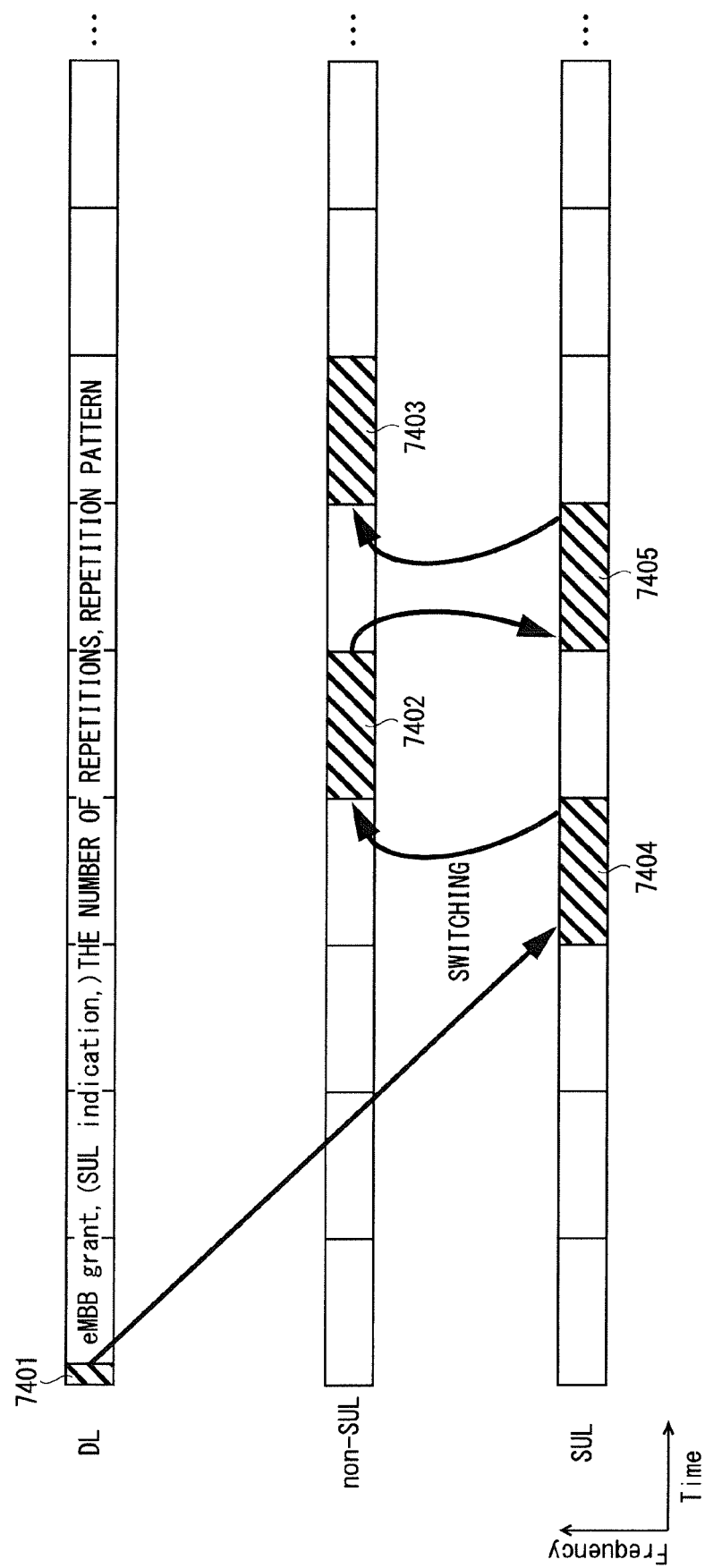
FIG. 62 illustrates one example repeated transmission when alternate switching between the UL carriers for each repeated transmission is configured according to the seventh embodiment.

FIG. 62 illustrates one example repeated transmission when alternate switching between the UL carriers for each repeated transmission is configured. When a resource 7404 on the SUL is configured using the DCI of a UL grant 7401 for the initial transmission, the second repeated transmission is performed with a resource 7402 on the non-SUL. The next third repeated transmission is performed with a resource 7405 on the SUL. The next fourth repeated transmission is performed with a resource 7403 on the non-SUL. Here, the number of repeated transmissions is configured as four.

The UL scheduling information for repeated transmission may be notified using the UL grant 7401, together with the UL grant for the initial transmission. As another method, the UL resource for repeated transmission may be calculated from the UL resource for the initial transmission. Since the frequency hopping across the UL carriers is performed in the repeated transmission, the communication quality can be improved.

FIG. 63 illustrates one example repeated transmission when the UL carriers have different numerologies. FIG. 63 illustrates a case where alternate switching between the UL carriers for each repeated transmission is configured. When a resource 7504 on the SUL is configured using the DCI of a UL grant 7501 for the initial transmission, the second repeated transmission is performed with a resource 7502 on the non-SUL. The next third repeated transmission is performed with a resource 7505 on the SUL. The next fourth repeated transmission is performed with a resource 7503 on the non-SUL. Here, the number of repeated transmissions is configured as four.

Suppose a case where the initial transmission (see the resource 7504) is performed on the SUL, the second transmission (see the resource 7502) is switched to the non-SUL, and then the third transmission (see the resource 7505) is switched back to the SUL. After the second transmission (see the resource 7502) on the non-SUL, the third transmission (see the resource 7505) is performed in the next slot on the SUL which does not overlap the slot in the second transmission. Thus, one slot on the non-SUL is vacant from the end of the second transmission (see the resource 7502) on the non-SUL to the start of the third transmission (see the resource 7505) on the SUL.

Thus, when each UL carrier differs in numerology, switching between the UL carriers for each repeated transmission sometimes delays the transmission. This creates a wasteful slot.

A method for solving such a problem is disclosed.

The switching between the UL carriers in the repeated transmission is performed with the timing when the slot timings of the UL carriers are aligned. The switching between the UL carriers in the repeated transmission is performed with the timing when the slot timings of the BWPs of the UL carriers are aligned. The repeated transmission is performed on the same UL carrier until the timing when the slot timings are aligned.

This can avoid waste of a vacant slot in the repeated transmission.

FIG. 64 illustrates one example repeated transmission when the UL carriers have different numerologies. FIG. 64 illustrates a case where the switching between the UL carriers in the repeated transmission is performed with the timing when the slot timings of the UL carriers are aligned. Here, the number of repeated transmissions is configured as four.

When a resource 7604 on the SUL is configured using the DCI of a UL grant 7601 for the initial transmission, the second repeated transmission is performed with a resource 7602 on the non-SUL. The next third repeated transmission is performed with a resource 7603 on the non-SUL without switching between the UL carriers, because the transmission is not performed with the timing when the slot timings are aligned. The next fourth repeated transmission is performed with a resource 7605 on the SUL after switching between the UL carriers, because the transmission is performed with the timing when the slot timings are aligned.

As such, when the UL carriers differ in numerology, the switching between the UL carriers in the repeated transmission is performed with the timing when the slot timings of the UL carriers are aligned. The repeated transmission is performed on the same UL carrier until the timing when the slot timings are aligned.

This can avoid a wasteful slot created in the repeated transmission, and the repeated transmission can be performed earlier. The reception quality in the gNB can be improved, which enables the gNB to perform earlier reception. This can produce the low latency characteristics in the repeated transmission from the UE in which the SUL is configured.

The method disclosed in the seventh embodiment enables the use of the SUL in the repeated transmission of the uplink data. Furthermore, since the repeated transmission of the uplink data at different frequencies are possible, the communication quality can be further improved. Moreover, switching between the frequencies saves transmission of a resource at a fixed frequency. This can randomize the interference with the other UEs, and reduce the interference with the other UEs.

The preemption may be performed when the repeated transmission of the UL transmission data is performed on the SUL or the non-SUL. The preemption may be performed in a slot where the repeated transmission including the initial transmission is performed. The fourth embodiment to the fourth modification of the fourth embodiment should be appropriately applied thereto. The communication with low latency and high reliability can be performed even when the repeated transmission is configured.

The Eighth Embodiment

In 3GPP, dedicatedly configuring the RRC parameter related to the SRS for each of the SRS on the SUL and the SRS on the non-SUL has been agreed. The RRC configuration includes the use case of the SRS. The use case of the SRS includes a non-codebook configuration.

The SRS in the non-codebook configuration is used, for example, when channel reciprocity is maintained and the base station performs precoding in the DL using a reception result of the SRS. Since the number of UL carriers for the DL is conventionally one, the non-codebook configuration has only to be made for the SRS in the UL.

However, when the SUL is operated, the number of UL carriers for the DL is two or more. Nothing has been discussed about a method on the non-codebook configuration for the SRS when a plurality of UL carriers are configured. The eighth embodiment discloses the method on the non-codebook configuration for the SRS when a plurality of UL carriers are configured.

The non-codebook configuration for the SRS is allowed only on the non-SUL. The non-codebook configuration for the SRS on the SUL other than the non-SUL is prohibited. In other words, transmission of the SRS using the non-codebook configuration is allowed only on the non-SUL. The UE does not assume the SRS with the non-codebook configuration on the SUL other than the non-SUL. Upon receipt of the non-codebook configuration for the SRS on the SUL other than the non-SUL, the UE may disregard the non-codebook configuration.

Since the non-codebook configuration for the SRS on the non-SUL that is a paired band for the DL is enabled regardless of the presence or absence of the configuration of the SUL, the precoding in the DL where the channel reciprocity is assumed is possible. Moreover, fixing the UL carrier to be used for the channel reciprocity can facilitate the control, and malfunctions between the gNB and the UE can be reduced.

However, when the non-codebook configuration for the SRS is allowed only on the non-SUL, a problem sometimes occurs. For example, when the communication quality of the non-SUL is deteriorated, the reciprocity characteristics are degraded, and the precoding performance in the DL where the channel reciprocity is assumed is degraded. A method for solving such a problem is disclosed.

The non-codebook configuration for the SRS is allowed on the SUL other than the non-SUL. In other words, transmission of the SRS using the non-codebook configuration is also allowed on the SUL other than the non-SUL. Upon receipt of the non-codebook configuration for the SRS on the SUL other than the non-SUL, the UE recognizes that the SRS with the non-codebook configuration is transmitted on the SUL.

Thus, the non-codebook configuration for the SRS is enabled not only on the non-SUL but also on the SUL. The gNB can use the SUL as channel reciprocity in the DL. The precoding in the DL becomes possible by using the SRS on the SUL.

The non-SUL and the SUL are sometimes configured in the same frequency band as that of the DL. For example, when the frequencies of the SUL are within the same frequency band as that of the DL, the non-codebook configuration for the SRS may be allowed on the SUL.

When the non-codebook configuration for the SRS is made on each of the non-SUL and the SUL, the gNB does not know which SRS should be used for transmitting a signal or a channel in the DL. Furthermore, the UE does not know for which UL carrier the gNB assumes the channel reciprocity. A method for solving such problems is disclosed.

The non-codebook configuration for the SRS is allowed only on one UL carrier at most at a time. The non-codebook configurations for both of the SRS on the non-SUL and the SRS on the SUL are not allowed at a time. The UE does not assume that the non-codebook configurations for the SRSs are made for two or more UL carriers at a time. Upon receipt of the non-codebook configurations for the SRSs on two or more UL carriers at a time, the UE may disregard the non-codebook configurations. Alternatively, upon receipt of the non-codebook configurations for the SRSs on two or more UL carriers at a time, the UE may enable only the non-codebook configuration for the SRS on the non-SUL and disable the non-codebook configuration for the SRS on the SUL.

Thus, the non-codebook configuration for the SRS is made only on one UL carrier. The gNB identifies the SRS on which UL carrier is used for transmitting the signal or the channel in the DL. Furthermore, the UE identifies for which UL carrier the gNB assumes the channel reciprocity. Thus, the transmission in the DL and the UL using the channel reciprocity is possible.

The gNB notifies the UE of on which UL carrier the non-codebook configuration for the SRS is made. Alternatively, the gNB may notify the UE of the non-codebook configuration for the SRS for each UL carrier. Furthermore, the gNB may notify the UE of change in the UL carrier on which the non-codebook configuration for the SRS is made. Alternatively, the gNB may notify the UE of change in the non-codebook configuration for the SRS for each UL carrier.

Although notification of the non-codebook configuration for the SRS from the gNB to the UE is disclosed, the gNB may notify the configuration of the use case of the SRS as another method. Examples of the configuration of the use case include non-codebook, codebook, and beam management. For example, when the SRS is configured as the non-codebook, the use case of the SRS should be configured as the non-codebook.

When the non-codebook configurations for the SRSs on a plurality of UL carriers are possible, the gNB can notify the UE of on which UL carrier the non-codebook configuration for the SRS is made.

The gNB should notify the UE via the RRC signaling. The gNB may give the notification using the RRC parameter related to the SRS. Increase in the amount of information can be suppressed. The gNB may give the notification via the MAC signaling or using the L1/L2 control signal as another method. The gNB may include, in the DCI, notification information to notify the information using the PDCCH. When the gNB gives the notification using the L1/L2 control signal, the dynamic configuration and change are possible.

The gNB may make, for the UE, the non-codebook configuration for the SRS (including the change) simultaneously when configuring the UL carrier. Information on the non-codebook configuration for the SRS should be provided. The information may be information indicating whether to make a change. For example, the DCI includes the SUL/non-SUL indicator for configuring the UL carrier. The information on the non-codebook configuration for the SRS may be included in the same DCI as that of the SUL/non-SUL indicator. The information may be associated with the SUL/non-SUL indicator.

As such, the gNB can notify the UE of whether the non-codebook configuration for the SRS is made on the configured UL carrier, together with the configuration of the SUL/non-SUL. The operation of the UL carrier can be associated with the non-codebook configuration for the SRS. The control can be facilitated.

The method disclosed in the eighth embodiment enables the operation of the SUL, and enables the non-codebook configuration for the SRS even when the number of UL carriers for the DL is two or more. Thus, the precoding in the DL where the channel reciprocity is assumed becomes possible, and the communication quality can be improved.

The Ninth Embodiment

In 3GPP, dedicatedly configuring the RRC parameter related to the SRS for each of the SRS on the SUL and the SRS on the non-SUL has been agreed. Furthermore, disallowing the simultaneous transmission of the SRSs on the SUL and the non-SUL has been agreed (Non-Patent Document 16).

The SRSs requiring the signaling other than the RRC exist. The SRSs are a semi-persistent SRS (SP-SRS) and an aperiodic SRS (A-SRS) (Non-Patent Document 15). The SP-SRS is activated/deactivated using the DCI, and the A-SRS is triggered using the DCI. Nothing has been discussed about a method for configuring the SP-SRS and the A-SRS when a plurality of UL carriers are configured. Here, the SP-SRS and the A-SRS cannot be transmitted during the operation of the SUL without any ingenuity.

The ninth embodiment discloses a method for solving such a problem.

The simultaneous occurrence of activation states of SRSs on the different UL carriers is prohibited in the SP-SRS. The simultaneous occurrence of trigger states of the SRSs on the different UL carriers is prohibited in the A-SRS. The UE need not assume the simultaneous occurrence of the activation states of the SP-SRSs on the different UL carriers. The UE need not assume the simultaneous occurrence of the trigger states of the A-SRSs on the different UL carriers.

When the activation of the SP-SRSs is configured on the different UL carriers, the UE may disregard the activation of the SP-SRS later configured. When the trigger of the A-SRSs is configured on the different UL carriers, the UE may disregard the trigger of the A-SRS later configured.

Consequently, the simultaneous occurrence of the activation states of the SP-SRSs on the different UL carriers is eliminated. Furthermore, the simultaneous occurrence of the trigger states of the A-SRSs on the different UL carriers is eliminated. Only the SP-SRS on one of the UL carriers is activated. Furthermore, only the A-SRS on one of the UL carriers is triggered.

Thus, the SP-SRS and the A-SRS can be transmitted even during the operation of the SUL.

However, since the aforementioned method specifies one UL carrier for transmitting the SP-SRS and the A-SRS, transmission of the SP-SRS and the A-SRS via a plurality of UL carriers requires the signaling from the gNB to the UE. Although the RRC parameter is configured for this reason, actual transmission of the SP-SRS and the A-SRS via a plurality of UL carriers causes a problem of taking time.

Without any transmission of the SRS when necessary in the gNB, for example, the UL scheduling, the precoding calculation in the DL, or the beam management is not appropriately performed. This leads to degradation in the communication quality. A method for solving such a problem is disclosed.

The simultaneous occurrence of the activation states of the SRSs on the different UL carriers is allowed in the SP-SRS. And/or, the simultaneous occurrence of the trigger states of the SRSs on the different UL carriers is allowed in the A-SRS. The gNB allows, for the UE, the simultaneous occurrence of the activation states of the SP-SRSs on the different UL carriers. The gNB allows, for the UE, the simultaneous occurrence of the trigger states of the A-SRSs on the different UL carriers.

These enable configuration of the SP-SRS and the A-SRS on a plurality of UL carriers, and enable the activation states of the SP-SRSs on the plurality of UL carriers. These also enable the trigger states of the A-SRSs on the plurality of UL carriers. Thus, the actual early transmission of the SP-SRS and the A-SRS via a plurality of UL carriers with low latency is possible.

For example, the gNB activates the SP-SRS on the non-SUL using the DCI for the UE. Furthermore, the gNB activates the SP-SRS on the SUL using the DCI. This enables the UE to transmit the SRS with the resource for SP-SRS on the non-SUL and transmit the SRS with the resource for SP-SRS on the SUL. Consequently, the UE can transmit the SP-SRSs via a plurality of UL carriers with low latency.

For example, the gNB triggers the A-SRS on the non-SUL using the DCI for the UE. Furthermore, the gNB triggers the A-SRS on the SUL using the DCI. This enables the UE to perform UL transmission with the resource for A-SRS on the non-SUL and perform UL transmission with the resource for A-SRS on the SUL. Consequently, the UE can transmit the A-SRSs via a plurality of UL carriers with low latency.

The gNB may activate the SP-SRSs and/or trigger the A-SRSs on the non-SUL and the SUL for the UE, using different pieces of the DCI or the same DCI. The DCI should include information for identifying the UL carrier via which the SP-SRSs are activated and/or the A-SRSs are triggered. The SUL/non-SUL indicator may be used.

When the SP-SRSs are activated and/or the A-SRSs are triggered via a plurality of UL carriers using the same DCI, the information should be information in which the activation of the SP-SRSs and/or the trigger of the A-SRSs are associated with the UL carriers.

The SP-SRSs may be deactivated similarly to the activation. The gNB may deactivate the SP-SRSs on the non-SUL and the SUL, using different pieces of the DCI or the same DCI. The DCI should include information for identifying the UL carrier via which the SP-SRSs are deactivated. The SUL/non-SUL indicator may be used. When the SP-SRSs are deactivated via a plurality of UL carriers using the same DCI, the information should be information in which the deactivation of the SP-SRSs is associated with the UL carriers.

The activation and the deactivation may coexist in the same DCI. Furthermore, the activation, the deactivation, and the trigger may coexist in the same DCI. This can flexibly configure the transmission of the SP-SRS and the A-SRS on a plurality of UL carriers.

Upon consecutive receipt of the activation/deactivation of the SP-SRSs on the same UL carrier before transmitting the SRS, the UE may enable the latter activation/deactivation.

For example, when the UE receives the deactivation of the SP-SRSs on the same UL carrier after receiving the activation of the SP-SRSs from the gNB and before transmitting the SRS, the UE may enable the deactivation of the SP-SRSs which has been received later. The UE does not transmit the SRS with the resource of the latter SP-SRSs. This can reduce malfunctions between the gNB and the UE.

Information for terminating a trigger of the A-SRS may be provided. In other words, information for disabling the trigger of the A-SRS may be provided. The information may be included in the DCI. The gNB should notify the UE of trigger termination information when terminating the trigger of the A-SRS which has been previously configured. Upon receipt of the trigger termination information before transmitting the SRS, the UE terminates the trigger of the A-SRS.

Upon consecutive receipt of the trigger/trigger termination of the A-SRSs on the same UL carrier before transmitting the SRS, the UE may enable the latter trigger/trigger termination.

For example, upon receipt of the trigger termination for the A-SRSs on the same UL carrier after receiving the trigger of the A-SRSs from the gNB and before transmitting the SRS, the UE enables the trigger termination for the A-SRSs that has been received later. The UE does not transmit the SRS with the resource of the latter A-SRSs. This can reduce malfunctions between the gNB and the UE.

Moreover, this can reduce transmission of the wasteful SRS from the UE. The power consumption of the UE can be reduced. Moreover, the interference in the UL can be reduced.

The trigger of the A-SRSs on the non-SUL and the SUL may be terminated using different pieces of the DCI or the same DCI. The DCI should include information for identifying the UL carrier via which the trigger of the A-SRSs is terminated. The SUL/non-SUL indicator may be used. When the trigger of the A-SRSs is terminated via a plurality of UL carriers using the same DCI, the information should be information in which the termination of the trigger of the A-SRSs is associated with the UL carriers.

The trigger and the trigger termination may coexist in the same DCI. Furthermore, the activation, the deactivation, the trigger, and the trigger termination may coexist in the same DCI. This can flexibly configure the transmission of the SP-SRS and the A-SRS on a plurality of UL carriers.

As described above, disallowing the UE to simultaneously transmit the SRSs on the different UL carriers has been agreed in 3GPP. However, when the activation states of the SP-SRSs on a plurality of UL carriers and the trigger states of A-SRSs on the plurality of UL carriers are enabled, the SRSs on the different UL carriers sometimes overlap in transmission timing. A method for solving such a problem is disclosed.

When the transmission timings of the SRSs on a plurality of UL carriers overlap, priorities should be assigned to the transmissions of the SRSs. The priorities may be statically determined, for example, in a standard, or determined and notified to the UE by the gNB. The UE should transmit the SRSs according to the priorities.

Examples of the priorities are disclosed. For example, the priorities are assigned according to the types of the UL carriers. Suppose that, for example, the priority of the SRS on the non-SUL is 1. Furthermore, the priorities may be configured including the non-SUL and the SUL. When the number of SULs is two or more, the priorities should be determined for the respective SULs. This can prioritize the transmission of the SRS on the non-SUL.

The gNB can preferentially perform the UL scheduling on the non-SUL. The priorities are configurable in order of UL carrier whose scheduling is desirably prioritized. Furthermore, when the channel reciprocity on the non-SUL is assumed in the DL, transmission of the SRS with the non-codebook configuration can be prioritized.

As another example of the priorities, the SUL may be prioritized. The frequency band of the SUL is configured to be lower than that of the non-SUL. Thus, the SUL sometimes have a wider coverage. Here, the UL communication quality of the SUL is sometimes superior to the UL communication quality of the non-SUL. The gNB can preferentially perform the UL scheduling on the SUL by prioritizing the SRS on the SUL. The communication quality in the UL can be improved.

As another example of the priorities, an instruction of the SRS later transmitted from the gNB to the UE may be prioritized. The UE should prioritize the instruction of the SRS later received. Examples of the instruction of the SRS include the activation of the SP-SRS and the trigger of the A-SRS.

For example, the UE receives, from the gNB, the activation of the SP-SRS on the non-SUL after receiving the activation of the SP-SRS on the SUL. When the resource for the SP-SRS on the SUL and the resource for the SP-SRS on the non-SUL overlap in timing, the UE prioritizes the activation of the SP-SRS on the non-SUL which has been later received, and transmits the SRS with the resource for the SP-SRS on the non-SUL.

For example, the UE receives, from the gNB, the trigger of the A-SRS on the SUL after receiving the trigger of the A-SRS on the non-SUL. When the resource for the A-SRS on the non-SUL and the resource for the A-SRS on the SUL overlap in timing, the UE prioritizes the trigger of the A-SRS on the SUL which has been later received, and transmits the SRS with the resource for the A-SRS on the SUL.

As such, the gNB can appropriately instruct the UE of the SRS to be desirably transmitted. Since the SRS to be desirably dynamically transmitted is configurable, the communication quality in the UL can be improved.

As another example of the priorities, the priorities may be determined according to the types of the SRSs. Examples of the types of the SRSs include the periodic SRS, the SP-SRS, and the A-SRS. For example, the priority of the A-SRS may be 1, the priority of the SP-SRS may be 2, and the priority of the periodic SRS may be 3. When the SRSs on a plurality of UL carriers overlap in transmission timing, the SRS to be preferentially transmitted is determined according to the type of the SRS.

As another example of the priorities, the priorities may be determined according to the use cases of the SRSs. For example, the priority of the non-codebook configuration may be 1, the priority of the beam management configuration may be 2, and the priority of the codebook configuration may be 3. When the SRSs on a plurality of UL carriers overlap in transmission timing, the SRS to be preferentially transmitted is determined according to the use case of the SRS.

The priorities may be obtained by combining the examples of the priorities previously disclosed. When the same priority is assigned to a plurality of SRSs, the SRS to be transmitted may be determined using another priority.

Even when the SRSs on the different UL carriers overlap in transmission timing, the UE can transmit the SRSs in such a manner.

The number of SRS transmission symbols is sometimes two or more. The SRS is transmitted in a plurality of consecutive symbols. The UE transmits the SRS in a plurality of consecutive symbols. As such, when the SRS is transmitted in a plurality of symbols, switching between the UL carriers on the way is prohibited. The transmission of the SRS in a plurality of symbols is performed on the same UL carrier.

Consequently, the UE need not change the UL carrier during transmission of the SRS. Furthermore, the gNB need not change the UL carrier during reception of the SRS from the UE. The waste of the resource owing to the switching of the SRS can be reduced. Furthermore, the control can be facilitated.

A method for transmitting the SRSs when the SRSs on the different UL carriers partly overlap in transmission timing is disclosed. Even when the transmission timings of the SRSs only partly overlap, the SRS whose transmission has been determined is transmitted in all the symbols. Transmission of the SRS whose transmission has not been determined should be avoided in all the symbols. The transmission of the SRS may be determined according to the priorities.

The waste of the resource owing to the switching of the SRS can be reduced. Furthermore, the control can be facilitated.

When the SUL is configured, the SRS and the other signal or channel on the different UL carriers sometimes overlap in transmission timing. In such a case, the simultaneous UL transmissions on the different UL carriers need not be performed. However, the transmission method is unclear. A method for solving such a problem is disclosed.

Priorities should be assigned to the transmissions when the SRS and the other signal or channel on a plurality of UL carriers overlap in transmission timing. The priorities may be statically determined, for example, in a standard, or determined and notified to the UE by the gNB. The UE should transmit the SRS, the other signal, or the other channel according to the priorities.

An example where the SRSs on different UL carrier overlap in transmission timing may be applied as an example of the priorities. In addition, the priorities may be determined according to the type of the other signal or channel.

For example, the priorities are assigned according to the types of the UL carriers. Suppose that, for example, the priority of a signal or a channel on the non-SUL is 1 and the priority of a signal or a channel on the SUL is 2. For example, when the PUCCH on the non-SUL and the SRS on the SUL overlap in transmission timing, transmission of the PUCCH on the non-SUL is prioritized.

The UE transmits the PUCCH on the non-SUL, and does not transmit the SRS on the SUL. This can prioritize the transmissions of the signal or channel on the non-SUL.

As another example of the priorities, the instruction for transmitting the signal or channel, which has been later transmitted from the gNB to the UE, may be prioritized. The UE should prioritize the instruction for transmitting the signal or channel, which has been later received.

For example, the UE receives, from the gNB, the trigger of the A-SRS on the SUL after receiving the instruction for transmitting the PUCCH for Ack/Nack on the non-SUL. When the PUCCH for Ack/Nack on the non-SUL and the A-SRS on the SUL overlap in transmission timing, the UE prioritizes the trigger of the A-SRS on the SUL which has been later received, and transmits the SRS with the resource for A-SRS on the SUL.

As another example of the priorities, the priorities may be determined according to the type of the SRS and the type of the other signal or channel. Suppose that, for example, the priority of transmission of the PUCCH for Ack/Nack is 1, the priority of transmission of the A-SRS is 2, the priority of transmission of the PUCCH for SR is 3, the priority of transmission of the SP-SRS is 4, the priority of the transmission of the PUCCH for CSI is 5, and the priority of transmission of the periodic SRS is 6.

When these signals or channels on the SUL and these signals or channels on the non-SUL overlap in transmission timing, the UE should determine, according to the priorities, the signal or channels to be transmitted and transmit the signal or channels.

As another example of the priorities, the SRS on the SUL may be prioritized. Furthermore, when the use case of the SRS on the SUL is a codebook, the SRS on the SUL may be prioritized. When the communication quality of the non-SUL is rapidly degraded, prioritizing the transmission of the SRS on the SUL enables the gNB to perform the UL scheduling on the SUL. This can satisfactorily maintain the communication quality in the UL.

When the SRS and the other signal or channel on different UL carriers partially overlap in transmission timing, the method used when the SRSs on the different UL carriers partially overlap in transmission timing should be applied. This produces the same advantages as previously described.

The gNB may schedule the transmission timings of the SRS and the PUSCH on different UL carriers without any overlap. The UE assumes that the transmission timings of the SRS and the PUSCH on the different UL carriers have no overlap. When receiving, from gNB on different UL carriers, an instruction for transmitting the SRS and an instruction for transmitting the PUSCH which overlap in transmission timing, the UE may disregard the instructions. Alternatively, the UE may disregard the instruction for transmitting the SRS or the instruction for transmitting the PUSCH which has been later transmitted.

This can avoid an overlap in transmission timing between the SRS and the PUSCH on different UL carriers, and reliably execute the transmission of the SRS and the PUSCH on the different UL carriers.

The SRS and the PUSCH on each of the UL carriers may be grouped into one group. The gNB may schedule the transmission timings of the groups on the different UL carriers without any overlap. For example, when the SRS and the PUSCH are included in the same slot on one UL carrier, the SRS and the PUSCH are grouped into one group.

Consequently, the scheduling can be facilitated.

When the SRS and the PUSCH on different UL carriers partially overlap in transmission timing, the overlapping symbols of the SRS may be punctured, and the PUSCH may be transmitted. The SRS and the PUSCH can be transmitted on the different UL carriers.

Data supposed to be transmitted in the punctured symbols may be transmitted in the other symbols of the PUSCH. The data may be transmitted with the rate being changed.

As such, when the SRS and the PUSCH on different UL carriers partially overlap in transmission timing, the SRS and the PUSCH can be transmitted on the different UL carriers.

One or more BWPs may be configured in each of the UL carriers. The description on the UL carriers may be appropriately applied to the one or more BWPs configured in each of the UL carriers. The description on the UL carriers may be regarded as that for the one or more BWPs configured in each of the UL carriers.

A method for configuring a modulation scheme for the UL carrier during the operation of the SUL is disclosed. Examples of the modulation scheme include the OFDM and the DFT-s-OFDM. The modulation scheme of the SUL should be the same as that of the non-SUL. For example, when the OFDM is configured on the non-SUL for the UE, the OFDM is configured also on the SUL. Since the modulation scheme is not changed in switching between the SUL and the non-SUL, the switching control can be facilitated.

As another method, the modulation scheme may be configured for each UL carrier. The modulation scheme may be configured for each UL carrier for each UE. For example, the OFDM is configured on the non-SUL for the UE, and the DFT-s-OFDM is configured on the SUL for the UE. Since the UL data transmission using the DFT-s-OFDM can reduce the power consumption, the UL data transmission on the SUL can further reduce the power consumption.

The Tenth Embodiment

The uplink data can be duplicated in one cell. For example, a packet may be duplicated using the SUL and the non-SUL. Transmission using the SUL and transmission using the non-SUL may or need not overlap in time resource. The duplication may be performed on the DRB or the SRB. This can produce, for example, the frequency diversity effects in transmission of the uplink data. As a result, the reliability can be enhanced. This duplication differs from the packet duplication (see Non-Patent Document 16) in not using the DC configuration and not using the CA.

The base station instructs the UE to start/stop the duplication. The base station may notify a configuration on the duplication. The base station may issue the instruction and/or notify the configuration via the RRC signaling, the MAC signaling, or the L1/L2 signaling. The aforementioned combinations may be used. For example, the configuration may be included in the RRC signaling and notified from the base station to the UE, or the instruction may be included in the MAC signaling and notified from the base station to the UE. This enables, for example, a prompt notification with less amount of signaling. The UE may start or stop the duplication using the instruction and/or the configuration. The base station may discard the pieces of uplink data redundantly received through the duplication except one of the pieces. The base station may transfer only one of the pieces of the data to the upper layer (e.g., the RRC) or the high-level NW device (e.g., the 5GC).

The UE may perform the duplication in the PDCP layer. As another example, the UE may perform the duplication in the RLC layer or the MAC layer. The base station may perform, in the PDCP layer, an operation of discarding the pieces of uplink data redundantly received through the duplication except one of the pieces. As another example, the base station may perform the operation in the RLC layer or the MAC layer. The duplication in the UE and the discarding operation in the base station should be performed in the same layer. This can, for example, prevent increase in the amount of processing in the base station and/or the UE due to unnecessary duplication of data.

The tenth embodiment enables, for example, the UE that does not use the DC structure or the CA structure to duplicate the uplink data. As a result, the reliability of the uplink data can be enhanced.

The embodiments and the modifications are mere exemplifications of the present invention, and can be freely combined within the scope of the present invention. The arbitrary constituent elements of the embodiments and the modifications can be appropriately modified or omitted.

A slot in the embodiments and the modifications is an example time unit of communication in the fifth generation base station communication system. The slot may be configured per scheduling. The processes described in the embodiments and the modifications as being performed per slot may be performed per TTI, per subframe, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES 200 communication system, 202 communication terminal device, 203 base station device.

The invention claimed is:

1. A user apparatus in a communication system, the user apparatus comprising:
a processor coupled to a memory storing instructions for the processor,
the communication system comprising the user apparatus and a plurality of base stations configured to wirelessly communicate with the user apparatus, wherein
the user apparatus operates in one of a radio resource control RRC_CONNECTED state, an RRC_INACTIVE state, and an RRC_IDLE state transitionable to each other,
the plurality of base stations include a plurality of master nodes including a first master node and a second master node and one or more secondary nodes, the plurality of master nodes each having a cell group including a primary cell and one or more secondary cells, the one or more secondary nodes each having a cell group including a primary cell and one or more secondary cells,
each master node and each secondary node support dual connectivity for the user apparatus,
the user apparatus performs a procedure for switching a destination of the user apparatus for the dual connectivity from the first master node, which is a source master node, to the second master node, which is a target master node, and resuming the user apparatus from the RRC_INACTIVE state to the RRC_CONNECTED state,
wherein, in the procedure, the user apparatus transmits, to the second master node, a resume request message including a identifier allocated by the first master node in transitioning from the RRC_CONNECTED state to the RRC_INACTIVE state, and
in the procedure, the user apparatus receives, from the second master node, a resume message related to resuming to the RRC_CONNECTED state, and executes release of a configuration related to a secondary node of the each secondary node based on the resume message.

2. The user apparatus according to claim 1, wherein, in the procedure, the user apparatus executes a packet data convergence protocol (PDCP) reconfiguration based on the resume message.

3. The user apparatus according to claim 1, wherein, in the procedure, the second master node executes decision related to the secondary node.

4. The user apparatus according to claim 1, wherein, in the procedure, the first master node transmits information related to the secondary node to the second master node based on a request received from the second master node to retrieve a context of the user apparatus identified by the identifier.

5. The user apparatus according to claim 4, wherein the first master node retains the information related to the secondary node to be transmitted to the second master node.

6. The user apparatus according to claim 4, wherein the information related to the secondary node to be transmitted to the second master node includes an identifier that identifies the secondary node.

7. The user apparatus according to claim 1, wherein, in the procedure, the secondary node retains a configuration related to the secondary node for the user apparatus.

8. The user apparatus according to claim 1, wherein, in the procedure, the secondary node transmits a configuration related to the secondary node to the second master node.

9. The user apparatus according to claim 1, wherein, in the procedure, the second master node transmits, to the user apparatus, an identifier identifying the user apparatus in radio access network (RAN) area update procedure.

10. The user apparatus according to claim 1, wherein the user apparatus periodically performs a measurement of neighbouring cells and reports a measurement result to any of the master nodes.

11. The user apparatus according to claim 1, wherein
the one or more secondary nodes include a first secondary node and a second secondary node, and
in respectively switching destinations of the user apparatus from the first master node and the first secondary node to the second master node and the second secondary node and resuming the user apparatus from the RRC_INACTIVE state to the RRC_CONNECTED state,
the second master node transmits a configuration related to the first secondary node to the second secondary node,
the second secondary node transmits a configuration related to the second secondary node to the second master node,
the first master node does not request the first secondary node to transmit a configuration, and
the user apparatus executes release of a configuration related to the first secondary node based on a resume message related to resuming to the RRC_CONNECTED state received from the second master node.

12. A base station in a communication system, the base station comprising:
a processor coupled to a memory storing instructions for the processor,
the communication system comprising a user apparatus and a plurality of base stations configured to wirelessly communicate with the user apparatus, wherein
the user apparatus operates in one of a radio resource control RRC_CONNECTED state, an RRC_INACTIVE state, and an RRC_IDLE state transitionable to each other,
the plurality of base stations include a plurality of master nodes including a first master node and a second master node and one or more secondary nodes, the plurality of master nodes each having a cell group including a primary cell and one or more secondary cells, the one or more secondary nodes each having a cell group including a primary cell and one or more secondary cells,
each master node and each secondary node support dual connectivity for the user apparatus,
the user apparatus performs a procedure for switching a destination of the user apparatus for the dual connectivity from the first master node, which is a source master node, to the second master node, which is a target master node, and resuming the user apparatus from the RRC_INACTIVE state to the RRC_CONNECTED state,
wherein, in the procedure, the second master node receives, from the user apparatus, a resume request message including a identifier allocated by the first master node in transitioning from the RRC_CONNECTED state to the RRC_INACTIVE state,
in the procedure, the second master node transmits, to the user apparatus, a resume message related to resuming to the RRC_CONNECTED state, and
the resume message indicates to execute release of a configuration related to a secondary node of the each secondary node.

13. A communication system comprising a user apparatus; and a plurality of base stations configured to wirelessly communicate with the user apparatus, wherein
the user apparatus operates in one of a radio resource control RRC_CONNECTED state, an RRC_INACTIVE state, and an RRC_IDLE state transitionable to each other,
the plurality of base stations include a plurality of master nodes including a first master node and a second master node and one or more secondary nodes, the plurality of master nodes each having a cell group including a primary cell and one or more secondary cells, the one or more secondary nodes each having a cell group including a primary cell and one or more secondary cells,
each master node and each secondary node support dual connectivity for the user apparatus,
the user apparatus performs a procedure for switching a destination of the user apparatus for the dual connectivity from the first master node, which is a source master node, to the second master node, which is a target master node, and resuming the user apparatus from the RRC_INACTIVE state to the RRC_CONNECTED state,
wherein, in the procedure, the user apparatus transmits, to the second master node, a resume request message including a identifier allocated by the first master node in transitioning from the RRC_CONNECTED state to the RRC_INACTIVE state, and
in the procedure, the user apparatus receives, from the second master node, a resume message related to resuming to the RRC_CONNECTED state, and executes release of a configuration related to a secondary node of the each secondary node based on the resume message.

* * * * *